(12) United States Patent
Meyers et al.

(10) Patent No.: US 12,318,699 B2
(45) Date of Patent: *Jun. 3, 2025

(54) GENERATING PLAYER TOKEN NFTS VIA A BLOCKCHAIN-BASED DISTRIBUTED COMPUTER NETWORK BASED ON PLAYER HIERARCHY

(71) Applicant: Galiant Arts, LLC, Austin, TX (US)

(72) Inventors: Mark Meyers, Austin, TX (US); Bruce E. Stuckman, Austin, TX (US); John W. Howard, Cedar Park, TX (US)

(73) Assignee: Galiant Arts, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,189

(22) Filed: Jan. 11, 2024

(65) Prior Publication Data

US 2024/0139634 A1      May 2, 2024

Related U.S. Application Data

(63) Continuation-in-part of application No. 18/486,314, filed on Oct. 13, 2023, which is a continuation-in-part of application No. 18/452,839, filed on Aug. 21, 2023, which is a continuation-in-part of application No. 17/820,935, filed on Aug. 19, 2022, which is a continuation-in-part of application No. 17/819,016, filed on Aug. 11, 2022, now Pat. No. 12,175,838, which is a continuation-in-part of application No. 17/806,766, filed on Jun. 14, 2022, which is a continuation-in-part of application No. 17/661,362, filed on Apr. 29, 2022, now Pat. No. 12,121,820, (Continued)

(51) Int. Cl.
*A63F 13/00*      (2014.01)
*A63F 13/79*      (2014.01)

(52) U.S. Cl.
CPC .................................. *A63F 13/79* (2014.09)

(58) Field of Classification Search
CPC .. H04L 9/50; A63F 13/69; A63F 13/71; A63F 13/77
See application file for complete search history.

(56) References Cited

U.S. PATENT DOCUMENTS 7,921,302 B2     4/2011   Gatto
11,663,551 B2    5/2023   Stephens
(Continued)

FOREIGN PATENT DOCUMENTS

EP     3857452     4/2021
EP     4136547     2/2023
(Continued)

*Primary Examiner* — David L Lewis
*Assistant Examiner* — Eric M Thomas
(74) *Attorney, Agent, or Firm* — Garlick & Markison; Bruce E. Stuckman

(57) ABSTRACT

A non-fungible token (NFT) platform that includes a processor and a memory, and operates by: receiving, via the processor, player data to be associated with a player token NFT corresponding to a multiplayer game; receiving, via the processor, other data, wherein the other data includes player hierarchy data to be associated with the player token NFT; and facilitating creation of the player token NFT via a blockchain-based distributed computer network, based on the player data and the player hierarchy data.

20 Claims, 134 Drawing Sheets

Related U.S. Application Data which is a continuation-in-part of application No. 17/656,084, filed on Mar. 23, 2022, now Pat. No. 11,786,820.

(60) Provisional application No. 63/608,953, filed on Dec. 12, 2023, provisional application No. 63/608,635, filed on Dec. 11, 2023, provisional application No. 63/608,645, filed on Dec. 11, 2023, provisional application No. 63/608,612, filed on Dec. 11, 2023, provisional application No. 63/511,787, filed on Jul. 3, 2023, provisional application No. 63/511,794, filed on Jul. 3, 2023, provisional application No. 63/509,208, filed on Jun. 20, 2023, provisional application No. 63/375,298, filed on Sep. 12, 2022, provisional application No. 63/370,464, filed on Aug. 4, 2022, provisional application No. 63/365,012, filed on May 19, 2022, provisional application No. 63/365,010, filed on May 19, 2022, provisional application No. 63/364,571, filed on May 12, 2022, provisional application No. 63/364,573, filed on May 12, 2022, provisional application No. 63/364,578, filed on May 12, 2022, provisional application No. 63/364,568, filed on May 12, 2022, provisional application No. 63/362,581, filed on Apr. 6, 2022, provisional application No. 63/310,376, filed on Feb. 15, 2022, provisional application No. 63/309,382, filed on Feb. 11, 2022, provisional application No. 63/308,546, filed on Feb. 10, 2022, provisional application No. 63/307,349, filed on Feb. 7, 2022, provisional application No. 63/306,405, filed on Feb. 3, 2022, provisional application No. 63/306,412, filed on Feb. 3, 2022, provisional application No. 63/305,505, filed on Feb. 1, 2022, provisional application No. 63/305,559, filed on Feb. 1, 2022, provisional application No. 63/302,757, filed on Jan. 25, 2022, provisional application No. 63/302,768, filed on Jan. 25, 2022, provisional application No. 63/297,394, filed on Jan. 7, 2022, provisional application No. 63/266,478, filed on Jan. 6, 2022, provisional application No. 63/265,754, filed on Dec. 20, 2021, provisional application No. 63/264,811, filed on Dec. 2, 2021, provisional application No. 63/263,844, filed on Nov. 10, 2021, provisional application No. 63/262,858, filed on Oct. 21, 2021, provisional application No. 63/262,762, filed on Oct. 20, 2021, provisional application No. 63/262,536, filed on Oct. 14, 2021.

(56) References Cited

U.S. PATENT DOCUMENTS

| | | | |
|---|---|---|---|
| 11,707,682 B2 | 7/2023 | Benedetto | |
| 11,741,426 B2 | 8/2023 | Stephens | |
| 11,765,230 B2 | 9/2023 | Sulibhavi | |
| 11,819,760 B2 | 11/2023 | Hiatt | |
| 11,865,457 B2 | 1/2024 | Benedetto | |
| 11,883,748 B2 | 1/2024 | Yang | |
| 12,029,984 B2 | 7/2024 | Benedetto | |
| 2010/0087251 A1 | 4/2010 | Collar | |
| 2021/0082044 A1* | 3/2021 | Sliwka | H04L 9/3255 |
| 2023/0079127 A1 | 3/2023 | Benedetto | |
| 2023/0316320 A1 | 10/2023 | Yamazaki | |
| 2023/0318811 A1 | 10/2023 | Claesen | |
| 2023/0385967 A1 | 11/2023 | Rosenberg | |
| 2023/0419315 A1 | 12/2023 | Togame | |
| 2024/0066402 A1 | 2/2024 | Milne | |
| 2024/0082710 A1 | 3/2024 | Hiatt | |
| 2024/0091652 A1 | 3/2024 | Benedetto | |
| 2024/0123354 A1 | 4/2024 | Benedetto | |
| 2024/0202707 A1 | 6/2024 | Sachson | |
| 2024/0238679 A1 | 7/2024 | Green | |

FOREIGN PATENT DOCUMENTS

| | | | |
|---|---|---|---|
| EP | 4405878 | 7/2024 | |
| WO | WO-2021062160 A1 * | 4/2021 | G06F 16/2365 |
| WO | WO-2022204404 A1 * | 9/2022 | G06F 21/10 |
| WO | WO2022224585 | 10/2022 | |
| WO | WO2022269989 | 12/2022 | |
| WO | WO2022269998 | 12/2022 | |
| WO | WO2023015202 | 2/2023 | |
| WO | WO2023076015 | 5/2023 | |
| WO | WO2023105326 | 6/2023 | |
| WO | WO2023015090 | 9/2023 | |
| WO | WO2023176421 | 9/2023 | |
| WO | WO2023181896 | 9/2023 | |
| WO | WO2023187486 | 10/2023 | |
| WO | WO2023217678 | 11/2023 | |
| WO | WO2023225437 | 11/2023 | |
| WO | WO2023248034 | 12/2023 | |
| WO | WO2024015704 | 1/2024 | |
| WO | WO2024029368 | 2/2024 | |
| WO | WO2024039447 | 2/2024 | |
| WO | WO2024042411 | 2/2024 | |
| WO | WO2024042415 | 2/2024 | |
| WO | WO2024053431 | 3/2024 | |
| WO | WO2024069310 | 4/2024 | |
| WO | WO2024080135 | 4/2024 | |
| WO | WO2024081704 | 4/2024 | |
| WO | WO2024084943 | 4/2024 | |
| WO | WO2024122243 | 6/2024 | |
| WO | WO2024123549 | 6/2024 | |
| WO | WO2024128045 | 6/2024 | |
| WO | WO2024134554 | 6/2024 | |
| WO | WO2024150698 | 7/2024 | |
| WO | WO2024155466 | 7/2024 | |

* cited by examiner

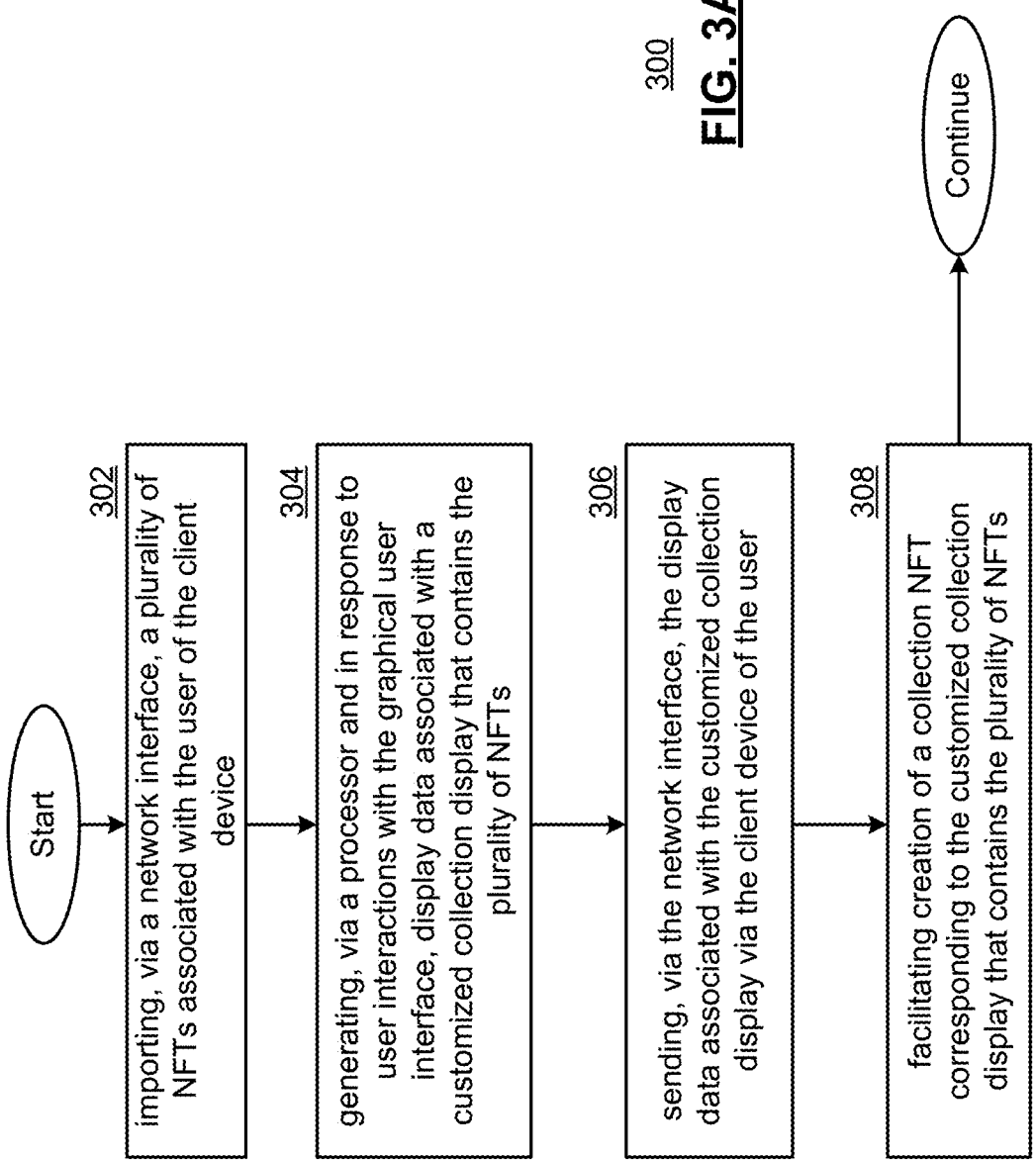

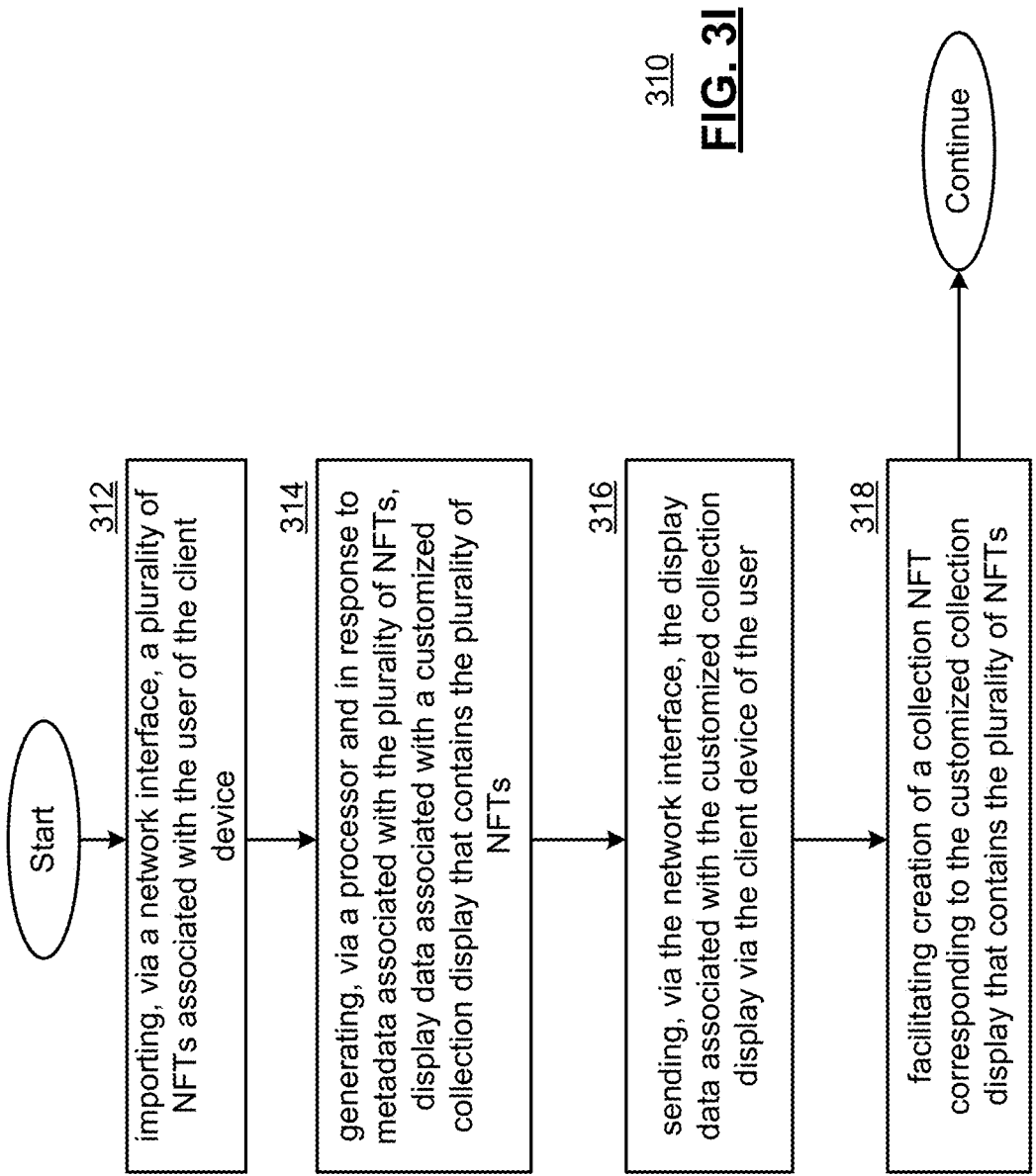

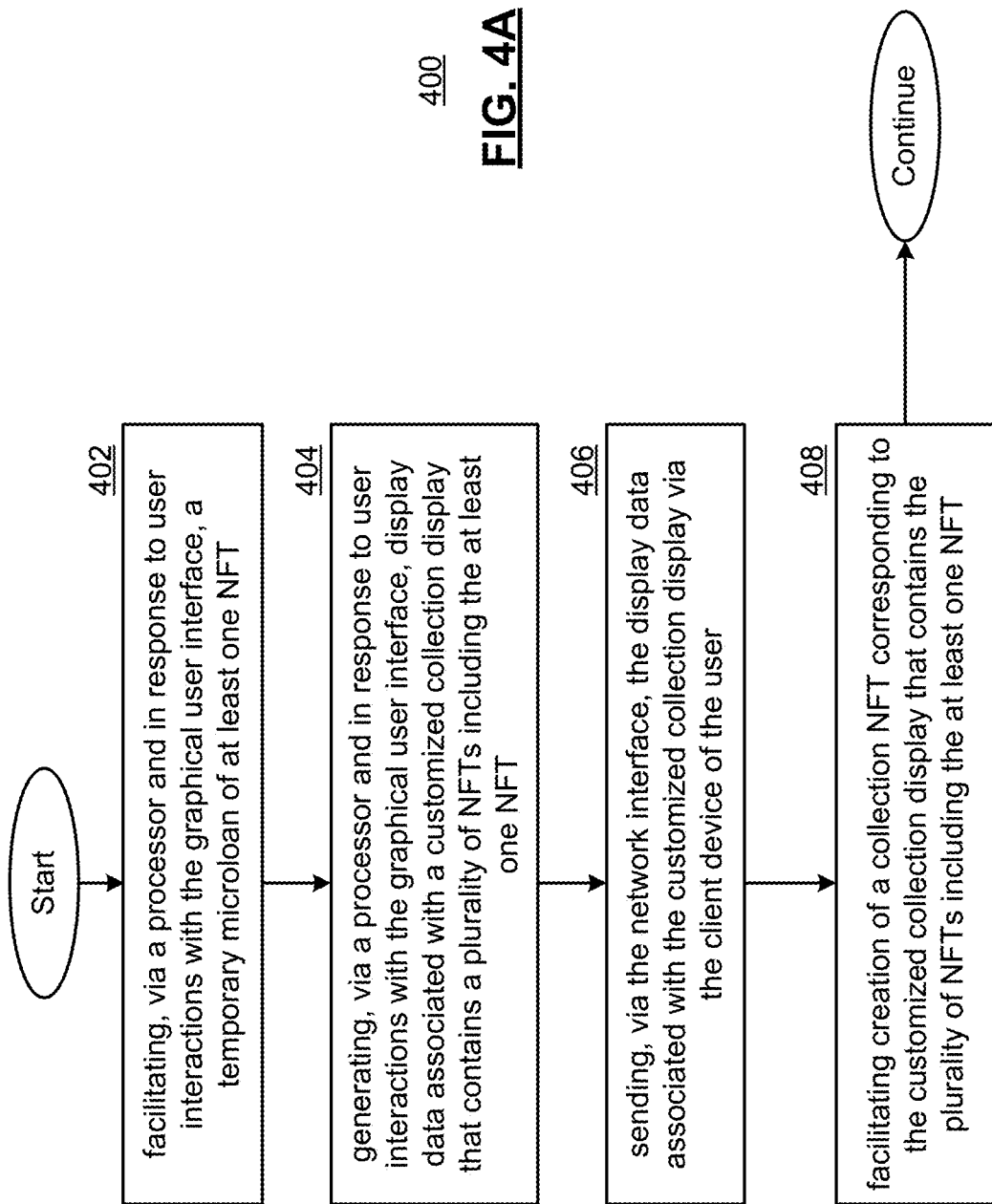

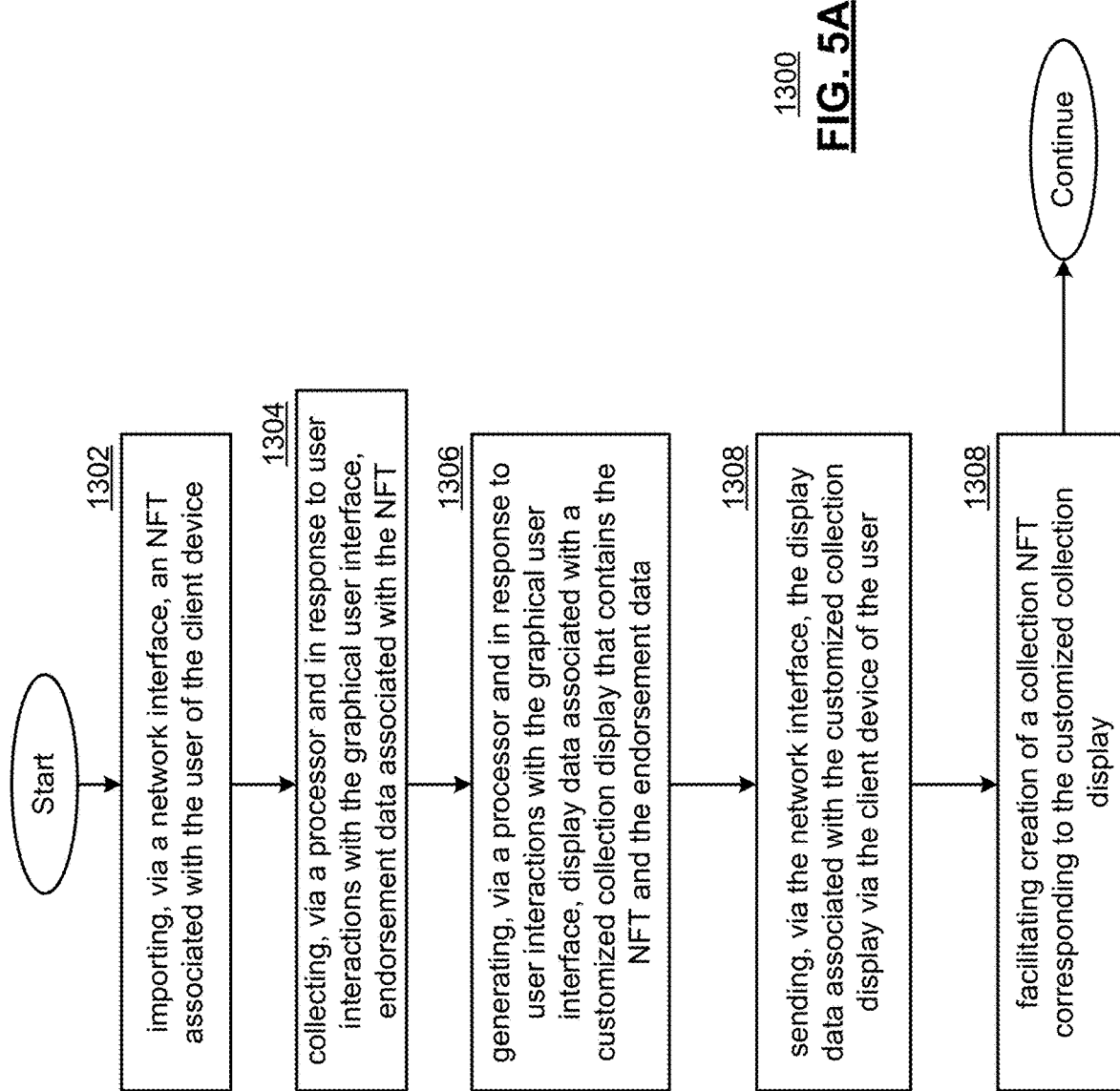

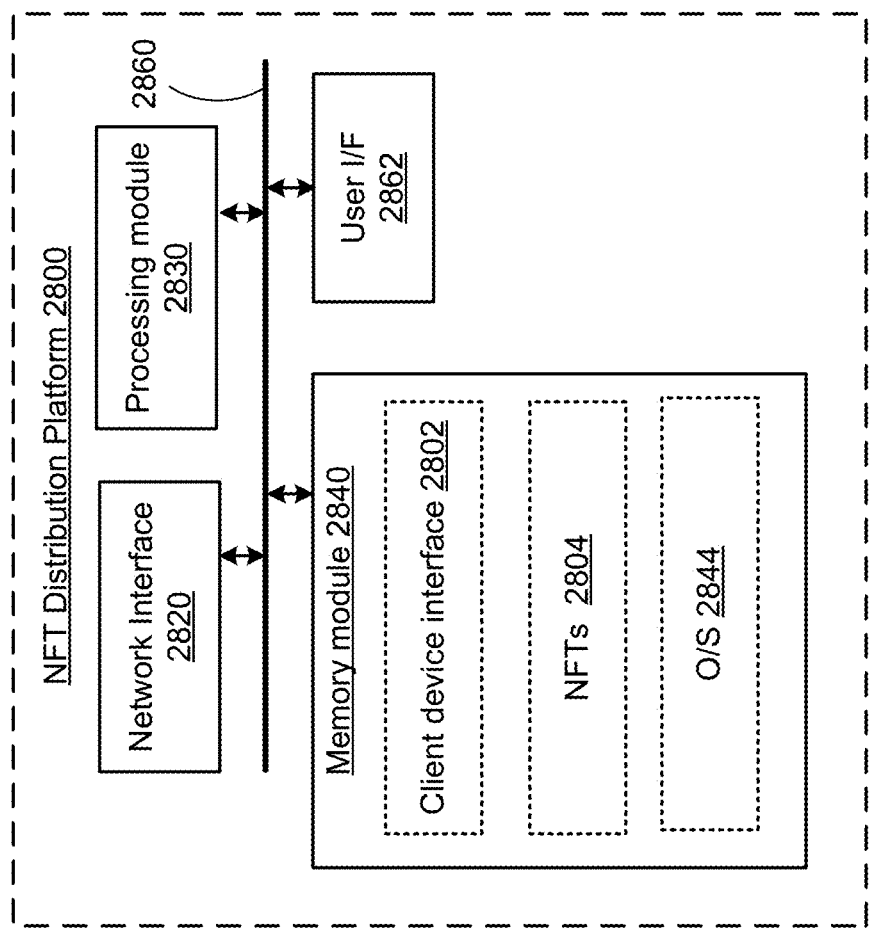
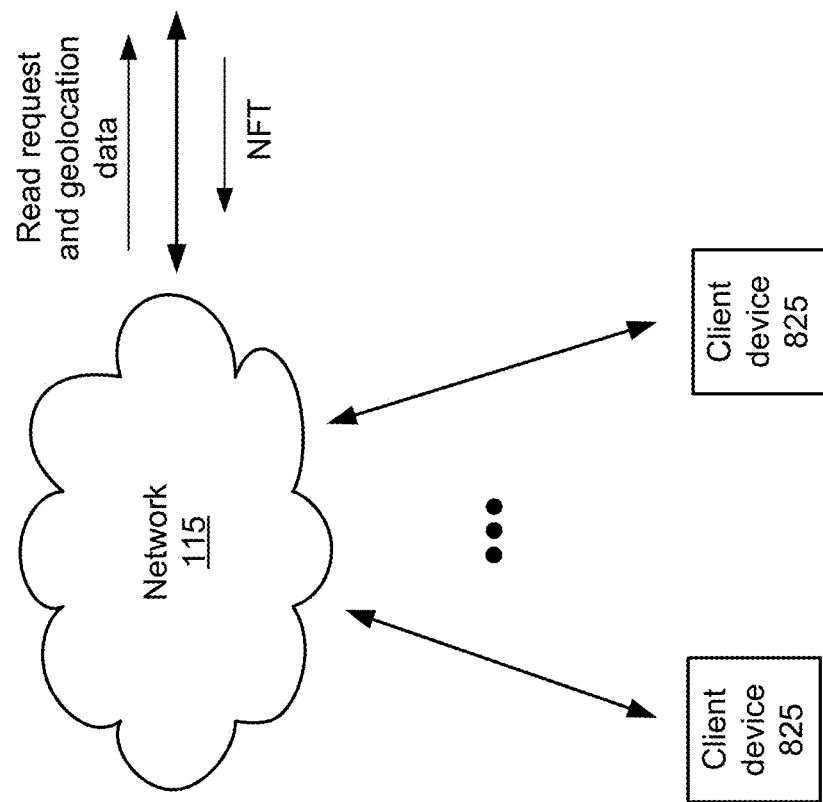
FIG. 7

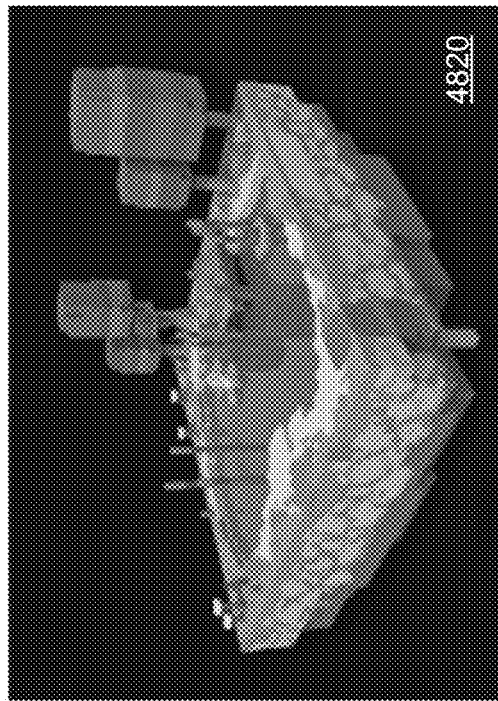
FIG. 9B
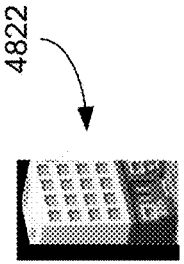
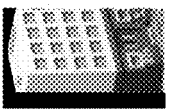
FIG. 9C
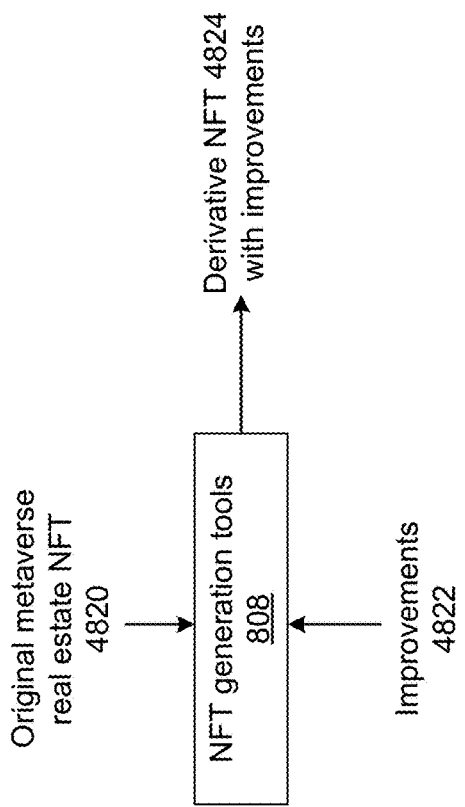
FIG. 9A
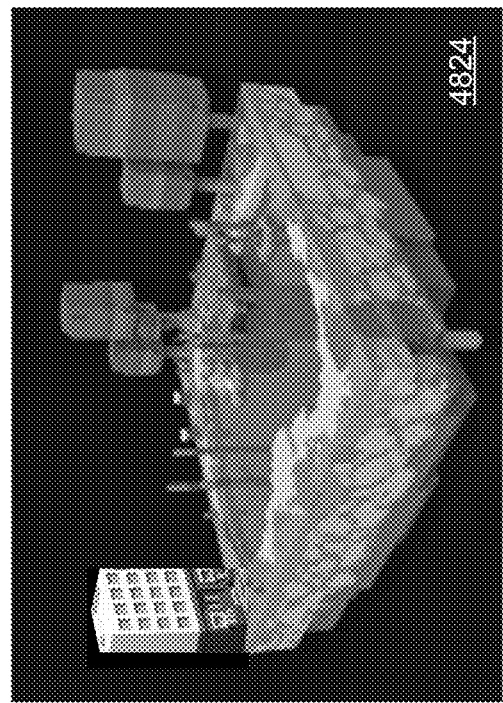
FIG. 9D

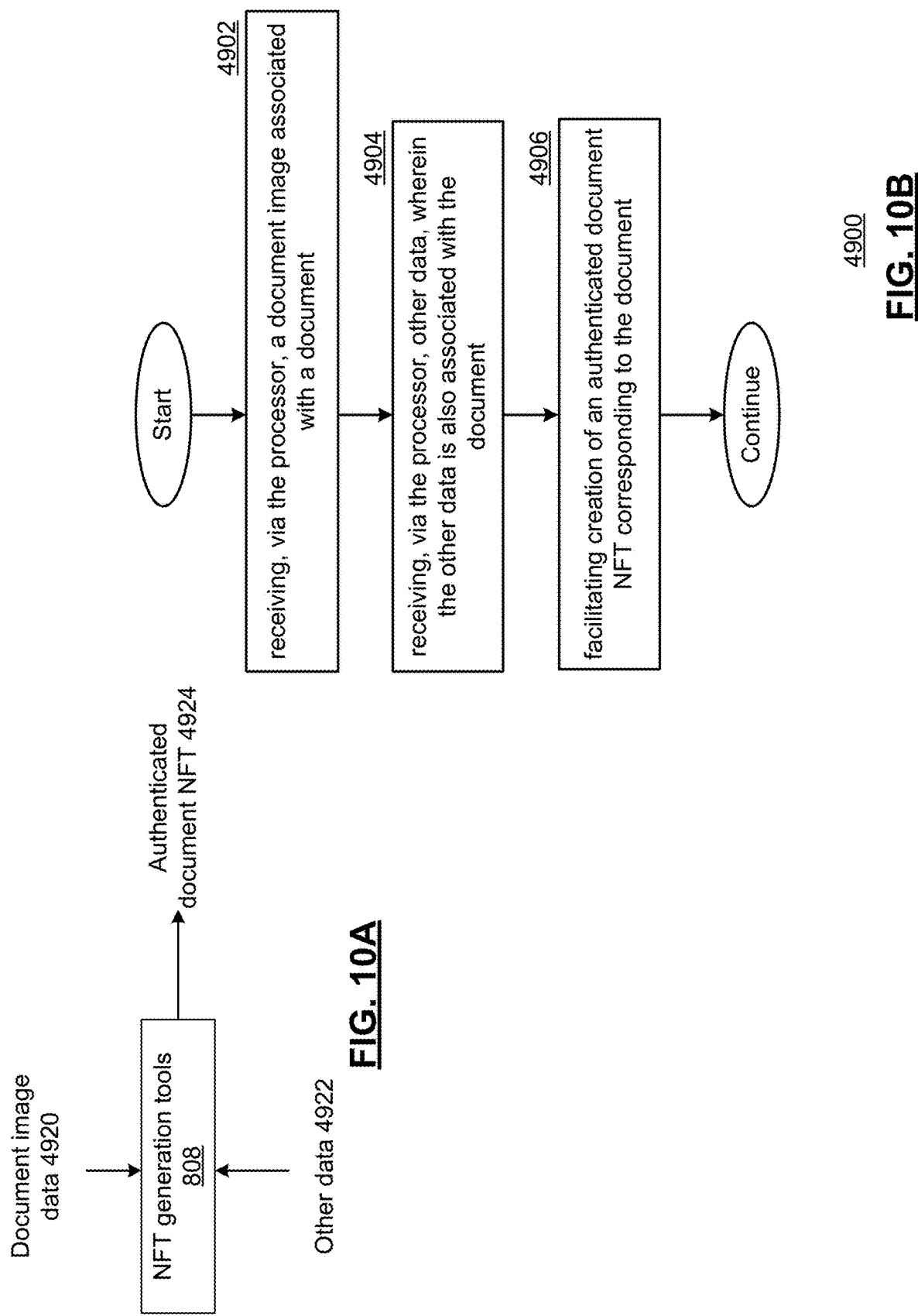

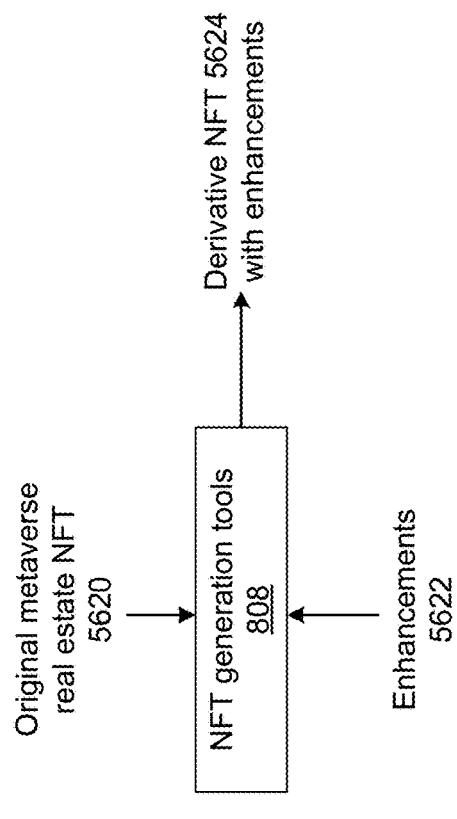
FIG. 11B
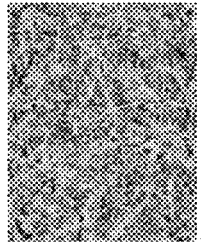
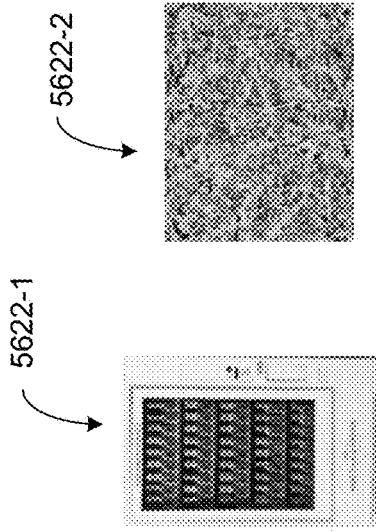
FIG. 11C
FIG. 11A
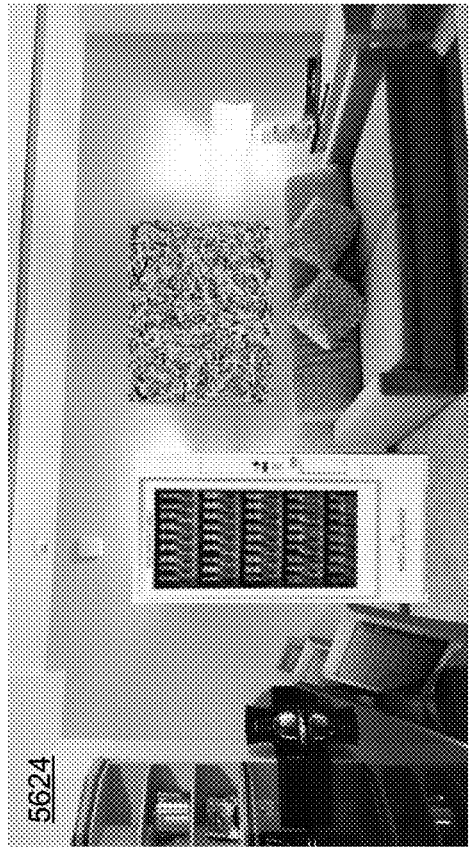
FIG. 11D

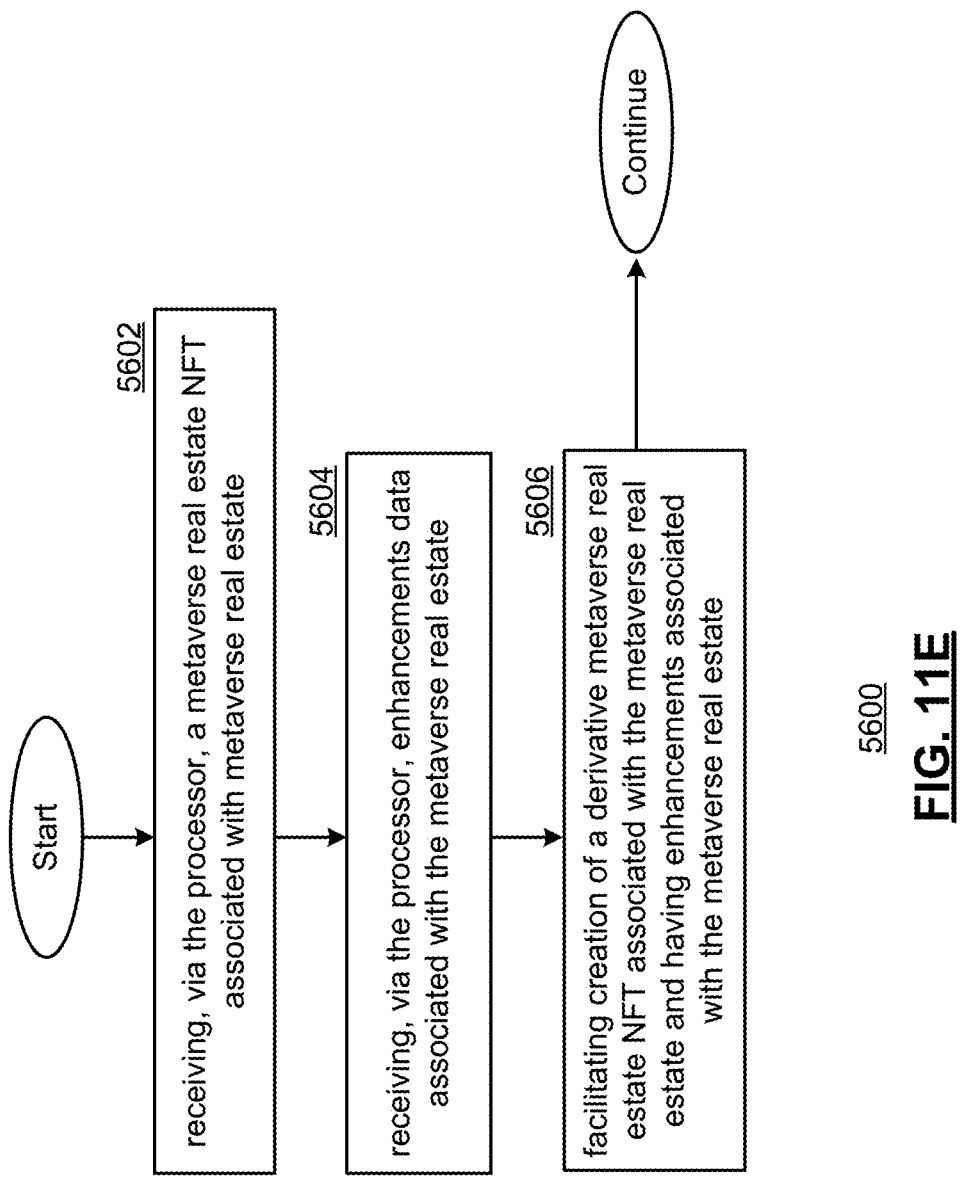

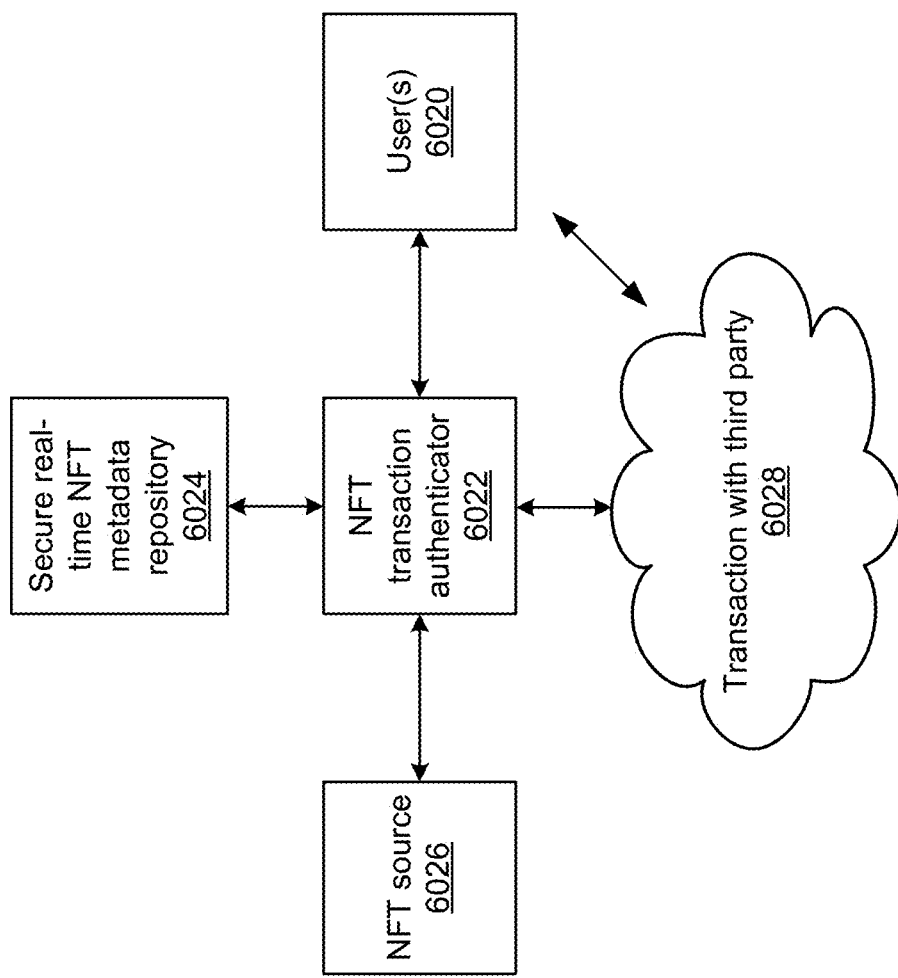

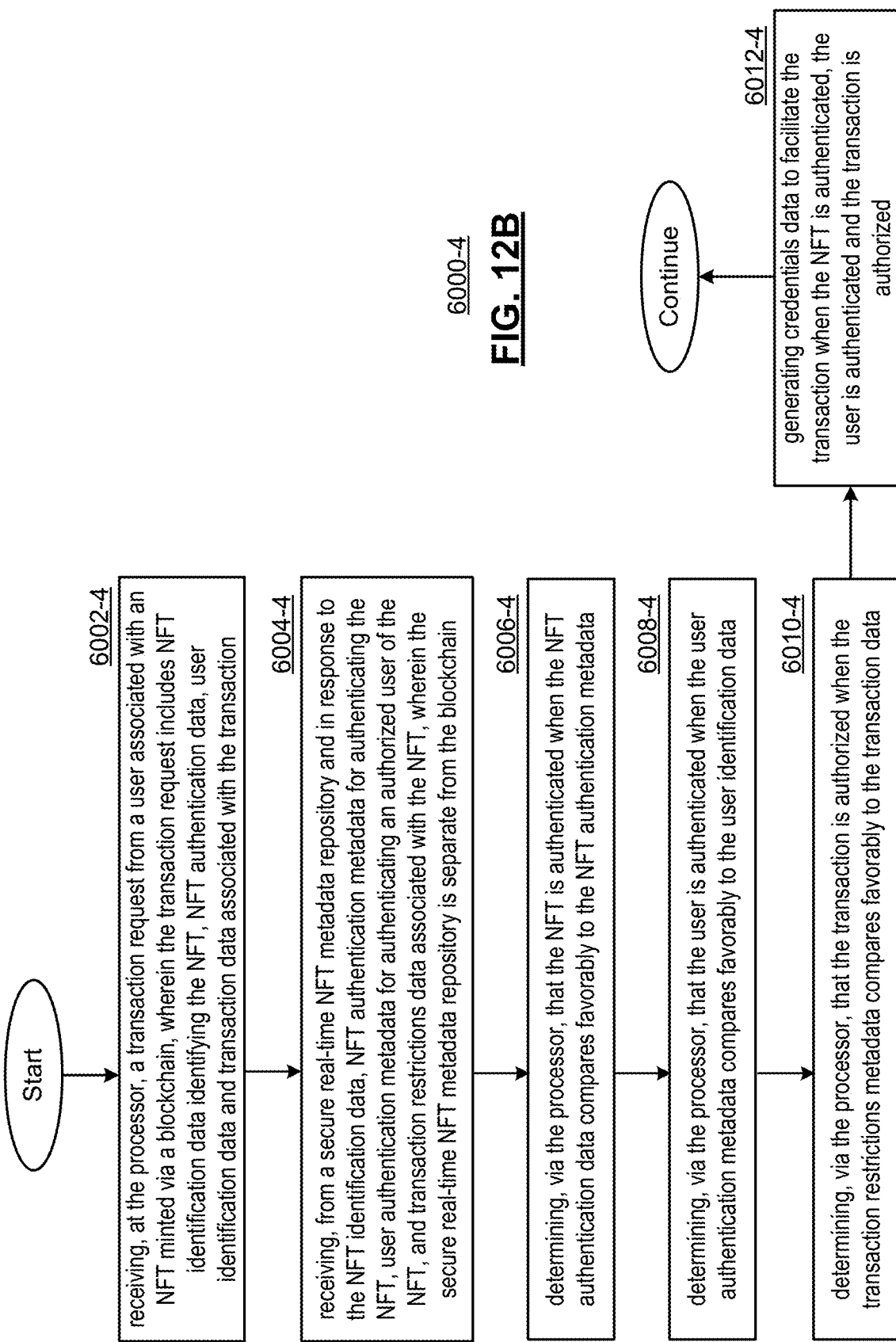

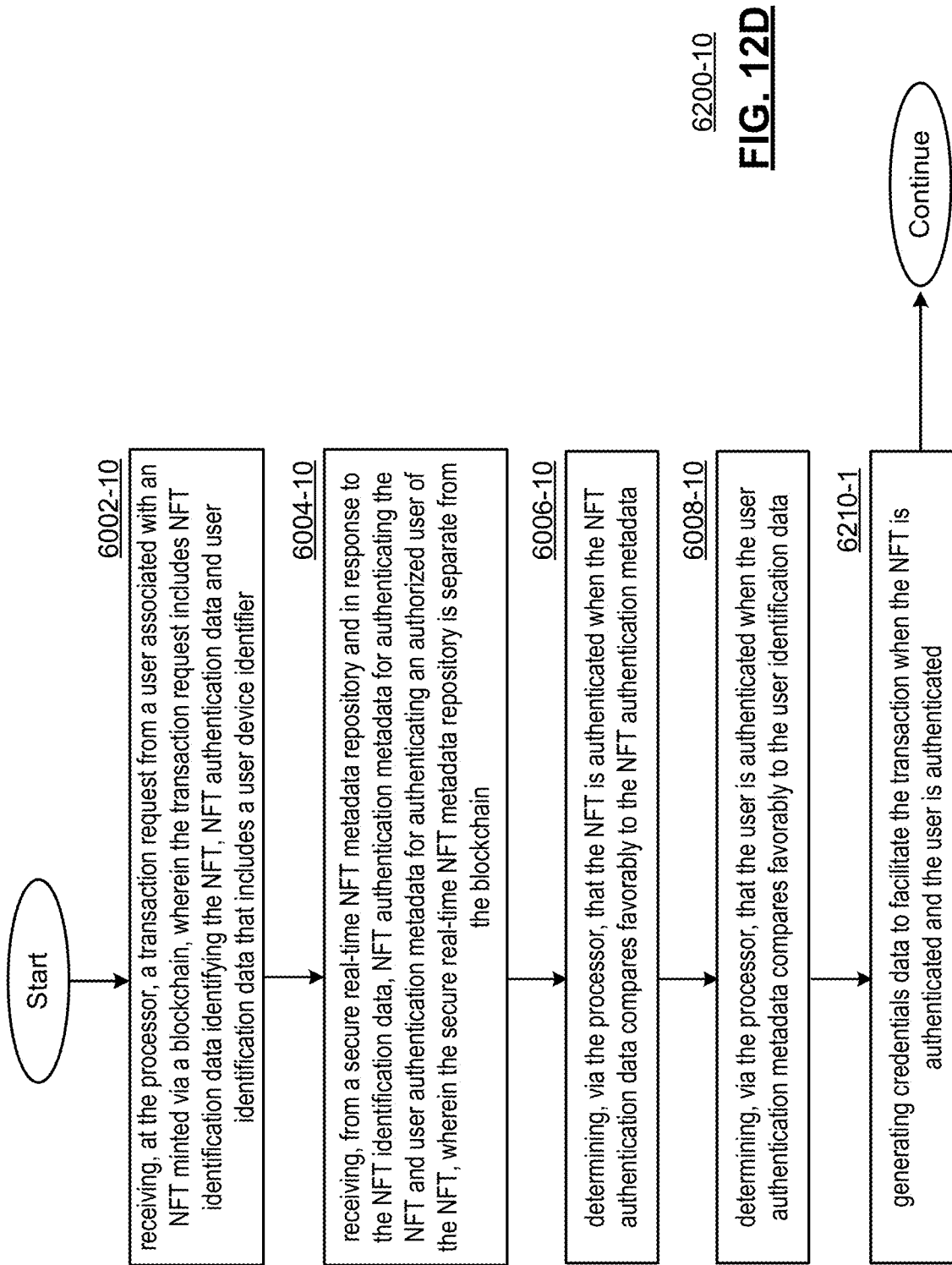

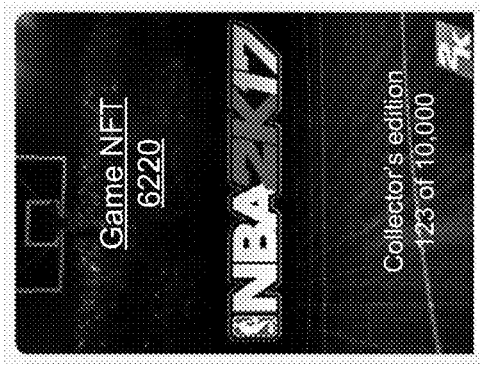
FIG. 13G
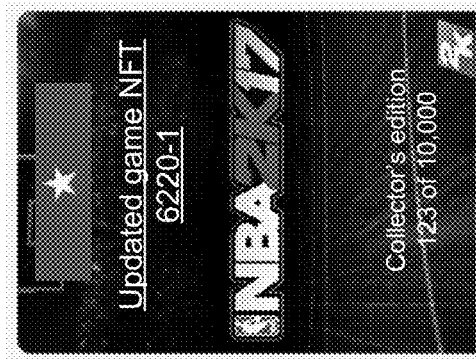
FIG. 13H
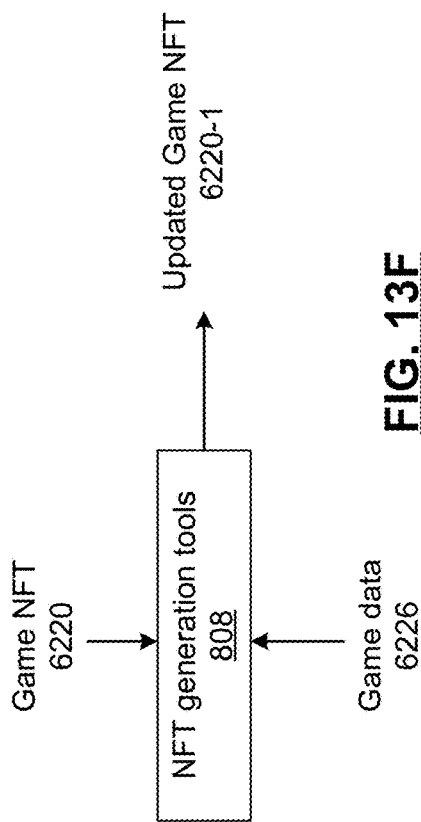
FIG. 13F
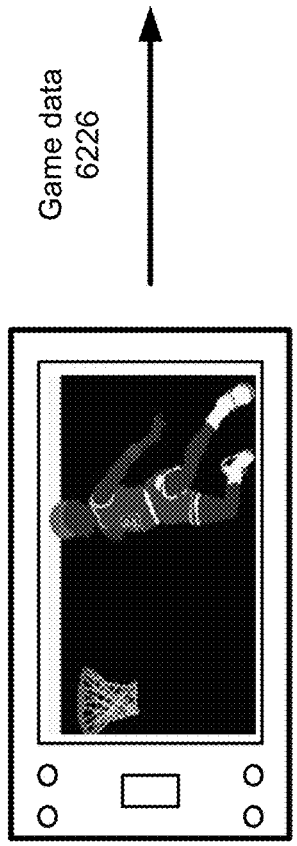

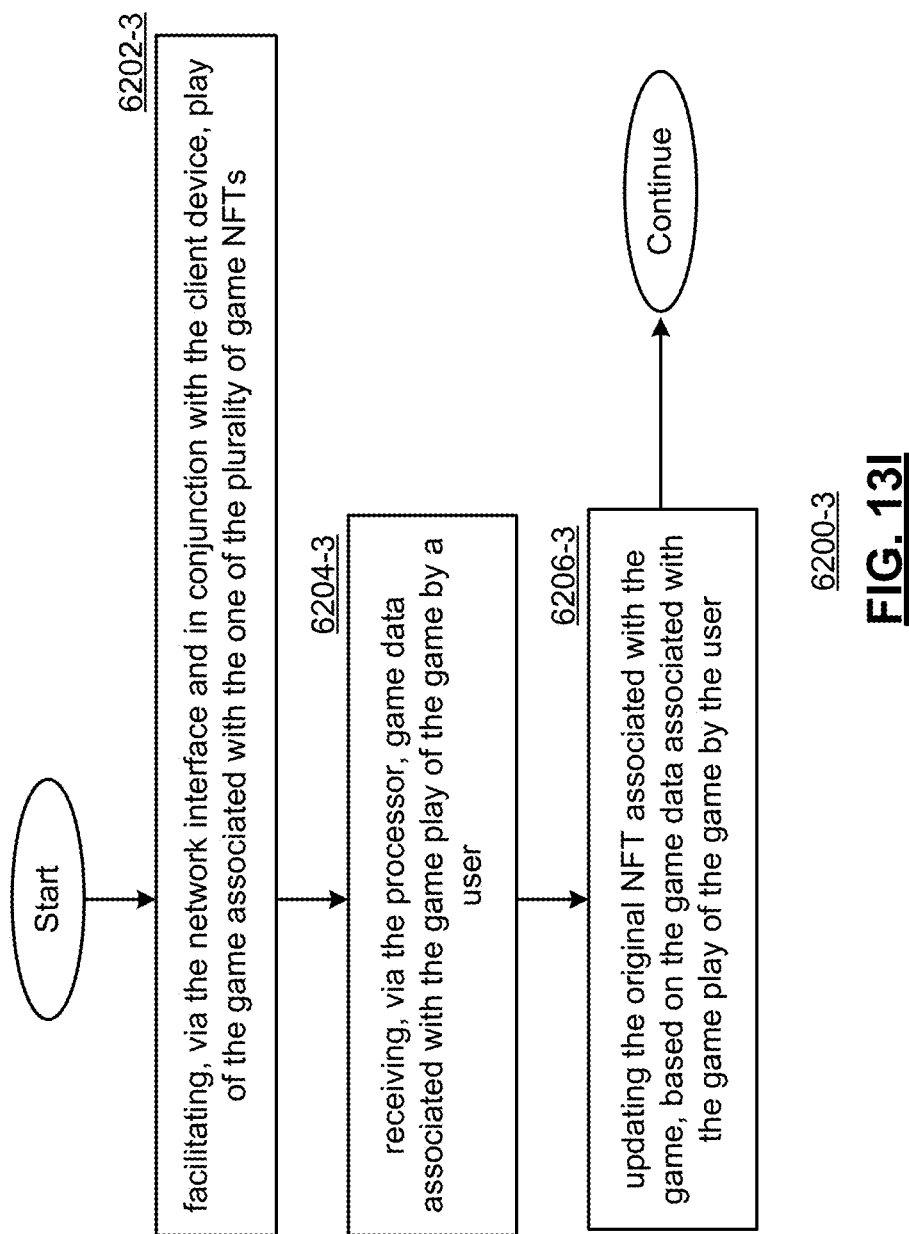

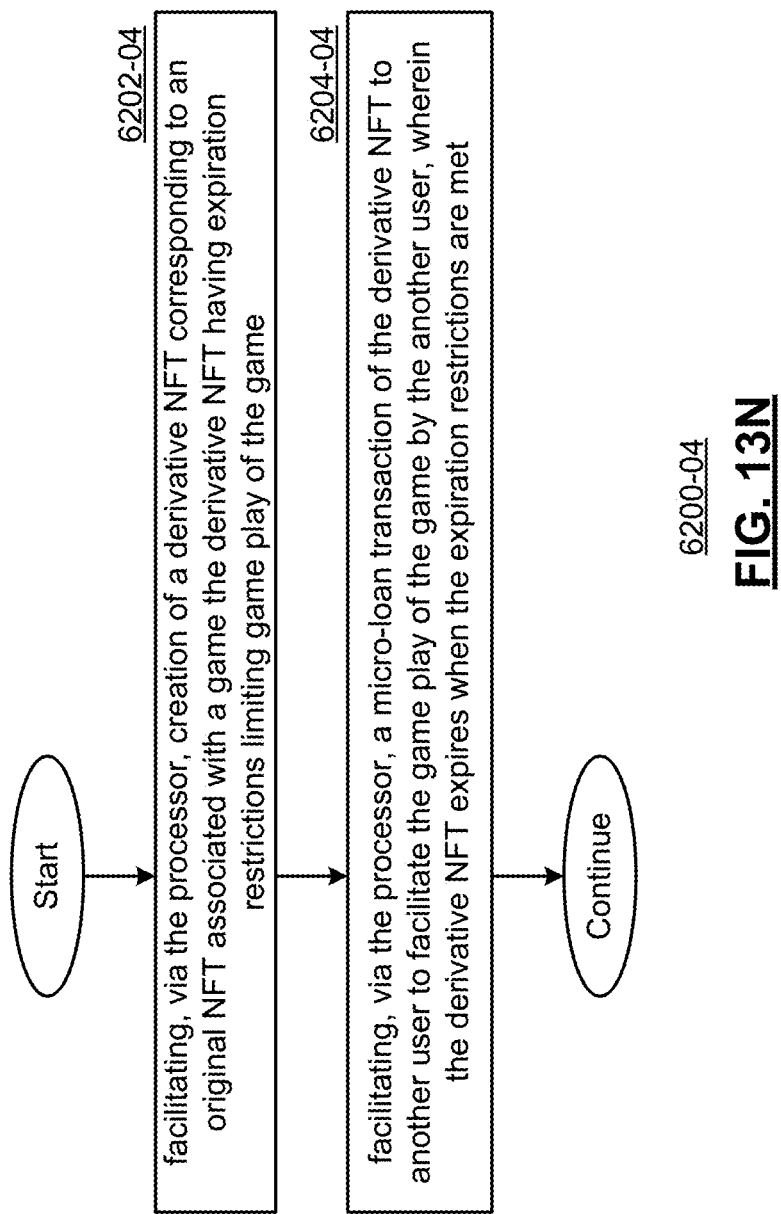

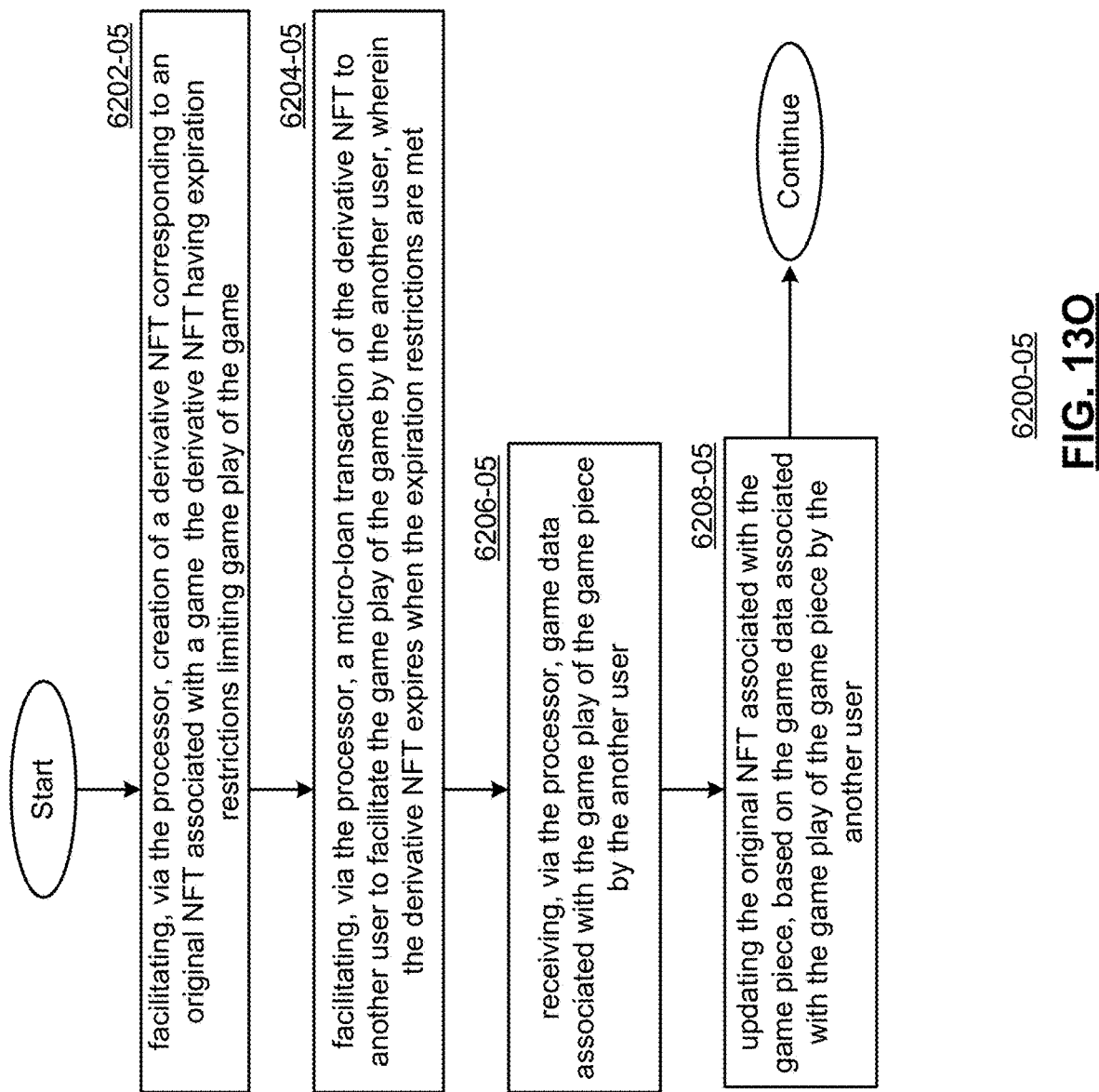

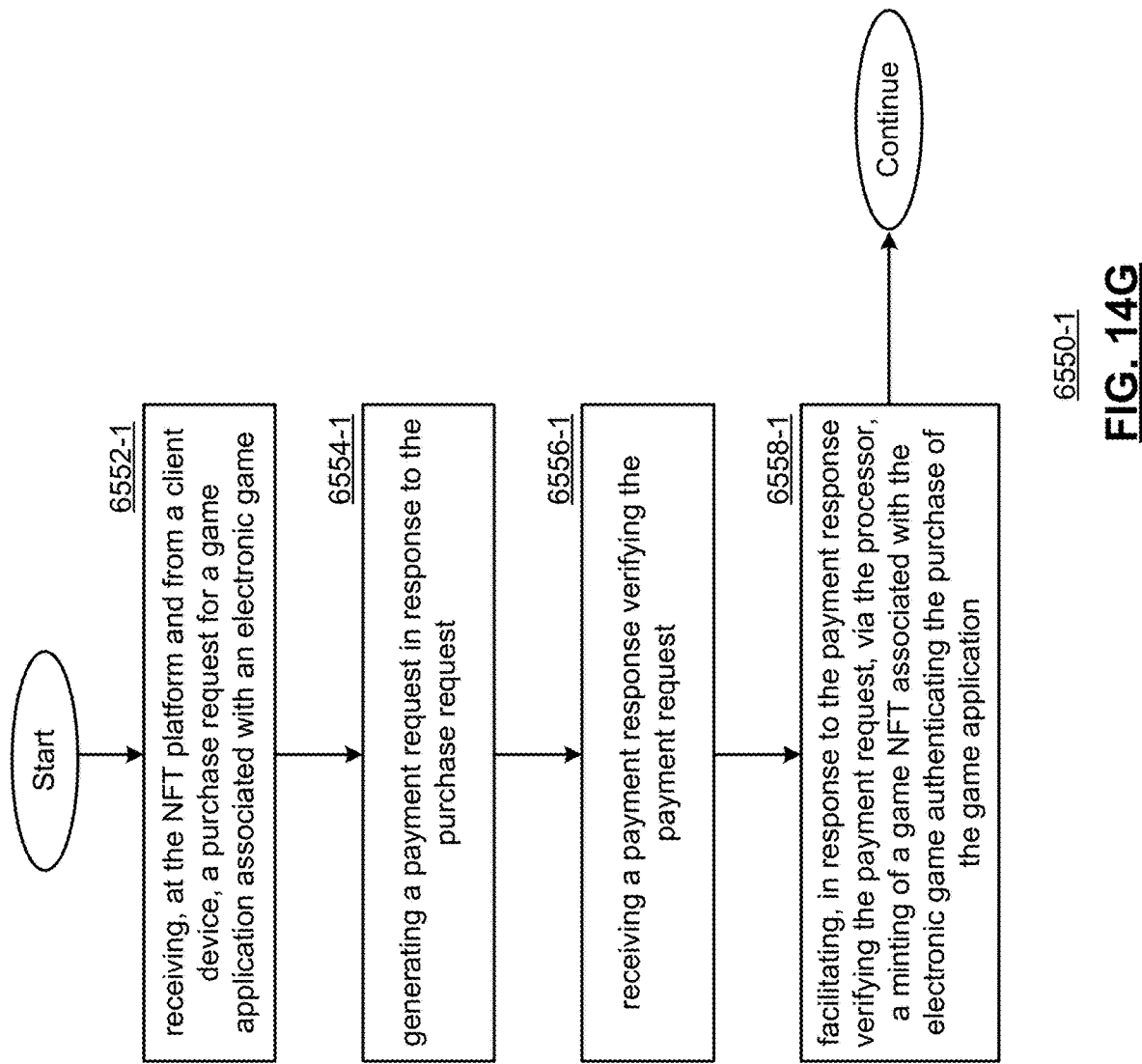

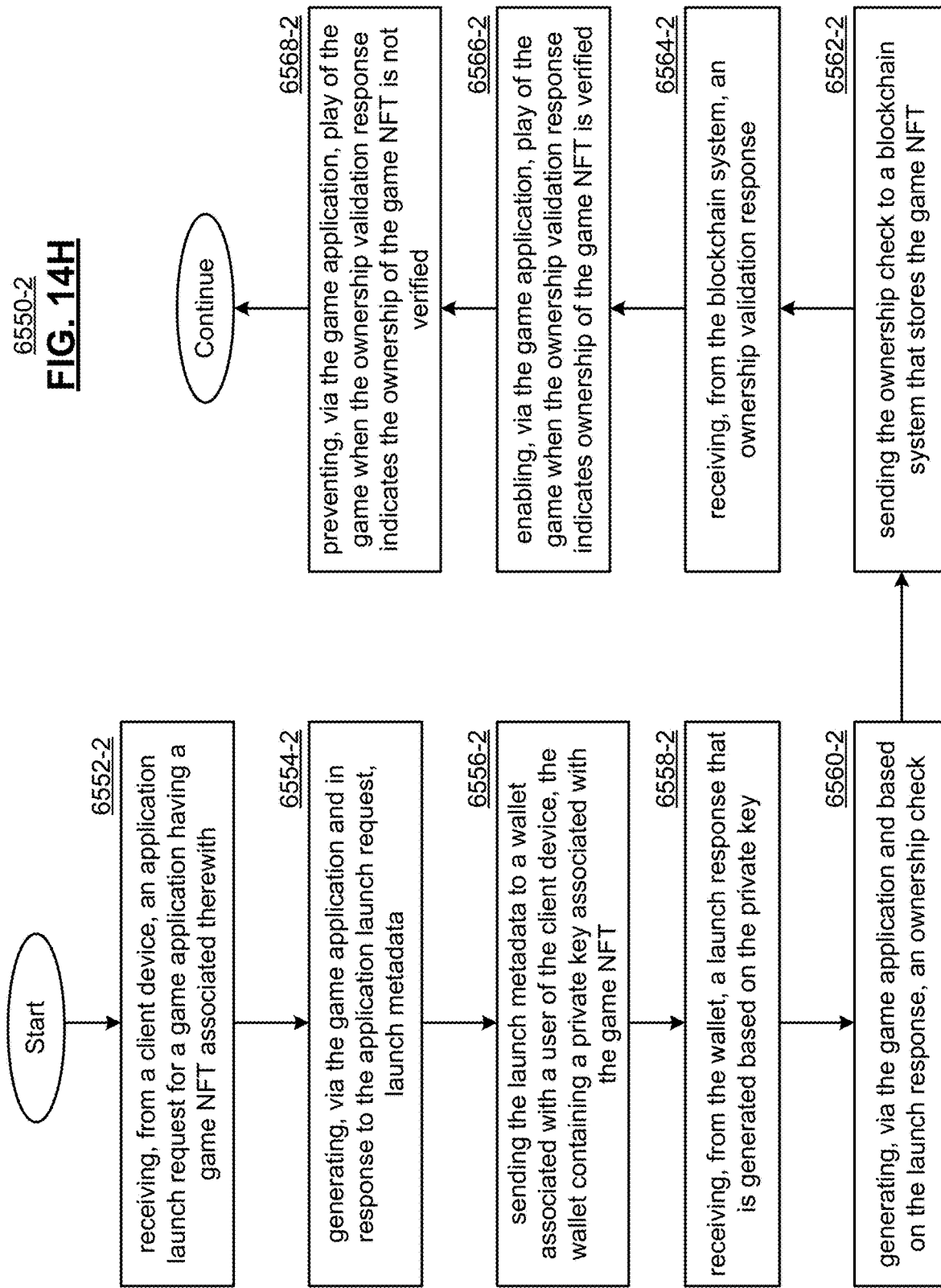

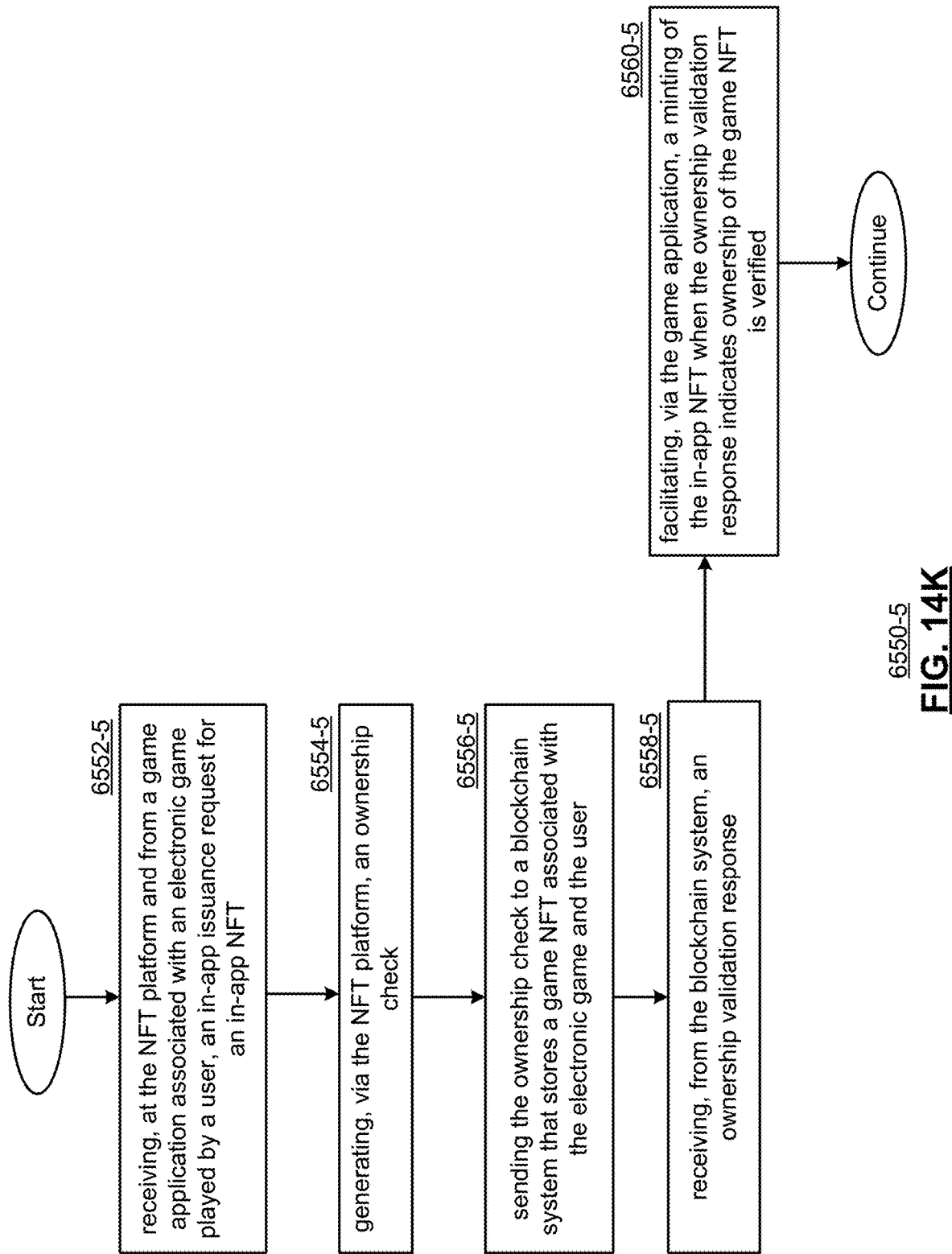

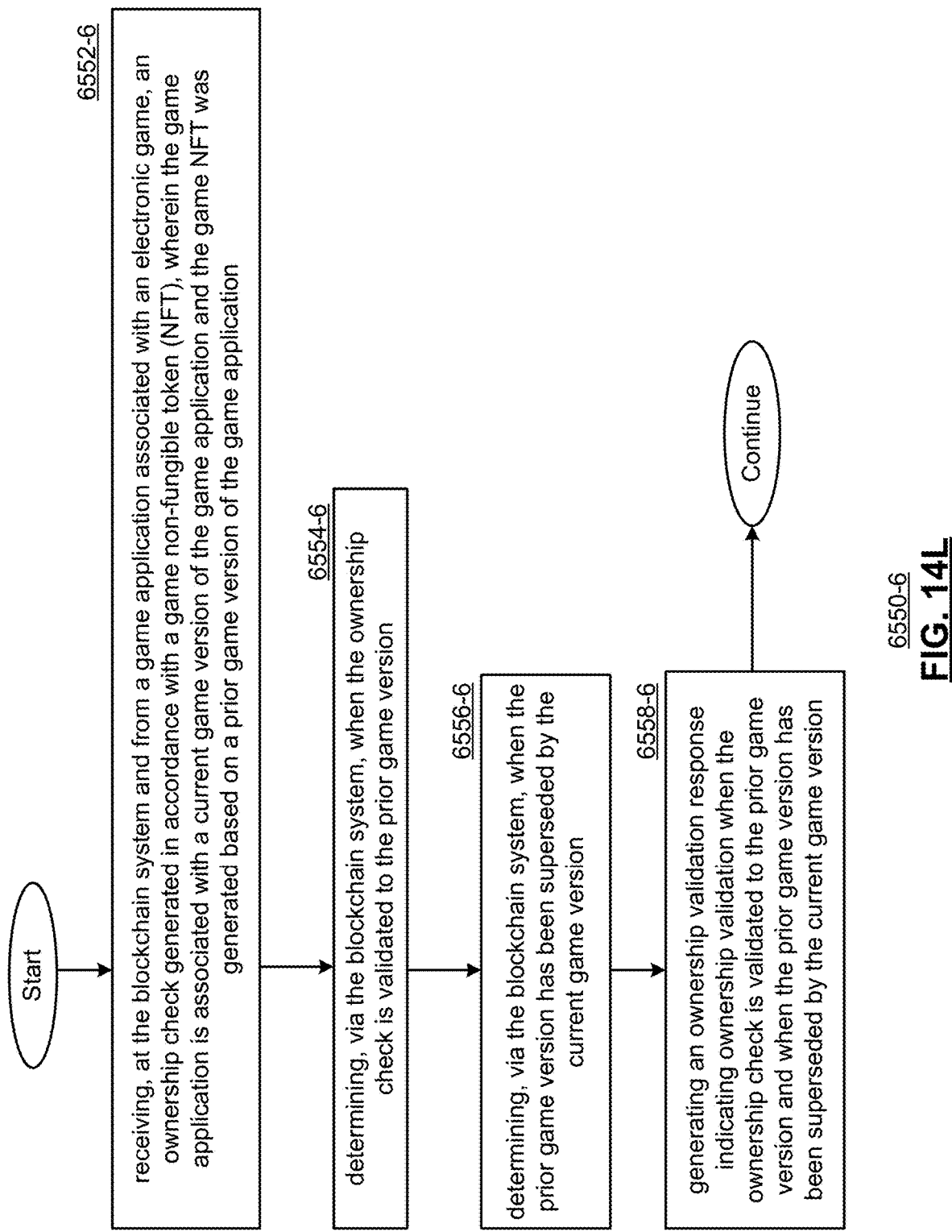

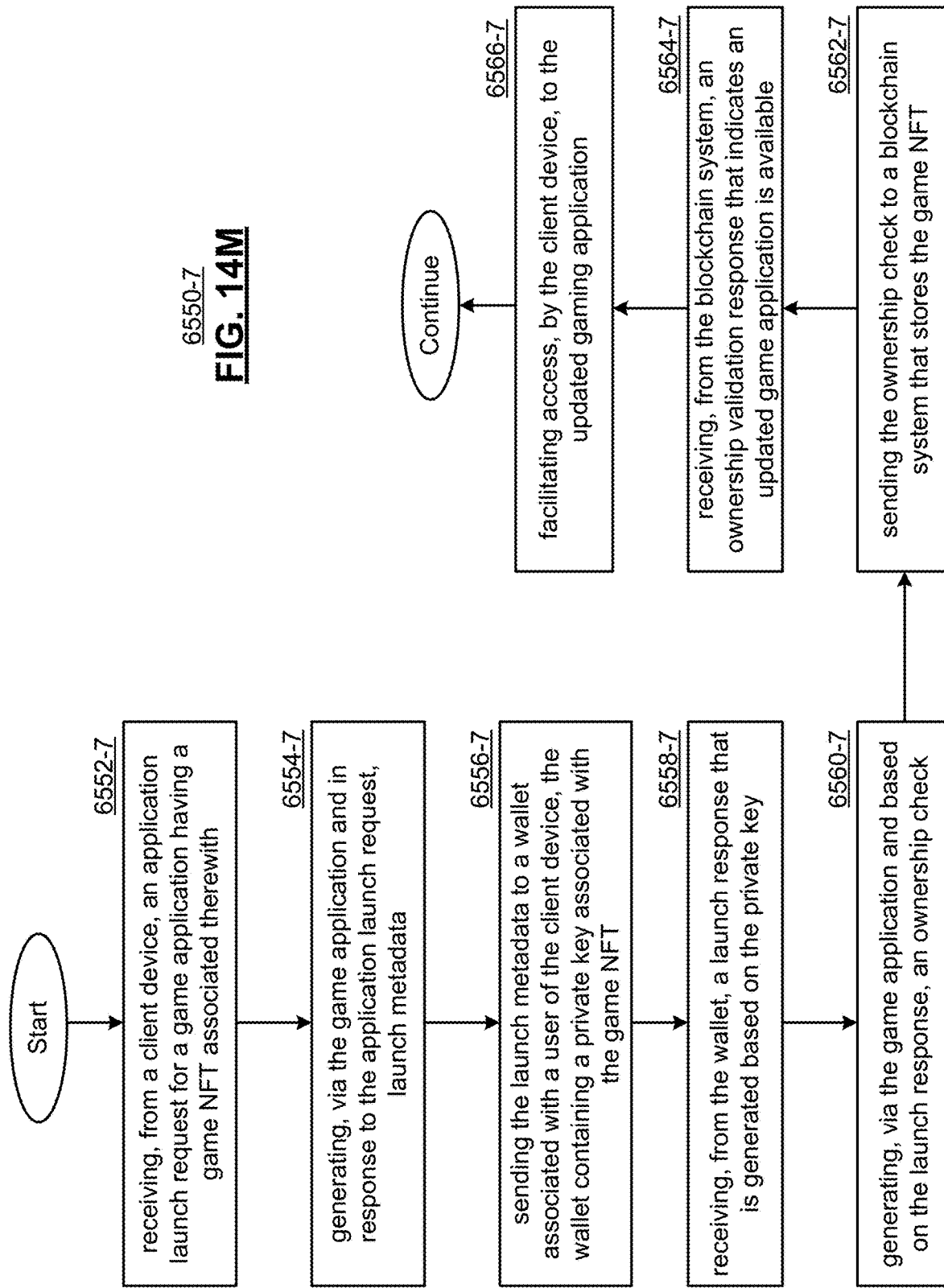

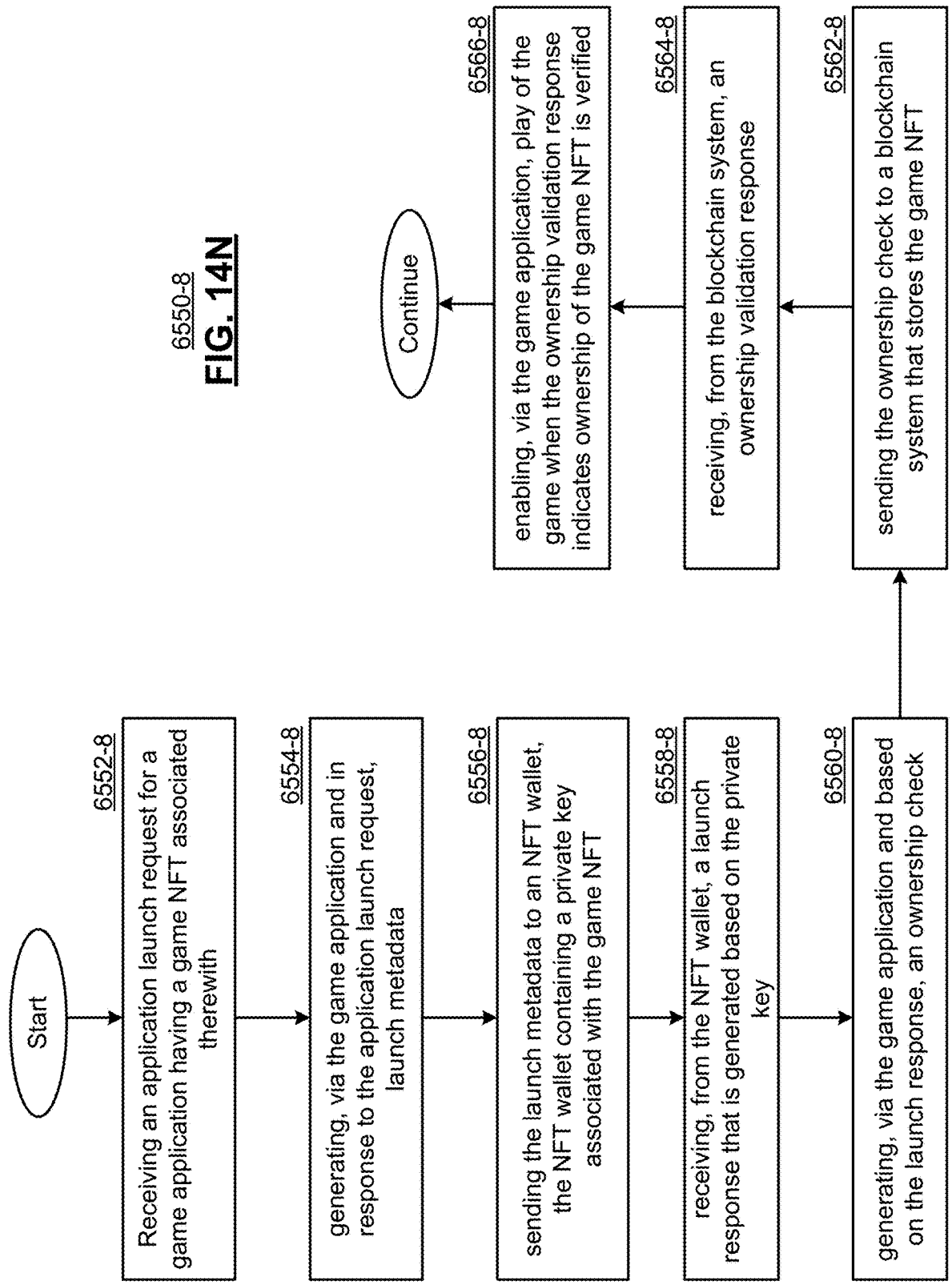

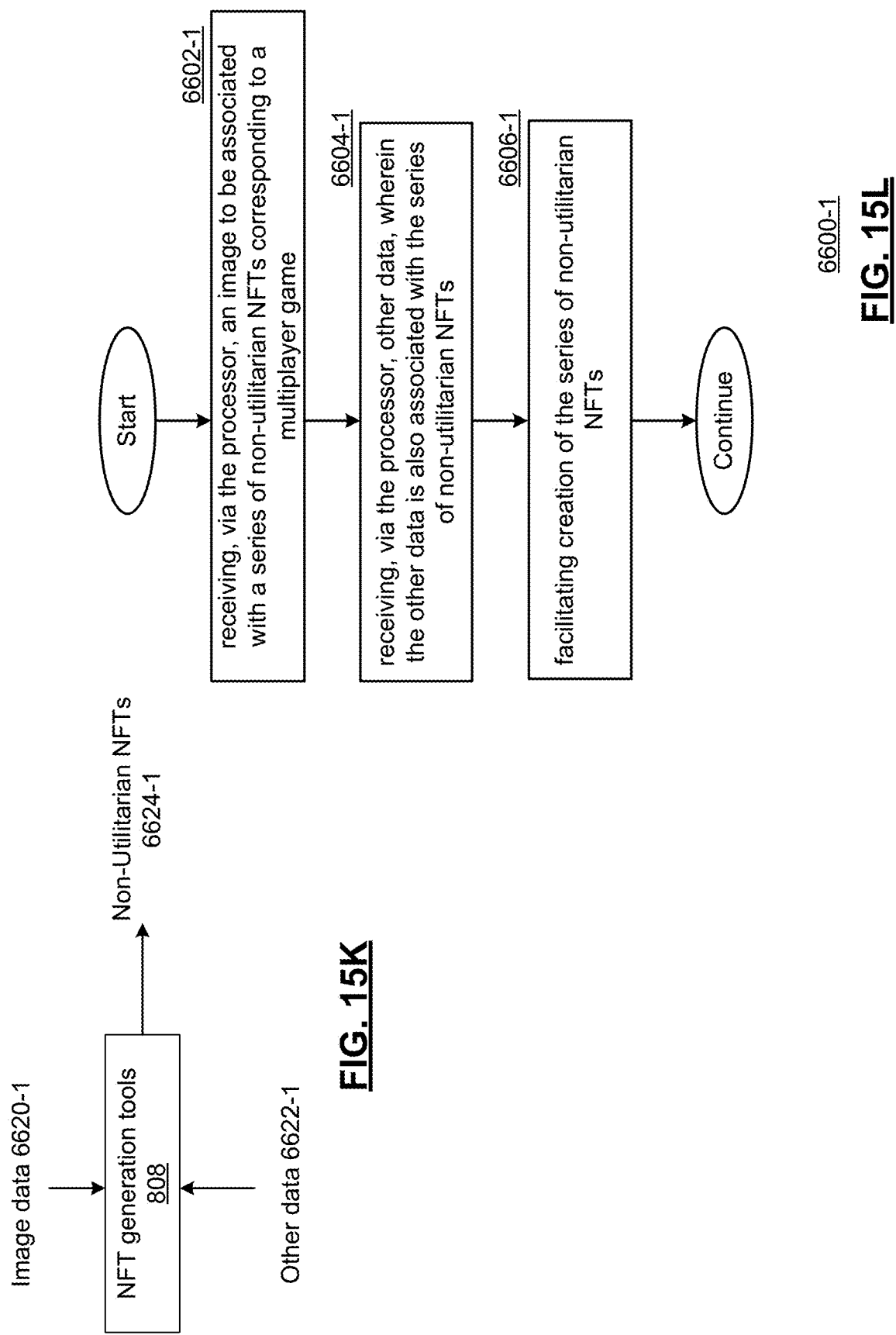

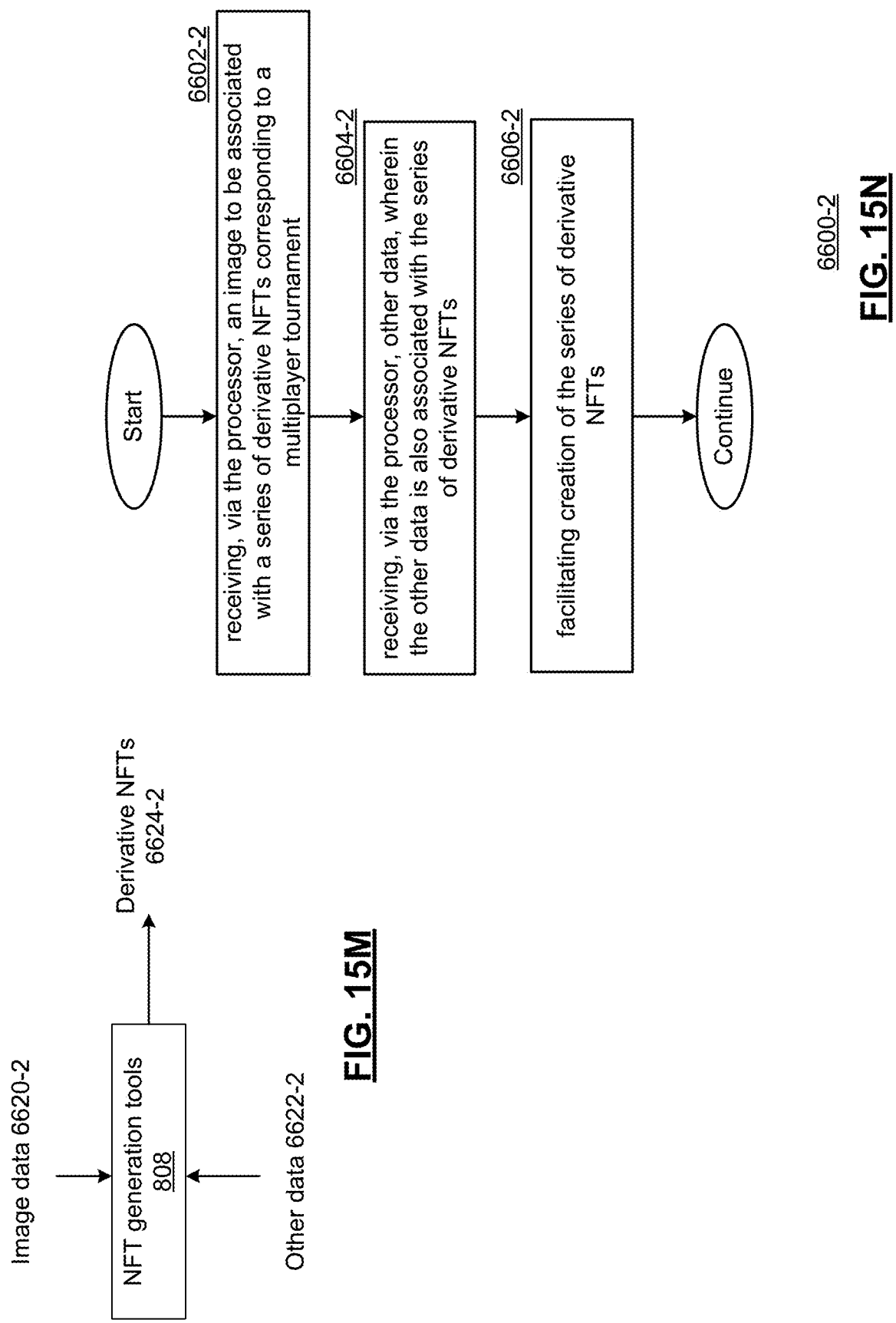

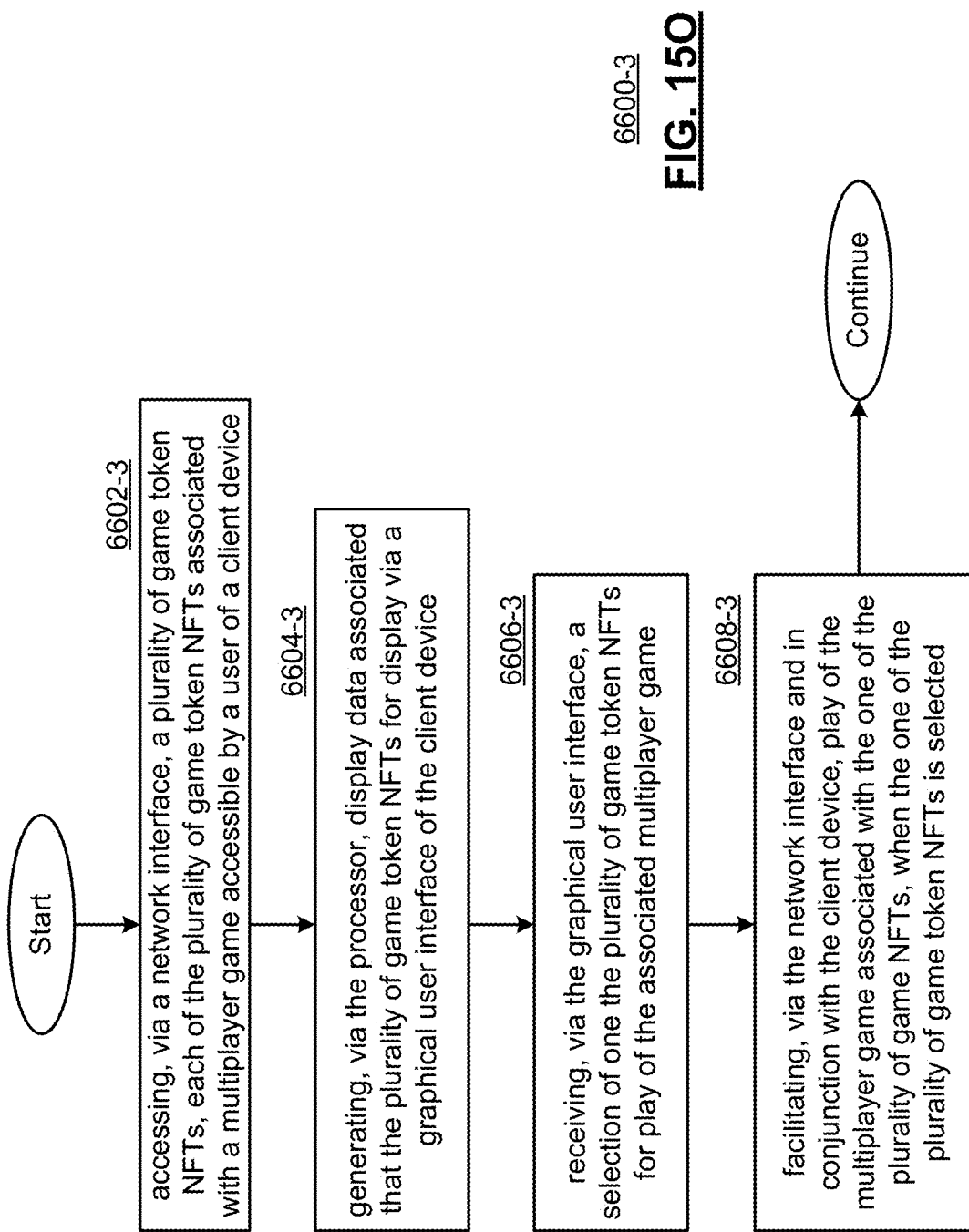

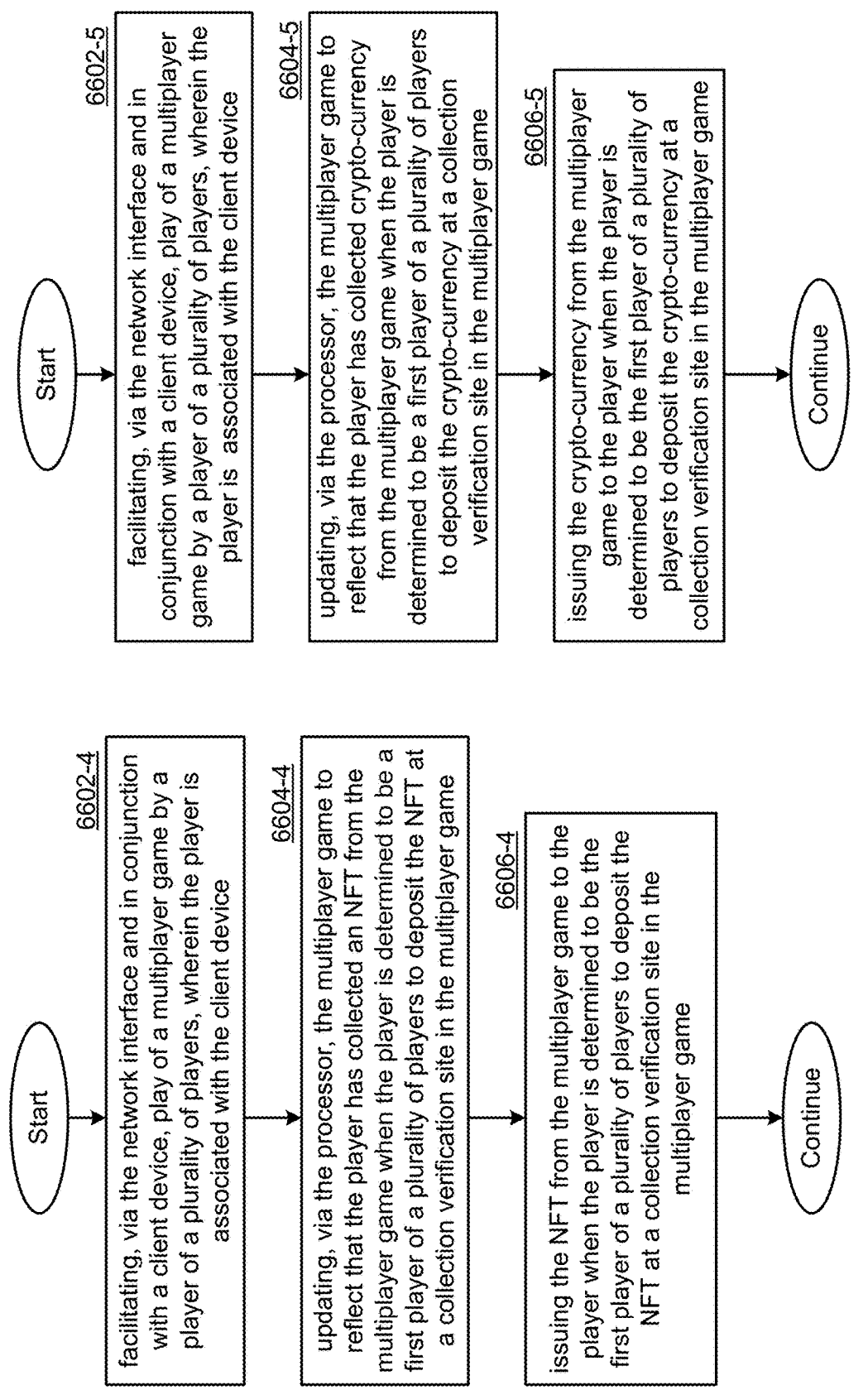

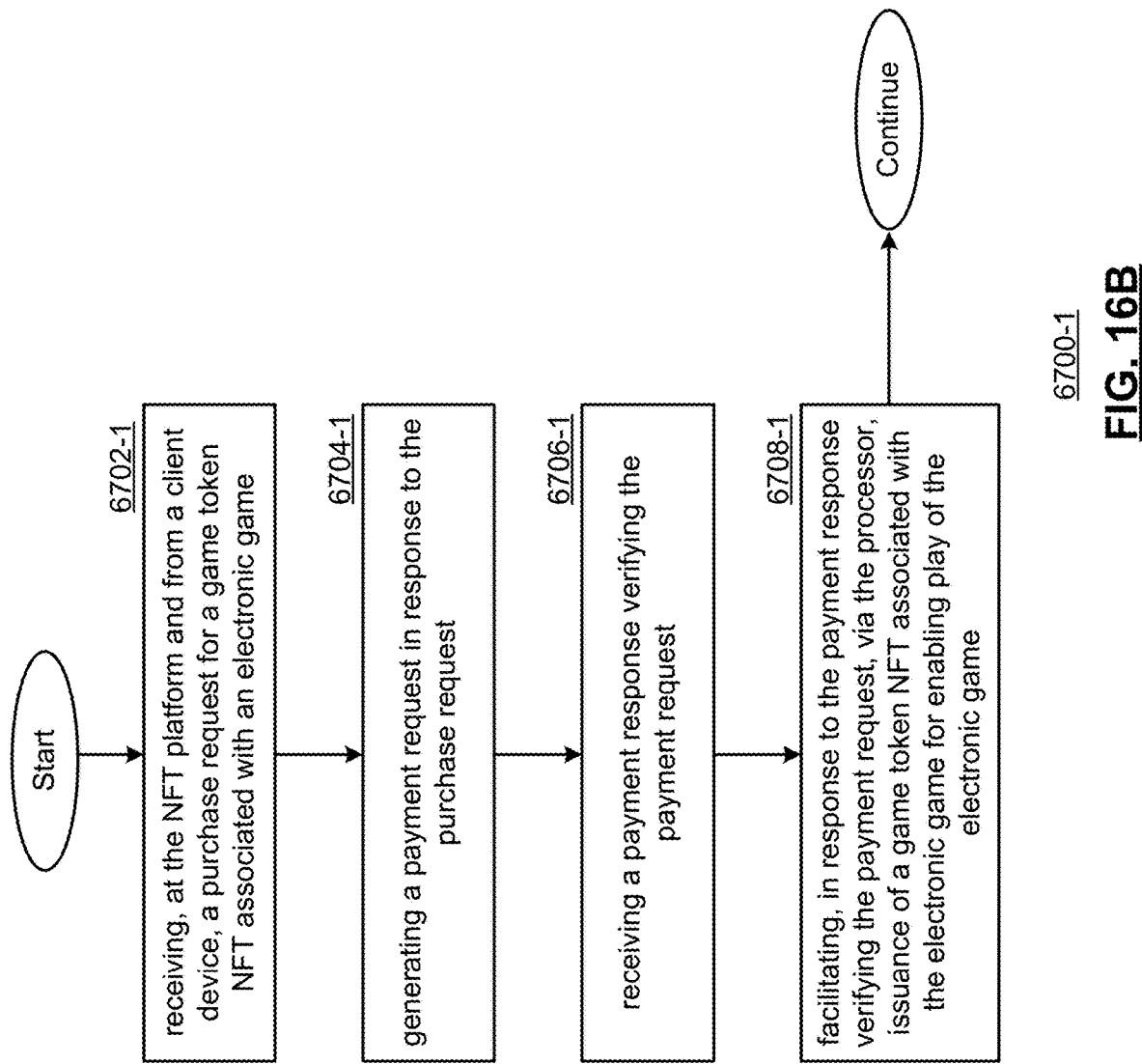

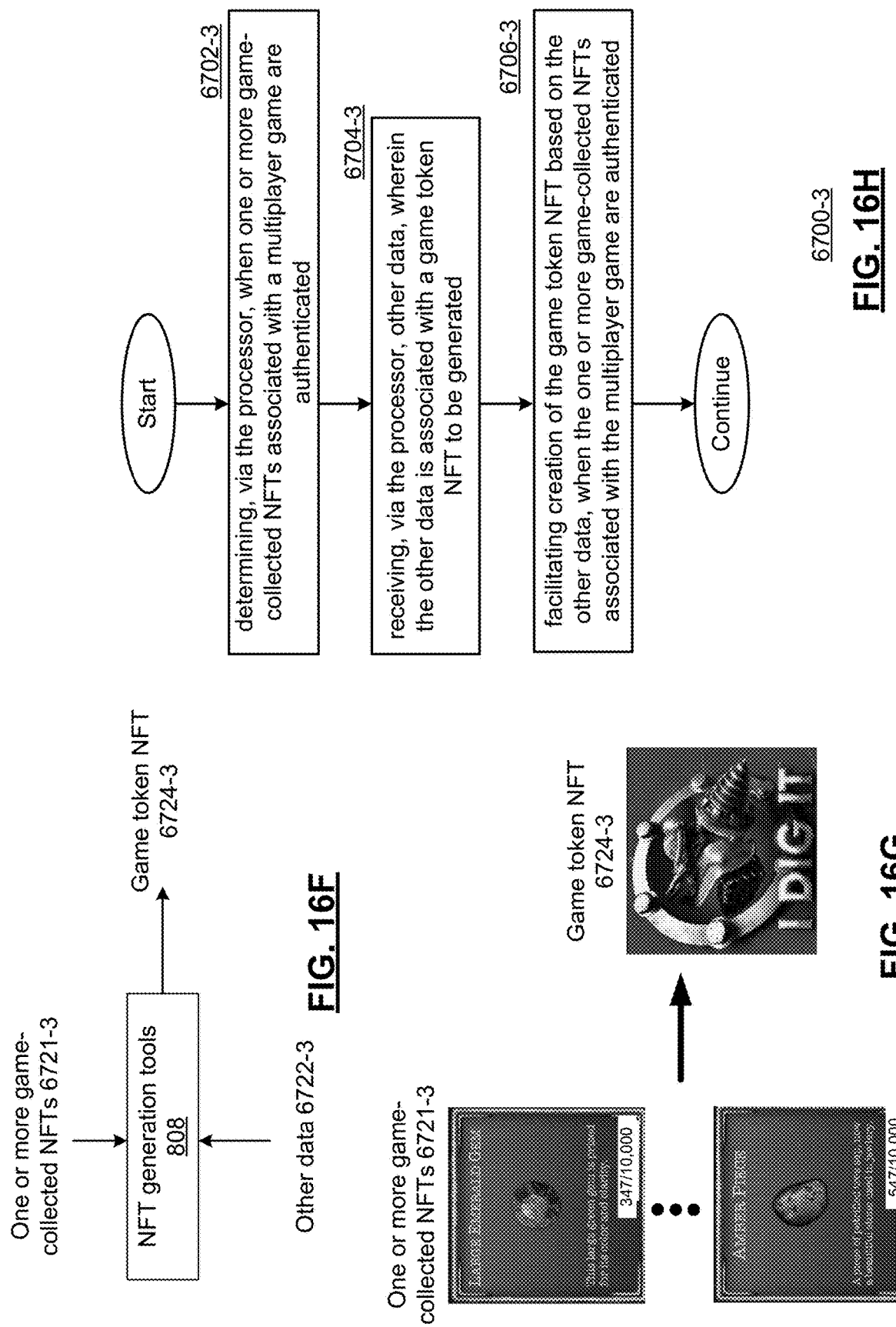

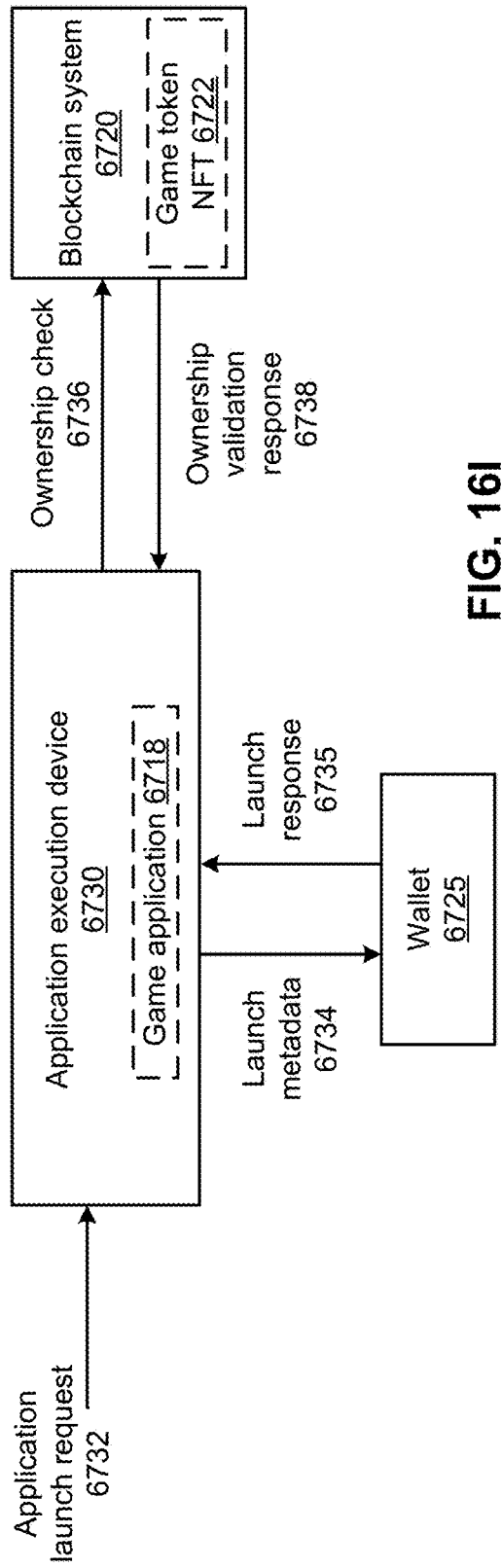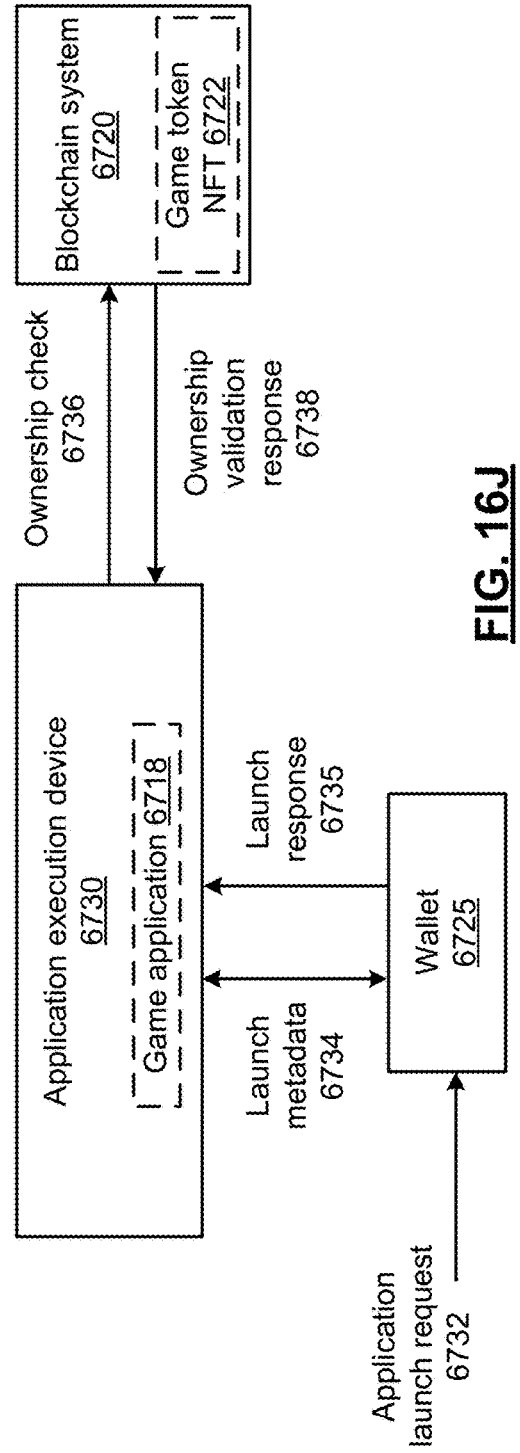

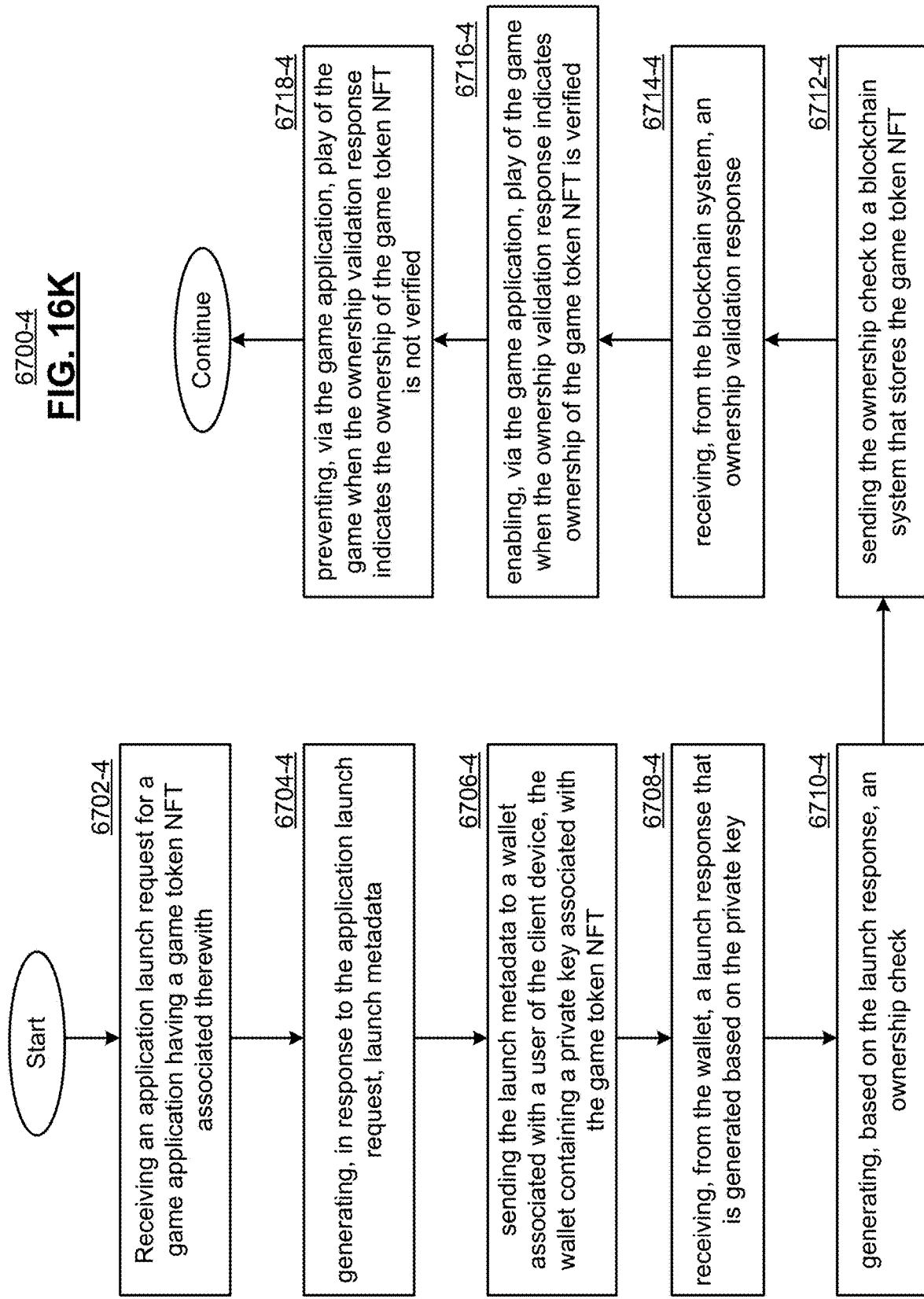

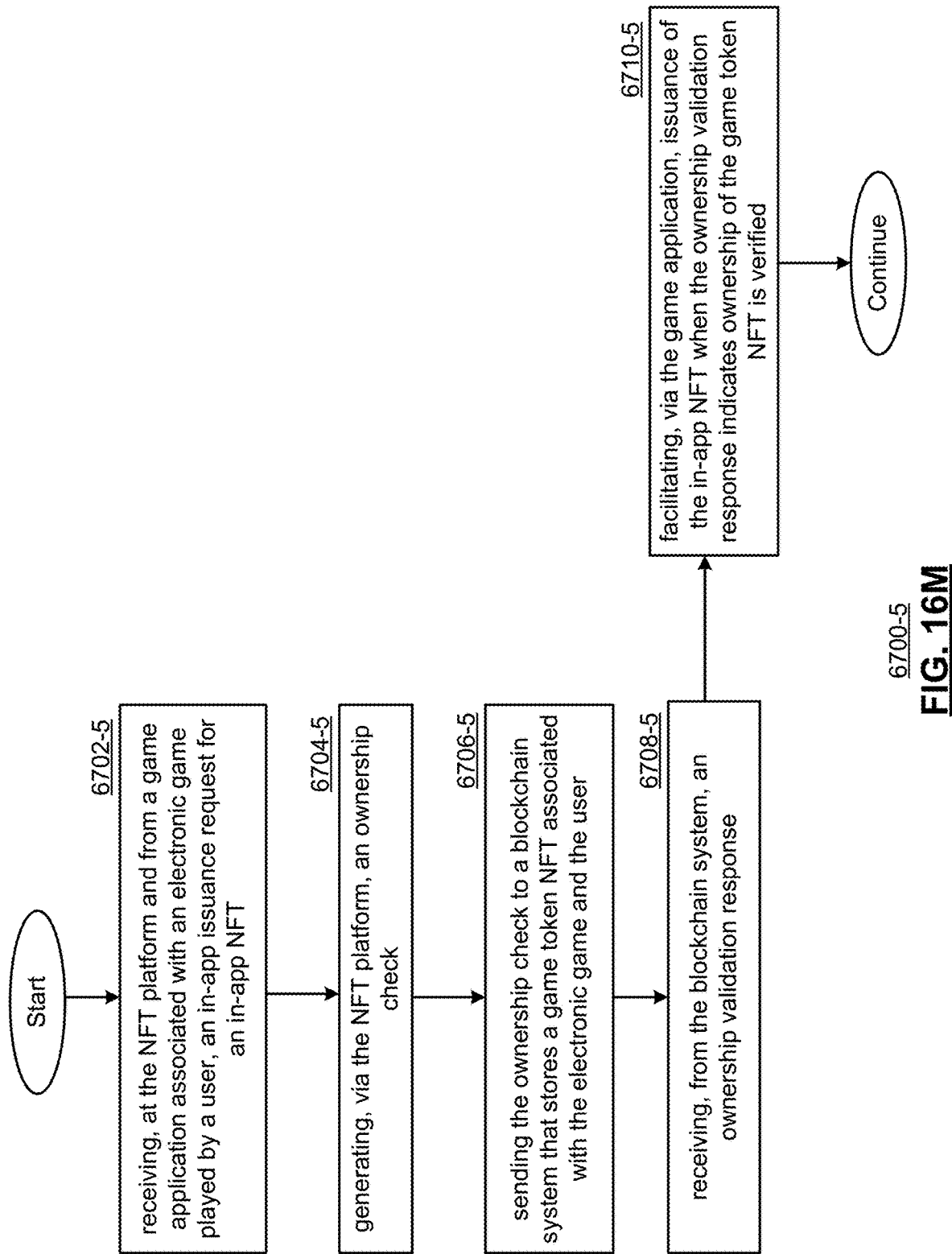

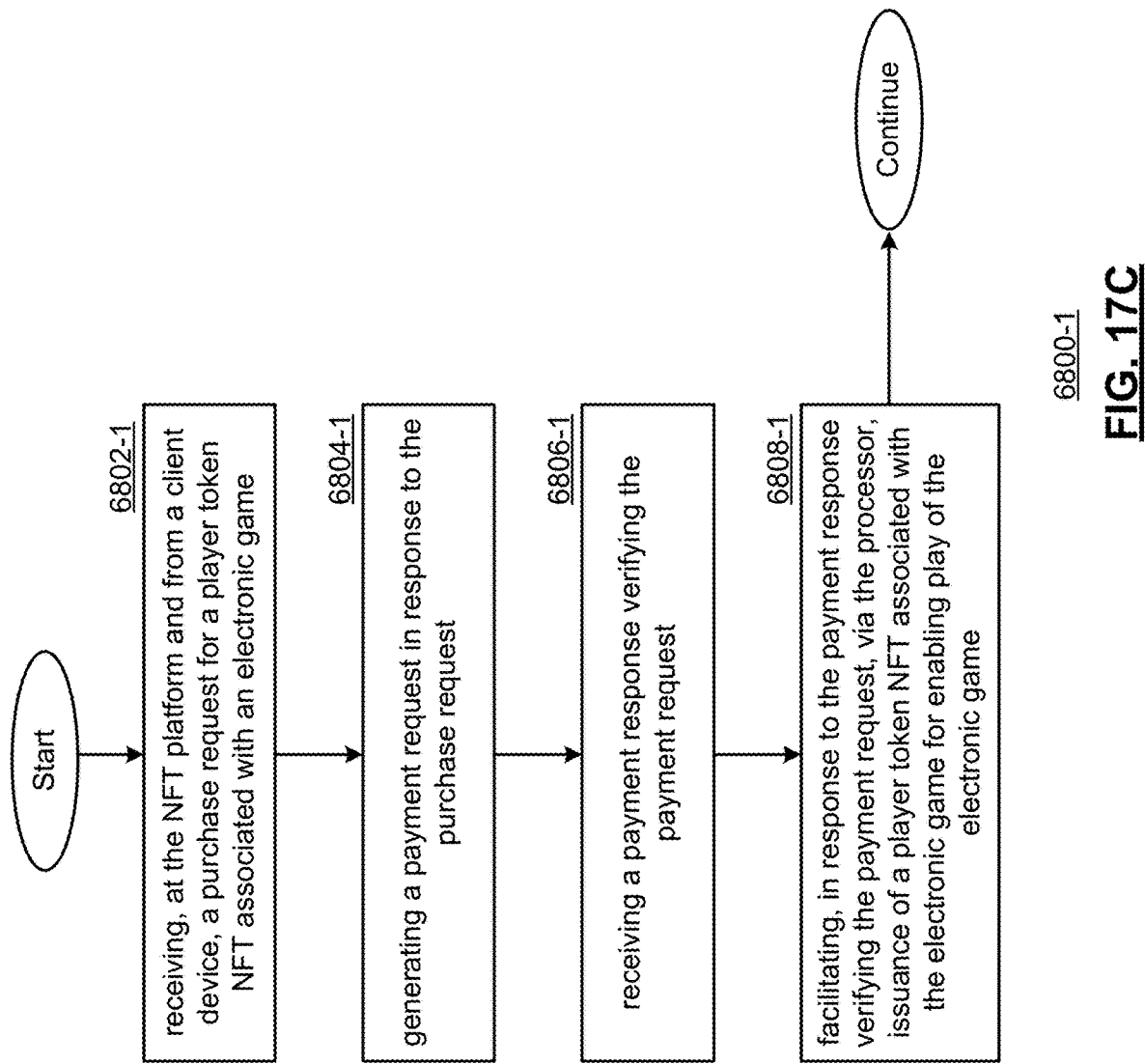

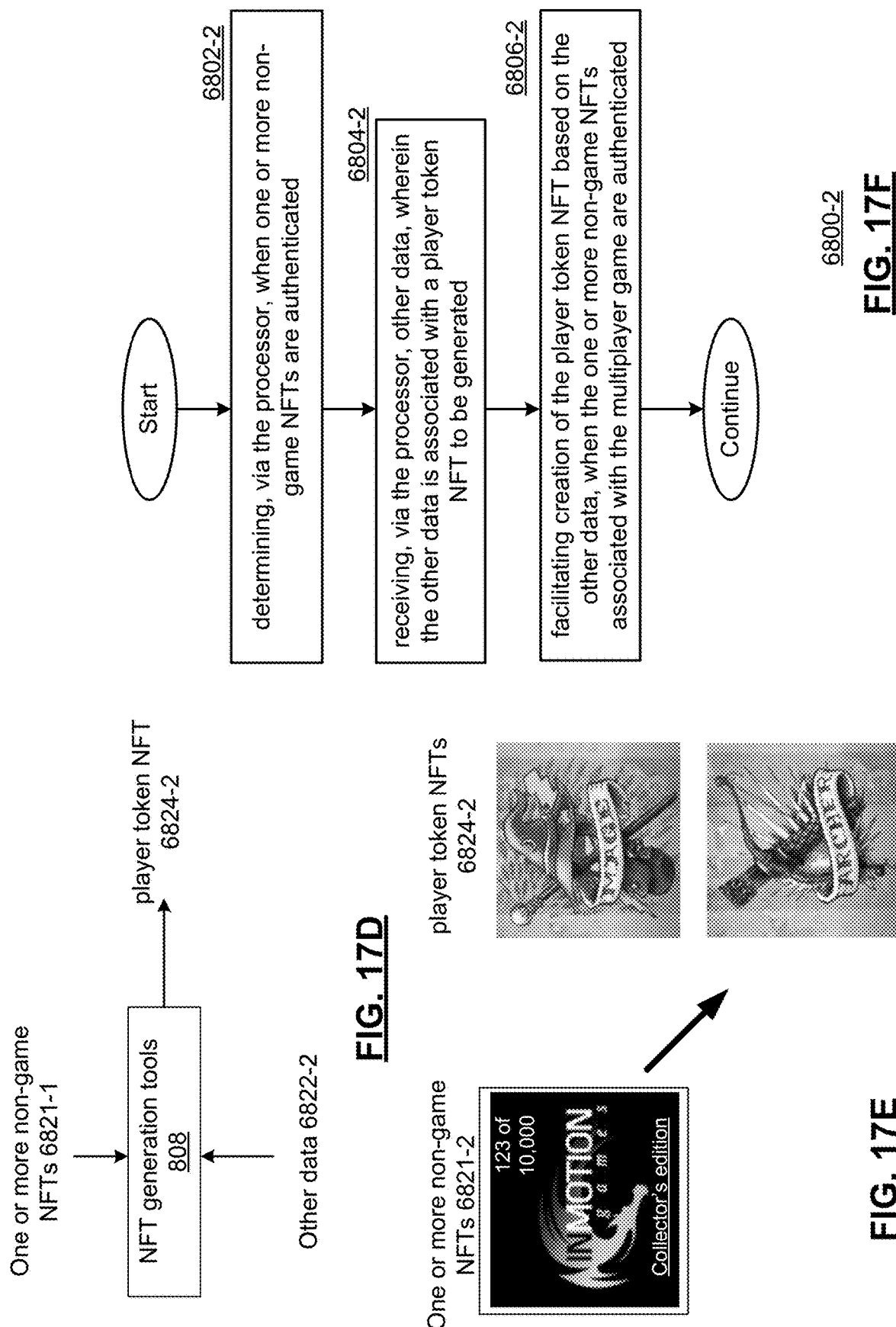

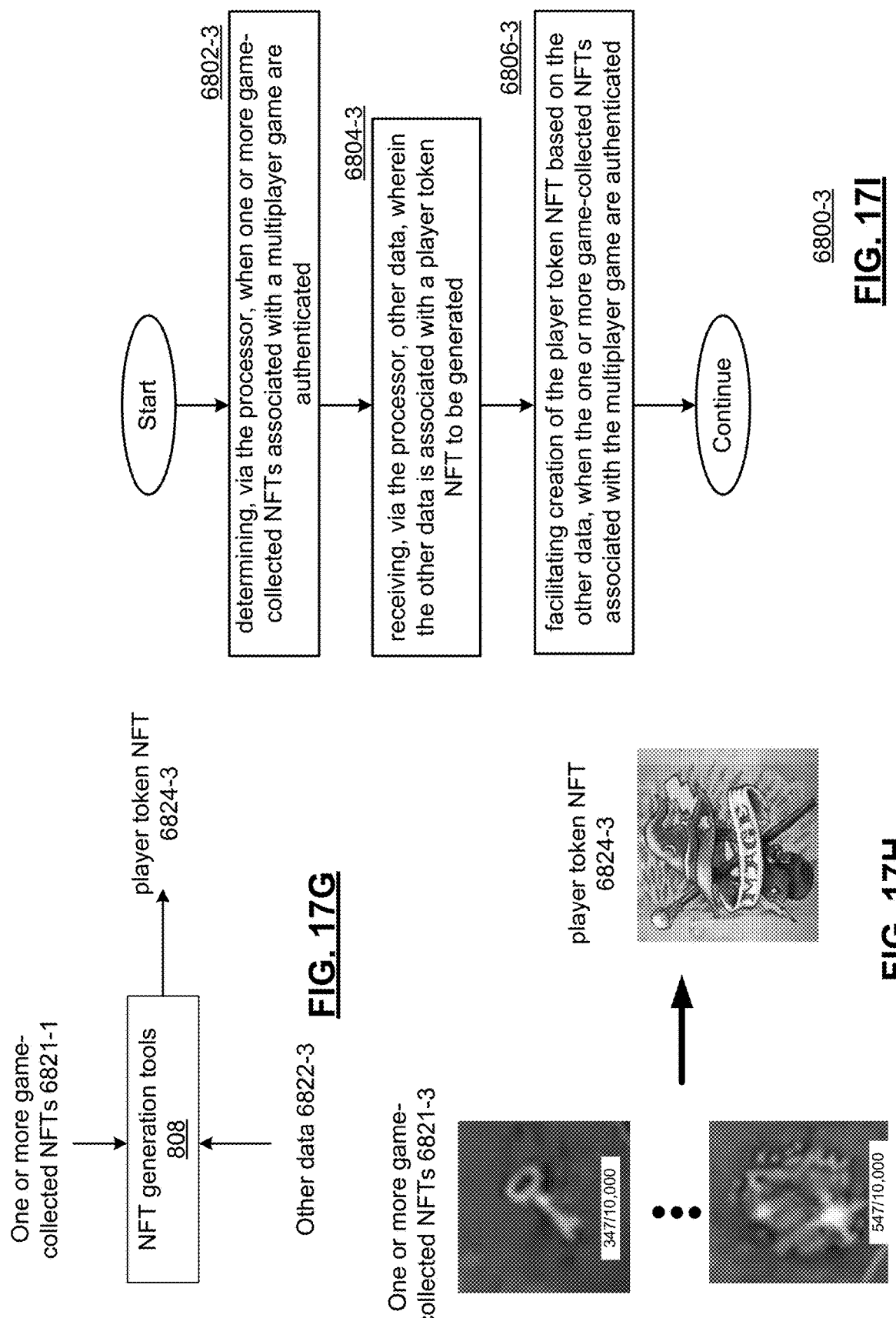

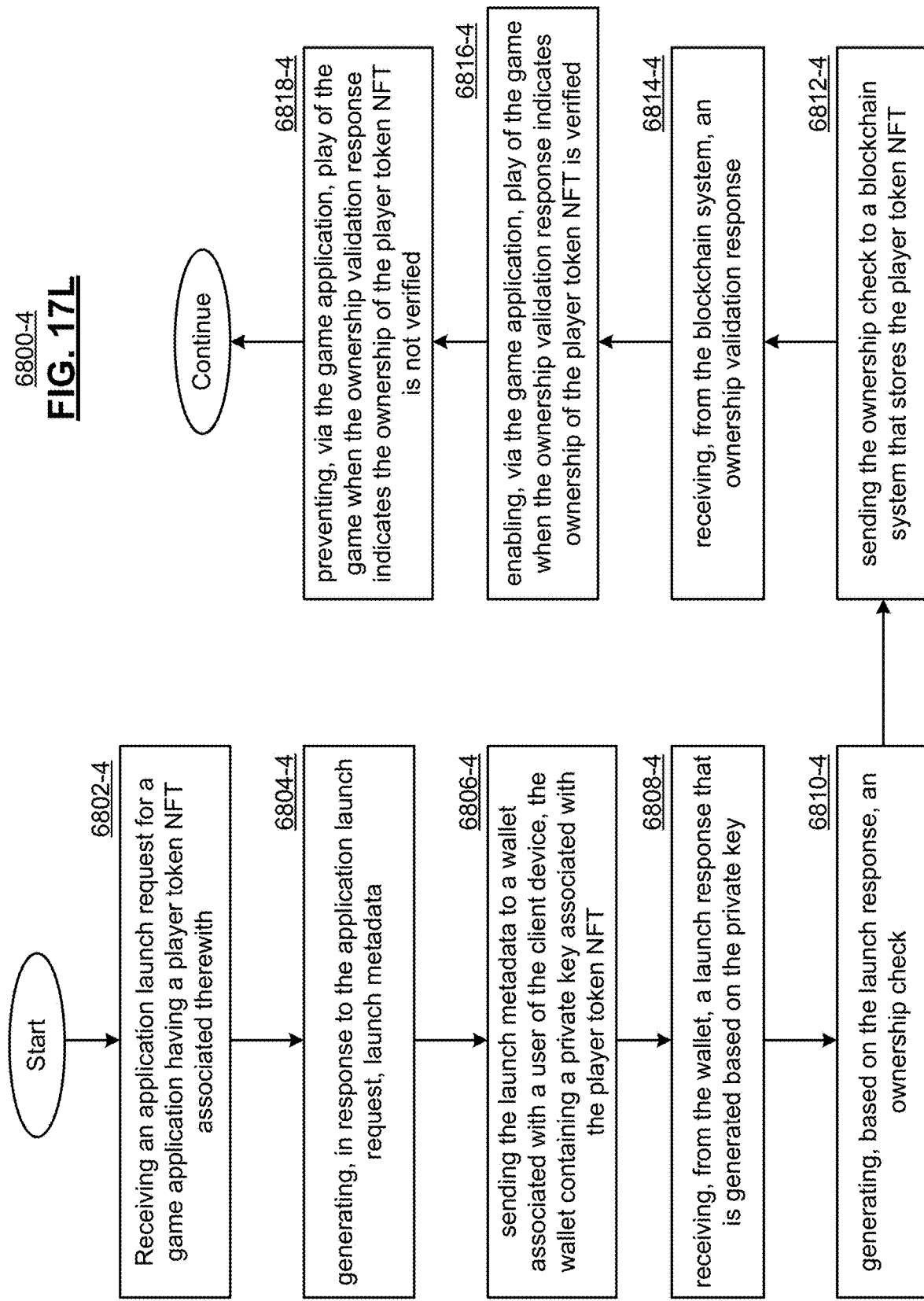

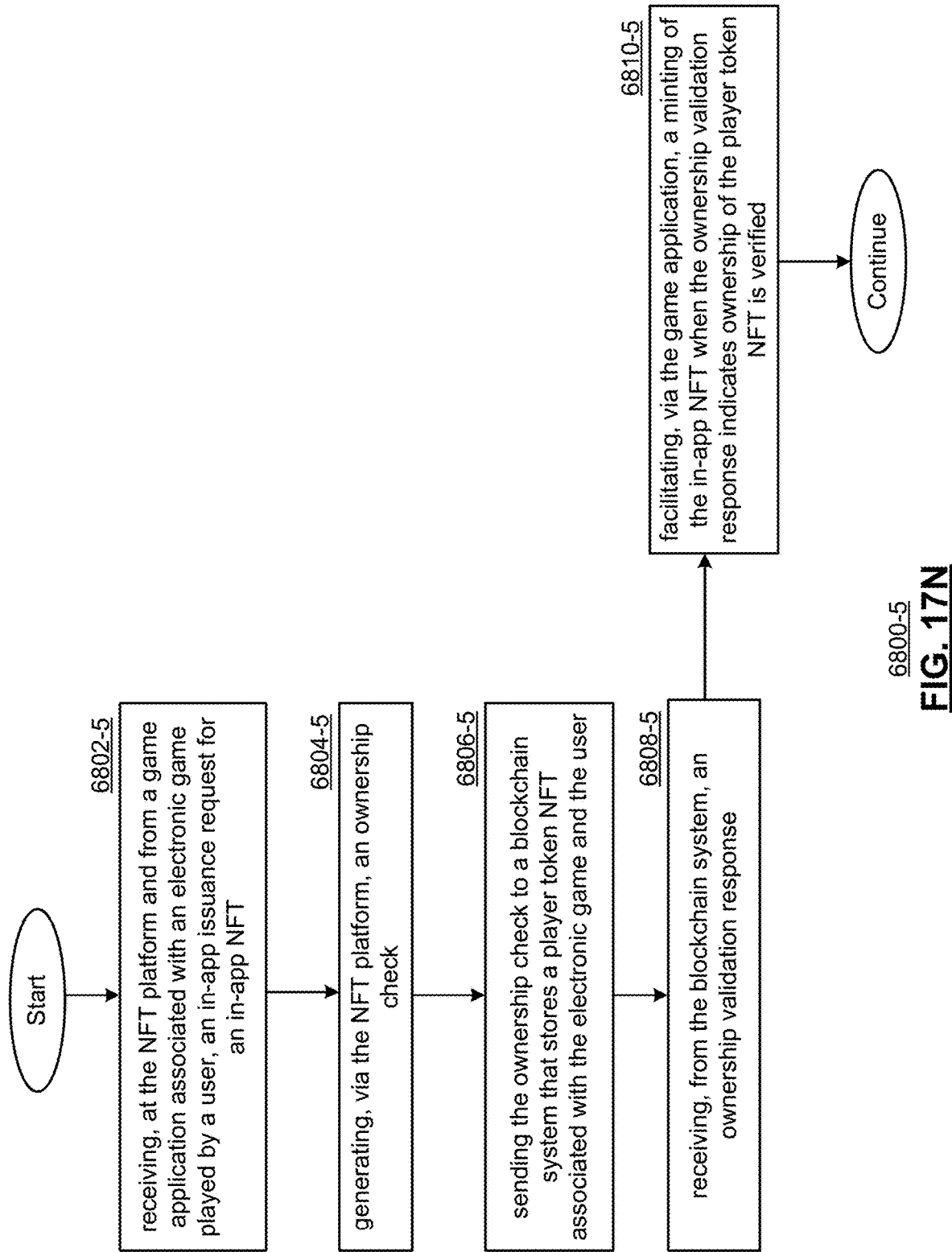

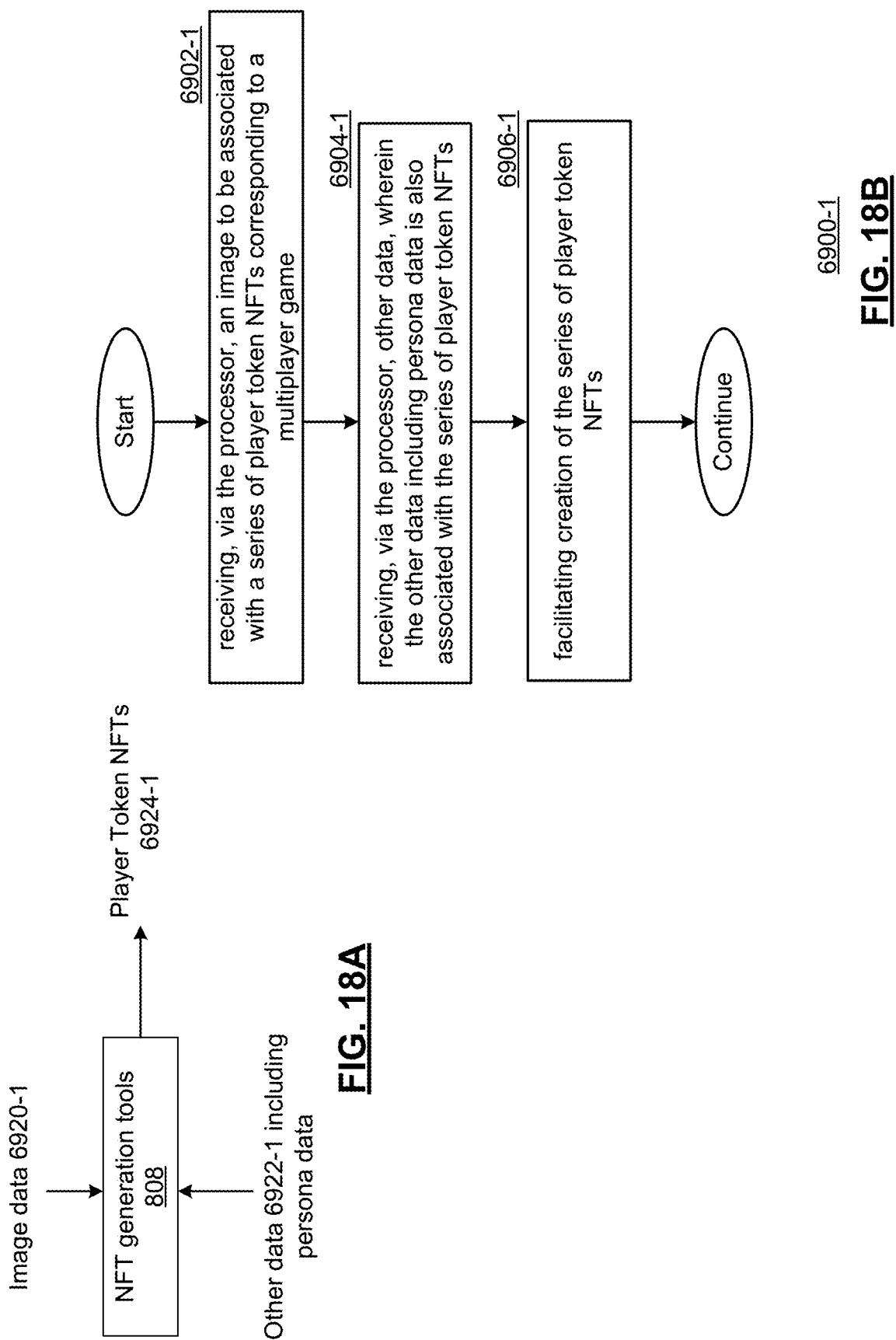

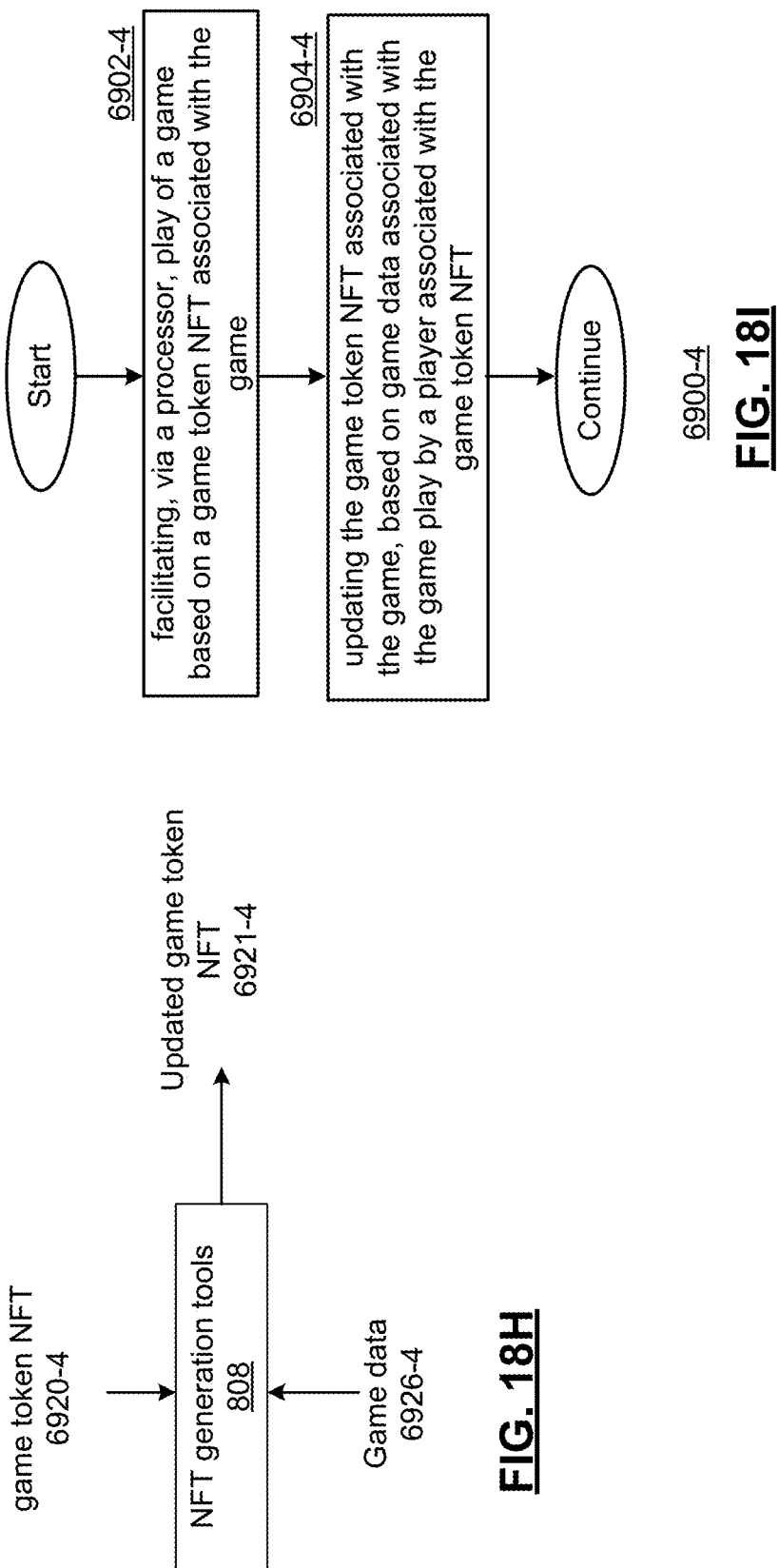

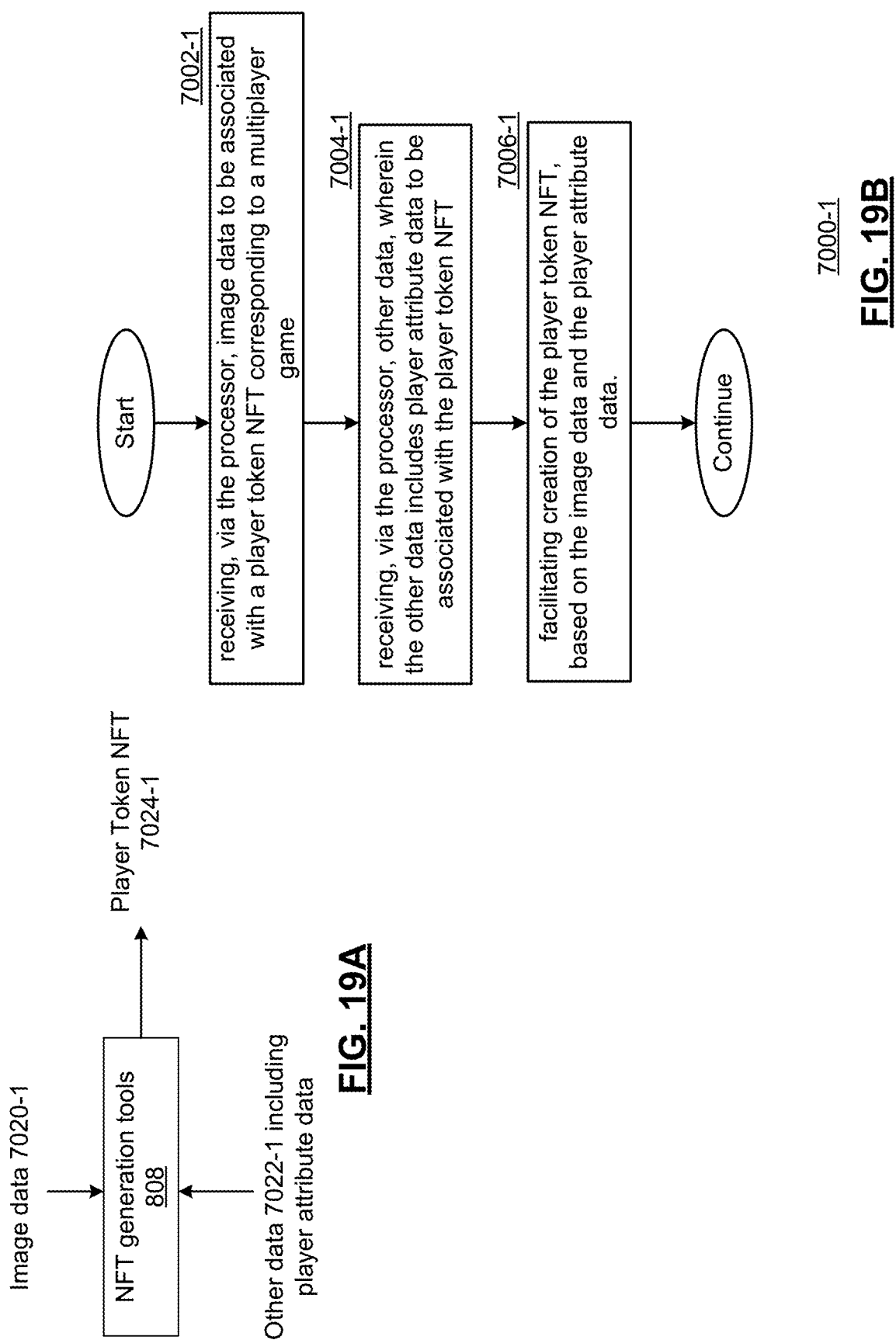

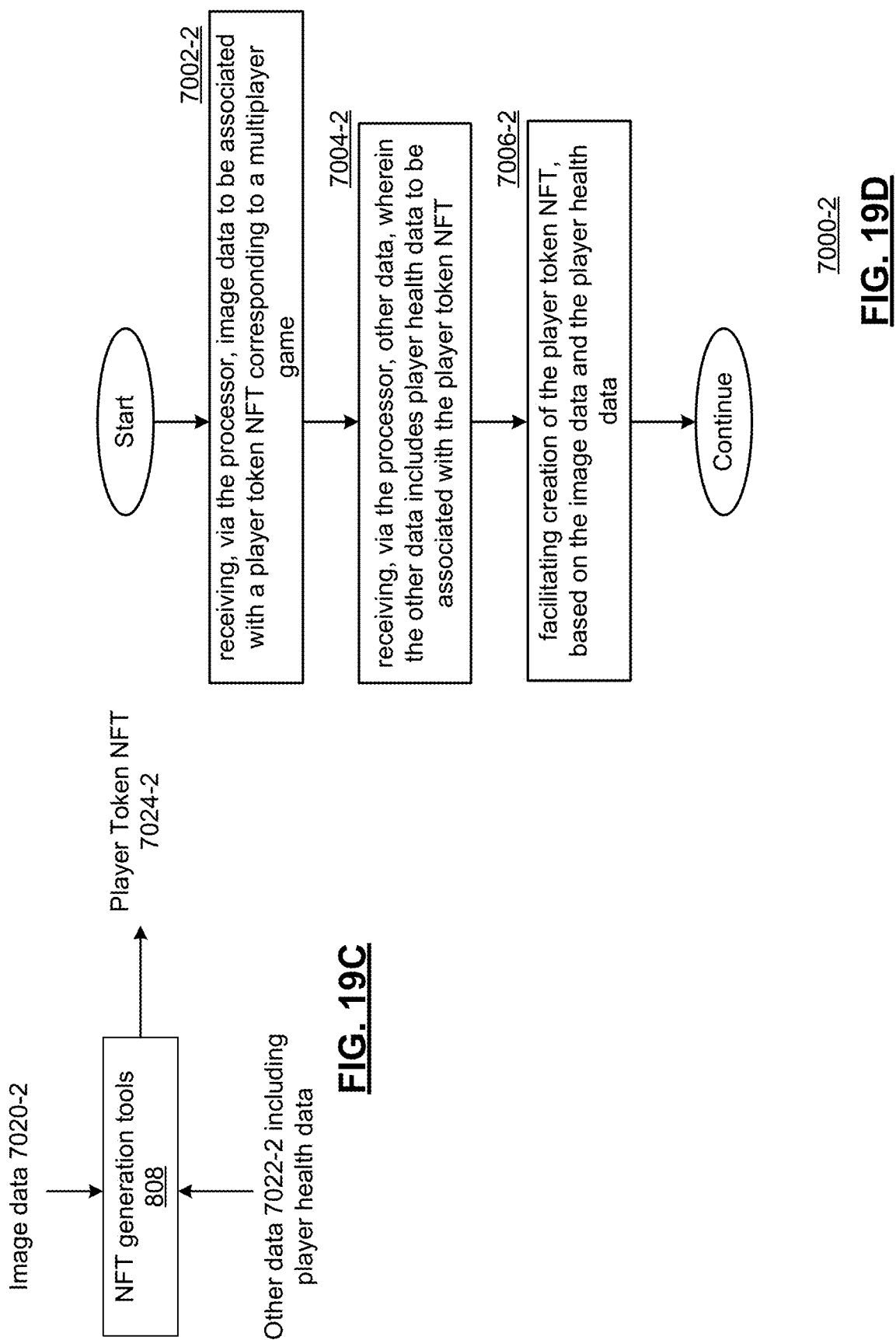

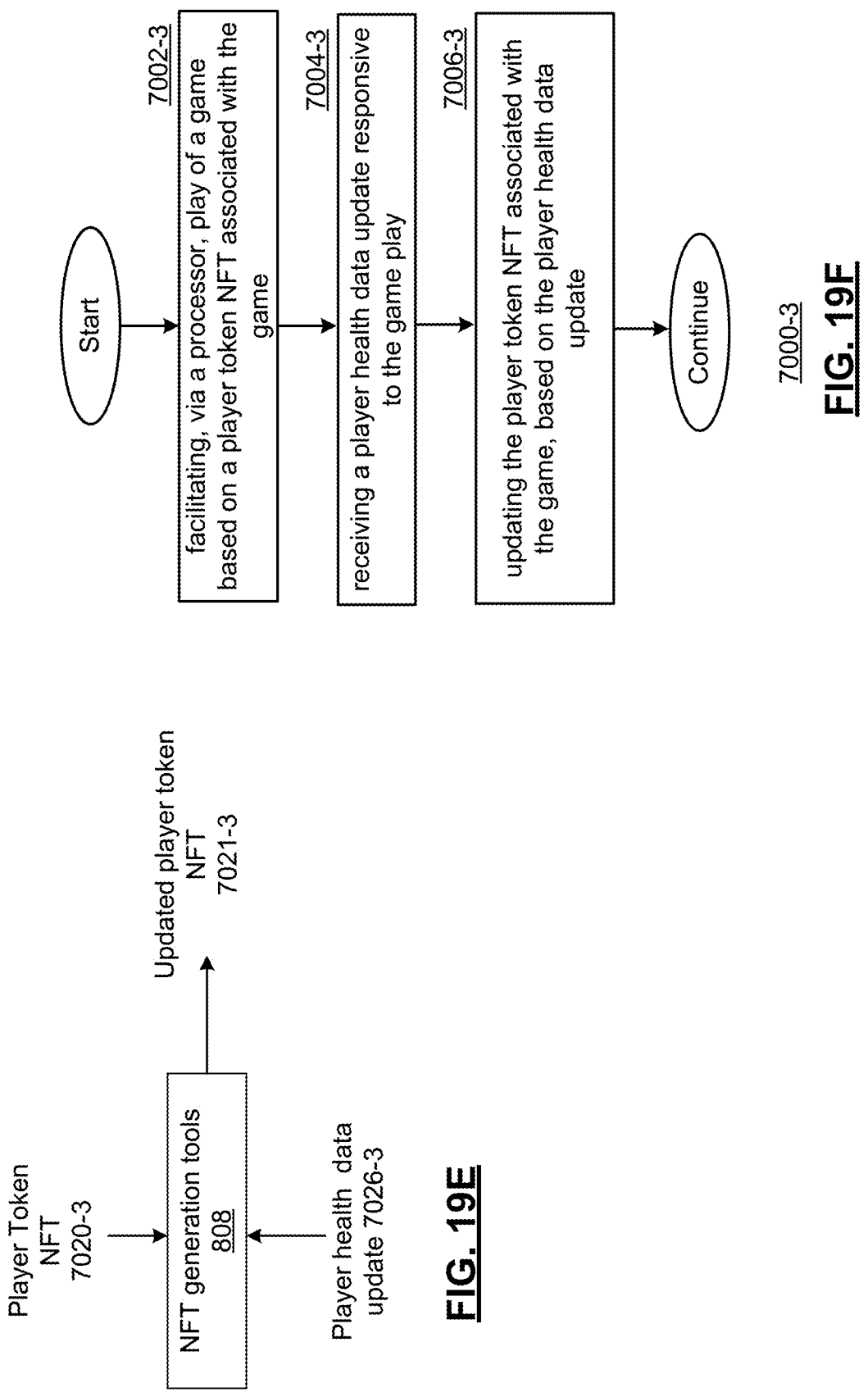

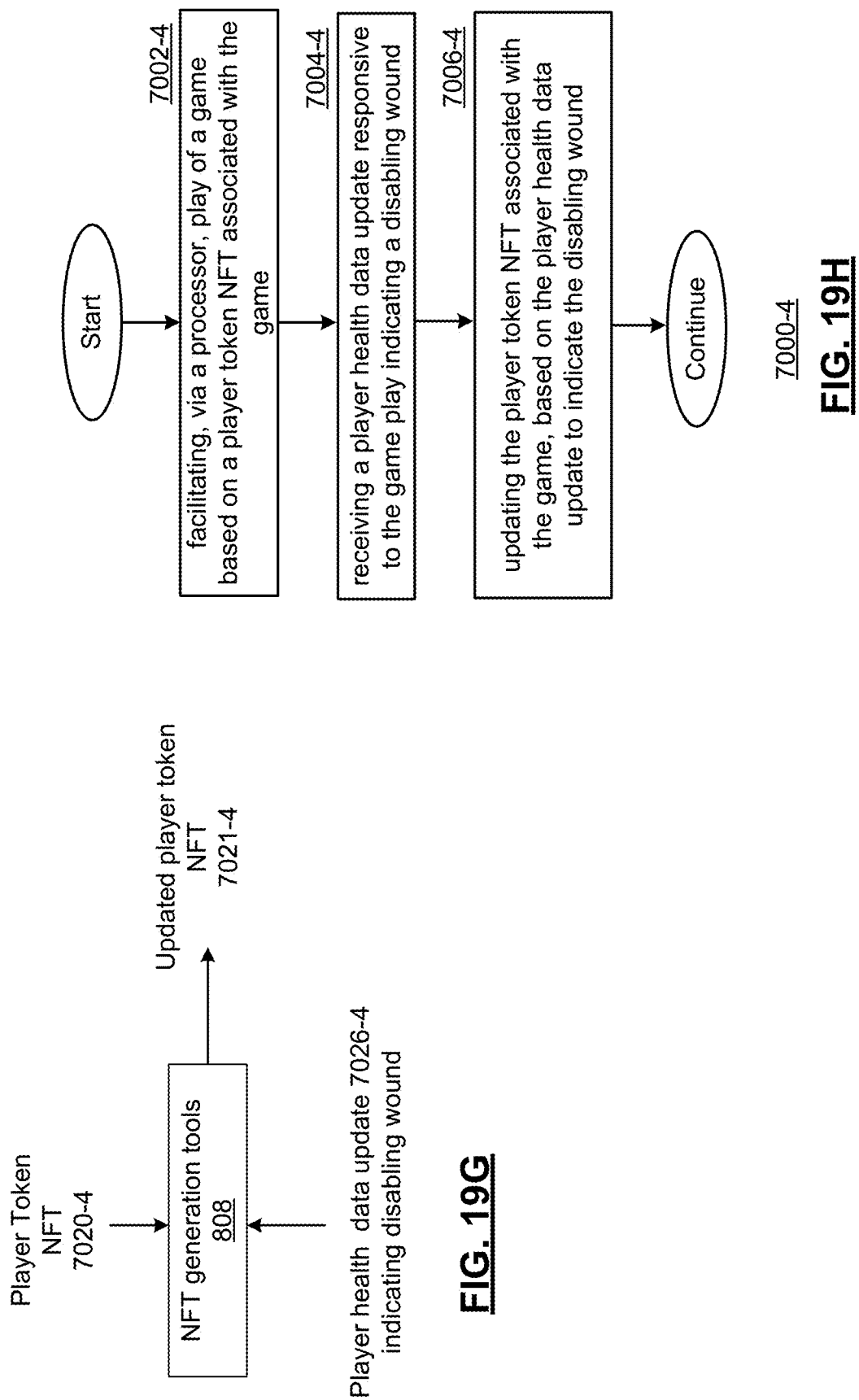

Name: Maalek Zorb, Disassociated Bruconian Syndicate, Ticket Torn
(Status: Ex Communicado)

7124-2

Player token NFT
7110-2

Updated Player Token
NFT 7110-3

Player Ticket NFT
7124-1

NFT generation tools
808

Other data 7122-2 including
game play data

Updated Player Ticket
NFT 7124-2

Player token NFT
data 7110-2

NFT generation tools
808

Other data 7112-1 including
player syndicate update

Updated Player Token NFT 7110-3

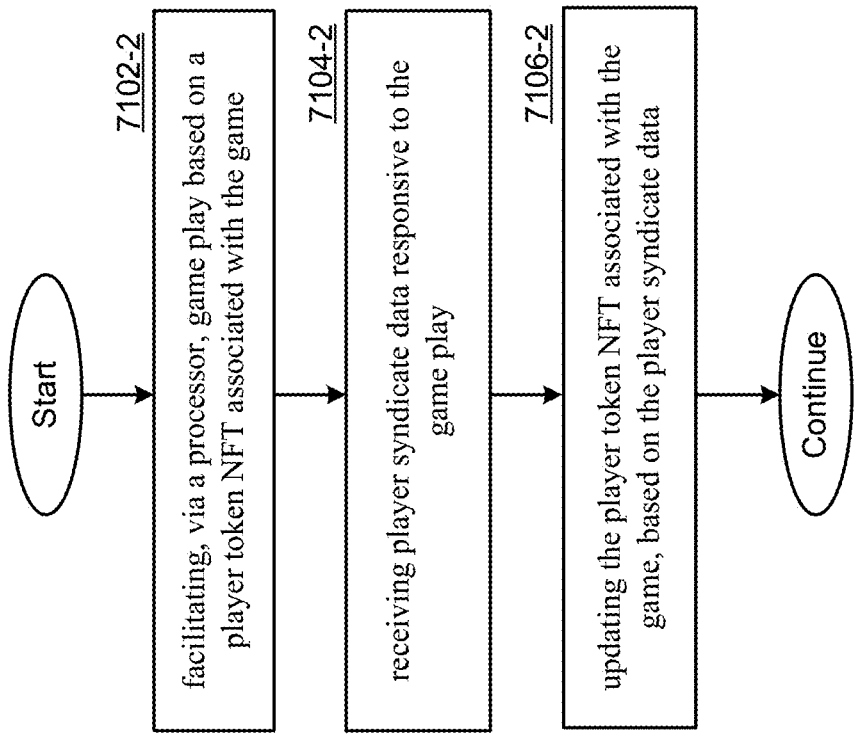
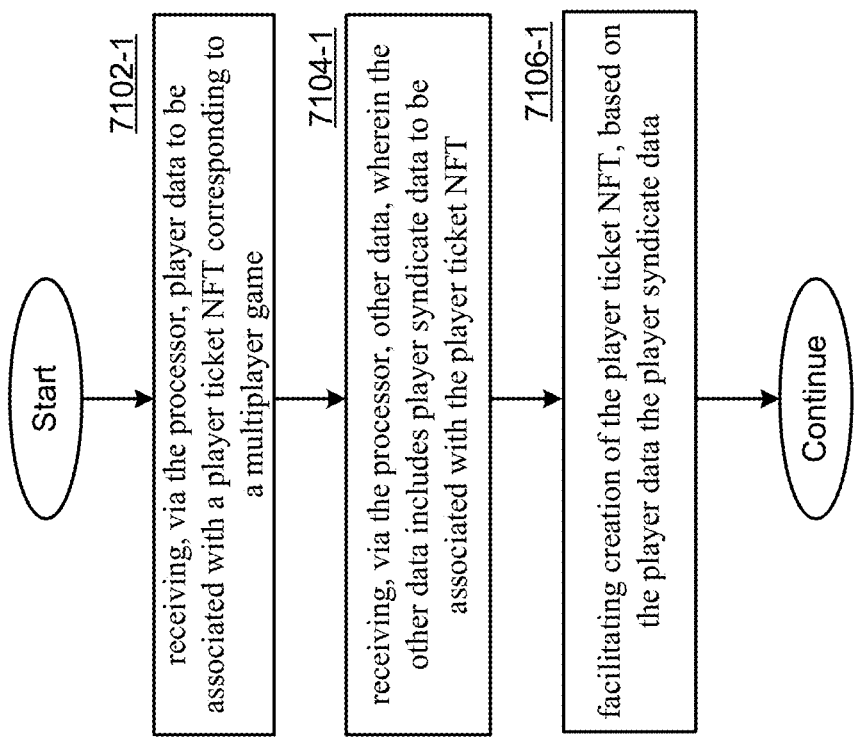

FIG. 21B
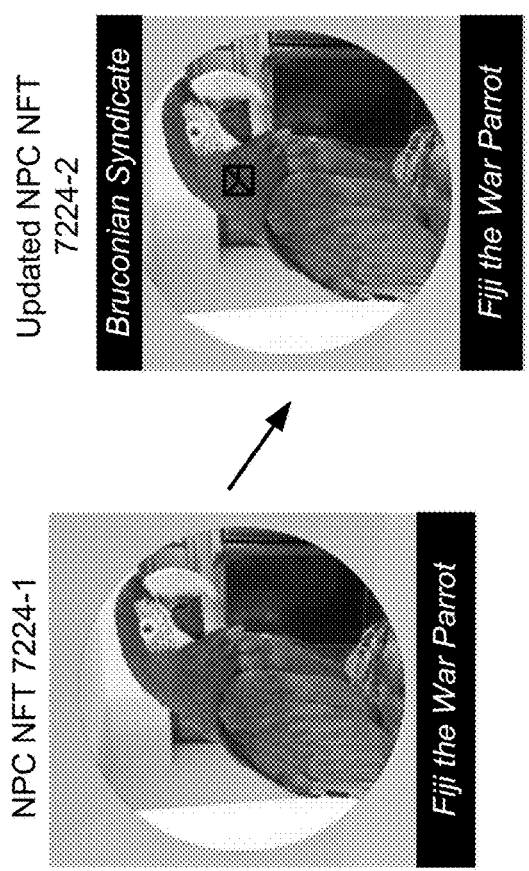
FIG. 21D
FIG. 21A
FIG. 21C

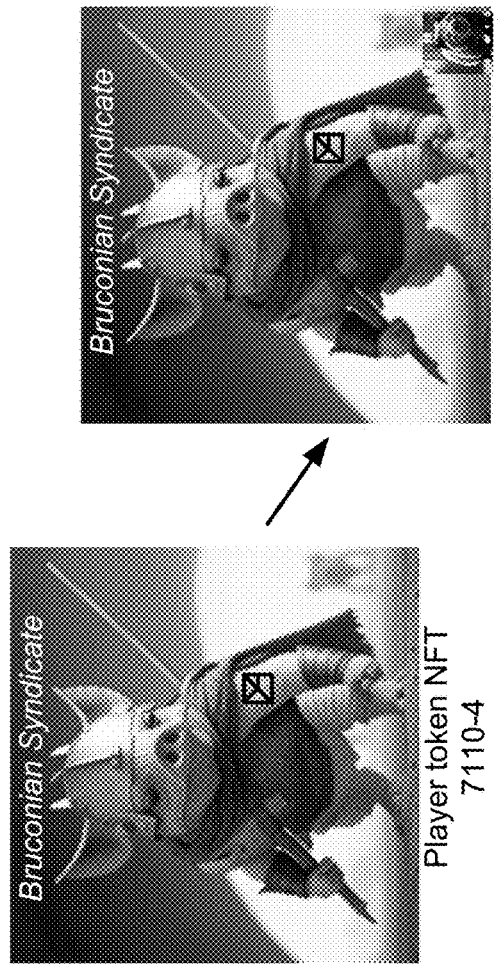
Player token NFT 7110-4
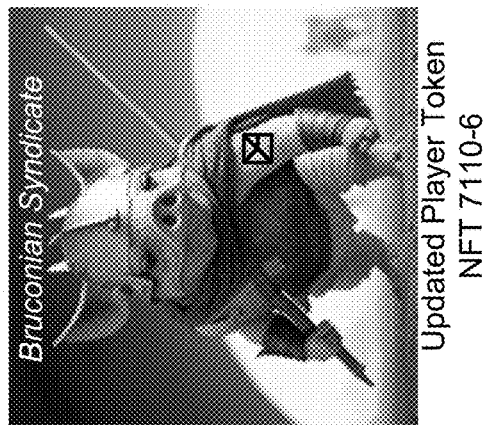
Updated Player Token NFT 7110-5
FIG. 21F
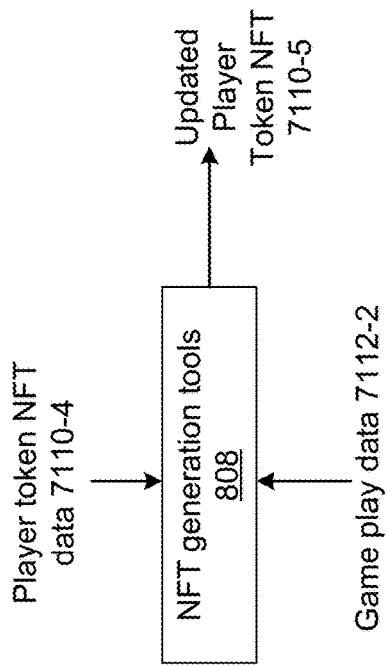
Player token NFT 7110-5
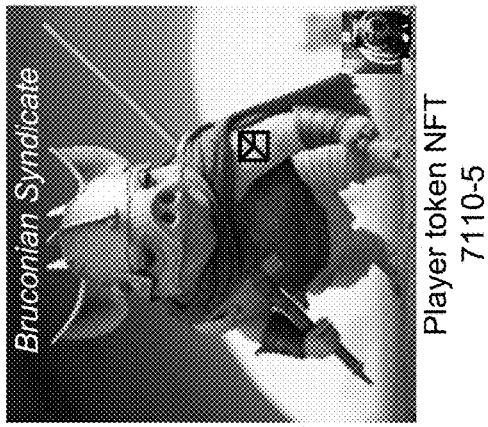
Updated Player Token NFT 7110-6
FIG. 21G
Player token NFT data 7110-4 → NFT generation tools 808 → Updated Player Token NFT 7110-5
Game play data 7112-2
FIG. 21E

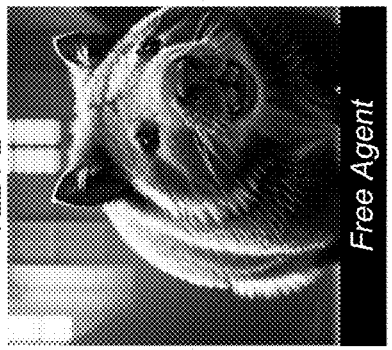
FIG. 21H
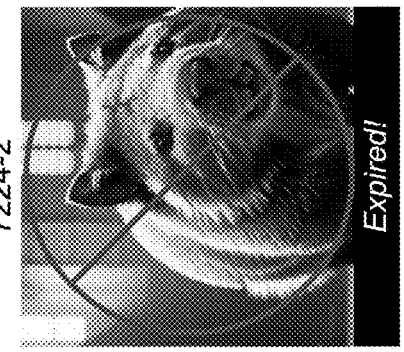
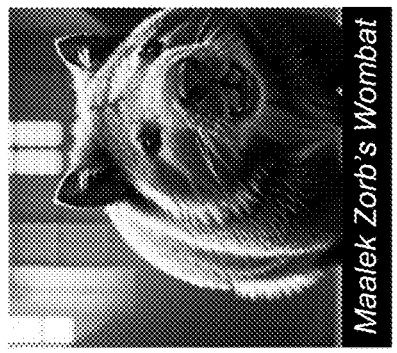
FIG. 21I

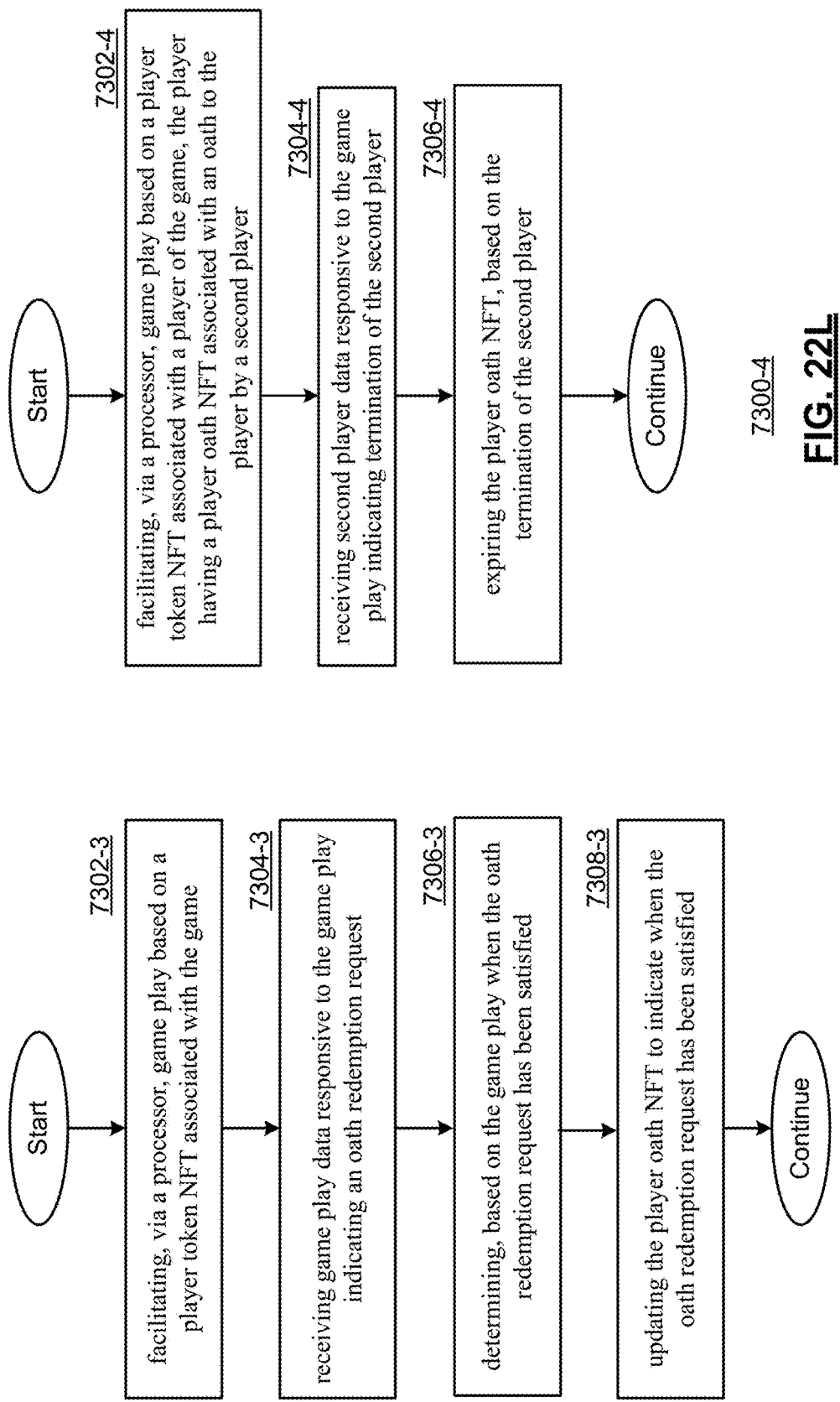

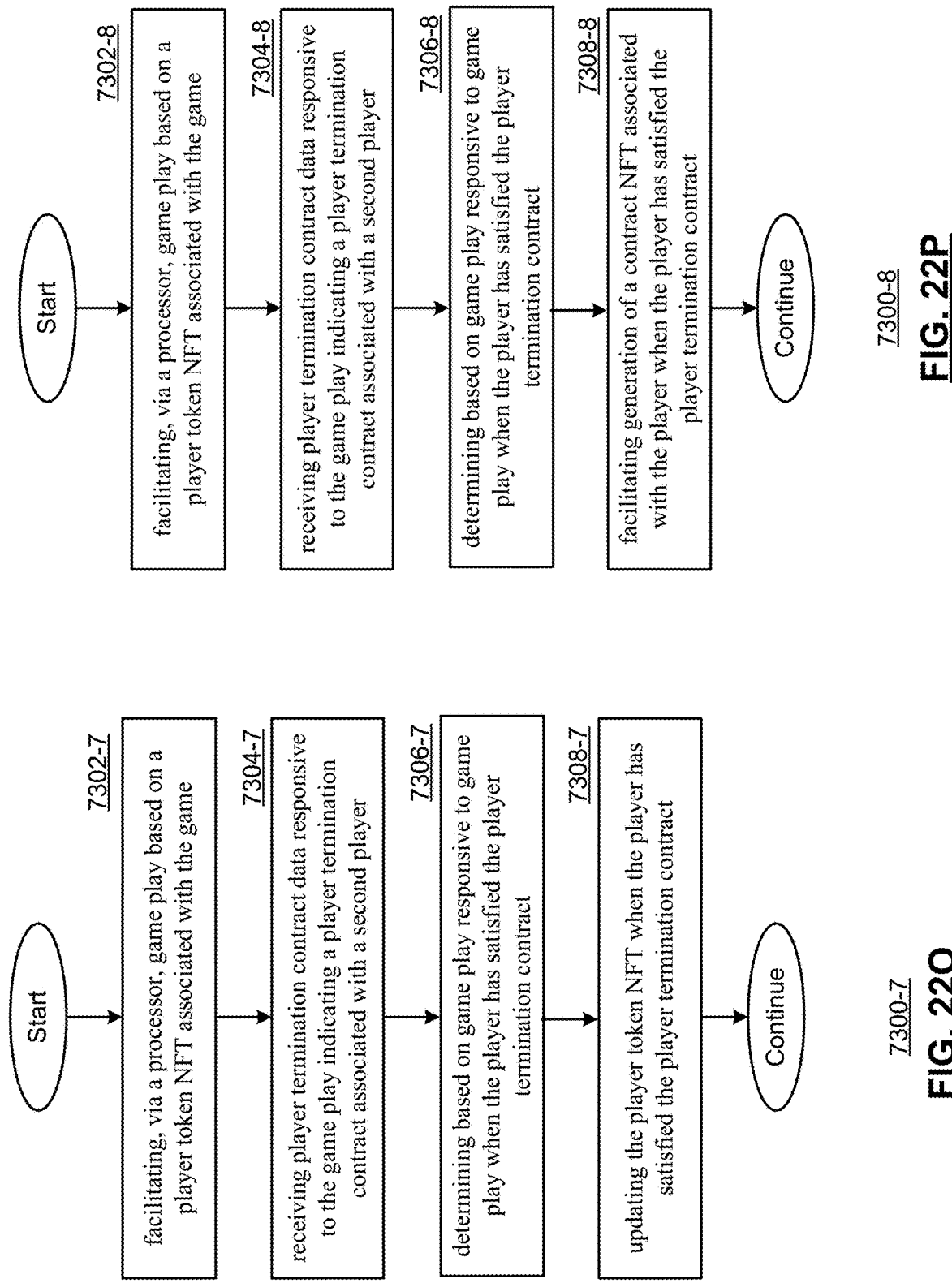

IN-GAME ECONOMY DETAILS

| | PVE MISSIONS | P2P CONTRACTS (E.G. HITS, OATHS) | PURCHASING (PRIMARY) | PURCHASING (GAME MARKETPLACE) | TRADING / LOANING | CRAFTING / BREEDING | SCRAPPING |
|---|---|---|---|---|---|---|---|
| WHAT | Gold Coins, Weapons, Clothing / Armor | Gold Coins | Weapons, Clothing / Armor, Vehicles / Parts, Pets | Weapons, Clothing / Armor, Vehicles / Parts, Pets | Weapons, Clothing / Armor, Vehicles / Parts, Pets | Weapons, Clothing / Armor, Vehicles / Parts, Pets | Weapons, Clothing / Armor, Vehicles / Parts, Pets |
| WHEN AND WHERE? | Players are able to select gear when they create their Assassin. Players can also buy gold coins and NFT contracts when they complete quests and missions | Players can put hits out on other players and if a contract is completed will exchange Coins. Players can also buy either sales Blood cash contracts that create debts | Players will be able to purchase more premium gear to create their avatar. Additionally gear will be available to purchase from Sunrise's Chop Shop or Kanero with an absolute limit | Players can buy and sell gear on secondary market (within the game) | Players can also offer interesting trades for gear without cost but only to others in their syndicate or limited quantity | Players can trade in combinations of things like weapons and vehicles / parts to create more premium weapons and vehicles / parts | Gear that can no longer be used can be stripped down for an amount of gold coins |
| IMPACT TO USERS (VOLUME) | Coins up, NFTs up | Coins neutral, NFTs neutral | Coins down, NFTs up | Coins down (10% fee), NFTs neutral | Coins neutral, NFTs neutral | Coins down, NFTs down | Coins up, NFTs down |

FIG. 23

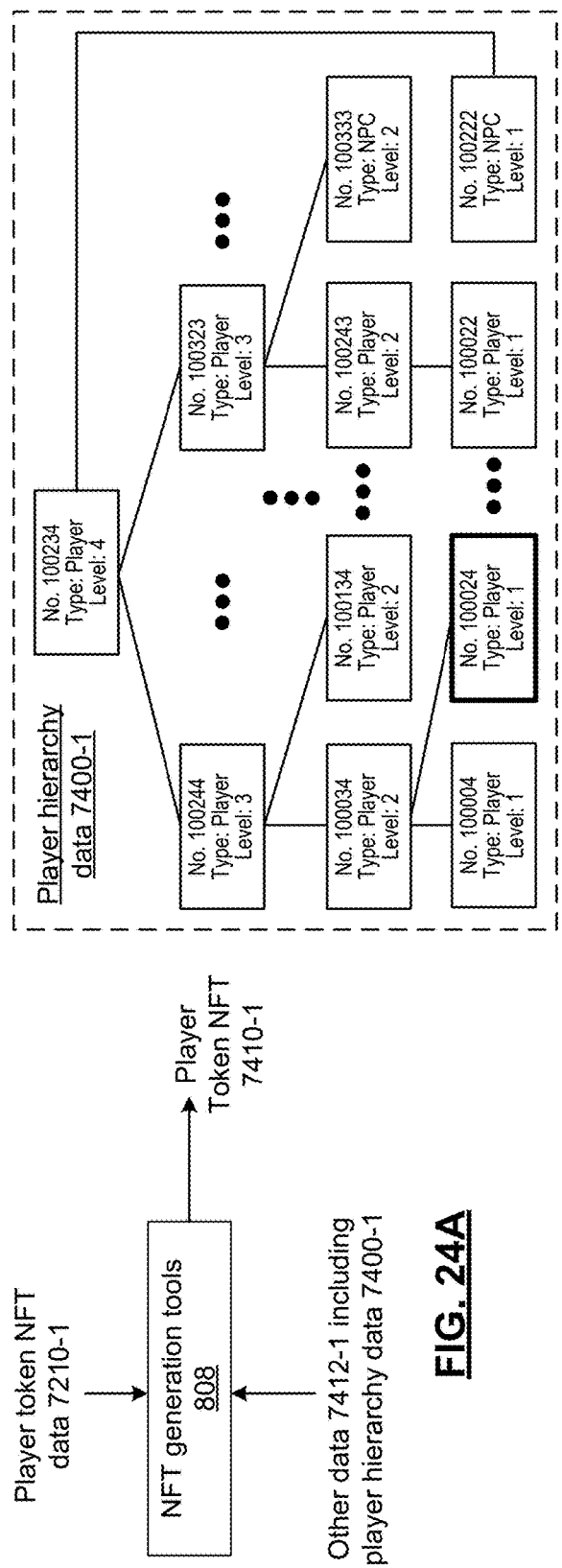
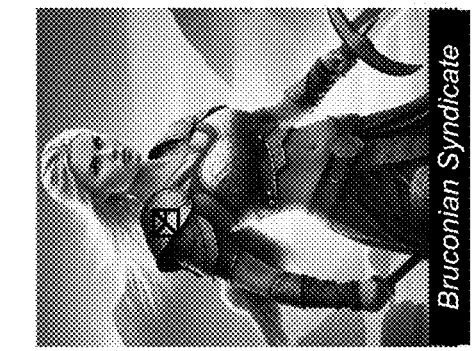
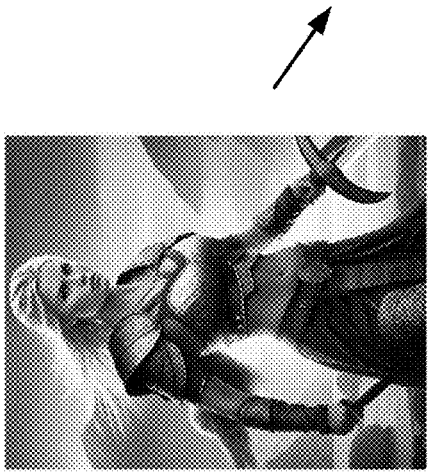
FIG. 24A
FIG. 24B
FIG. 24C

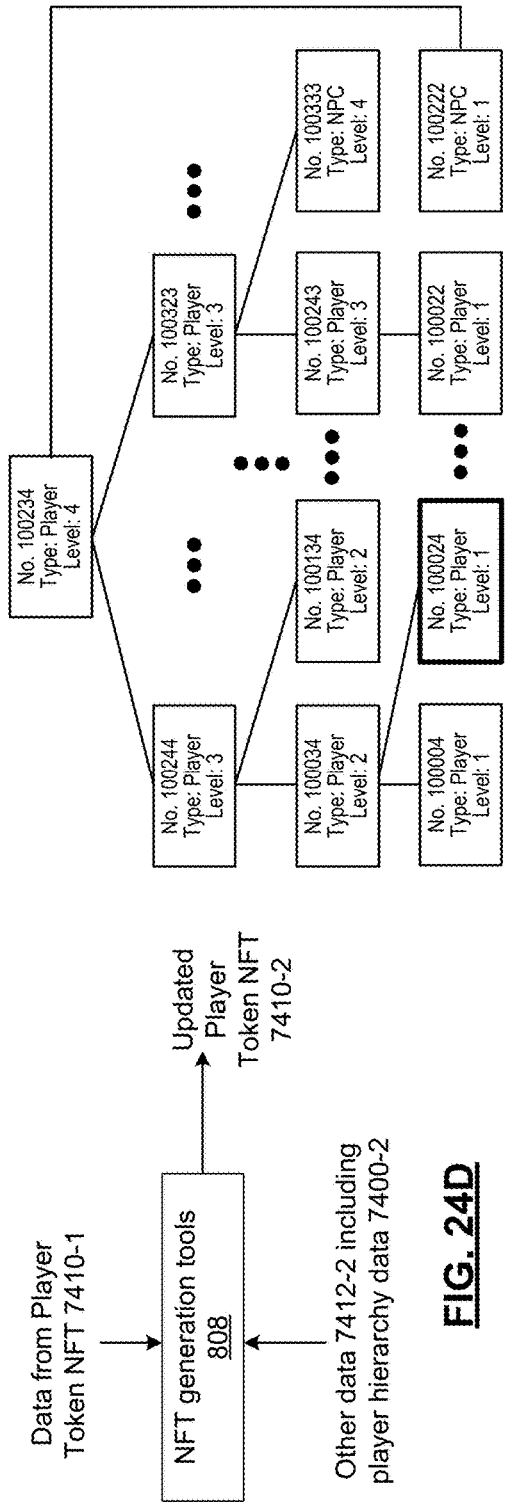
FIG. 24E
FIG. 24D
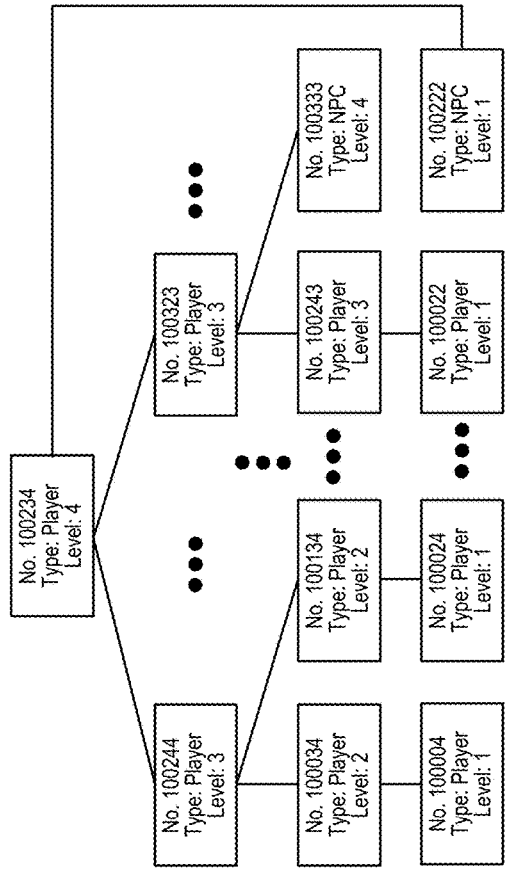
FIG. 24F

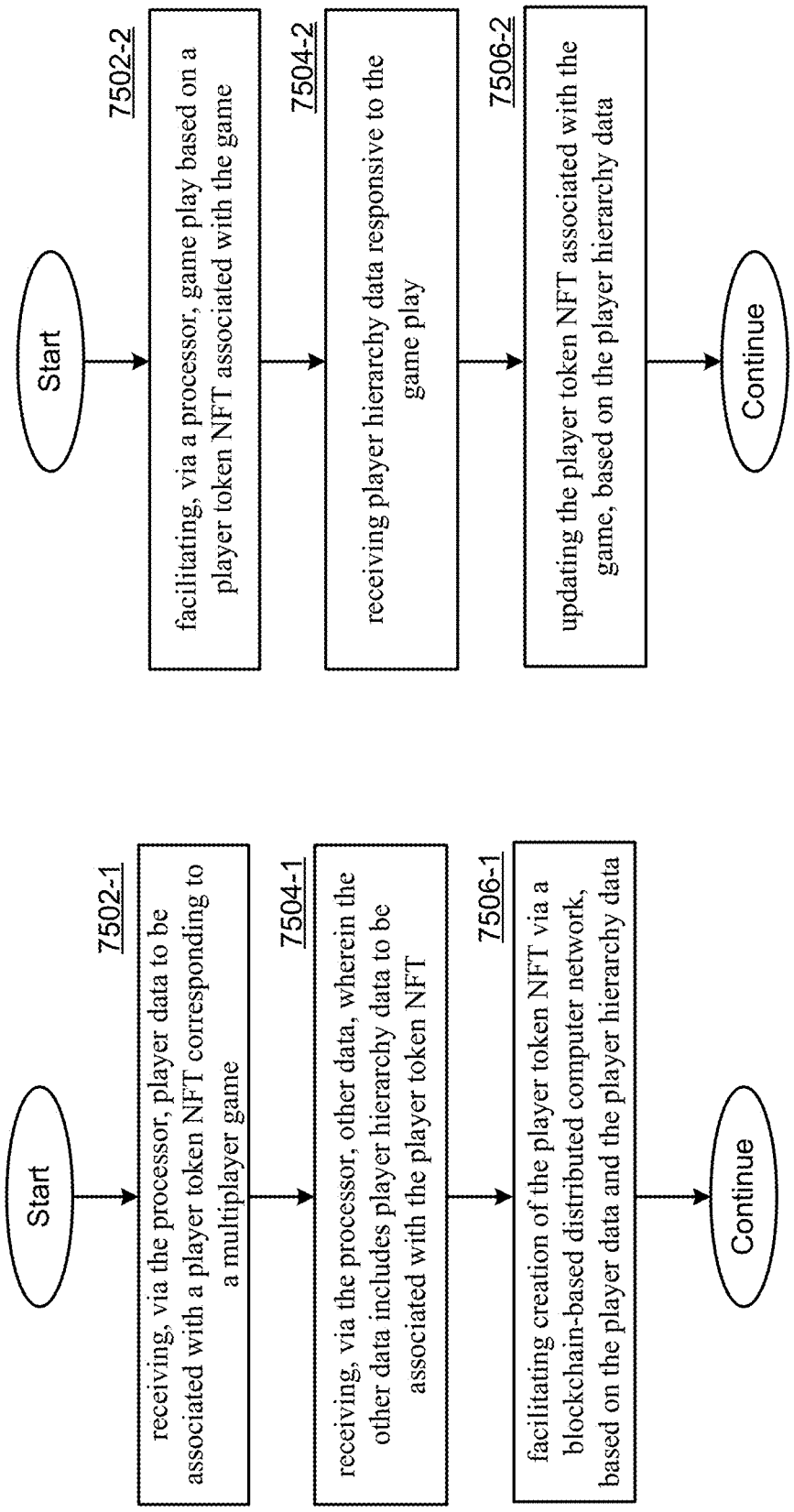

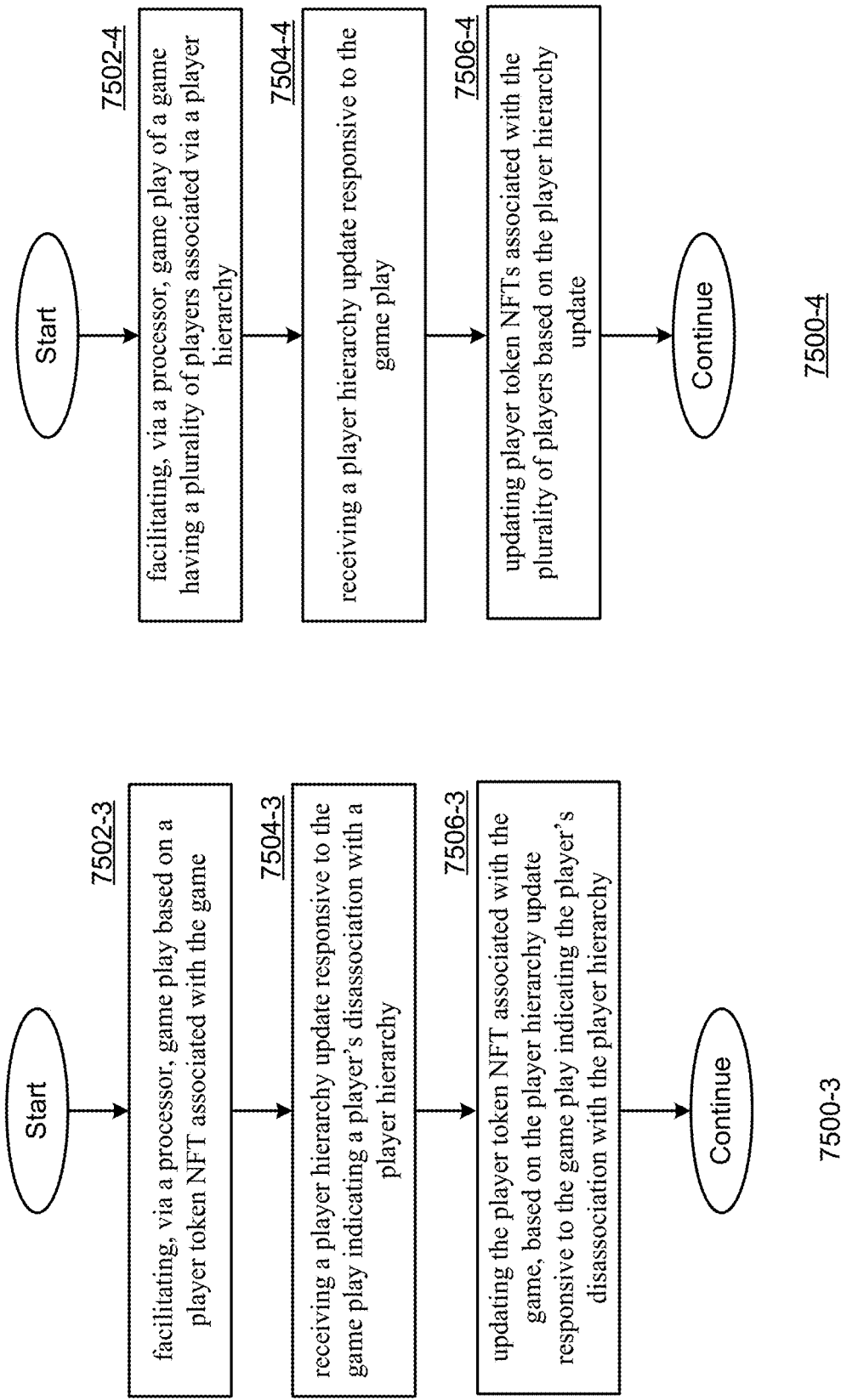

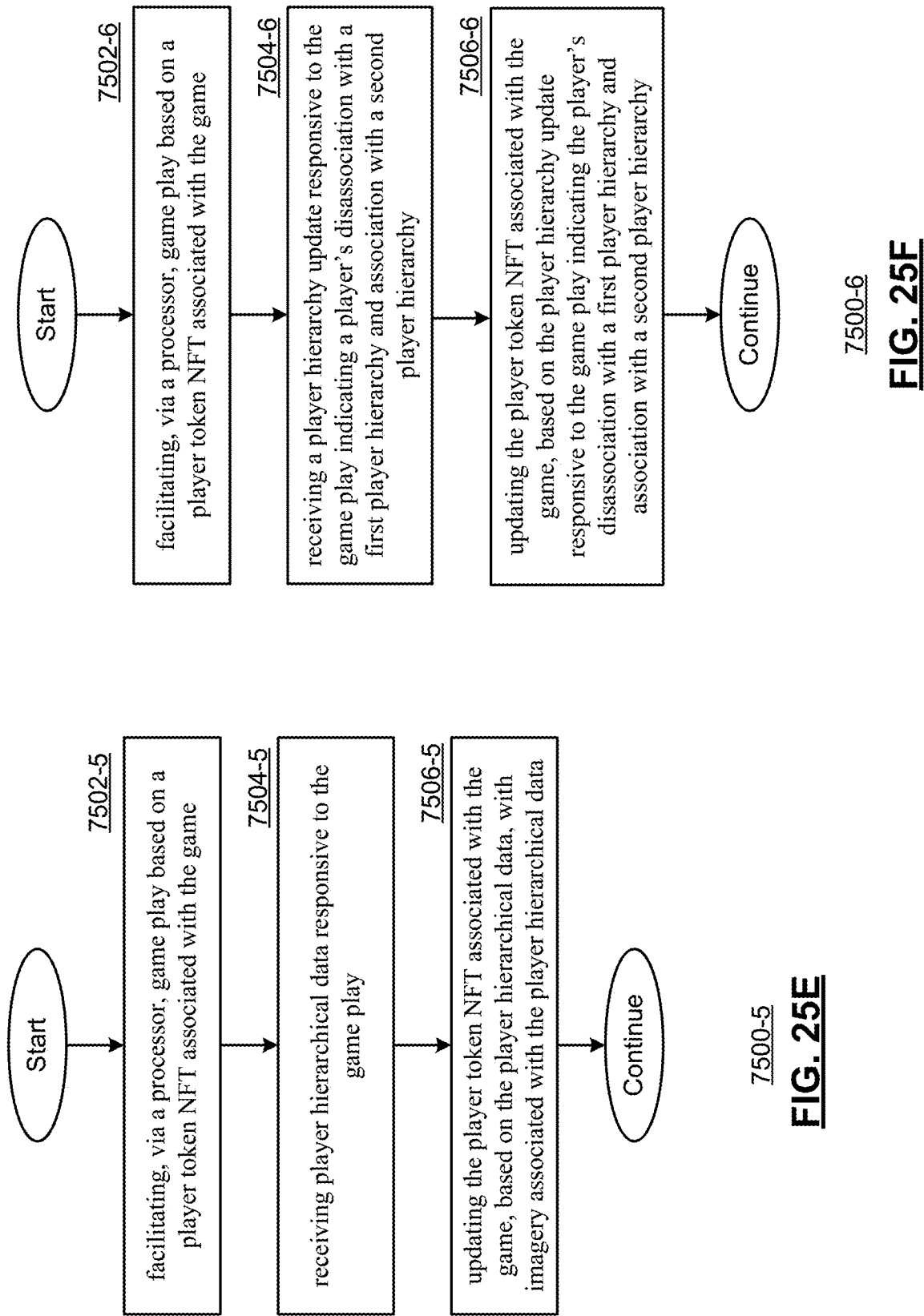

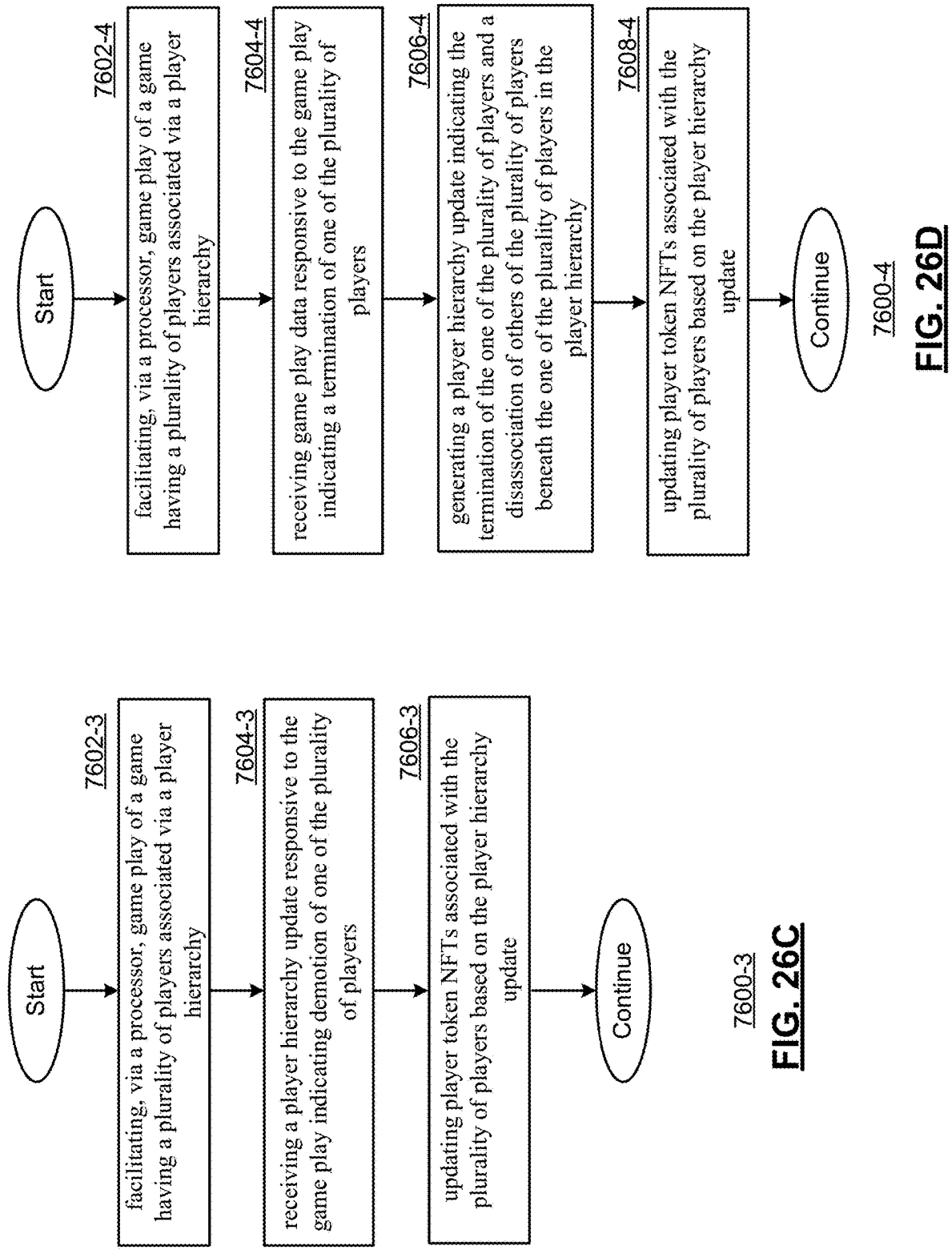

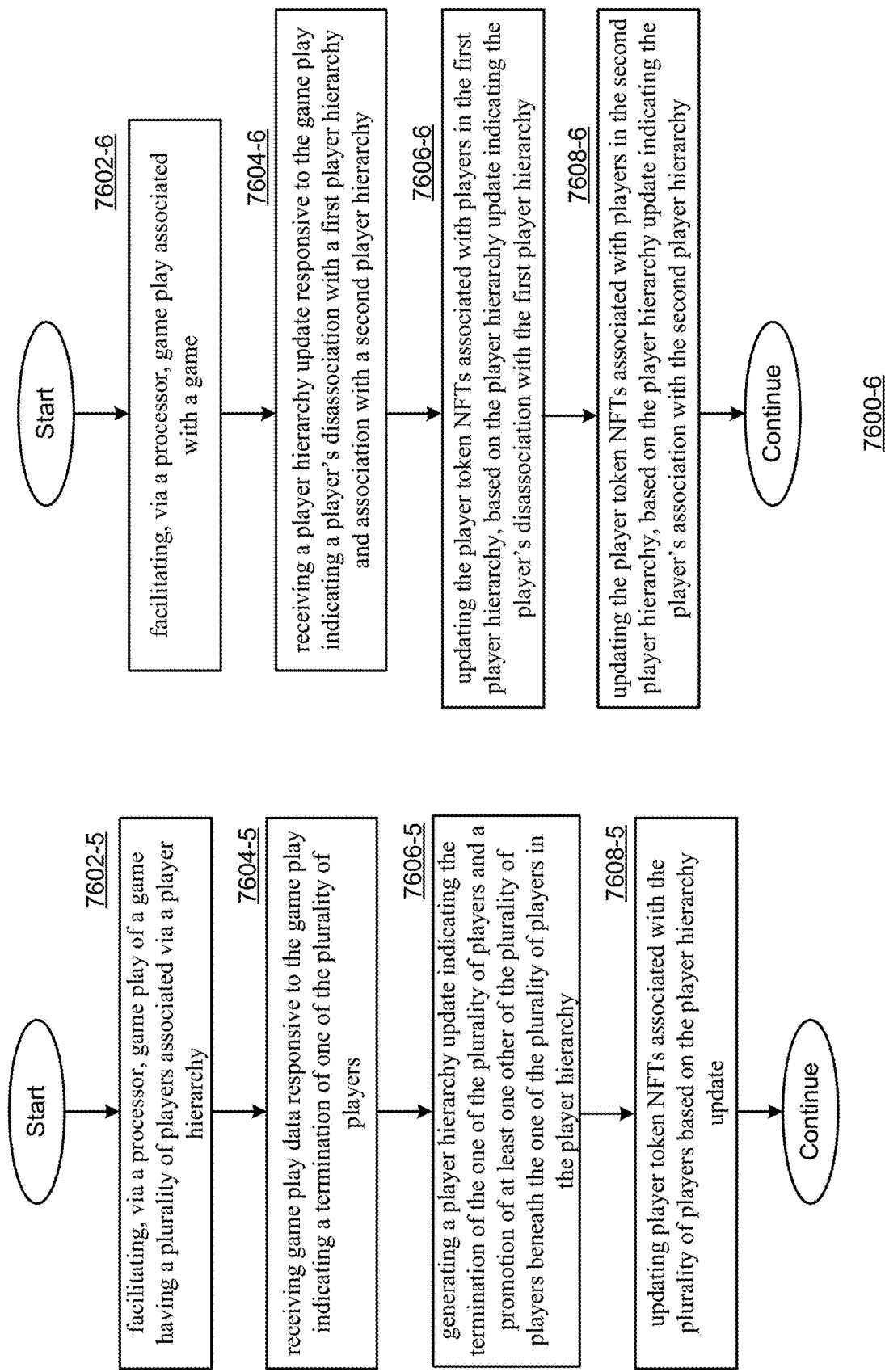

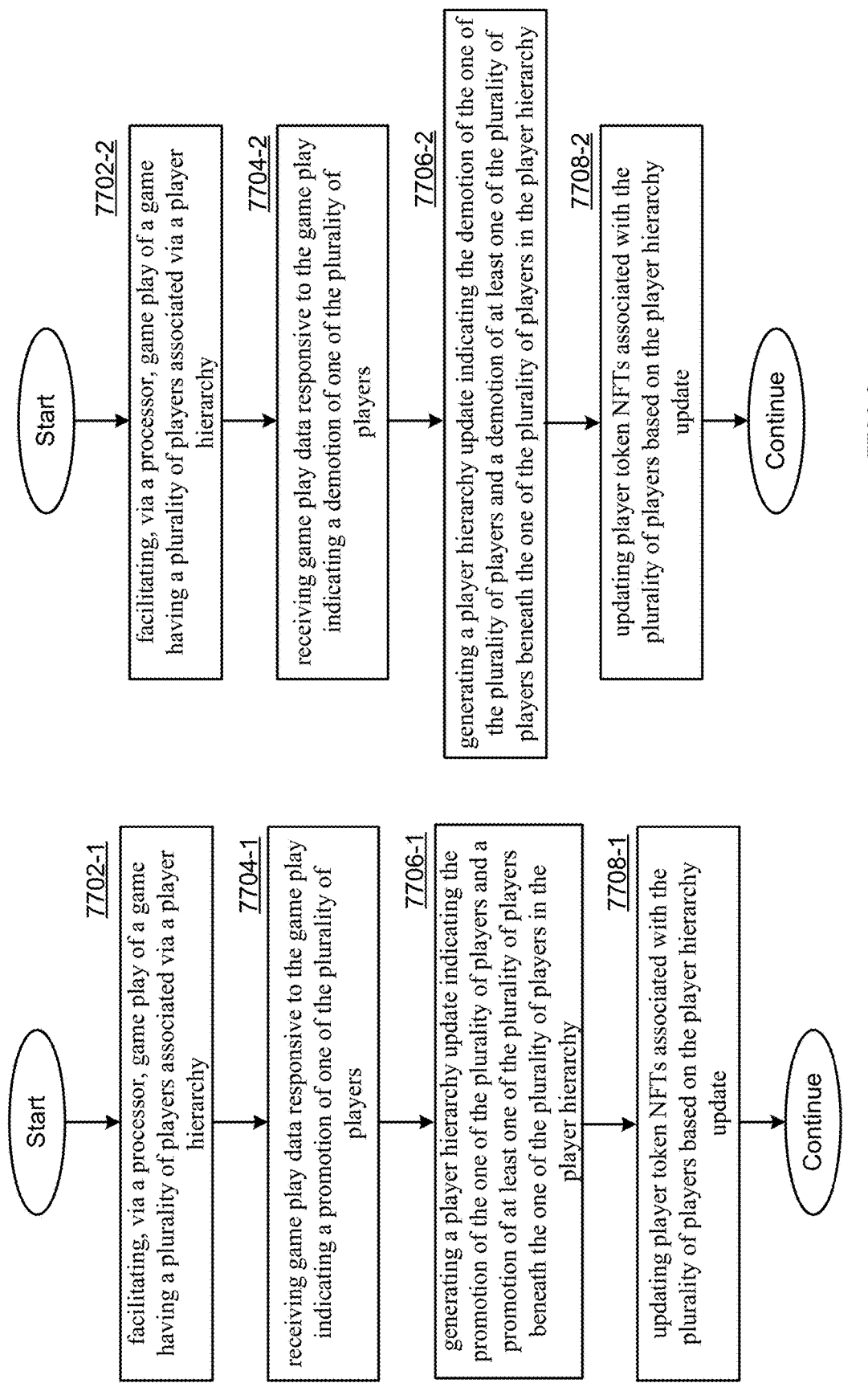

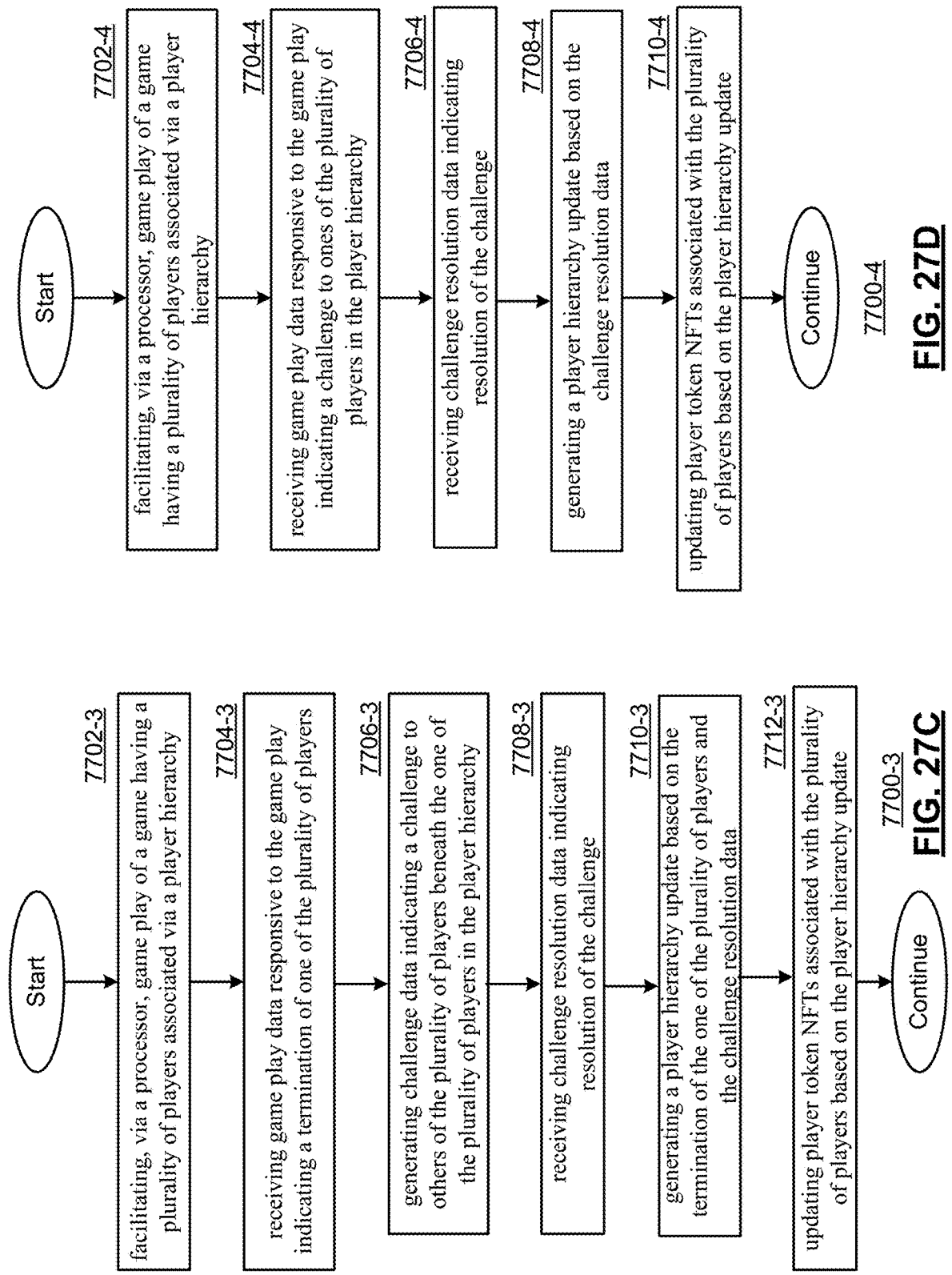

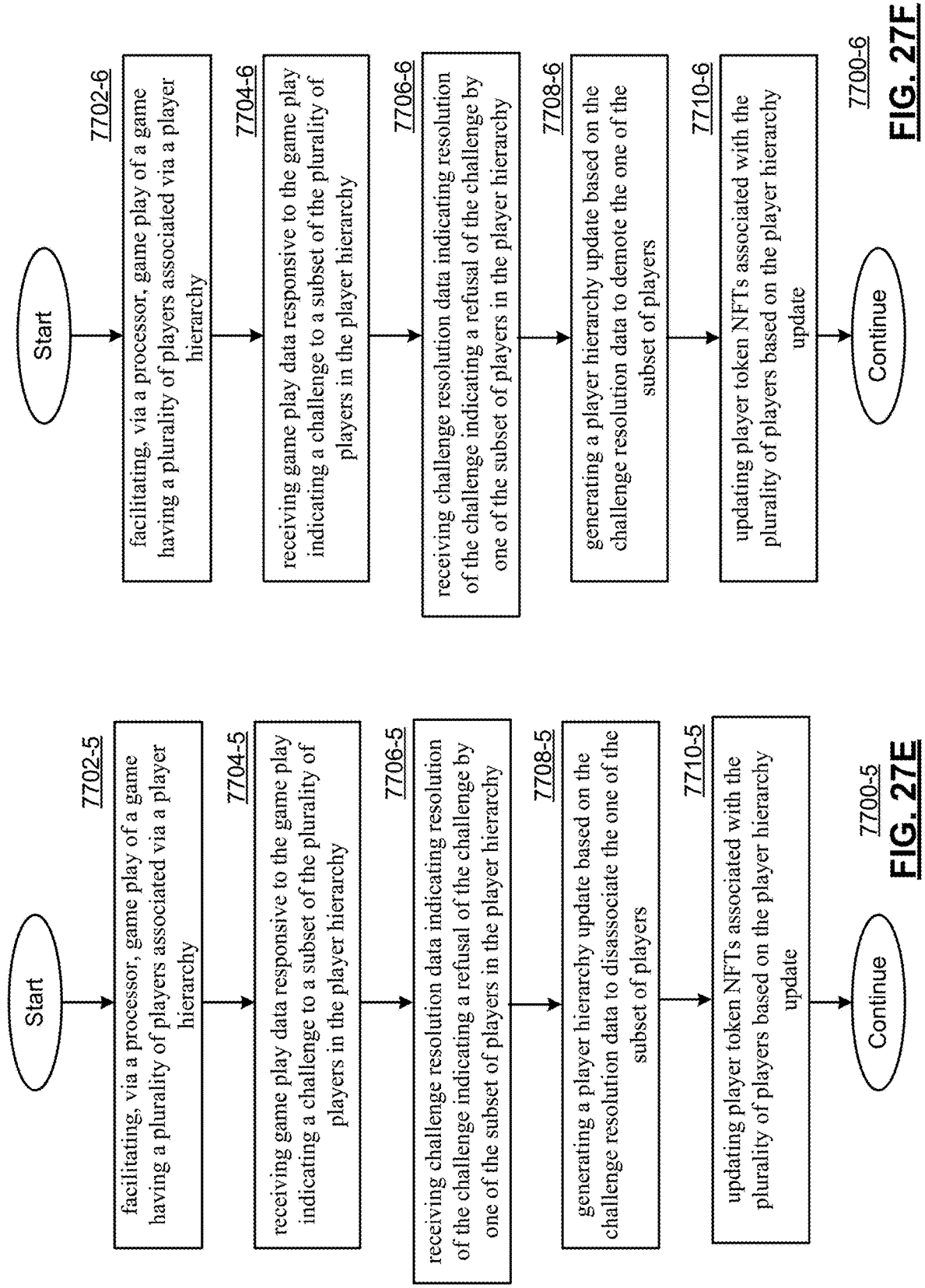

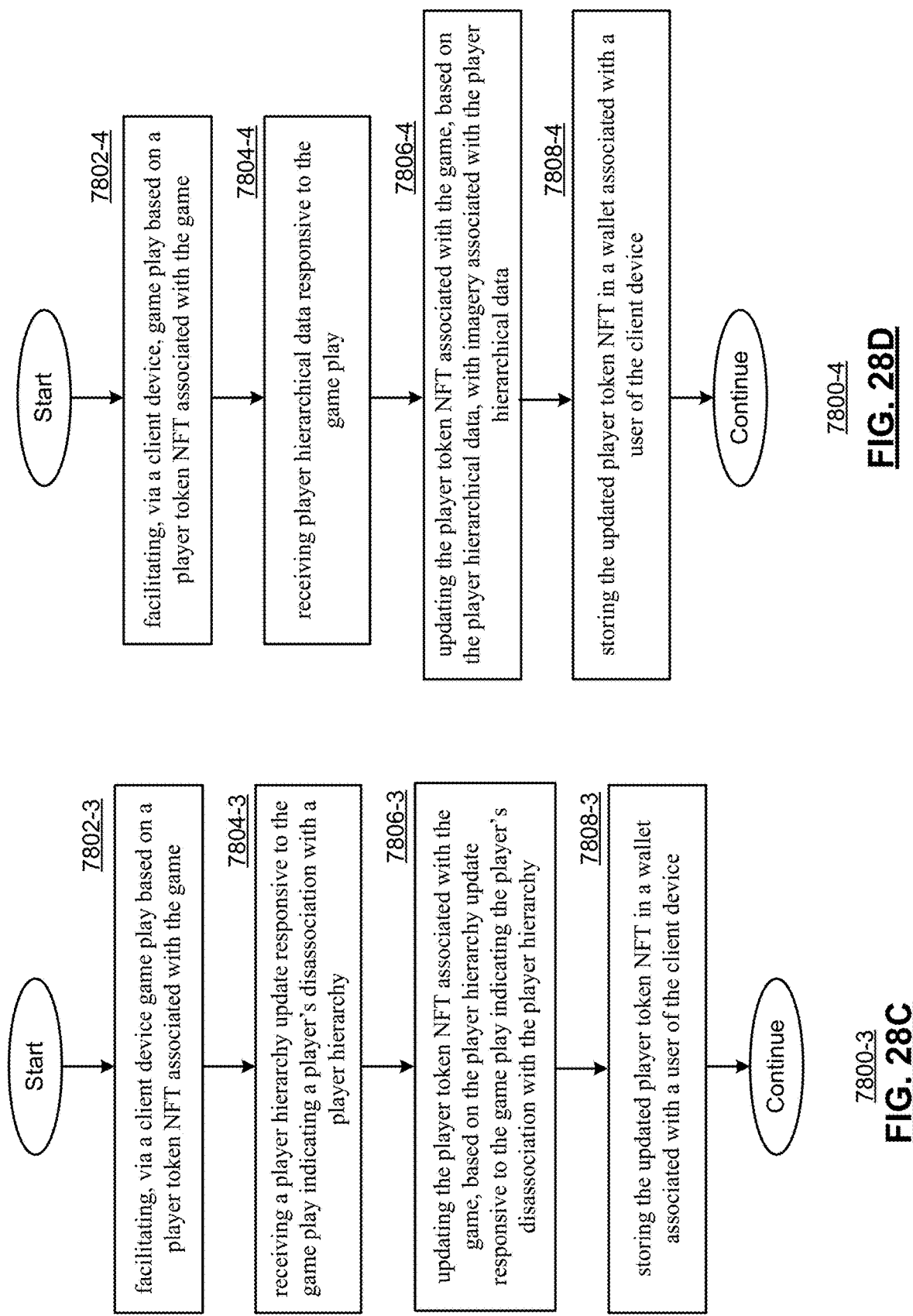

GENERATING PLAYER TOKEN NFTS VIA A BLOCKCHAIN-BASED DISTRIBUTED COMPUTER NETWORK BASED ON PLAYER HIERARCHY

CROSS-REFERENCE TO RELAYED APPLICATIONS

The present U.S. Utility patent application claims priority pursuant to 35 U.S.C. § 119(e) to U.S. Provisional Application No. 63/608,612, entitled "UPDATING PLAYER TOKEN NFTS BASED ON PLAYER HIERARCHY", filed Dec. 11, 2023; U.S. Provisional Application No. 63/608,635, entitled "UPDATING PLAYER NFTS BASED ON EVENTS OF A PLAYER IN A HIERARCHY", filed Dec. 11, 2023; U.S. Provisional Application No. 63/608,645, entitled "UPDATING PLAYER NFTS BASED ON CHANGES IN A PLAYER HIERARCHY", filed Dec. 11, 2023; and U.S. Provisional Application No. 63/608,953, entitled "UPDATING PLAYER TOKEN NFTS IN A WALLET BASED ON PLAYER HIERARCHY", filed Dec. 12, 2023, all of which are hereby incorporated herein by reference in their entirety and made part of the present U.S. Utility patent application for all purposes.

The present U.S. Utility patent application also claims priority pursuant to 35 U.S.C. § 120 as a continuation-in-part of U.S. Utility application Ser. No. 18/486,314, entitled "GENERATING AND UPDATING NON-PLAYER CHARACTER NFTS AND METHODS FOR USE THEREWITH", filed Oct. 13, 2023, which claims priority pursuant to 35 U.S.C. § 119(e) to U.S. Provisional Application No. 63/509,208, entitled "GENERATING AND UPDATING PLAYER TICKET NFTS WITH GAME SYNDICATES AND METHODS FOR USE THEREWITH", filed Jun. 20, 2023; U.S. Provisional Application No. 63/511,787, entitled "GENERATING AND UPDATING NON-PLAYER CHARACTER NFTS AND METHODS FOR USE THEREWITH", filed Jul. 3, 2023; and U.S. Provisional Application No. 63/511,794, entitled "GENERATING AND UPDATING PLAYER OATH NFTS AND METHODS FOR USE THEREWITH", filed Jul. 3, 2023, all of which are hereby incorporated herein by reference in their entirety and made part of the present U.S. Utility patent application for all purposes.

U.S. Utility application Ser. No. 18/486,314 also claims priority pursuant to 35 U.S.C. § 120 as a continuation-in-part of U.S. Utility application Ser. No. 18/452,839, entitled "GENERATING AND UPDATING PLAYER TOKEN NFTS AND METHODS FOR USE THEREWITH", filed Aug. 21, 2023, which is a continuation in part of U.S. Utility application Ser. No. 17/820,935, entitled "FACILITATING GENERATION OF PLAYER TOKEN NFTS AND METHODS FOR USE THEREWITH", filed Aug. 19, 2022, which is a continuation-in-part of U.S. Utility application Ser. No. 17/819,016, entitled "GAME PLATFORM USING PLAYER TOKEN NFTS AND METHODS FOR USE THEREWITH", filed Aug. 11, 2022, which claims priority pursuant to 35 U.S.C. § 119(e) to U.S. Provisional Application No. 63/364,568, entitled "NFT GAME PLATFORM WITH MULTIPLAYER SUPPORT AND METHODS FOR USE THEREWITH", filed May 12, 2022; U.S. Provisional Application No. 63/364,571, entitled "NFT GAME PLATFORM USING GAME TOKEN NFTS AND METHODS FOR USE THEREWITH", filed May 12, 2022; U.S. Provisional Application No. 63/364,573, entitled "NFT GAME PLATFORM USING PLAYER TOKEN NFTS AND METHODS FOR USE THEREWITH", filed May 12, 2022; and U.S. Provisional Application No. 63/364,578, entitled "NFT GAME PLATFORM USING PLAYER TOKEN NFTS OR GAME TOKEN NFTS AND METHODS FOR USE THEREWITH", filed May 12, 2022, all of which are hereby incorporated herein by reference in their entirety and made part of the present U.S. Utility patent application for all purposes.

U.S. Utility application Ser. No. 18/452,839 also claims priority pursuant to 35 U.S.C. § 119(e) to U.S. Provisional Application No. 63/375,298, entitled "GENERATING AND UPDATING PLAYER TOKEN NFTS AND METHODS FOR USE THEREWITH", filed Sep. 12, 2022, which is hereby incorporated herein by reference in its entirety and made part of the present U.S. Utility patent application for all purposes.

U.S. Utility patent application Ser. No. 17/819,016 also claims priority pursuant to 35 U.S.C. § 120 as a continuation-in-part of U.S. Utility application Ser. No. 17/806,766, entitled "SYSTEM FOR VALIDATING TICKET TRANSACTIONS VIA TICKET NFTS AND METHODS FOR USE THEREWITH", filed Jun. 14, 2022, which is a continuation-in-part of U.S. Utility application Ser. No. 17/661,362, entitled "SYSTEM FOR VALIDATING PLAY OF GAME APPLICATIONS VIA GAME NFTS AND METHODS FOR USE THEREWITH", filed Apr. 29, 2022, which claims priority pursuant to 35 U.S.C. § 119(e) to U.S. Provisional Application No. 63/362,581, entitled "SYSTEM FOR VALIDATING PLAY OF GAME APPLICATIONS VIA GAME NFTS AND METHODS FOR USE THEREWITH", filed Apr. 6, 2022, all of which are hereby incorporated herein by reference in their entirety and made part of the present U.S. Utility patent application for all purposes.

U.S. Utility application Ser. No. 17/661,362 also claims priority pursuant to 35 U.S.C. § 120 as a continuation-in-part of U.S. Utility application Ser. No. 17/656,084, entitled "FACILITATING PLAY OF GAME NFTS VIA A CLIENT DEVICE", filed Mar. 23, 2022, issued as U.S. Pat. No. 11,786,820 on Oct. 17, 2023, which claims priority pursuant to 35 U.S.C. § 119(e) to U.S. Provisional Application No. 63/262,536, entitled "NFT COLLECTION PLATFORM AND METHODS FOR USE THEREWITH", filed Oct. 14, 2021; U.S. Provisional Application No. 63/262,762, entitled "NFT COLLECTION PLATFORM FOR PROCESSING NFTS AND DATA AND METHODS FOR USE THEREWITH", filed Oct. 20, 2021; U.S. Provisional Application No. 63/262,858, entitled "NFT COLLECTION PLATFORM FOR PROCESSING NFTS AND DATA AND METHODS FOR USE THEREWITH", filed Oct. 21, 2021; U.S. Provisional Application No. 63/263,844, entitled "NFT COLLECTION PLATFORM FOR RENDERING NFTS IN AN ENVIRONMENT AND METHODS FOR USE THEREWITH", filed Nov. 10, 2021; U.S. Provisional Application No. 63/264,811, entitled "CLIENT DEVICE FOR NFTS AND METHODS FOR USE THEREWITH", filed Dec. 2, 2021; U.S. Provisional Application No. 63/265,754, entitled "REAL ESTATE NFTS AND METHODS FOR USE THEREWITH", filed Dec. 20, 2021; U.S. Provisional Application No. 63/266,478, entitled "AUTHENTICATED LICENSE NFTS AND METHODS FOR USE THEREWITH", filed Jan. 6, 2022; U.S. Provisional Application No. 63/297,394, entitled "GENERATION OF ENHANCEMENT NFTS AND METHODS FOR USE THEREWITH", filed Jan. 7, 2022; U.S. Provisional Application No. 63/302,757, entitled "GENERATION OF NFT GALLERIES AND METHODS FOR USE THEREWITH", filed Jan. 25, 2022; U.S. Provisional Application No. 63/302,768, entitled "ENHANCEMENT OF REAL ESTATE NFTS VIA NFT GALLERIES", filed Jan. 25, 2022; U.S. Provisional Application No. 63/305,559, entitled "AUTHENTICATING NFT TRANSACTIONS VIA CONDITIONAL NFTS", filed Feb. 1, 2022; U.S. Provisional Application No. 63/305,505, entitled "GENERATING A SECURE REAL-TIME NFT REPOSITORY FOR AUTHENTICATING NFT TRANSACTIONS", filed Feb. 1, 2022; U.S. Provisional Application No. 63/306,405, entitled "GENERATING NFTS WITH FRACTIONAL RIGHTS IN ASSETS", filed Feb. 3, 2022; U.S. Provisional Application No. 63/306,412, entitled "GENERATING NFTS WITH FRACTIONAL RIGHTS IN A COLLECTABLE", filed Feb. 3, 2022; U.S. Provisional Application No. 63/307,349, entitled "STREAMING OF VIDEO NFTS TO A CLIENT DEVICE", filed Feb. 7, 2022; U.S. Provisional Application No. 63/308,546, entitled "NODE NFTS WITH TRANSACTION UPDATES", filed Feb. 10, 2022; U.S. Provisional Application No. 63/309,382, entitled "GENERATING PLAYABLE GAME NFTS", filed Feb. 11, 2022; and U.S. Provisional Application No. 63/310,376, entitled "GENERATING UPDATED TEAM NFTS BASED ON TEAM DATA", filed Feb. 15, 2022, all of which are hereby incorporated herein by reference in their entirety and made part of the present U.S. Utility patent application for all purposes.

U.S. Utility application Ser. No. 17/806,766 claims priority pursuant to 35 U.S.C. § 119(e) to U.S. Provisional Application No. 63/365,010, entitled "SYSTEM FOR VALIDATING TICKET TRANSACTIONS VIA TICKET NFTS AND METHODS FOR USE THEREWITH", filed May 19, 2022; and U.S. Provisional Application No. 63/365,012, entitled "METHOD AND SYSTEM FOR AUTHENTICATING TICKET NFT TRANSACTIONS IN REAL-TIME", filed May 19, 2022, all of which are hereby incorporated herein by reference in their entirety and made part of the present U.S. Utility patent application for all purposes.

U.S. Utility application Ser. No. 17/820,935 also claims priority pursuant to 35 U.S.C. § 119(e) to U.S. Provisional Application No. 63/370,464, entitled "FACILITATING GENERATION OF PLAYER TOKEN NFTS AND METHODS FOR USE THEREWITH", filed Aug. 4, 2022, which is hereby incorporated herein by reference in its entirety and made part of the present U.S. Utility patent application for all purposes.

TECHNICAL FIELD

The present disclosure relates to processing systems and applications including used in the collection, generation, display and use of non-fungible tokens (NFTs) or other digital tokens that are used in games and gaming applications and generated utilizing a distributed computer network.

BRIEF DESCRIPTION OF THE SEVERAL VIEWS OF THE DRAWINGS

FIG. 3A presents a flowchart representation of an example method.

FIG. 3I presents a flowchart representation of an example method.

FIG. 4A presents a flowchart representation of an example method.

FIG. 5A presents a flowchart representation of an example method.

FIG. 7 presents a block diagram representation of an example system.

FIG. 9A presents a block diagram/flow representation of an example of NFT generation.

FIG. 9B presents a pictorial representation of an example NFT.

FIG. 9C presents a pictorial representation of an example improvement.

FIG. 9D presents a pictorial representation of an example NFT.

FIG. 10A presents a block diagram/flow representation of an example of NFT generation.

FIG. 10B presents a flowchart representation of an example method.

FIG. 11A presents a block diagram/flow representation of an example of NFT generation.

FIG. 11B presents a pictorial representation of an example NFT.

FIG. 11C presents a pictorial representation of example enhancements.

FIG. 11D presents a pictorial representation of an example NFT.

FIG. 11E presents a flowchart representation of an example method.

FIG. 12A presents a block diagram of an example system.

FIG. 12B presents a flowchart representation of an example method.

FIG. 12D presents a flowchart representation of an example method.

FIG. 13F presents a block diagram/flow representation of an example of NFT generation.

FIG. 13G presents a pictorial representation of an example NFT.

FIG. 13H presents a pictorial/flow representation of an example update to an NFT.

FIG. 13I presents a flowchart representation of an example method.

FIG. 13N presents a flowchart representation of an example method.

FIG. 13O presents a flowchart representation of an example method.

FIG. 14G presents a flowchart representation of an example method.

FIG. 14H presents a flowchart representation of an example method.

FIG. 14K presents a flowchart representation of an example method.

FIG. 14L presents a flowchart representation of an example method.

FIG. 14M presents a flowchart representation of an example method.

FIG. 14N presents a flowchart representation of an example method.

FIG. 15K presents a block/flow diagram representation of an example system.

FIG. 15L presents a flowchart representation of an example method.

FIG. 15M presents a block/flow diagram representation of an example system.

FIG. 15N presents a flowchart representation of an example method.

FIG. 15O presents a flowchart representation of an example method.

FIG. 15P presents a flowchart representation of an example method.

FIG. 15Q presents a flowchart representation of an example method.

FIG. 16B presents a flowchart representation of an example method.

FIG. 16F presents a block/flow diagram representation of an example system.

FIG. 16G presents a pictorial/flow diagram representation of an example process.

FIG. 16H presents a flowchart representation of an example method.

FIGS. 16I-16J present a block/flow diagram representations of example systems.

FIG. 16K presents a flowchart representation of an example method.

FIG. 16M presents a flowchart representation of an example method.

FIG. 17C presents a flowchart representation of an example method.

FIG. 17D presents a block/flow diagram representation of an example system.

FIG. 17E presents a pictorial/flow diagram representation of an example process.

FIG. 17F presents a flowchart representation of an example method.

FIG. 17G presents a block/flow diagram representation of an example system.

FIG. 17H presents a pictorial/flow diagram representation of an example process.

FIG. 17I presents a flowchart representation of an example method.

FIG. 17L presents a flowchart representation of an example method.

FIG. 17N presents a flowchart representation of an example method.

FIG. 18A presents a block/flow diagram representation of an example system.

FIG. 18B presents a flowchart representation of an example method.

FIG. 18H presents a block/flow diagram representation of an example system.

FIG. 18I presents a flowchart representation of an example method.

FIG. 19H presents a flowchart representation of an example method.

Figure 19J:
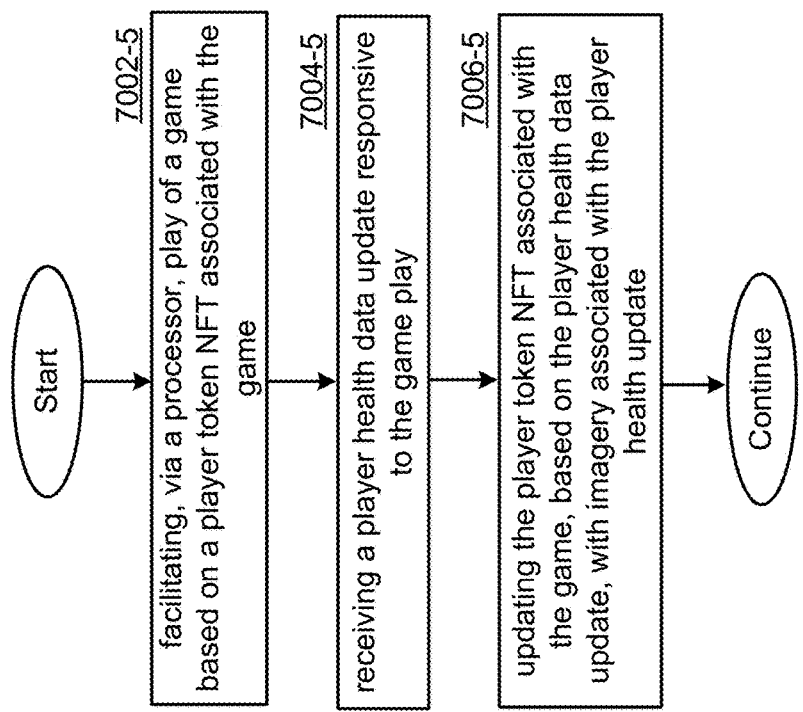
FIG. 19A presents a block/flow diagram representation of an example system.
FIG. 19B presents a flowchart representation of an example method.
FIG. 19C presents a block/flow diagram representation of an example system.
FIG. 19D presents a flowchart representation of an example method.
FIG. 19E presents a block/flow diagram representation of an example system.
FIG. 19F presents a flowchart representation of an example method.
FIG. 19G presents a block/flow diagram representation of an example system.
Figure 19I:
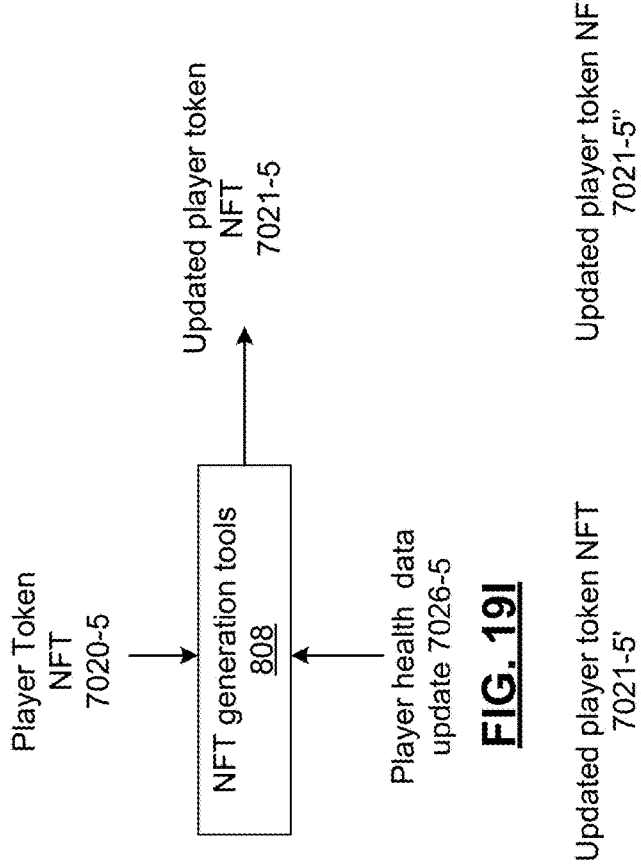

FIG. 19I presents a block/flow diagram representation of an example system.

FIG. 19J presents a flowchart representation of an example method.

Figure 19L:
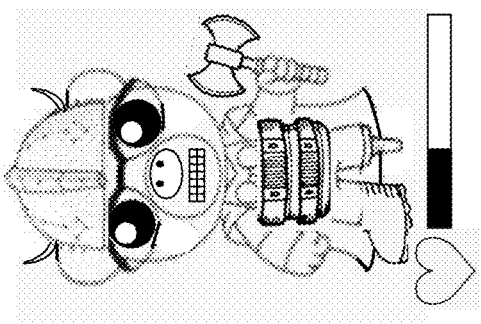
Figure 19K:
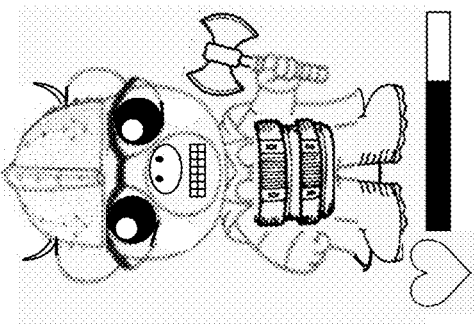

FIG. 19K presents a pictorial representation of an example NFT.

FIG. 19L presents a pictorial representation of an example NFT.

Figure 19M:
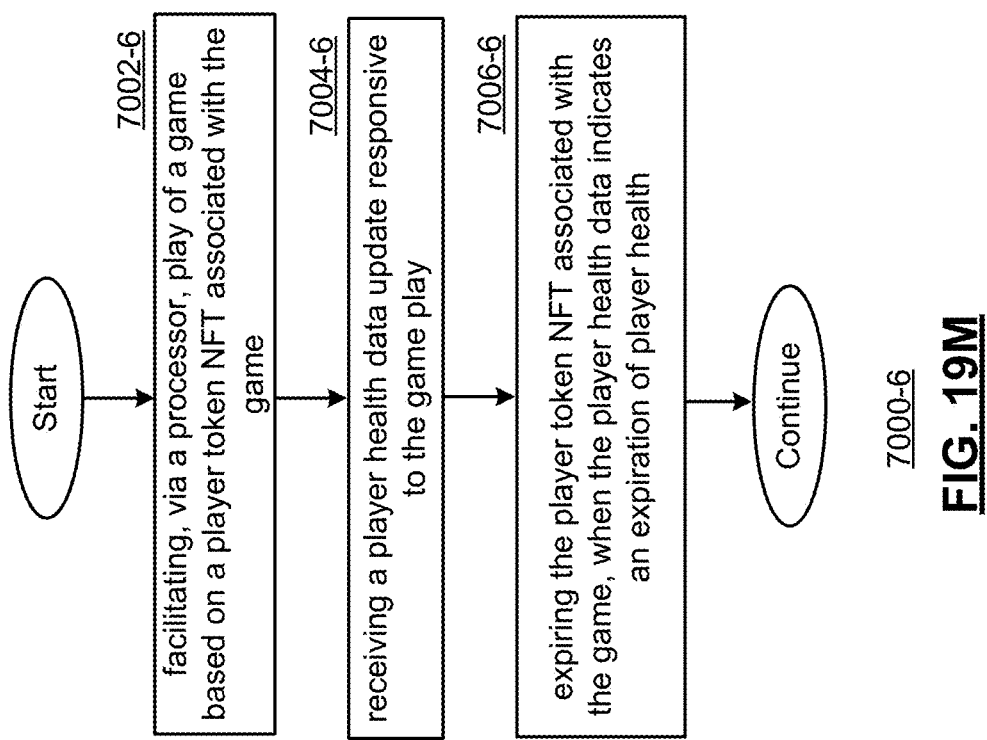

FIG. 19M presents a flowchart representation of an example method.

Figure 20A:
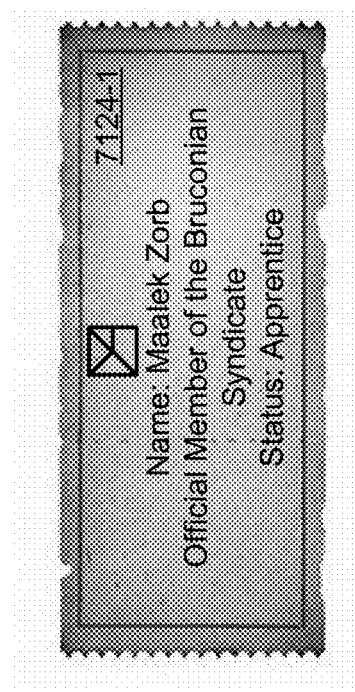

FIG. 20A presents a block/flow diagram representation of an example system.

Figure 20B:
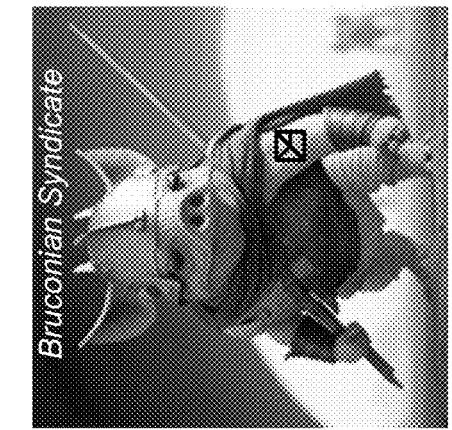

FIG. 20B presents a pictorial representation of an example NFT.

Figure 20C:
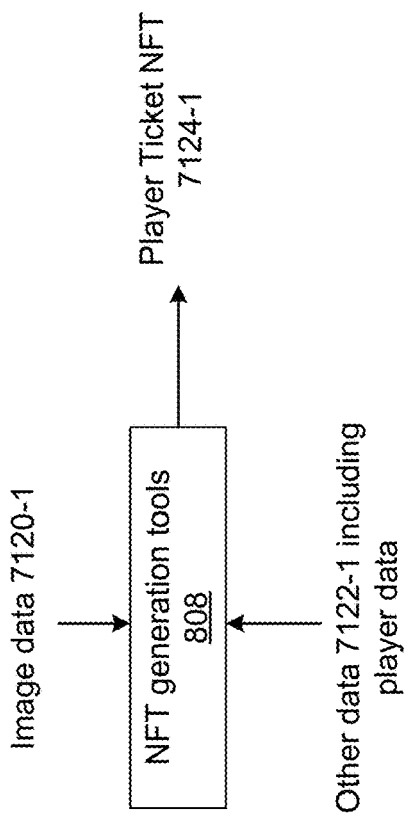

FIG. 20C presents a block/flow diagram representation of an example system.

Figure 20D:
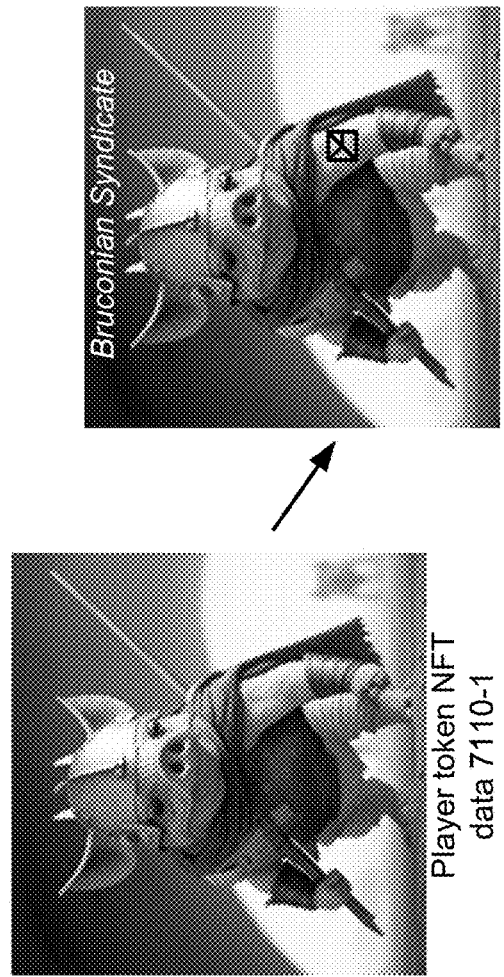

FIG. 20D presents a pictorial representation of updates to an example NFT.

Figure 20F:
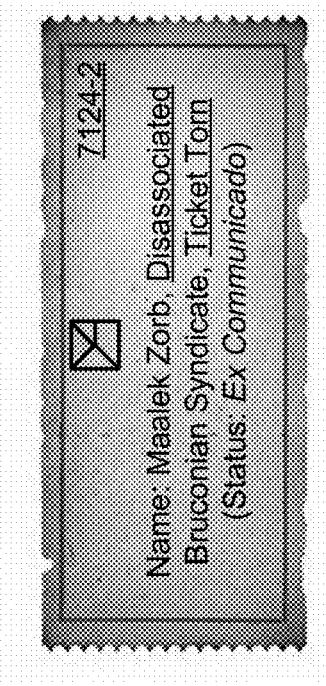
Figure 20H:
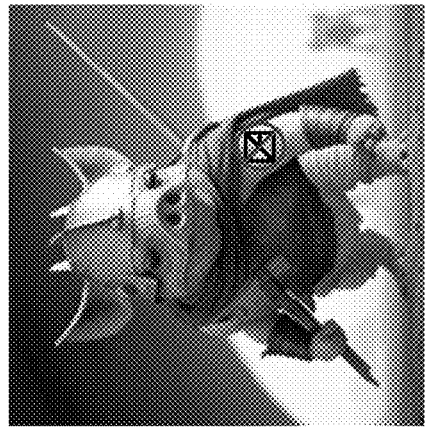
Figure 20E:
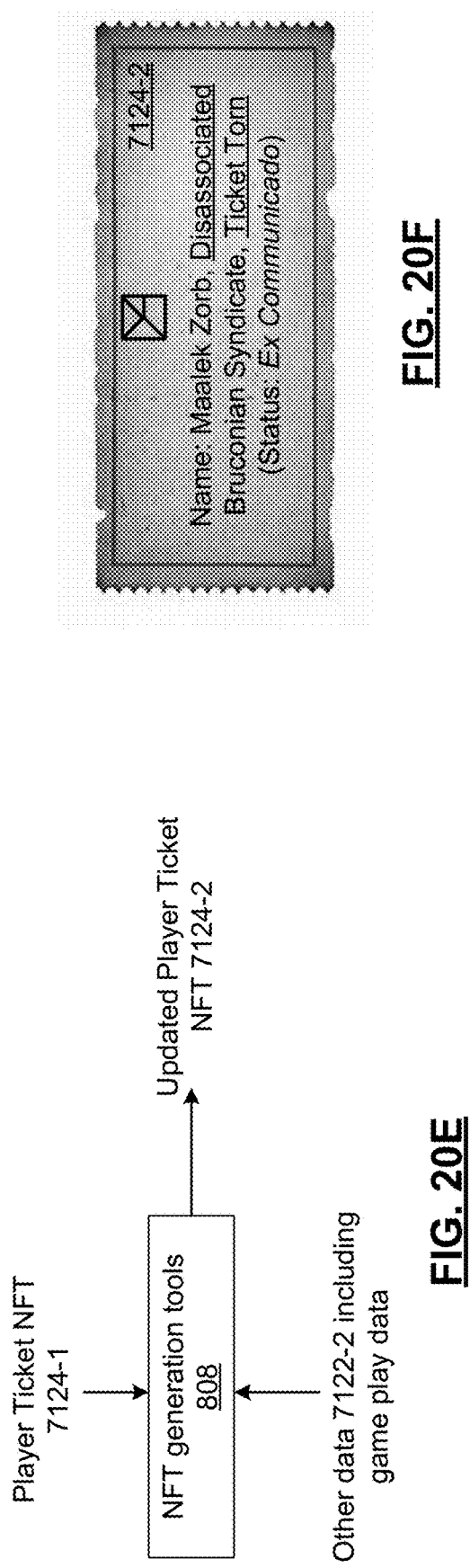

FIG. 20E presents a block/flow diagram representation of an example system.

FIG. 20F presents a pictorial representation of updates to an example NFT.

Figure 20G:
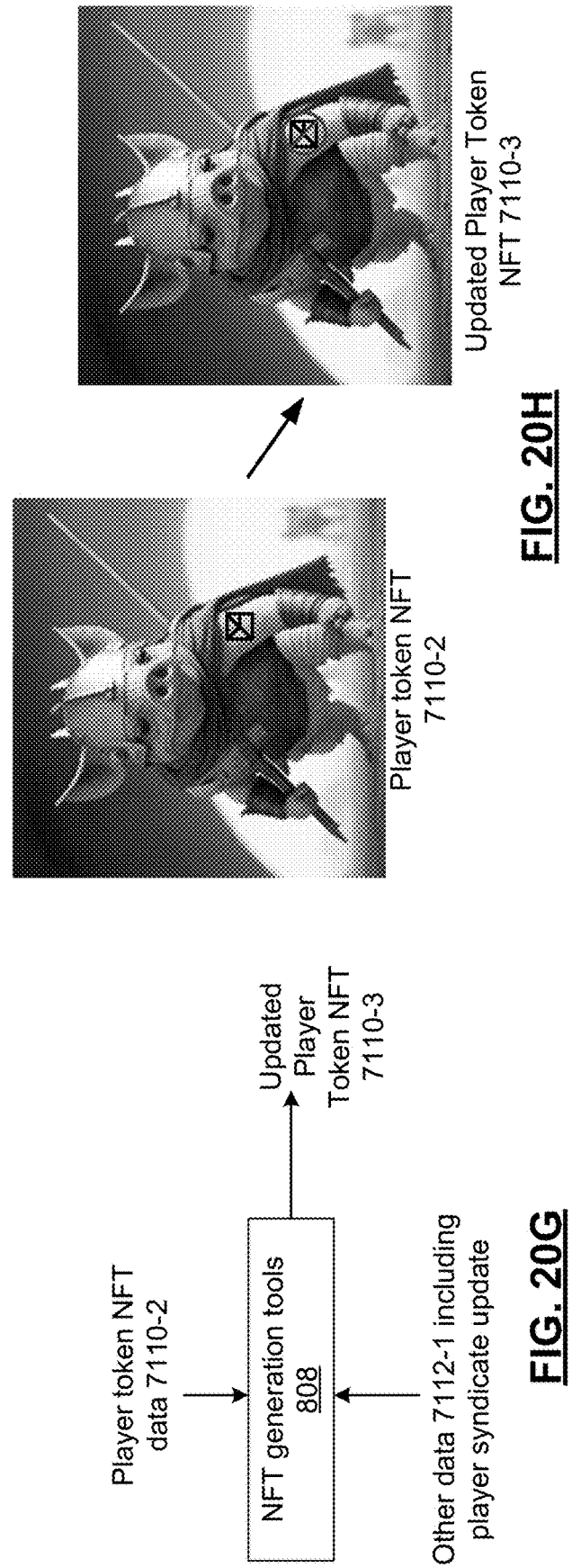

FIG. 20G presents a block/flow diagram representation of an example system.

FIG. 20H presents a pictorial representation of updates to an example NFT.

FIGS. 20I-20N present flowchart representations of example methods.

FIG. 21A presents a block/flow diagram representation of an example system.

FIG. 21B presents a pictorial representation of an example NFT.

FIG. 21C presents a block/flow diagram representation of an example system.

FIG. 21D presents a pictorial representation of updates to an example NFT.

FIG. 21E presents a block/flow diagram representation of an example system.

FIG. 21F presents a pictorial representation of an example NFT.

FIG. 21G presents a pictorial representation of updates to an example NFT.

FIG. 21H presents a pictorial representation of updates to an example NFT.

FIG. 21I presents a pictorial representation of updates to an example NFT.

FIGS. 21J-21O present flowchart representations of example methods.

Figure 22B:
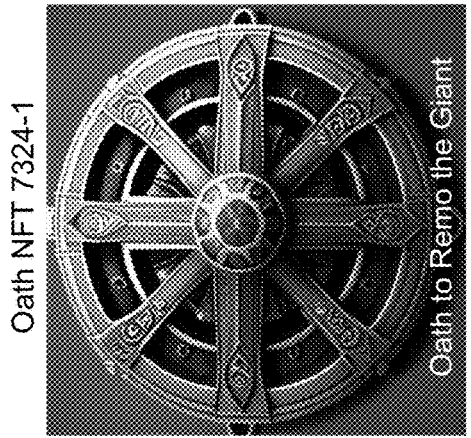
Figure 22D:
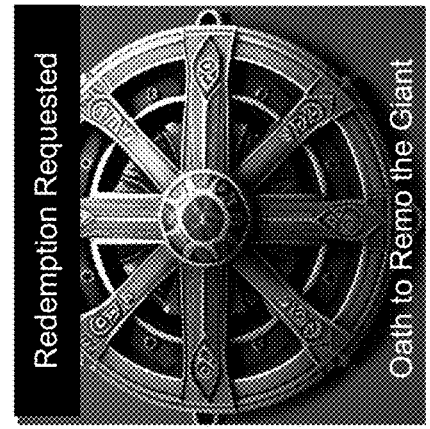
Figure 22A:
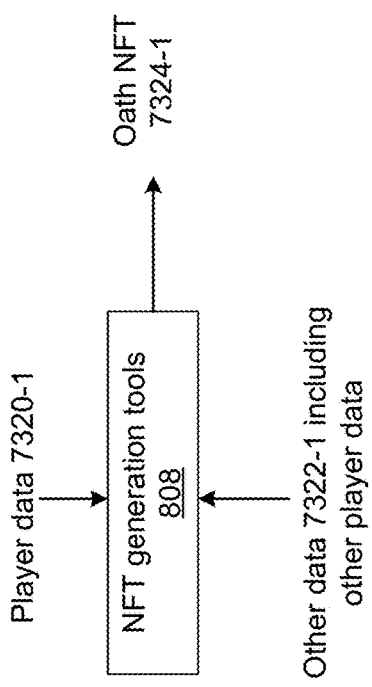

FIG. 22A presents a block/flow diagram representation of an example system.

FIG. 22B presents a pictorial representation of an example NFT.

Figure 22C:
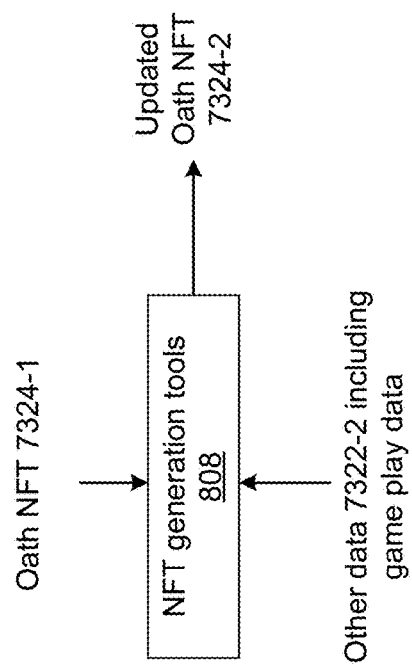

FIG. 22C presents a block/flow diagram representation of an example system.

FIG. 22D presents a pictorial representation of updates to an example NFT.

Figure 22E:

FIG. 22E presents a pictorial representation of updates to an example NFT.

Figure 22F:
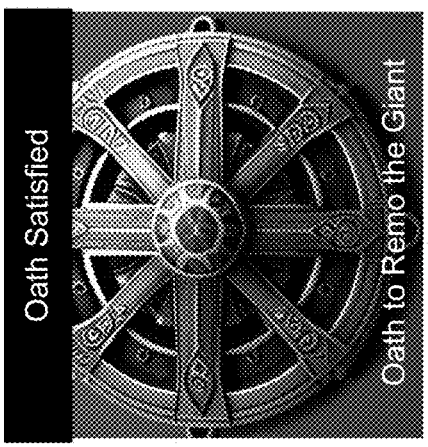

FIG. 22F presents a pictorial representation of updates to an example NFT.

Figure 22G:
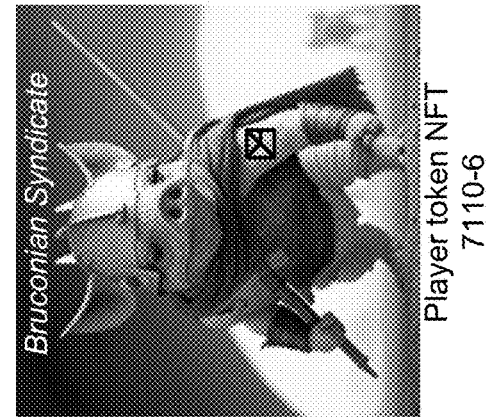

FIG. 22G presents a pictorial representation of updates to an example NFT.

Figure 22H:
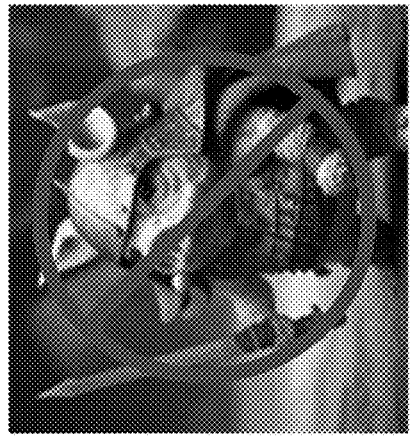

FIG. 22H presents a pictorial representation of an example NFT.

FIGS. 22I-22P present flowchart representations of example methods.

FIG. 23 presents a tabular representation of an example economic details.

Figure 24G:
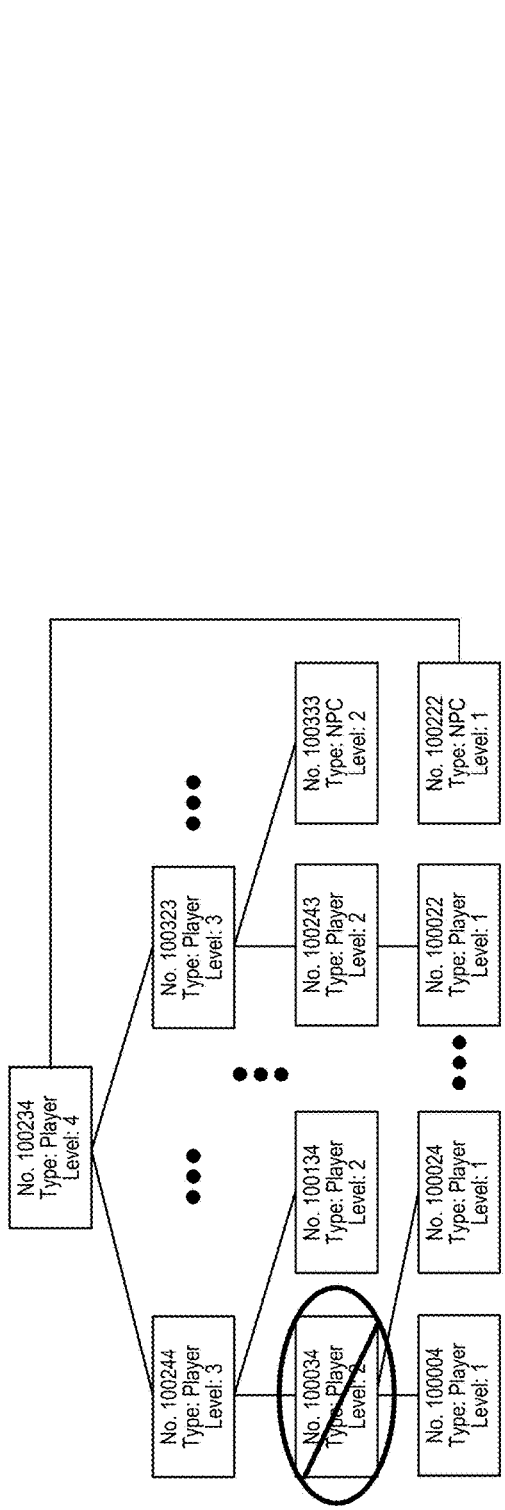

FIG. 24A presents a block/flow diagram representation of an example system.

FIG. 24B presents a graphical representation of an example player hierarchy.

FIG. 24C presents a pictorial representation of updates to an example NFT.

FIG. 24D presents a block/flow diagram representation of an example system.

FIGS. 24E-24O present graphical representations of example player hierarchies.

FIGS. 25A-25F present flowchart representations of example methods.

FIGS. 26A-26F present flowchart representations of example methods.

FIGS. 27A-27F present flowchart representations of example methods.

FIGS. 28A-28E present flowchart representations of example methods.

DETAILED DESCRIPTION

Figure 1A:
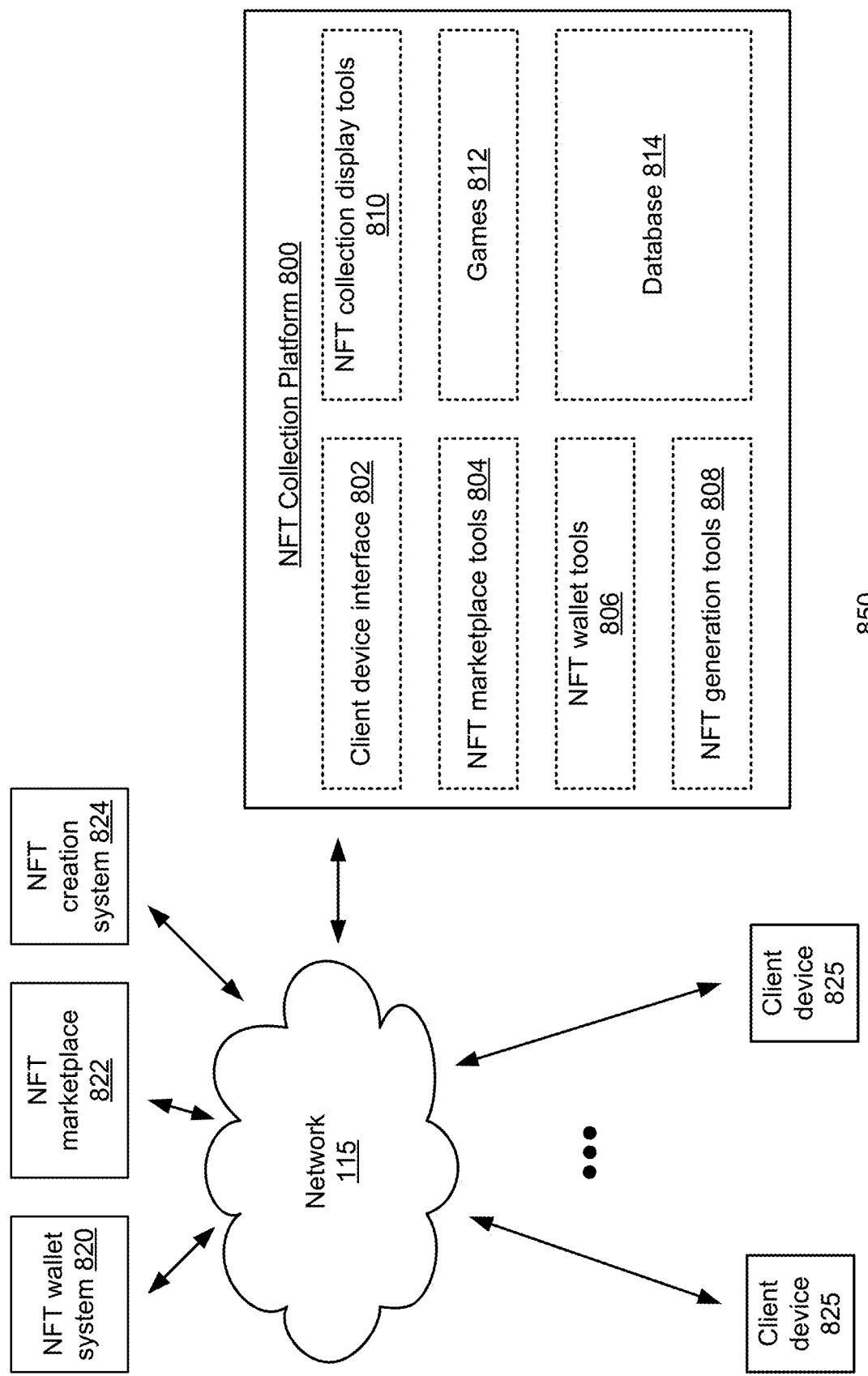
FIG. 1A presents a block diagram representation of an example system.

FIG. 1A presents a block diagram representation of an example system in accordance with various examples. In particular, a system 850 is presented that includes an NFT collection platform 800 that communicates with client devices 825 via a network 115. The network 115 can be the Internet or other wide area or local area network, either public or private. The client devices 825 can be computing devices such as laptops, smartphones, smart watches, tablets, desktops, or other computing devices associated with users, for example, buyers, sellers, collectors and/or users of NFTs.

NFT creation and ownership is growing worldwide. Existing platforms provide tools to create NFTs, marketplaces for buying and selling NFTs and wallets to securely hold them. Many NFT purchasers however, view NFTs similarly to cryptocurrency, purely as financial investments to be collected and later sold. Unlike cryptocurrencies which are fungible tokens, NFTs have a non-fungible (e.g. unique or limited) component that can correspond to photographs, graphics, art, video, games or other media or imagery that can be displayed, used in authentication and/or to provide other support for transactions and/or used in game play and for other utilitarian purposes, etc.

In the example shown, the NFT collection platform 800 includes a client device interface 802 for interacting with the client devices 825, NFT marketplace tools 804, NFT wallet tools 806, NFT generation tools 808, NFT collection display tools 810, one or more games 812 that can be played using NFTs that have been collected including game NFTs that include and/or otherwise associated with, or correspond to, playable game content, and a database 814 for storing user and account information, preferences, display settings and other data associated with users of the NFT collection platform 800. The NFT collection platform 800 can include or be implemented via one or more servers, a cloud computing system, an InterPlanetary File System (IPFS) or other decentralized or distributed computer system of individual computers and/or nodes and/or a centralized computing system.

For example, the client device interface 802 can operate in conjunction with each client device 825 and via network 115 to generate a graphical user interface. This graphical user interface is based on display data generated by the NFT collection platform 800 in a format for display on a display device associated with the client devices 825. This graphical user interface generates input data that is received by the NFT collection platform 800 from the client devices 825 in response to user interaction with the graphical user interface.

In various examples, the NFT collection platform 800 can serve the needs of a collector of NFTs by providing a system that offers new experiences that support various collector and/or use behaviors in the NFT world and metaverse including the collection, display, and use of NFTs and their corresponding content. The NFT collection display tools 810 can include a high-fidelity customizable page builder so each collector can personalize and display their NFTs in an environment. The NFT collection platform 800 can provide and support a collection social media site that, for example, is similar to My Space, Facebook, or OnlyFans, but specifically directed to the arrangement, posting, sharing and/or display of collections of NFTs.

In the most basic mode of operation, the NFT collection platform 800 improves the technology of NFT systems by allowing the user to collect, arrange and display NFTs they have purchased so that the user, and other users, can enjoy and admire the NFTs they have collected. The NFT collection platform 800 not only allows users to curate, display and use their collections, to play games associated with their NFTs and/or also allows users to create a social/professional profile of their NFT property—enabling users to get creative with how their collections are presented, used and displayed. In addition, when a group of NFTs is collected and/or when a personalized/curated collection page, set and/or collection display is built, the NFT collection platform 800 improves the technology of NFT systems by allowing the user to mint a new "collection NFT" using blockchain-based, distributed computer network, and/or other crypto-based NFT creation techniques, for example and authenticated based on the user's ownership of the underlying NFTs.

Furthermore, the NFT collection platform 800 allows users to buy, sell, loan, borrow and trade NFTs with other users, including their own collection NFTs created based on their own collections. In various examples, the NFT collection platform 800 may not include a NFT creator, marketplace or wallet itself. The NFT generation tools 808, NFT wallet tools 806 and NFT marketplace tools 804 can reside on the NFT collection platform 800 and interface with one or more NFT wallet systems 820, NFT marketplaces 822 and/or NFT creation systems 824 to enable transactions/interactions/abilities at a metaverse level, offering collectors new and unique experiences, pre and post purchase, across all different NFT's and blockchains in one place. The NFT collection platform 800 improves the technology of NFT systems by allowing the user to perform the functions above in a fashion, that can be blockchain, wallet, and marketplace agnostic.

It should be noted that the system 850 can operate via blockchain-based technologies. In blockchain, a growing list of records, called "blocks", are linked together using cryptography and spread over a decentralized computer system/network or other distributed network of participants. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. The distributed nature of this process over different nodes, the contemporaneous nature of geographically distinct calculations, coupled with the extreme computational complexity of the required calculations means that these blockchain-based technologies cannot practically be performed by the human mind.

It should be noted, that while the NFT wallet system 820, NFT marketplace 822 and NFT creation system 824 are shown as separate entities and as being external to the NFT collection platform 800, other configurations are possible where two or more of these entities share a common platform and/or the functions and features of one or more of these entities can be incorporated within the NFT collection platform 800 itself.

It should also be noted that while client device interface 802, NFT marketplace tools 804, NFT wallet tools 806, NFT generation tools 808, NFT collection display tools 810, games 812 and database 814 are shown as being internal to the NFT collection platform 800, in other examples, any subset of the various elements of the NFT collection platform 800 can be implemented external to the NFT collection platform 800 and coupled to the other components via the network 115. Furthermore, the NFT collection platform 800 can be implemented in a cloud computing configuration with any or all of the various elements of the NFT collection platform 800 implemented within the cloud.

The further operation of this system will be described in greater detail in conjunction with the figures that that follow, including many optional functions and features and examples thereof.

Figure 1B:
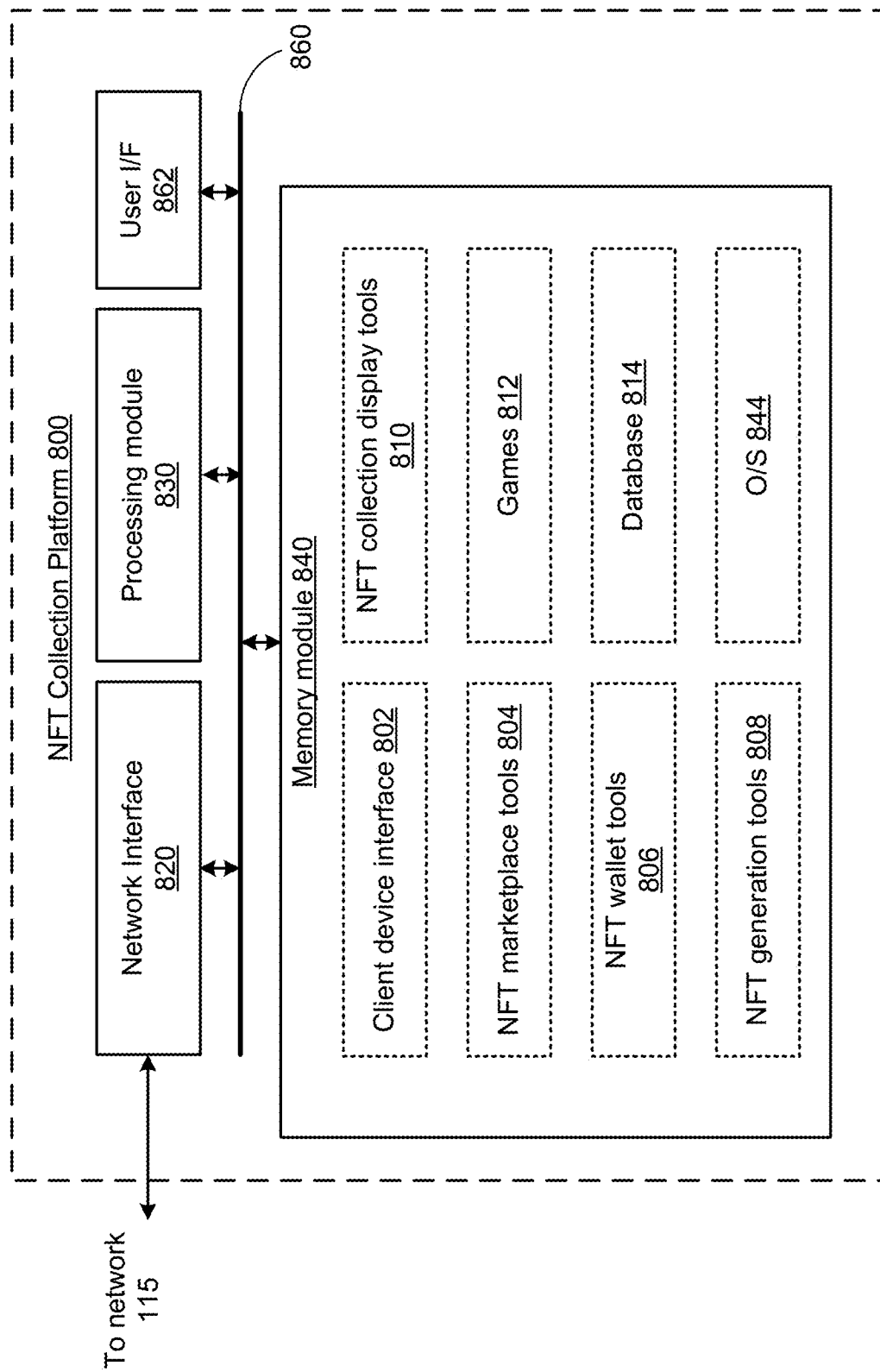
FIG. 1B presents a block diagram representation of an example non-fungible token (NFT) collection platform.

FIG. 1B presents a block diagram representation of an NFT collection platform 800 in accordance with various examples. In particular, the NFT collection platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT collection platform 800 also includes a processing module 830 and memory module 840 that stores an operating system (O/S) 844 such as an Apple, Unix, Linux or Microsoft operating system or other operating system, client device interface 802, NFT marketplace tools 804, NFT wallet tools 806, NFT generation tools 808, NFT collection display tools 810, games 812 and database 814. In particular, the O/S 844, the client device interface 802, NFT marketplace tools 804, NFT wallet tools 806, NFT generation tools 808, NFT collection display tools 810, and games 812 each include operational instructions that, when executed by the processing module 830, cooperate to configure the processing module 830 into a special purpose device to perform the particular functions of the NFT collection platform 800 described herein.

The NFT collection platform 800 may include a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT collection platform 800 and that generate data in response to the administrator's interaction with NFT collection platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the NFT collection platform 800 can include one or more additional elements that are not specifically shown.

Figure 2:
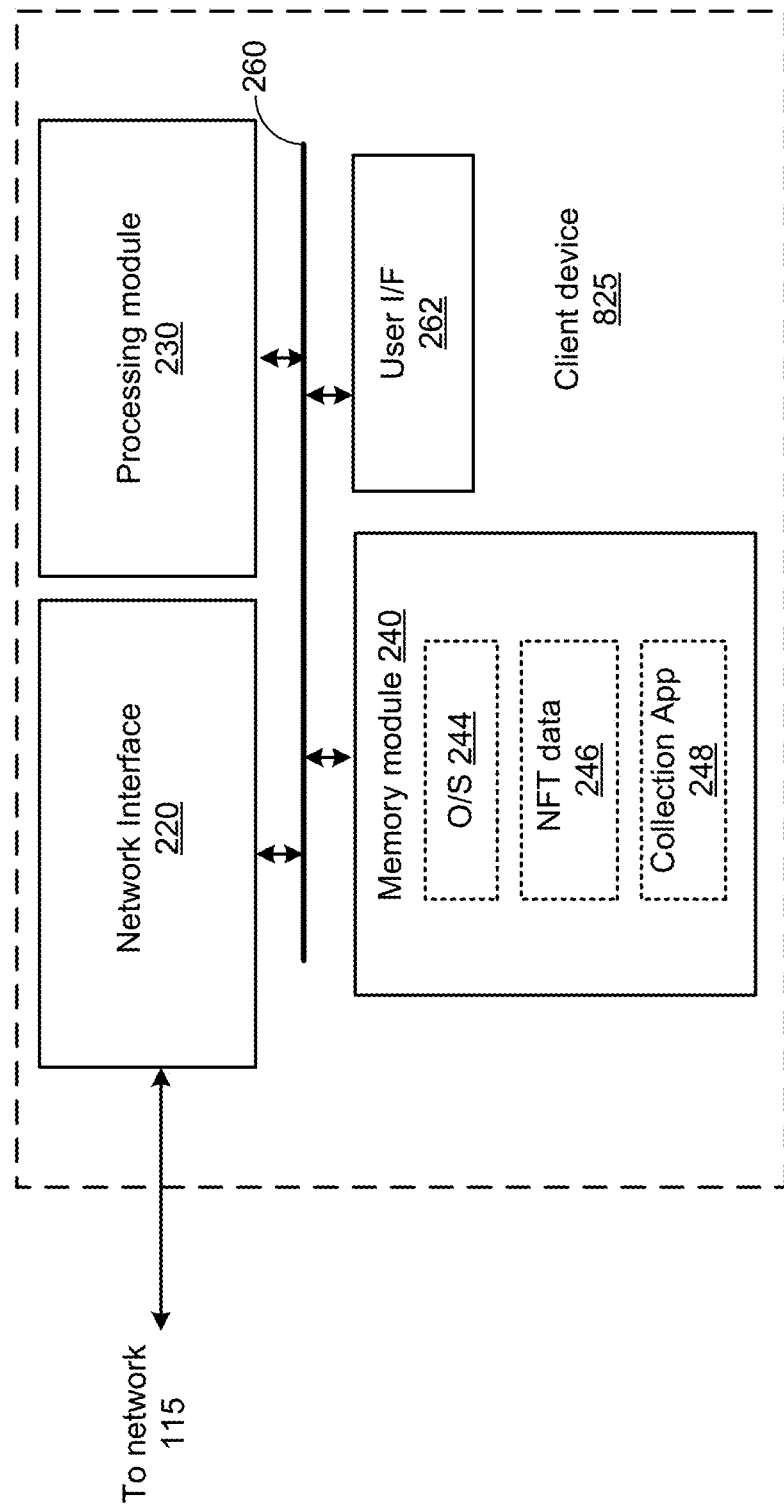
FIG. 2 presents a block diagram representation of an example client device.

FIG. 2 presents a block diagram representation of an example client device in accordance with various examples. In particular, a client device 825 is presented that includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 825 also includes a processing module 230 and memory module 240 that stores an operating system (O/S) 244 such as an Apple, Unix, Linux or Microsoft operating system or other operating system, NFT data 246 associated with one or more NFTs owned by the user, and/or a collection applications 248. In particular, the O/S 244 and collection application 248 each include operational instructions that, when executed by the processing module 230, cooperate to configure the processing module into a special purpose device to perform the particular functions of the client device 825 described herein.

The client device 825 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the client device 825 and that generate data in response to the user's interaction with the client device 825.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the client device 825 can include one or more additional elements that are not specifically shown.

The client device 825 operates, via network interface 220, network 115 and NFT collection platform 800. In various examples, the client device 825 operates to display a graphical user interface generated based on display data from the NFT collection platform 800, including corresponding screen displays. Furthermore, the graphical user interface can operate in response to interactions by a user to generate input data that is sent to the NFT collection platform 800 to control the operation of the NFT collection platform 800 and/or to provide other input.

It should be noted that while the client devices 825 and NFT collection platform 800 are shown as separate devices that communicate via the network 115, it should be noted that any and all of the functionality attributed to the NFT collection platform 800, including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform and communications sent to a NFT collection platform from the client device 825.

FIG. 3A presents a flowchart representation of an example method in accordance with various examples. In particular, a method 300 for use in conjunction with any of the functions and features described herein for generating a collection NFT based on NFTs in a user's collection.

Step 302 includes importing, via a network interface, a plurality of NFTs associated with the user of the client device. Step 304 includes generating, via a processor and in response to user interactions with the graphical user interface, display data associated with a customized collection display that contains the plurality of NFTs. Step 306 includes sending, via the network interface, the display data associated with the customized collection display via the client device of the user. Step 308 includes facilitating creation of a collection NFT corresponding to the customized collection display that contains the plurality of NFTs.

FIGS. 3B-3F and 3H present pictorial representations of example screen displays. In particular, screen displays of a graphical user interface generated based on display data from the NFT collection platform 800 are shown. In the example below, three NFTs are used to design and create a new collection NFT based on a common theme, the 1999 Chicago Bulls team in the National Basketball association.

Figure 3B:
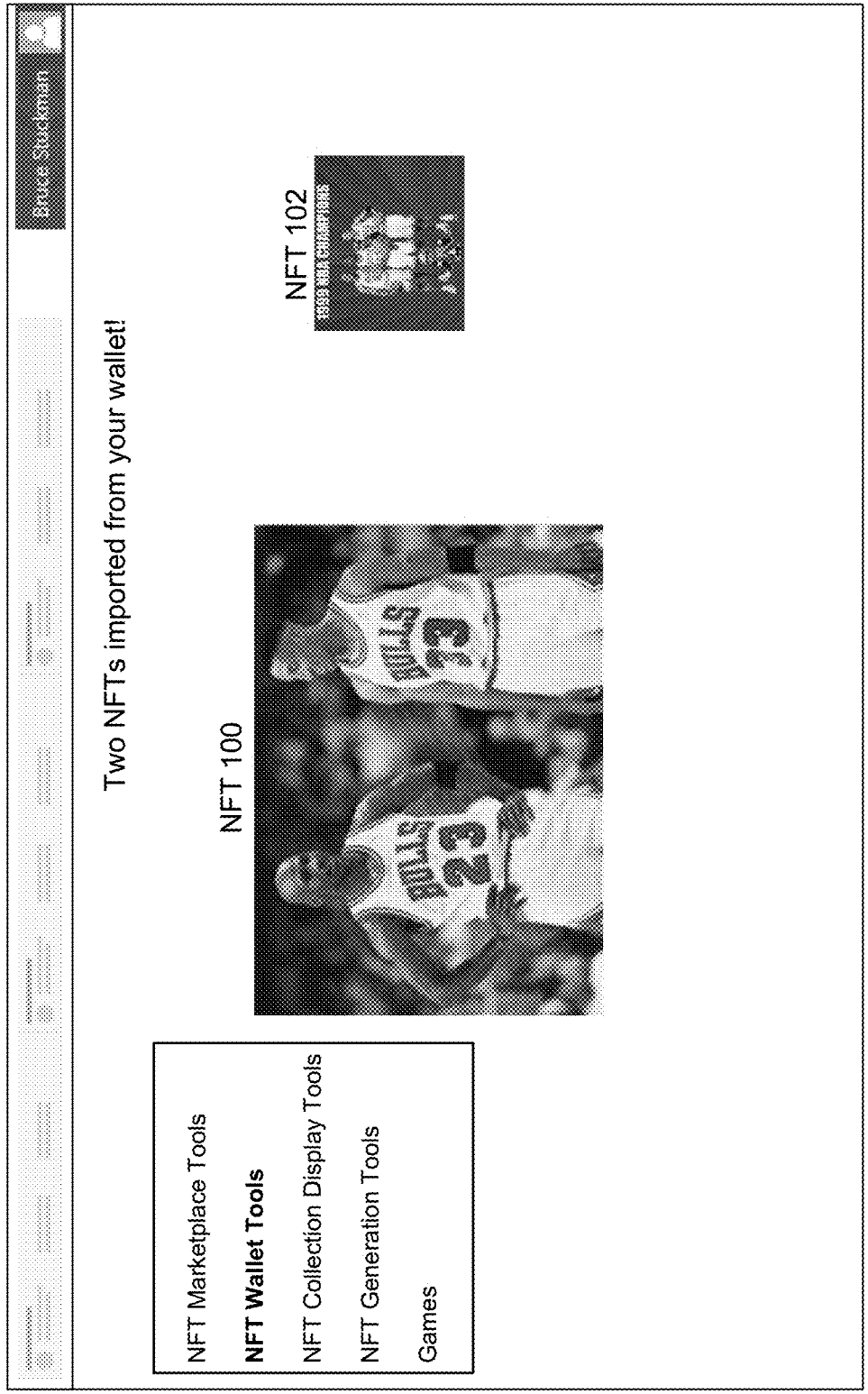
FIGS. 3B-3F and 3H present pictorial representations of example screen displays.

In FIG. 3B, the user "Bruce Stuckman" is logged into the NFT collection platform 800. The user has interacted with NFT wallet tools, such as NFT wallet tools 804, to import NFTs 100 and 102 from his wallet residing in NFT wallet system 820. In this example, the NFTs 100 and 102 are blockchain authenticated original photographs depicting two different images of the 1999 Chicago Bulls.

Figure 3C:
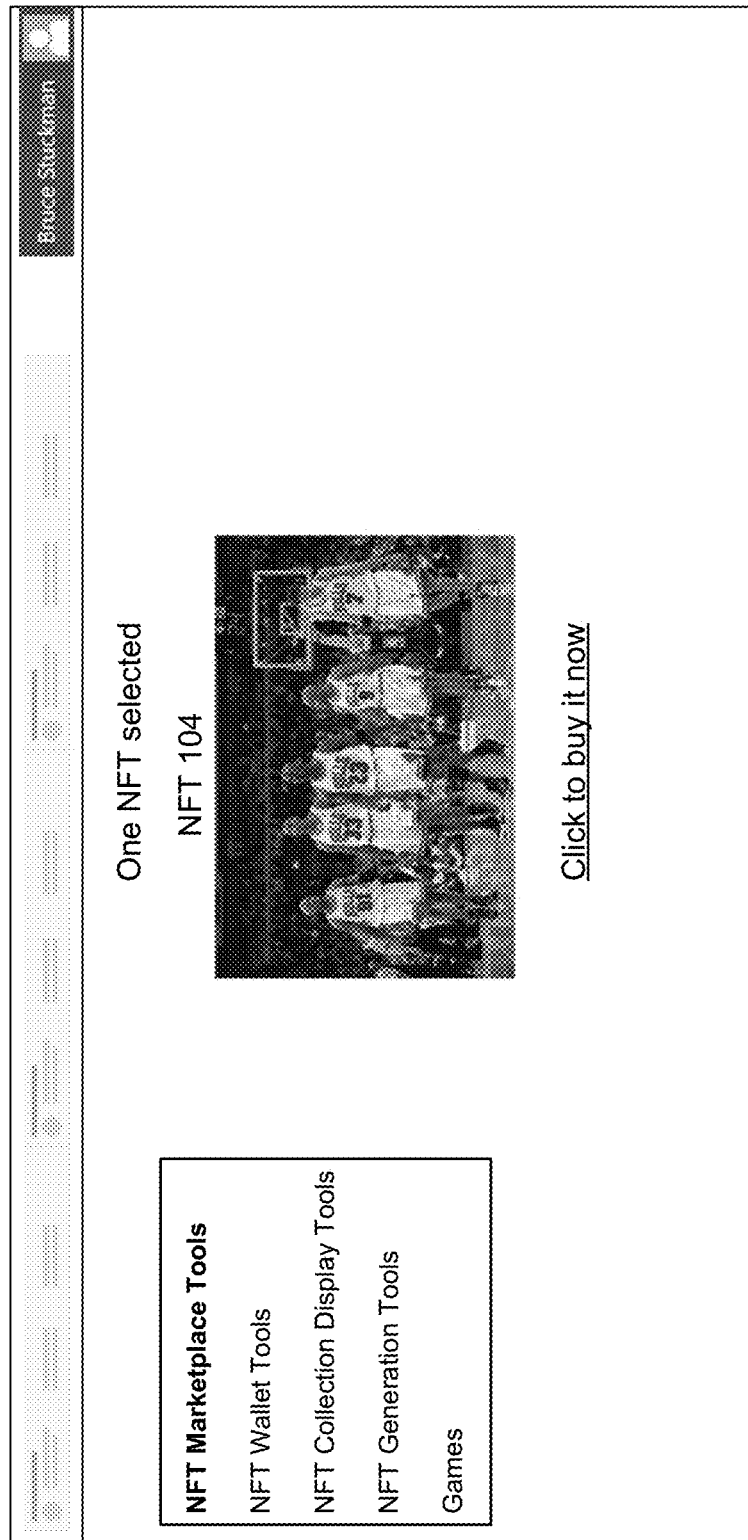
Figure 3D:
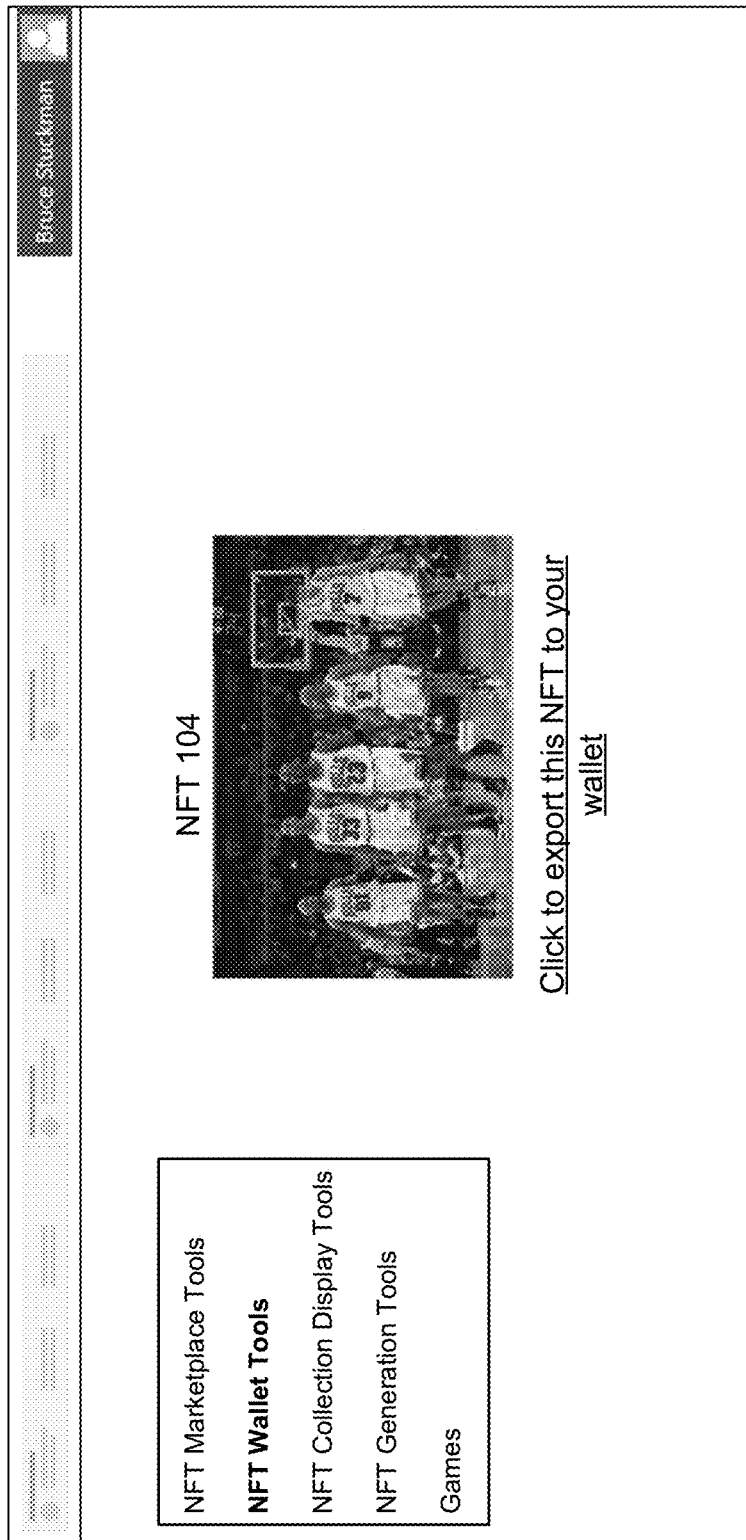
Figure 3E:
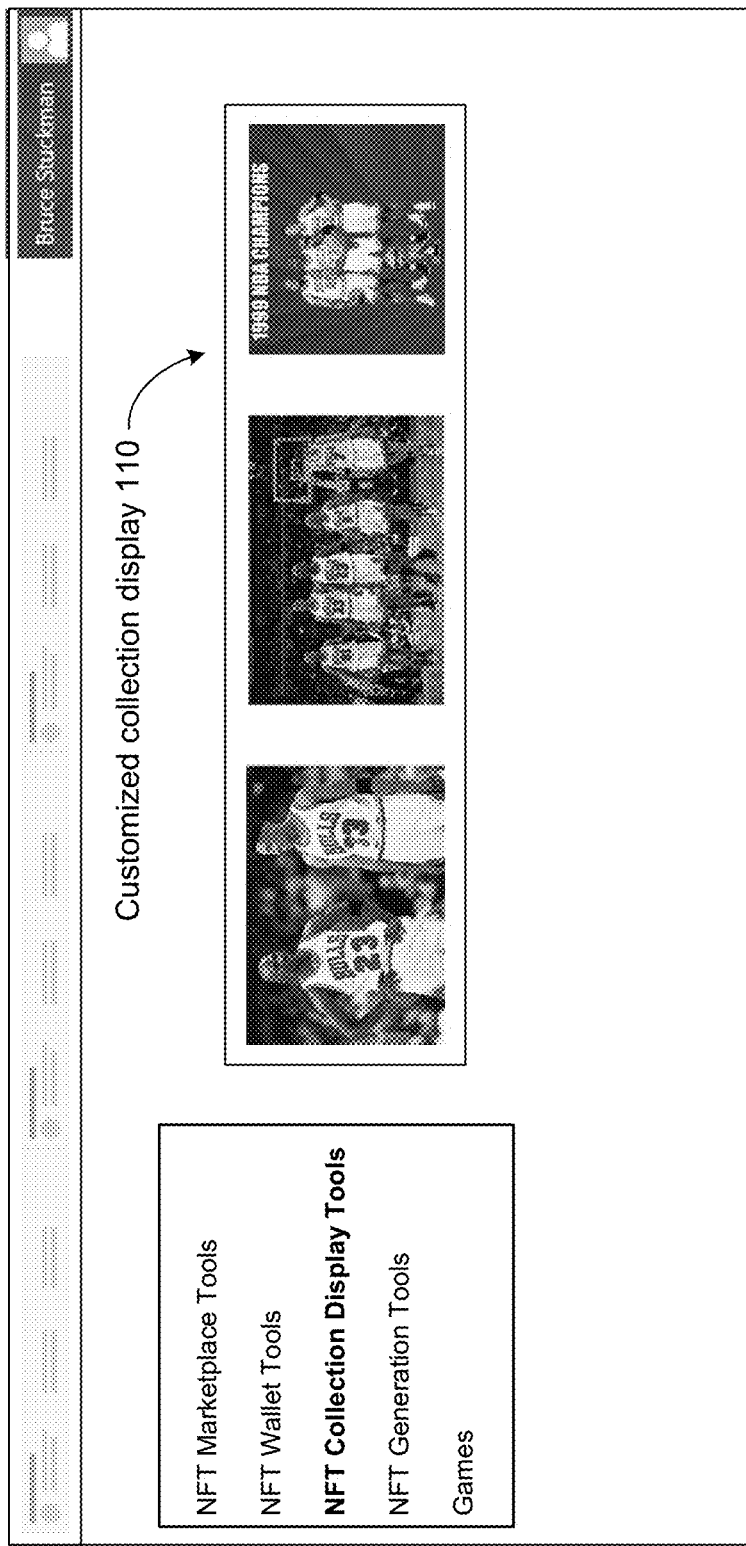

In FIG. 3C, the user has interacted with the NFT marketplace tools, such as NFT marketplace tools 804, to select a new NFT 104 for purchase via an NFT marketplace such as NFT marketplace 822. In FIG. 3D, the wallet tools are used again, this time to export the NFT 104 to the user's wallet. In FIG. 3E, the user has selected and used NFT collection display tools, such as NFT collection display tools 810, to create a customized collection display 110 contain all three 1999 Chicago Bulls-related NFTs he now owns. In the example shown, the user has "dragged and dropped" NFTs he owns in a custom display window and has sized and arranged them into the particular collage that is shown. In other examples, the NFT collection display tools 810 can operate, based on metadata associated with the NFTs of a user indicating content, theme, color themes, subject matter, dates of creation, authorship, ownership, prior ownership, number of prior owners, size, resolution, and other NFT information and metadata, to automatically generate arrangements of custom collection display 110 that may be accepted by the user and/or that may be further arranged by the user to create the final customized collection display 110.

Figure 3F:
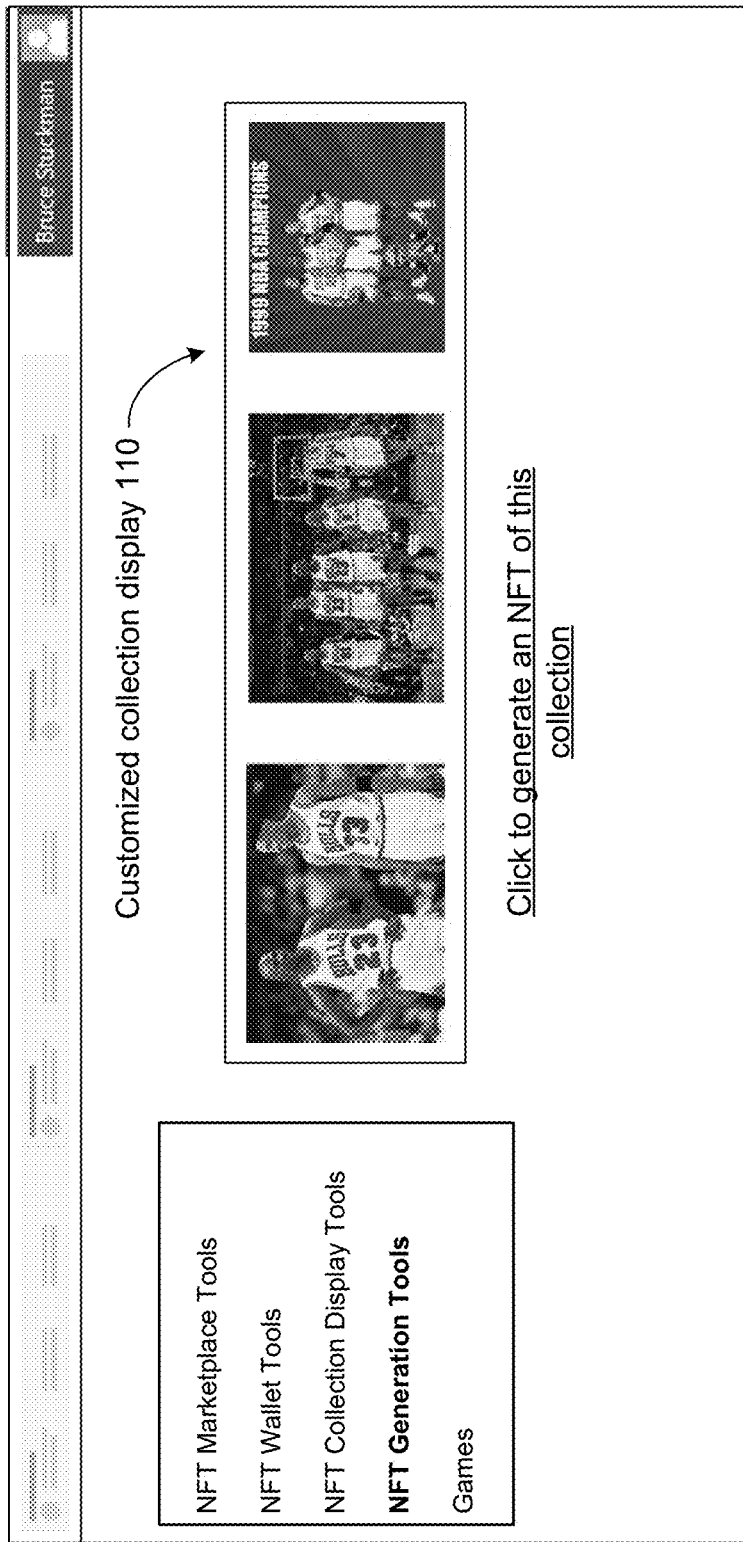

In FIG. 3F, the user has selected NFT generation tools, such as NFT generation tools 808, in order to facilitate, via NFT creation system 824 for example, the creation of a collection NFT from the customized collection display 110.

Figure 3G:
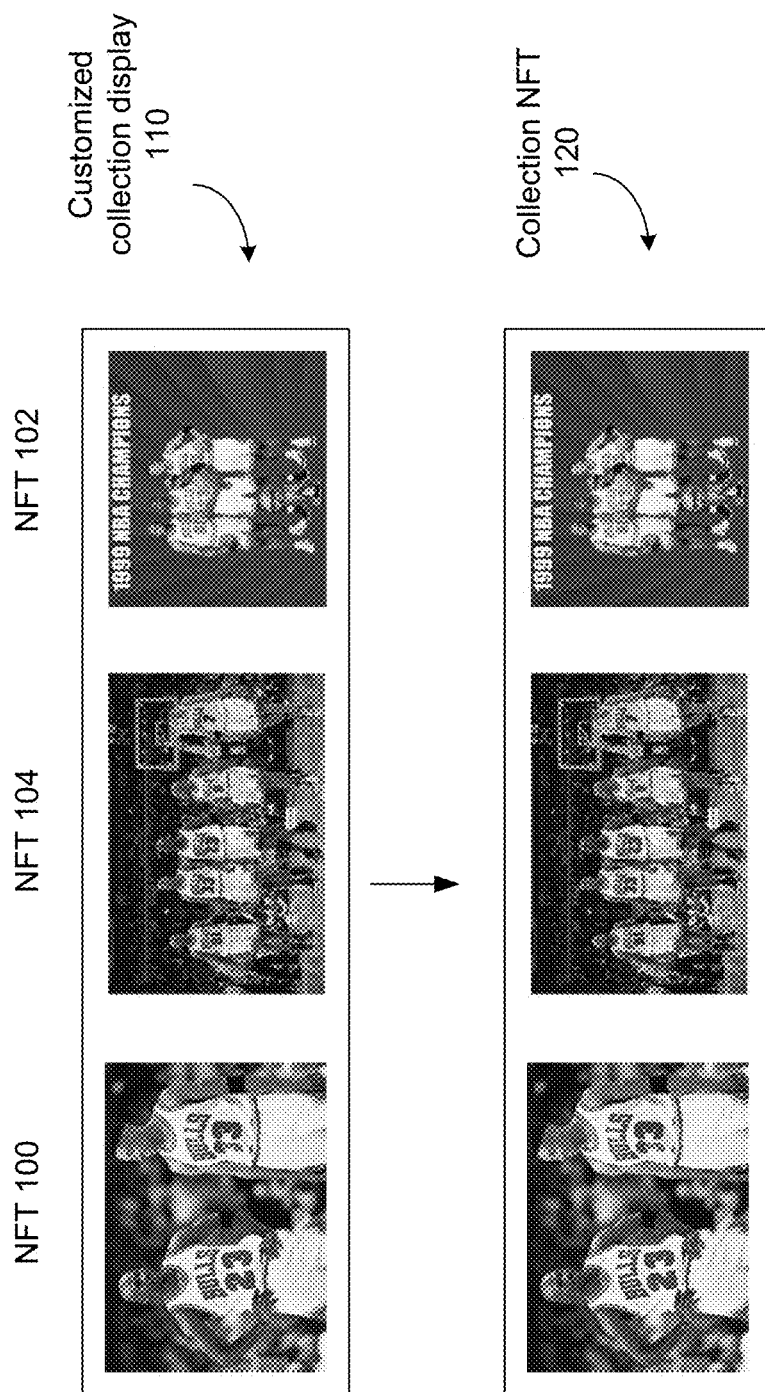
FIG. 3G presents a flow diagram representation of an example process.
Figure 3H:
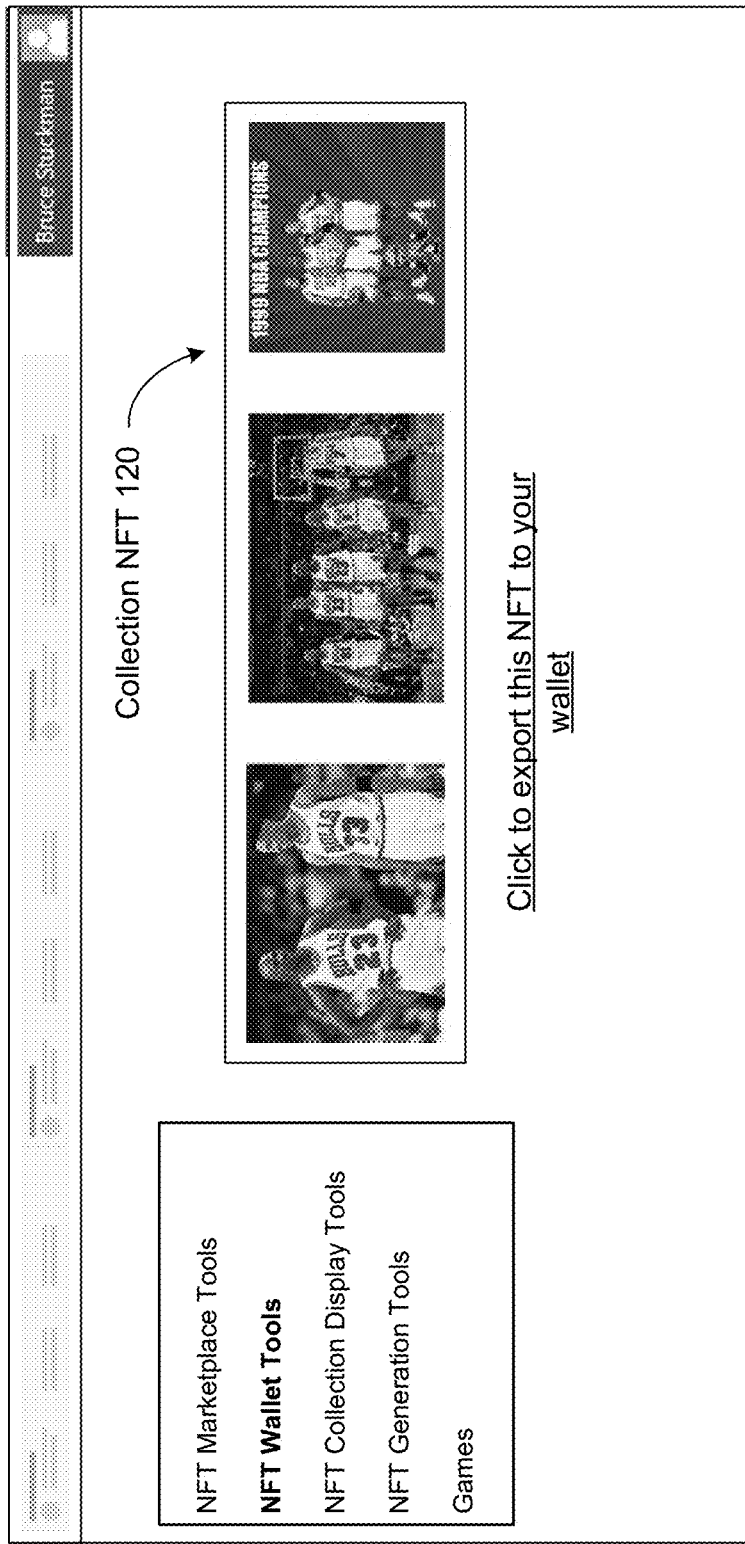

FIG. 3G presents a flow diagram representation of an example process. In the example shown, the collection NFT 120 is created from the customized collection display 110. As previously discussed, the NFT generation tools can operate by, for example, first authenticating the user's rights in the three NFTs and then creating, via NFT creation system 824, a new NFT of the unique customized image with its own blockchain authentication. In various examples, the collection NFT 120 can contain metadata indicating, for example attributions to the sources of the original NFTs in the collection, the creator of the collection NFT, a date of creation, promotion data and coupons related to offers, privileges and/or discounts, title data with respect to title to tangible or intangible real or personal property, warrant data with respect to tangible or intangible real or personal property, transaction data regarding one or more transactions, and/or other metadata. This metadata can be protected via the blockchain and/or other crypto-based NFT creation technology that is employed to create and protect the collection NFT itself—with or without associated image data. In FIG. 3H, the wallet tools are used again, this time to export the collection NFT 120 to the user's wallet.

FIG. 3I presents a flowchart representation of an example method in accordance with various examples. In particular, a method 310 is presented for use in conjunction with any of the functions and features described herein for generating a collection NFT based on NFTs in a user's collection.

Step 312 includes importing, via a network interface, a plurality of NFTs associated with the user of the client device. Step 314 includes generating, via a processor and in response to metadata associated with the plurality of NFTs, display data associated with a customized collection display that contains the plurality of NFTs. Step 316 includes sending, via the network interface, the display data associated with the customized collection display via the client device of the user. Step 318 includes facilitating creation of a collection NFT corresponding to the customized collection display that contains the plurality of NFTs.

FIG. 4A presents a flowchart representation of an example method. In particular, a method 400 for use in conjunction with any of the functions and features described herein in generating a collection NFT based on at least one NFT accessed via a temporary micro-loan.

Step 402 includes facilitating, via a processor and in response to user interactions with the graphical user interface, a temporary micro-loan of at least one NFT. Step 404 includes generating, via the processor and in response to user interactions with the graphical user interface, display data associated with a customized collection display that contains a plurality of NFTs including the at least one NFT. Step 406 includes sending, via the network interface, the display data associated with the customized collection display via the client device of the user. Step 408 includes facilitating creation of a collection NFT corresponding to the customized collection display that contains the plurality of NFTs including the at least one NFT.

Figure 4B:
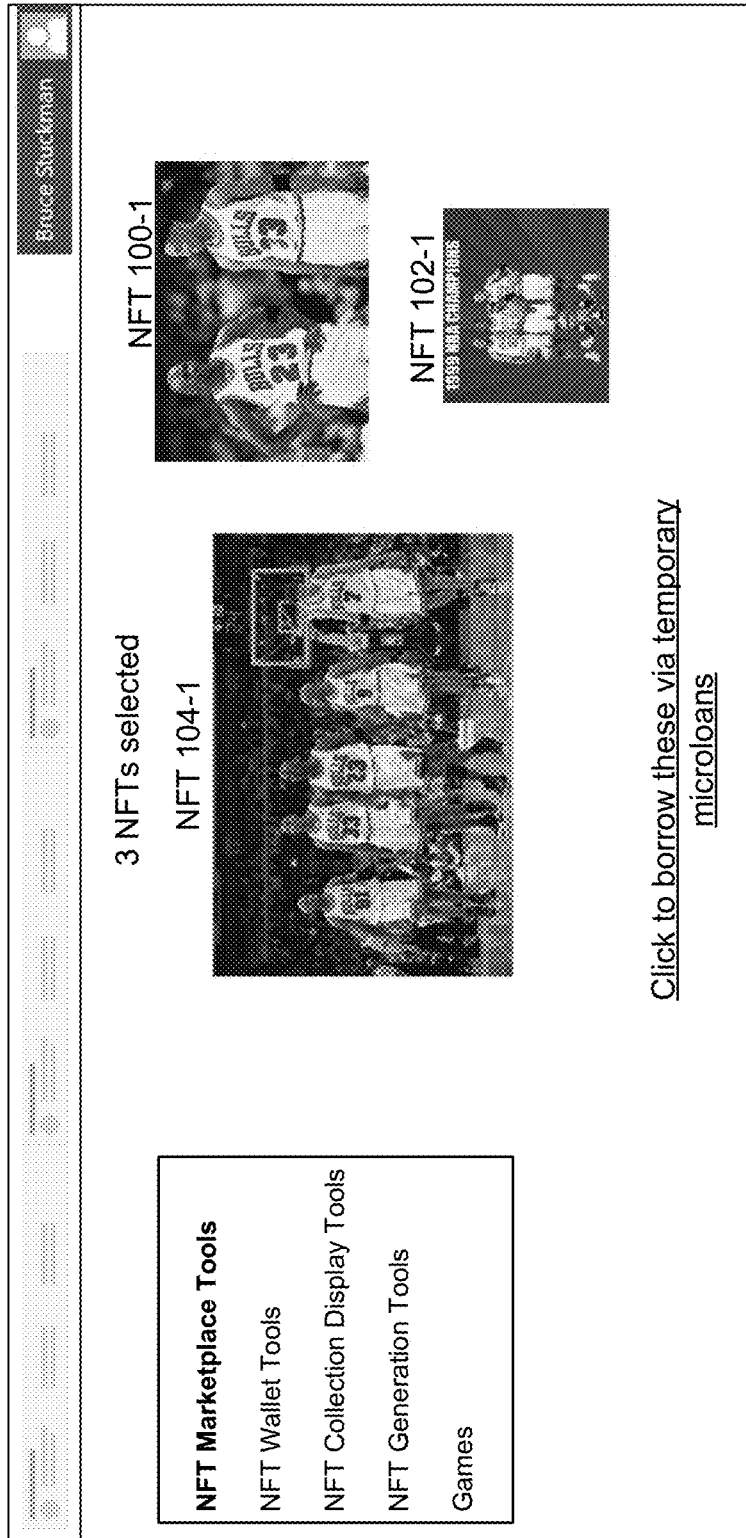
FIG. 4B presents a pictorial representation of an example screen display.

FIG. 4B presents a pictorial representation of an example screen display. In particular, the user has used the marketplace tools to select NFTs 100-1, 102-1, and 104-1. Instead of putting these NFTs up for purchase, the original owners have made them available for temporary micro-loan. This process allows the users can engage to, in exchange for a fee, "borrow" NFTs in order to create a collection NFT. After the Collection NFT is created, or upon the expiration of some predetermined time period (such as 15 minutes, 30 minutes, an hour, a day, etc.) the micro-loaned NFT(s) are returned, expired, deleted or destroyed. Transaction fees apply, a portion of which can be credited to the original NFT owner, the author, including an upfront cost, reward-based payment based on the use and/or performance of the micro-loaned NFT etc. In the alternative, a fixed fee could be charged to the user and credited to the original NFT owner. In various examples, the NFT collection platform 800 may be configured to operate with a single user and/or within a single wallet, and/or to otherwise prohibit the sale or borrowing of micro-loaned NFTs to avoid dilution of the value of the original itself. Furthermore, original and/or derivative NFTs can include restrictions on the total number of micro-loan transactions, the number of simultaneous/contemporaneous micro-loans, restrictions on types of microloan transactions such as normal use loans, staking loans, death match loans, loans less than a predetermined length of time, loans greater than a predetermined length of time, etc.

Consider the following example where an NFT is put up for loan. The proposed loan transaction can include restrictions including an expiration time and/or date, one or N time use in creating a collection NFT or in a game, tournament or challenge, etc. Once the loan is accepted by the borrower, an additional NFT, such as a derivative NFT of the original NFT being loaned, is created on a side chain, layer 1 or 2 blockchain (or "parachain") that can be different from (and/or independent from) the blockchain used to create the original NFT. This new NFT can be created and transferred to the wallet of the borrower via a smart contract that is based on the restrictions. A cryptocurrency market can be used to fund the transaction and/or to collateralize the micro-loan. The new NFT can then be set via the smart contract to automatically expire (e.g. be deleted from the wallet, destroyed or otherwise disabled), when the restrictions are met. In this fashion, if the purpose of the micro-loan is the creation of a collection NFT, the borrowed NFT can automatically expire once the collection NFT is created. It should be noted that the collection NFT can be created via the same blockchain platform (e.g. Ethereum) used to create the original NFT (e.g. not the parachain).

Figure 4C:
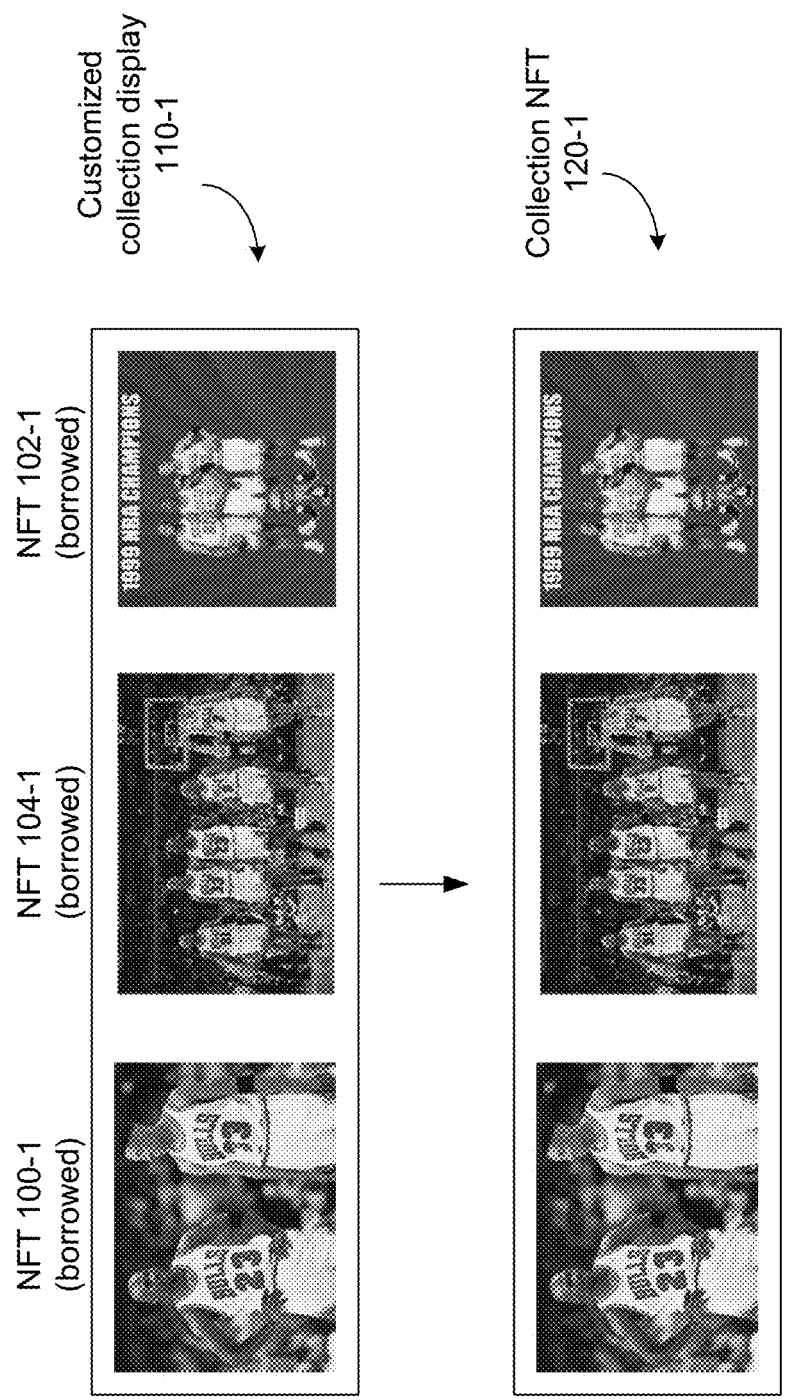
FIG. 4C presents a flow diagram representation of an example process.

FIG. 4C presents a flow diagram representation of an example process where a collection NFT 120-1 is generated based on a customized collection display 110-1 created by the user based on the borrowed NFTs 100-1, 102-1 and 104-1. In various examples, the collection NFT 120-1 metadata can also indicate the original sources of the micro-loans as well as the micro-loaned status of NFTs 100-1, 102-1 and 104-1. While not expressly shown, the collection NFTs based on one or more micro-loaned NFTs, can be created with a visual indication of the original vs. micro-loaned status of the NFTs as appropriate.

FIG. 5A presents a flowchart representation of an example method. In particular, a method 1300 for use in conjunction with any of the functions and features previously described facilitates the collection of endorsements associated with an NFT. Step 1302 includes importing, via a network interface, an NFT associated with the user of the client device. Step 1304 includes collecting, via a processor and in response to user interactions with the graphical user interface, endorsement data associated with the NFT. Step 1306 includes generating, via the processor and in response to user interactions with the graphical user interface, display data associated with a customized collection display that contains the NFT and the endorsement data. Step 1308 includes sending, via the network interface, the display data associated with the customized collection display via the client device of the user. Step 1310 includes facilitating creation of a collection NFT corresponding to the customized collection display.

Figure 5B:
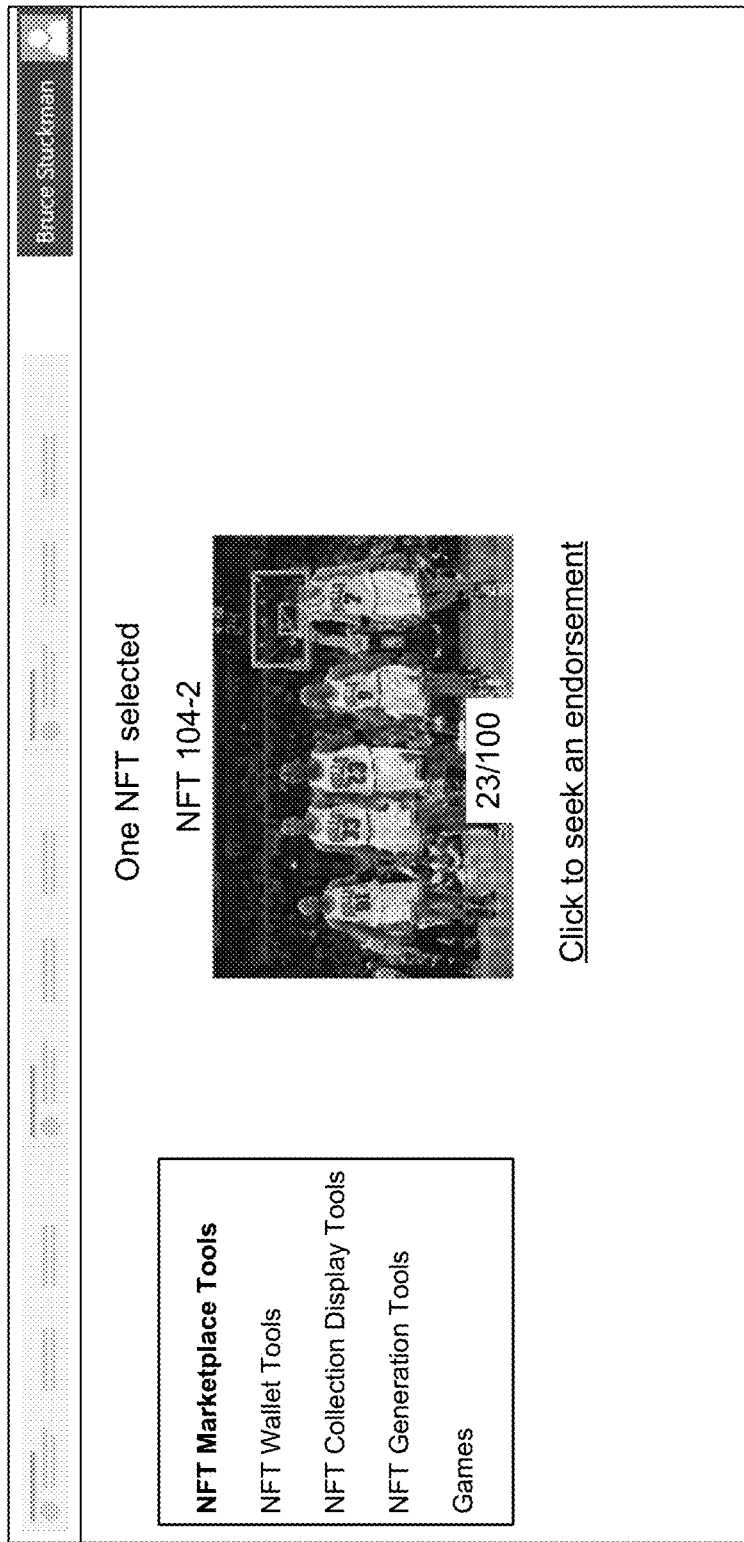
FIGS. 5B and 5C present pictorial representations of example screen displays.
Figure 5C:
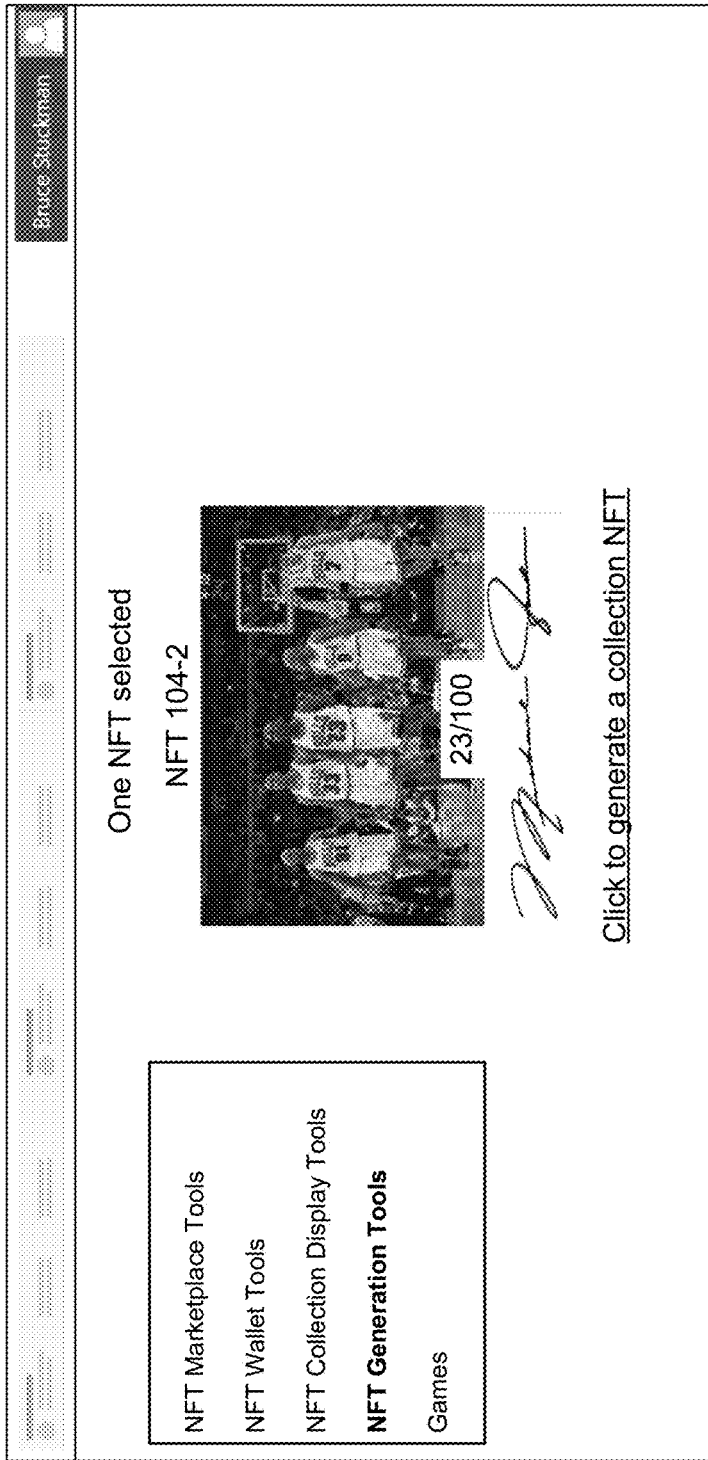

FIGS. 5B and 5C present pictorial representations of example screen displays. In FIG. 5B, the user is interacting with the graphical user interface to use the NFT marketplace tools to seek an endorsement for a selected NFT. After an endorsement in the form of a signature has been received it can be appended to the customized collection display of the NFT. In FIG. 5C, the user interacts with the NFT generation tools to generate a collection NFT that includes both the NFT and the signature. In various examples, this collection NFT 120-6 metadata can also indicate an attribution associated the endorsement itself. Furthermore, the endorsement itself can be an original NFT, a derivative NFT, a micro-loaned NFT or other NFT.

Figure 6:
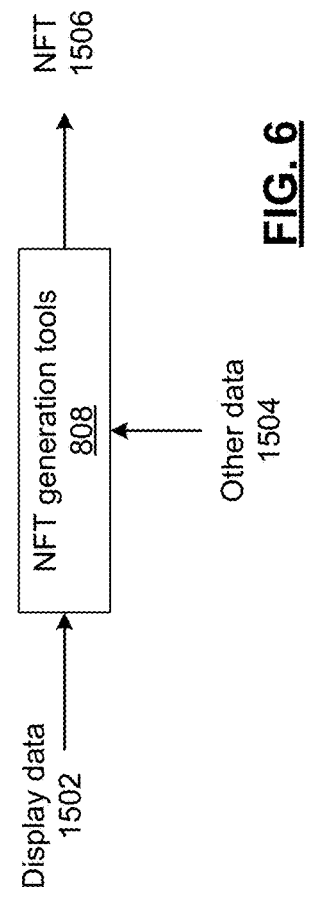
FIG. 6 presents a block diagram/flow representation of an example of NFT generation.

FIG. 6 presents a block diagram/flow representation of an example of NFT generation. In the example shown, NFT generation tools 808 operate to convert display data 1502 and other data 1504 into an NFT 1506. The display data 1502 can correspond to an original NFT, borrowed (e.g. temporary micro-loaned) NFT, a derivative NFT, a customized collection display 110, an original image, and/or other derivatives or micro-loans thereof or other display or image data. In various examples, the NFT generation tools 808 can operate to verify the credentials of any NFTs whose images are contained in the display data 1502, prior to creating the NFT 1506. In this fashion, derivative NFTs can only be created when the source NFT or NFTs are verified—preventing the creation of unauthorized or counterfeit NFTs.

The other data 1504, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the display data 1502.

This other data 1504 can be used to generate an NFT and/or combined with the display data 1502 to create a dataset that includes both the display data 1502 and the other data 1504. This other data 1504 or combined dataset can be protected via the blockchain and/or other crypto-based NFT creation technology that is employed by the NFT generation tools 808 and via the NFT creation system 824 to create and protect the new NFT 1506 itself. It should be noted that the NFT 1506 can include a single derivative or a number of derivatives, including a limited series of derivatives. It should be noted further that some or all of the other data 1504, including restriction data and/or attribution data, can be derived from one or more original NFTs whose images are associated with the display data 1502. Furthermore, some or all of the other data 1504 can be generated in response to user interactions with a graphical user interface generated in conjunction with the NFT collection platform 800.

FIG. 7 presents a block diagram representation of an example system. In particular, a system 2850 is presented that includes an NFT distribution platform 2800 that communicates with client devices 825 via a network 115. The network 115 can be the Internet or other wide area or local area network, either public or private. The client devices 825 can be computing devices associated with users, for example, buyers, sellers, collectors, game players and/or other users of NFTs.

In the example shown, the NFT distribution platform 2800 includes a client device interface 2802 for interacting with the client devices 825, NFTs 2804 to be distributed, and an operating system 2844. One or more of the NFTs 2804 can have geographical restrictions as to distribution that are either part of the NFTs themselves or have restriction data that is stored separately.

The NFT distribution platform 2800 includes a network interface 2820 such as a 3G, 4G, 5G or another cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via the network 115.

The NFT distribution platform 2800 also includes a processing module 2830 and memory module 2840 that stores an operating system (O/S) 2844 such as an Apple, Unix, Linux or Microsoft operating system or another operating system, the client device interface 2802, and the NFTs 2804. The O/S 2844 and the client device interface 802 each include operational instructions that, when executed by the processing module 830, cooperate to configure the processing module 830 into a special purpose device to perform the particular functions of the NFT distribution platform 2800 described herein.

The NFT distribution platform 2800 may include a user interface (I/F) 2862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to an administrator of the NFT distribution platform 2800 and that generate data in response to the administrator's interaction with NFT distribution platform 2800.

The processing module 2830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 2840. The memory module 2840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 2860, other architectures are possible including additional data buses and/or direct connectivity between one or more elements. Further, the NFT distribution platform 2800 can include one or more additional elements that are not specifically shown.

For example, the client device interface 2802 can operate in conjunction with each client device 825 and via network 115 to generate a graphical user interface. This graphical user interface is based on display data generated by the NFT distribution platform 2800 in a format for display on a display device associated with the client devices 825. This graphical user interface generates input data that is received by the NFT distribution platform 2800 from the client devices 825 in response to user interaction with the graphical user interface.

In various examples, the NFT distribution platform 2800 can operate to respond to input data from client devices in the form of read requests for NFTs and geolocation data such as GPS coordinates, connection to or proximity with a network element of network 115 or other location data indicating a location of the client device 825. The NFT distribution platform 2800 sends the requested NFT(s) to the requesting client device—only when the geolocation data conforms with restriction data—for example, when the geolocation data indicates a position of the requesting client device within a limited area or proximity indicated by the restriction data.

Figure 8:
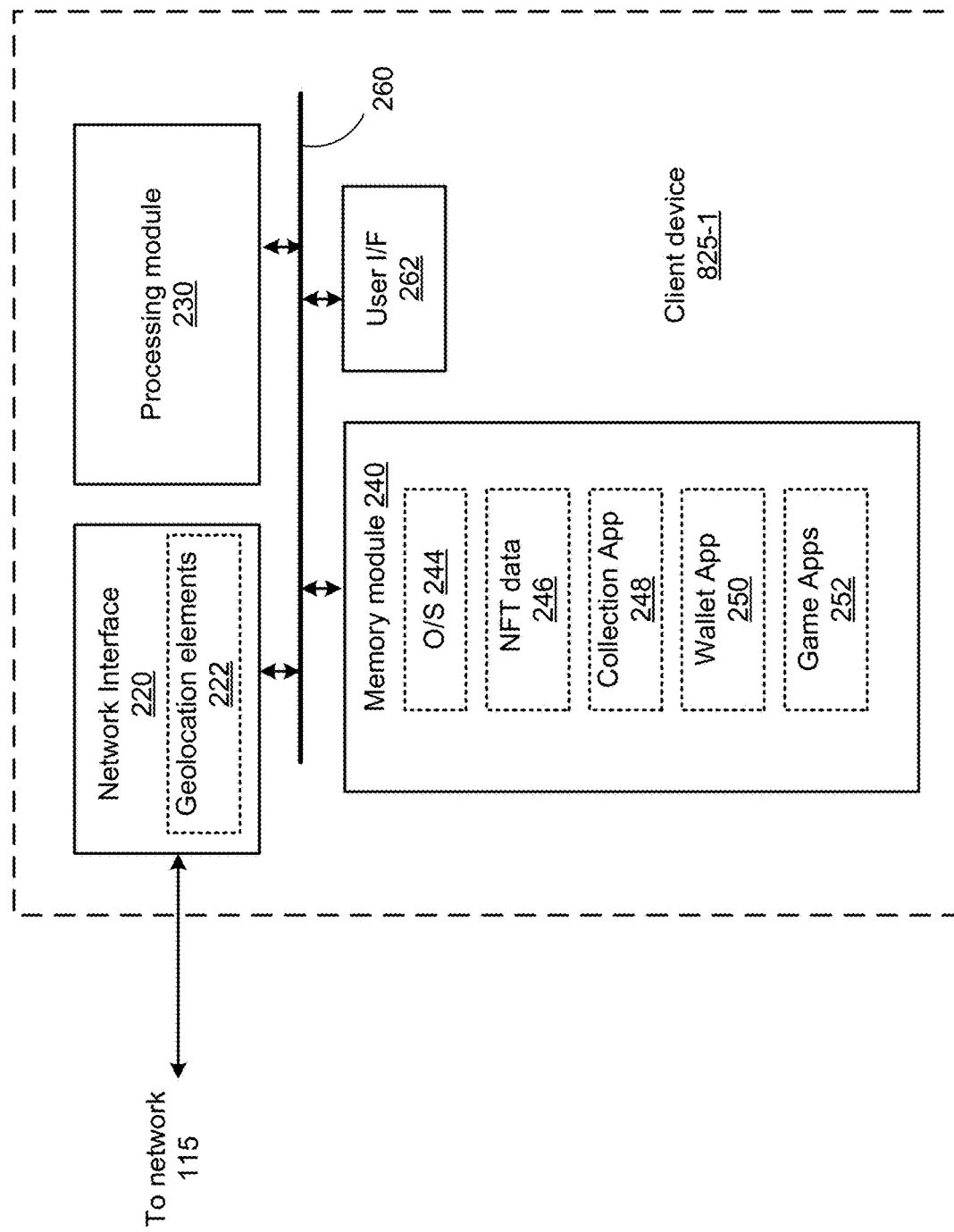
FIG. 8 presents a block diagram representation of an example client device.

FIG. 8 presents a block diagram representation of an example client device. In particular, a client device 825-1 is presented that functions similarly to client device 825, and includes several elements of client device 825 that are referred to by common reference numerals. The client device 825-1 is capable of operating to client device 825 described herein.

In addition, the memory module 240 includes a wallet application (app) 250 that is capable of engaging in financial transactions including credit card transactions and traditional digital payments, is capable of holding crypto-currency and engaging in crypto-currency transactions and is further capable of storing one or more NFTs that are either original NFTs, derivative NFTs, borrowed (temporarily micro-loaned) NFTs, collection NFTs and/or combinations thereof. In various examples, the wallet app 250 is capable of operating in conjunction with the NFT collection platform 800, the NFT distribution platform 2800, the NFT wallet system 820, the NFT marketplace 822, and/or the NFT creation system 824 via network 115.

As will be understood by one skilled in the art, unlike a normal wallet, which can physically hold cash, credit cards, etc., NFT wallets "store" NFTs by storing the NFT data necessary to access the NFT. So, even though a wallet can be said to store an NFT, technically the NFT content is stored on the blockchain, which can only be accessed via the NFT data in the wallet. This NFT data includes metadata, other off-chain data corresponding to the NFT and in particular, a private key. This private key can be considered an indicator of ownership of the NFT and is required to access the NFT via the blockchain. If the NFT data (including the private key) is lost, the NFT can no longer be accessed—and the NFT is itself "lost" for all intents and purposes, even though it remains immutably stored on the blockchain.

Also, the memory module 240 includes one or more game apps 252 that represent either stand alone games of the client device 825-1 or that operate in conjunction with the games 812 of the NFT collection platform 800 and/or interface with the NFT distribution platform 2800. This allows, for example, a user of client device 825-1 to engage in (e.g. play) games associated with NFT content, and engage in other activities that involve the acquisition, collection, display, distribution, and/or use of one or more NFTs that are either original NFTs, derivative NFTs, borrowed (temporarily micro-loaned) NFTs, collection NFTs and/or combinations thereof.

Furthermore, the network interface 220 includes one more geolocations elements 222 such as a GPS receiver, a ultra-wideband (UWB) transceiver, a Bluetooth transceiver and/or other component(s) that that facilitate the generation of geolocation data and/or facilitate other location-based services. Consider the case where the client device 825 is a smartphone or tablet and the wallet app 250 is an Apple or Android wallet or mobile wallet card that is in a Apple or Android wallet. Once the wallet app 250 is activated, NFTs can be easily added to the wallet. In addition, the wallet app 250 can access the location services of the device, and for example, generate push notifications regarding NFTs that are available near the current location.

In various examples, the geolocation data generating in such a fashion can facilitate the generation of geolocation data discussed in conjunction with the operation of NFT distribution platform 2800. In particular, the NFT distribution platform 2800 can automatically detect the presence of the user at a venue based on geolocation data received from the user's client device 825-1 and automatically prompted the user to click to send a read request. In this fashion, the user can be geo-authorized, before the request. In other examples, the NFT distribution platform 2800 can distribute NFTs to client devices 825 based on payments, authentication and/or other criteria that does not rely on geolocation data.

Furthermore, while the client device 825-1 and NFT collection platform 800 (or NFT distribution platform) are shown as separate devices that communicate via the network 115, it should be noted that any and all of the functionality attributed to the NFT collection platform 800 (or NFT distribution platform), including the NFT marketplace tools 804, NFT wallet tools 806, NFT generation tools 808, NFT collection display tools 810, games 812, and database 814, etc. can likewise be incorporate directly into the client device 825. In this fashion, a client device 825 through the application of its operating system 244 and one or more applications can provide a graphical user interface to operate via network 115 but independently from any NFT collection platform to perform any of the functions and features described herein. In particular, the client device 825 can perform the functions of both the client device and the NFT collection platform 800 without requiring communications to be sent to the client device 825 from a NFT collection platform (or NFT distribution platform) and communications sent to a NFT collection platform (or NFT distribution platform) from the client device 825.

In addition, NFT generation tools 808 can be used to protect, encrypt and/or authenticate any digital information that could be stored in the wallet app 250, including for example rewards cards, coupons, movie tickets, event tickets, boarding passes, public transit cards, student ID cards, credit cards, debit cards, prepaid cards, and loyalty cards. In addition, the functionality of the wallet app 250 can be further expanded to protect other information such as vehicle titles, warranty cards, driver's licenses and other IDs, vaccination records, prescriptions, and/or other medical records, social security cards, financial records, authentication tokens, insurance cards, passwords, user IDs and/or other images and information of a personal and/or sensitive nature. Any of these types of digital information can be protected via an NFT or other blockchain transaction in conjunction, with or without associated image or display data, and with or without metadata and/or "other data" as that term has been used herein in association with the NFT generation tools 808.

FIG. 9A presents a block diagram/flow representation of an example of NFT generation. In the example shown, an original metaverse real estate NFT 4820 corresponds to a portion/plot of real estate that is used in a game or metaverse application. An example is shown in FIG. 9B. The original metaverse real estate NFT 4820 can be purchased by the user, created or leveled-up via game play or otherwise acquired by the user of a metaverse application or game.

The NFT generation tools 808 are used to generate a derivative NFT 4824 or other metaverse real estate NFT that is based on the improvements 4822 shown in FIG. 9C. In the example shown the improvements 4822 correspond to a building or other structure, however, other real estate improvements can likewise be implemented. In various example, the derivative NFT 4824 with improvements shown in FIG. 9D can be created on a parachain or other sidechain that is different from the blockchain on which the original metaverse real estate NFT 4820 resides or the same blockchain on which the original metaverse real estate NFT 4820 resides.

Figure 9E:
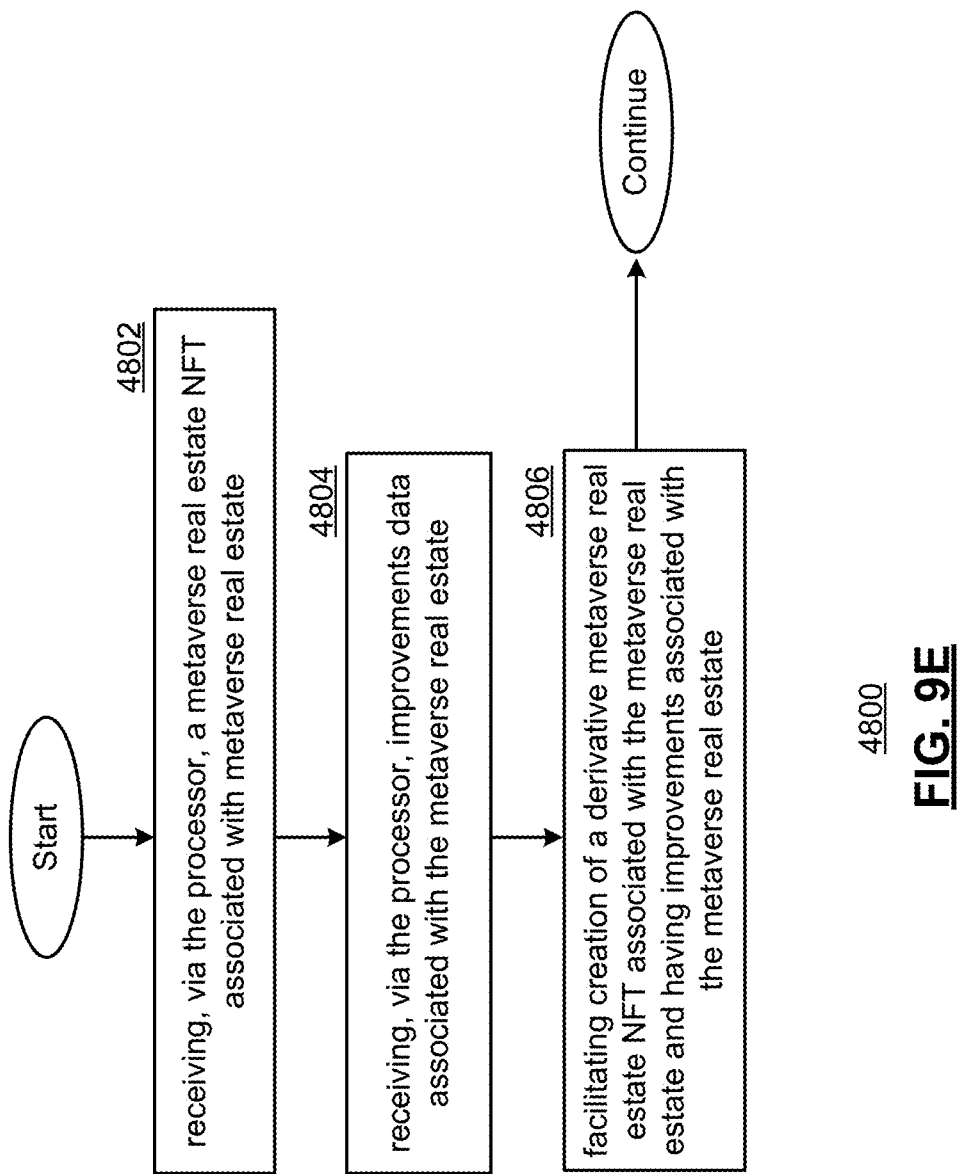
FIG. 9E presents a flowchart representation of an example method.

FIG. 9E presents a flowchart representation of an example method. In particular, a method 4800 is presented for use in conjunction with any of the functions and features described herein. Step 4802 includes receiving, via the processor, a metaverse real estate NFT associated with metaverse real estate. Step 4804 includes receiving, via the processor, improvements data associated with the metaverse real estate. Step 4806 includes facilitating creation of a derivative NFT associated with the metaverse real estate and having improvements associated with metaverse real estate.

FIG. 10A presents a block diagram/flow representation of an example of NFT generation. In the example shown, document image data 4920 and other data corresponding to a document are used to generate an authenticated document NFT 4924 via the NFT generation tools 808. These authenticated document NFTs 4924 can be stored in an NFT wallet associated with the mobile phone or other client device associated with the user and can be used, for example, in place of coupons, cards, legal documents, medical documents, financial documents, IDs, credit cards, licenses and/or other important documents associated with a user that normally exist in non-digital, e.g. paper or plastic form. The authenticated document NFT 4924 can be used to prevent fraud and/or promote privacy in transactions via secure user and/or document authentication. In various examples, the authenticated document NFT 4924 can be presented and analyzed via secured blockchain or other crypto transactions at the time of a transaction in order to authenticate the identity of the user and/or to verify the accuracy and authentic nature of the other data 4922 and/or to facilitate the security of the transaction.

FIG. 10B presents a flowchart representation of an example method. In particular, a method 4900 is presented for use in conjunction with any of the functions and features described herein. Step 4902 includes receiving, via the processor, a document image associated with a document. Step 4904 includes receiving, via the processor, other data, wherein the other data is also associated with the document. Step 4906 includes facilitating creation of an authenticated document NFT corresponding to the document.

FIG. 11A presents a block diagram/flow representation of an example of NFT generation. The NFT generation tools 808 are used to generate a derivative NFT 5624 based on an original metaverse real estate NFT 5620 and based on the enhancement data 5622.

In the example shown in FIG. 11B, an original metaverse real estate NFT 5620 corresponds to real estate having an interior room that is used in a game or metaverse application. The original metaverse real estate NFT 5620 can be purchased by the user, created or leveled-up via game play or otherwise acquired by the user of a metaverse application or game.

The NFT generation tools 808 are used to generate a derivative NFT 5624 or other metaverse real estate NFT that is based on the enhancements data 5622 shown in FIG. 11C. In the example shown the enhancements 5622-1 and 5622-2 correspond to a Moet & Chandon vending machine and a Jackson Pollock painting that are acquired either as image data or as individual NFTs. While particular enhancements are shown, other real estate enhancements can likewise be implemented including statues and other art, rugs, lamps, furniture and other furnishings and accessories, outdoor objects, appliances, knick-knacks, machinery and other virtual objects for decorating or finishing an office, home, factory, venue or other real estate.

In the example shown in FIG. 11D, the user has placed the enhancements 5622-1 and 5622-2 as desired before creating the derivative NFT 5624. The derivative NFT 5624 with improvements shown can be created on a parachain or other sidechain that is different from the blockchain on which the original metaverse real estate NFT 5620 resides or the same blockchain on which the original metaverse real estate NFT 5620 resides.

FIG. 11E presents a flowchart representation of an example method. In particular, a method 5600 is presented for use in conjunction with any of the functions and features described herein. Step 5602 includes receiving, via the processor, a metaverse real estate NFT associated with metaverse real estate. Step 5604 includes receiving, via the processor, enhancement data associated with the metaverse real estate. Step 5606 includes facilitating creation of a derivative NFT associated with the metaverse real estate and having enhancements associated with metaverse real estate.

FIG. 12A presents a block diagram of an example system. In particular, a system is shown that can be implemented similarly to, or in conjunction with, NFT collection platform 800. The system includes an NFT transaction authenticator 6022 and a secure real-time NFT metadata repository 6024. In various examples, the NFT transaction authenticator 6022 and the secure real-time NFT metadata repository 6024 can be implemented via one or more modules that include a network interface, processing circuitry and memory. The secure real-time NFT metadata repository 6024 stores NFT metadata received in conjunction with NFTs created via metadata source 6026, such as one or more NFT creation systems 824. The NFTs are associated with one or more users 6020.

In operation, the NFT transaction authenticator 6022 responds to transaction requests from a user associated with an NFT to authenticate the NFT and the user and to otherwise determine the validity of the transaction that is requested. If the user and the NFT are both authenticated, and the requested transaction is otherwise permissible (e.g. not restricted by conditions on use or other transaction restrictions), then the NFT transaction authenticator 6022 responds by issuing credentials to facilitate the transaction with a third party 6028. As will be discussed herein, the maintenance and use of the secure real-time NFT metadata repository 6024 allows authentication of NFT related transactions in real-time—avoiding possible delays in performing, for example, complex blockchain transactions via an NFT source 6026 where the NFT was minted and/or otherwise maintained.

Consider the following example where an NFT is created via NFT source 6026. In addition to other NFT data, the NFT has metadata that uniquely identifies the NFT, a hash or other NFT authentication metadata that can be used to authenticate the NFT and/or transaction restriction metadata indicating possible restrictions on transactions/use conditions involving the NFT. Furthermore, when the NFT is created and/or acquired by a user, user-specific user authentication metadata is acquired or created and stored on the blockchain with the NFT with the other metadata. This user authentication metadata can include one or more passwords, answers to security questions, identifiers of recognized devices such as a device identifier of a personal cellphone, laptop, tablet, computer or other known and/or trusted device, one or more trusted networks of the user, other multifactor authentication data such as personal information, known answers to security questions, biometric data related to fingerprints, retinal scans, facial features or other biometrics of the user and/or other user authentication data that can be used to determine if a user is the owner of the NFT or otherwise an authorized user and in particular, whether or not the user is (or is not) who they claim to be.

The metadata associated with the NFT is indexed by NFT identifier and stored on the secure real-time NFT metadata repository 6024 for use by the NFT transaction authenticator 6022 in authenticating NFT-related transactions. This metadata is available from the repository on a real-time basis (e.g., is available with an acceptable amount of latency associated with a corresponding transaction). The metadata in the secure real-time NFT metadata repository 6024 is also synced periodically with the NFT via the NFT source 6026 to reflect any changes in the NFT itself. While some metadata, such as an NFT identifier, NFT authentication metadata and/or transaction restriction metadata may be made accessible to the user who holds the NFT, in various examples, the user authentication metadata in particular, can be encrypted in such a fashion that is decryptable by the secure real-time NFT metadata repository 6024—but not by the user. In various examples, the secure real-time NFT metadata repository 6024 lacks a general network connection and is connected to the NFT transaction authenticator 6022 via a dedicated and/or otherwise secured connection or is otherwise walled-off from other network connections of the NFT transaction authenticator 6022. This helps prevent unauthorized tampering with the sensitive data stored therein.

When a user 6020 proposes an NFT-related transaction, the NFT transaction authenticator 6022 collects from the user as part of the transaction request (a) an identifier of the NFT, and NFT authentication data corresponding to the NFT (b) user authentication data user, and (c) information on the proposed transaction. The NFT transaction authenticator 6022 determines whether or not the identifier corresponds to a valid NFT. If so, it retrieves the metadata associated with the NFT from secure real-time NFT metadata repository 6024. The NFT transaction authenticator 6022 authenticates the NFT by comparing the NFT authentication data to the NFT authentication metadata to determine if they match. The NFT transaction authenticator 6022 can also authenticate the user 6020 to the NFT by comparing the user authentication data to the user authentication metadata to determine if they match. If authentication succeeds, the NFT transaction authenticator 6022 facilitates the transaction with the third party 6028 by authorizing completion of the transaction, e.g. by issuing a credential to the third party 6028. The credential can include any message, object, or data structure that vouches for the identity of the user, the authenticity of the NFT and/or the validity of the transaction, through some method of security, trust and/or authentication.

In this fashion, the NFT transaction authenticator 6022 can authenticate transactions such as access to a flight via a driver's license or passport NFT, sale of a vehicle, real estate via a title NFT, a credit, debit or gift card transaction via a credit, debit or gift card NFT, the sale of a stock or bond via a stock or bond certificate NFT, warranty transactions via a warranty card NFT, access to events via venue ticket NFTs and/or vaccination card NFTs, coupon redemption via a coupon NFT, access to a vehicle, dwelling or office via a key NFT, etc. Furthermore, the NFT transaction authenticator 6022 can authenticate transactions such as sales and/or micro-loans of NFTs itself.

It should be noted that some NFTs are conditional, e.g. that have restrictions on their use and/or the transactions that are permitted. Depending on the type of transaction, the NFT transaction authenticator 6022 can also operate to compare transaction data received from the user to transaction restrictions metadata to determine if a transaction is permitted—before it is authorized. In this fashion, a credit, debit or gift card transaction can be halted if an expiration date or transaction limit has been exceeded. A warranty transaction can be halted if the warranty has expired. A key access for a pool, gym or office can be halted based on date, day of week or time of day restrictions, etc.

Furthermore, in sales transactions and/or micro-loans that have been authorized, the NFT transaction authenticator 6022 can also operate to note the pending sale or micro-loan in the secure real-time NFT metadata repository 6024 or otherwise place a hold on the NFT to prevent another sales or micro-loan until the repository is updated in a future sync with the NFT source 6026. Furthermore, in some cases the NFT corresponds to an expendable asset such as a venue ticket, gift card, coupon, etc. The NFT transaction authenticator 6022 can also operate to determine that the NFT is expended, based on the transaction restrictions metadata and the transaction data. In response to such a determination, NFT transaction authenticator 6022 can then update the secure real-time NFT metadata repository to indicate the NFT is expended. In any of these cases above, the secure real-time NFT metadata repository may facilitate updating of the NFT source 6026 to reflect an authorized transaction via notifications and/or that an NFT has been expended.

FIG. 12B presents a flowchart representation of an example method. In particular, a method 6000-4 is presented for use in conjunction with any of the functions and features described herein. Step 6002-4 includes receiving, at the processor, a transaction request from a user associated with an NFT minted via a blockchain, wherein the transaction request includes NFT identification data identifying the NFT, NFT authentication data, user identification data and transaction data associated with the transaction. Step 6004-4 includes receiving, from a secure real-time NFT metadata repository and in response to the NFT identification data, NFT authentication metadata for authenticating the NFT, user authentication metadata for authenticating an authorized user of the NFT, and transaction restrictions data associated with the NFT, wherein the secure real-time NFT metadata repository is separate from the blockchain.

Step 6006-4 includes determining, via the processor, that the NFT is authenticated when the NFT authentication data compares favorably to the NFT authentication metadata. Step 6008-4 includes determining, via the processor, that the user is authenticated when the user authentication metadata compares favorably to the user identification data. Step 6010-4 includes determining, via the processor, that the transaction is authorized when the transaction restrictions metadata compares favorably to the transaction data. Step 6012-4 includes generating credentials data to facilitate the transaction when the NFT is authenticated, the user is authenticated and the transaction is authorized.

Figure 12C:
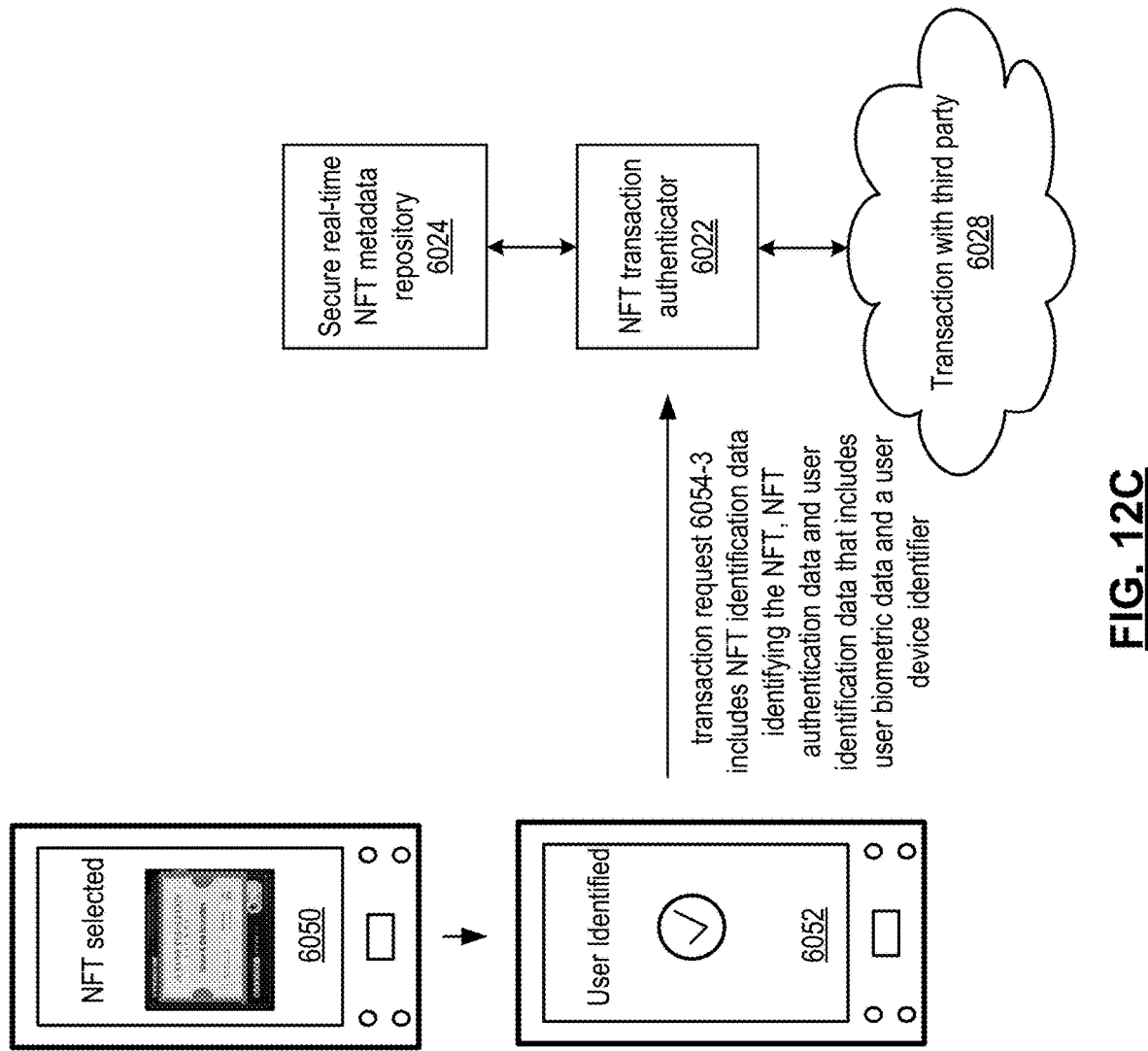
FIG. 12C presents a pictorial block diagram/flow representation of an example of transaction authentication.

FIG. 12C presents a pictorial block diagram/flow representation of a further example of transaction authentication. In this case, the transaction request 6054-1 includes NFT identification data identifying the NFT, NFT authentication data, and also user identification data that includes both a user device identifier and user biometric data that was collected via the client device 825 as part of its own user authentication process.

Again, the NFT transaction authenticator 6022 can operate in conjunction with the secure real-time NFT metadata repository 6024 for example, to authenticate the transaction with the third party 6028. In this additional case, the user authentication mechanisms of the client device are used in the transaction of the authentication process. Once the user is identified by a trusted device, the device identifier of the trusted device can be in combination with the user biometrics collected by that device to provide further security for the proposed transaction.

FIG. 12D presents a flowchart representation of an example method. In particular, a method 6000-10 is presented for use in conjunction with any of the functions and features described herein. Step 6002-10 includes receiving, at the processor, a transaction request from a user associated with an NFT minted via a blockchain, wherein the transaction request includes NFT identification data identifying the NFT, NFT authentication data and user identification data that includes a user device identifier. Step 6004-10 includes receiving, from a secure real-time NFT metadata repository and in response to the NFT identification data, NFT authentication metadata for authenticating the NFT and user authentication metadata for authenticating an authorized user of the NFT, wherein the secure real-time NFT metadata repository is separate from the blockchain.

Step 6006-10 includes determining, via the processor, that the NFT is authenticated when the NFT authentication data compares favorably to the NFT authentication metadata. Step 6008-10 includes determining, via the processor, that the user is authenticated when the user authentication metadata compares favorably to the user identification data. Step 6010-10 includes generating credentials data to facilitate the transaction when the NFT is authenticated and the user is authenticated.

Figure 13A:
FIG. 13A presents a pictorial representation of an example NFT.

In FIG. 13A, an NFT includes (e.g. that has associated content stored on-chain or off-chain) corresponding to a playable version (e.g. a game application, game binary, game data, etc.) of an electronic game (or more simply, a "game"), such as an online game, cloud-based game, a game application for a mobile device, a video game playable on a game console or personal computer and this is rendered on a streaming platform, in the cloud, or locally at the client device itself. The electronic game can be a metaverse game or other metaverse experience, a single player game, a multiplayer game, an action/adventure game, a real-time strategy game, a shooter game, a multiplayer online battle arena, a role-playing game, simulation or sports game, a puzzle, party game and/or other game.

In various examples, the NFT includes (e.g. that has associated content stored on-chain or off-chain) corresponding to a game application having playable game data such as graphics files, game status information, executable code or other instructions that operate in conjunction with a platform and/or a client device to execute the play of the game itself. Furthermore, the NFT may include authentication data with respect to a user that "owns" the game NFT and this particular copy of the game and entitles the user or other holder of the NFT to play the game and other metadata and other data as discussed herein. In the example shown, the game NFT includes metadata that indicates that this copy corresponds to a special collector's edition of the game and, in particular, one of a limited series release of NFTs corresponding to one of the first 10,000 copies of the game and/or game NFT.

While described above as a "game NFT", such an NFT can have any of the metadata, other data, and/or operate similarly to any of the other types of NFTs corresponding to videos, images, documents, game pieces, game characters, metaverse features, and/or other objects, etc. that are described herein.

Figure 13B:
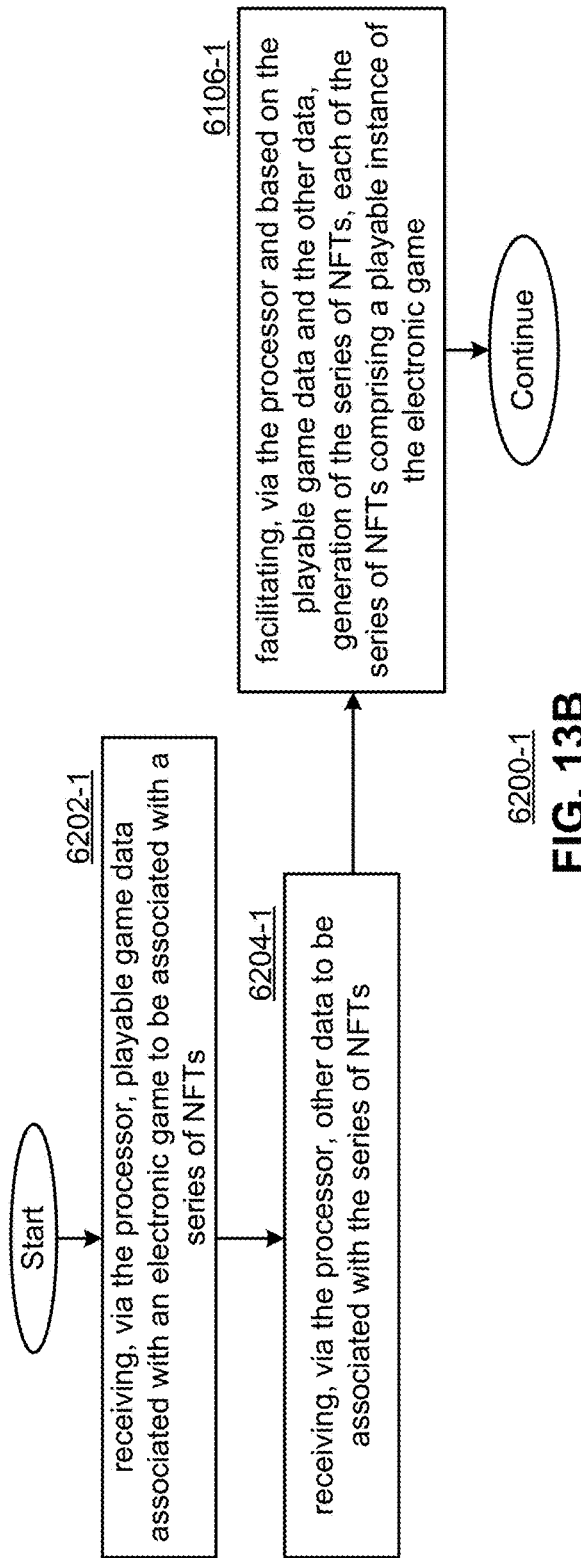
FIG. 13B presents a flowchart representation of an example method.

FIG. 13B presents a flowchart representation of an example method. In particular, a method 6200-1 is presented for use in conjunction with any of the functions and features described herein. Step 6202-1 includes receiving, via the processor, playable game data associated with an electronic game to be associated with a series of NFTs. Step 6204-1 includes receiving, via the processor, other data to be associated with the series of NFTs. Step 6206-1 includes facilitating, via the processor and based on the playable game data and the other data, generation of the series of NFTs, each of the series of NFTs comprising a playable instance of the electronic game.

Figure 13C:
FIG. 13C presents a pictorial representation of an example screen display.

FIG. 13C presents a pictorial representation of an example screen display. In the example shown, a user of an NFT game platform has accessed, via a client device associated with the user such as client device 825, a plurality of game NFTs associated with the user. The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In this case, the user's collection of game NFTs includes NFTs 4150-1, 4150-2, 4150-3, and 4150-4, etc. In various embodiments the collection display can be arranged by the user or automatically sorted into categories such as genre's or other groupings based on metadata associated with each of the NFTs.

Figure 13D:
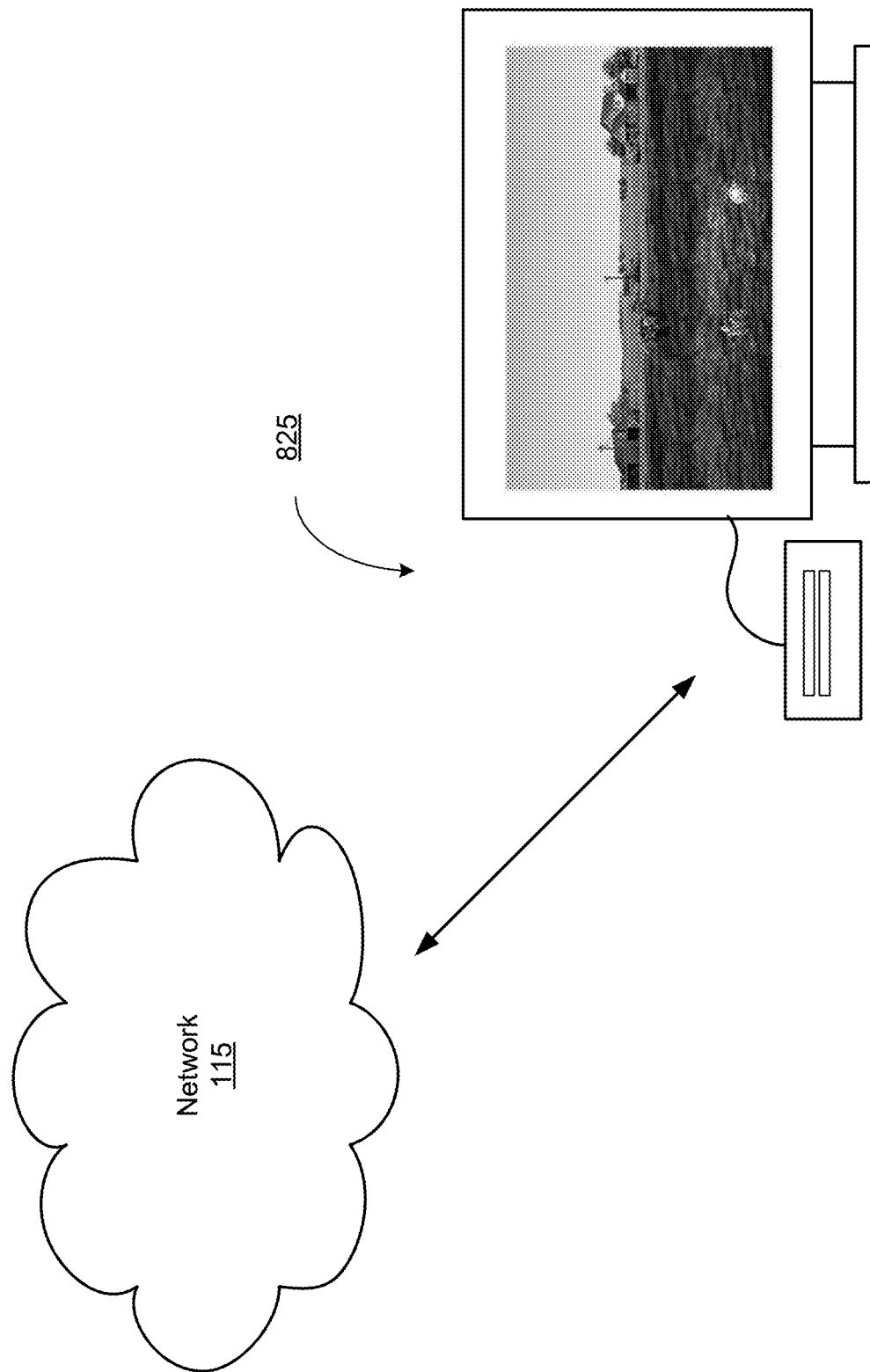
FIG. 13D presents a pictorial/block diagram representation of an example system with screen display.

In the screen display shown, the platform has generated display data associated with a customized collection display that contains the plurality of game NFTs for display via a graphical user interface associated with the client device. Furthermore, the user has interacted with the graphical user interface and indicated a selection of one the plurality of game NFTs for play—in this case, the game "I Dig It". The selection is received by the platform which responds by interacting, via the network 115, with a client device 825 to support play of the selected game by the user—as shown in FIG. 13D. This support can include streaming game video to, and receiving game input from, the client device 625 via the network 115.

The NFT collection platform 800 and/or associated client device improves the technology of NFT systems and existing gaming platforms by allowing the user to generate, store, collect, display and use game NFTs that include playable content. The use of NFTs in association with playable game content allows users to "own" playable versions of games that can be streamed to a user's client device, to own and trade collectable limited game edition NFTs, to loan authenticated versions of games for the play of others, and/or to authenticate the user's ownership in the game and the game NFT.

Figure 13E:
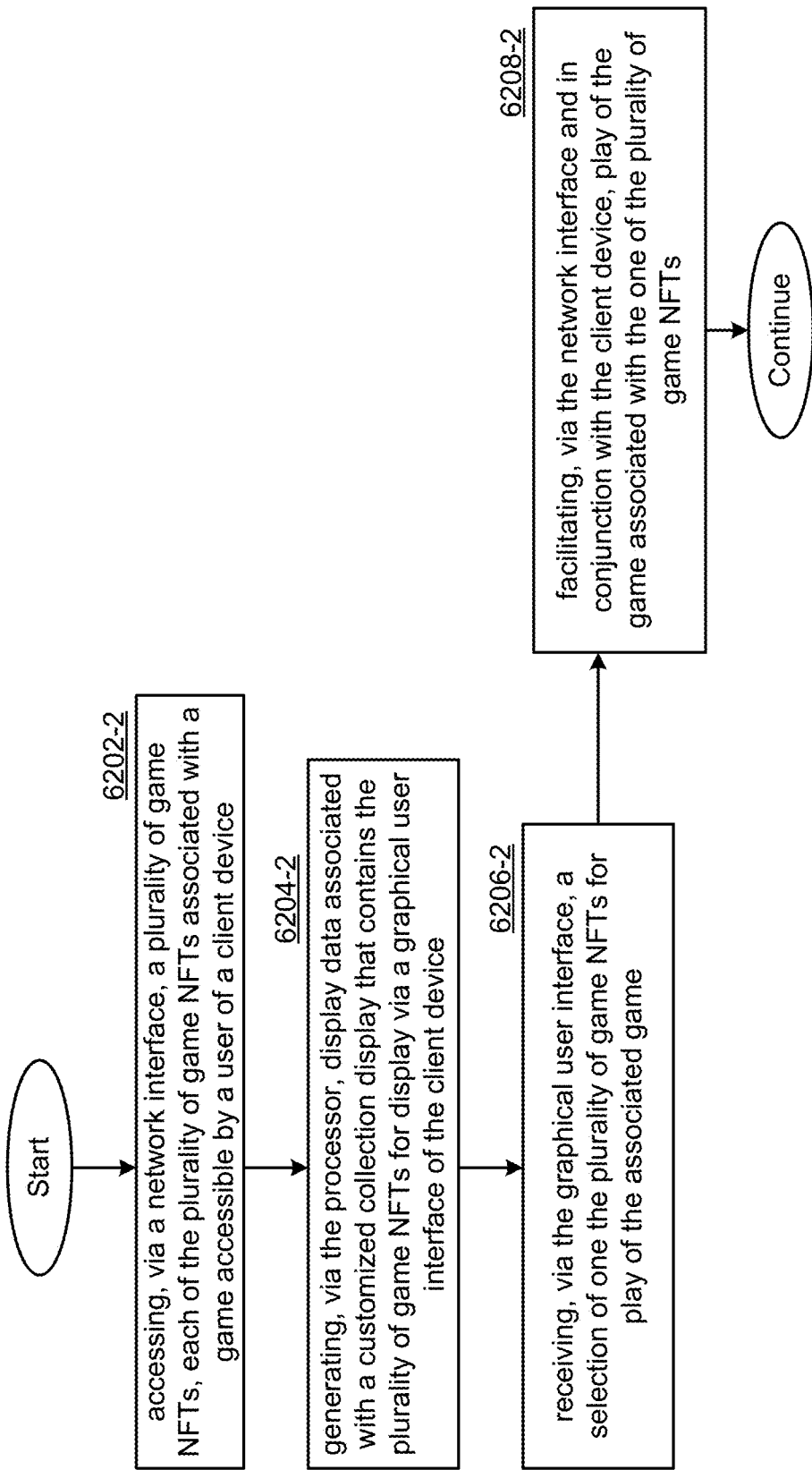
FIG. 13E presents a flowchart representation of an example method.

FIG. 13E presents a flowchart representation of an example method. In particular, a method 6200-2 is presented for use in conjunction with any of the functions and features described herein. Step 6202-2 includes accessing, via a network interface, a plurality of game NFTs, each of the plurality of game NFTs associated with a game accessible by a user of a client device. Step 6204-2 includes generating, via the processor, display data associated with a customized collection display that contains the plurality of game NFTs for display via a graphical user interface.

Step 6206-2 receiving, via the graphical user interface, a selection of one the plurality of game NFTs for play of the associated game. Step 6208-2 includes facilitating, via the network interface and in conjunction with the client device, play of the game associated with the one of the plurality of game NFTs.

FIG. 13F presents a block diagram/flow representation of an example of NFT generation. In particular, game data 6226 has been collected in association with the user's (player's) play of a game corresponding to game NFT 6220. At some time, such as the end of a game, when a player reaches certain goals or achievements in the game, upon expiration of a predetermined time period, upon accumulation of a predetermined amount of game play (e.g. a number of games played, an amount of play time, etc.) or other criteria, the game data 6226 is used to generate an update to the game NFT 6220 as the updated game NFT 6220-1. In this fashion, the player's game play and/or performance and achievements can be used to update the game NFT so that a player can pick up where he/she left off, have a mechanism to display some of the performance/achievements in conjunction with the game NFT itself.

As used herein, the term "updated" NFT can be used to represent changes that are made to an original NFT—i.e. the NFT that is the subject of the update. In addition, an "updated" NFT can be a new NFT, such as a derivative NFT, an all new NFT or other NFT that is minted based on the content, images, metadata and/or other data or based merely on the existence of the original NFT. This new NFT can be minted on the original blockchain used to mint the original NFT or via a parachain/side chain that is different from the original blockchain.

In FIG. 13G, an example of Game NFT 6220 corresponding to an NBA game is presented. In FIG. 13H, game data 6226 is generated based on the player's play of the game and used to generate an updated game NFT 6220-1. In the example shown, updated game NFT 6220-1 visually reflects that the player has reached the "one-star" level.

FIG. 13I presents a flowchart representation of an example method. In particular, a method 6200-3 is presented for use in conjunction with any of the functions and features described herein. Step 6202-3 includes facilitating, via the network interface and in conjunction with the client device, play of the game associated with the one of the plurality of game NFTs. Step 6204-3 includes receiving, via the processor, game data associated with the game play of the game by a user. Step 6206-3 includes updating the original NFT associated with the game piece, based on the game data associated with the game play of the game by the user.

Figure 13K:
FIG. 13K presents a pictorial representation of an example derivative NFT.
Figure 13M:
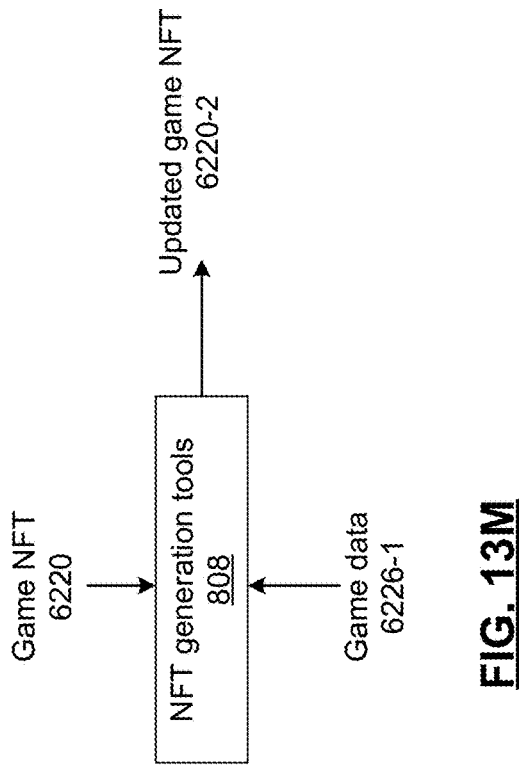
FIG. 13M presents a block diagram/flow representation of an example of NFT generation.
Figure 13J:
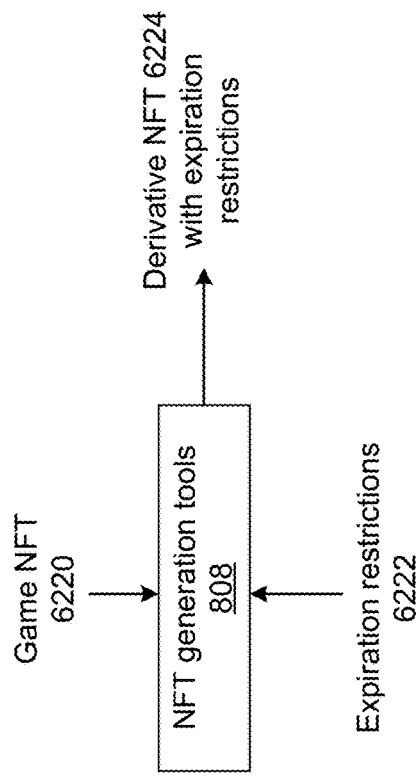
FIG. 13J presents a block diagram/flow representation of an example of NFT generation.

FIG. 13J presents a block diagram/flow representation of an example of NFT generation. In the example shown, NFT generation tools 808 are used to generate a derivative NFT 6224 based on the expiration restrictions 6222 that is shown in FIG. 13K. The expiration restrictions can correspond to, for example, an expiration time and/or date, one or N time use in a game, tournament or challenge, etc. This derivative NFT 6224 can be created on a parachain or other sidechain that is different from the blockchain on which the original game NFT 6220 resides. Furthermore, this derivative NFT 6224 can be micro-loaned or otherwise leased or loaned to another user for game play—subject to the expiration restrictions. In this fashion, for example, other users can play the game in exchange for a price (payment, bounty, experience, etc.).

Figure 13L:
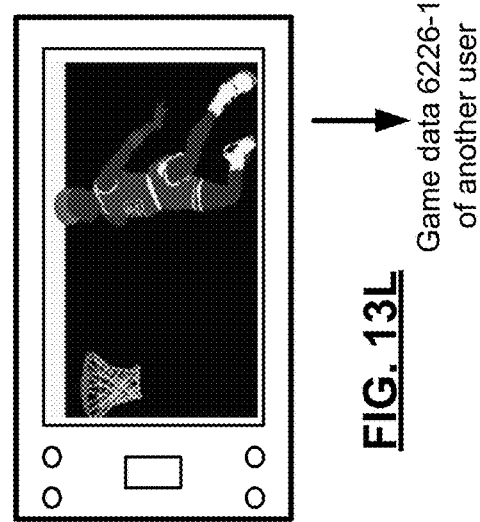
FIG. 13L presents a pictorial representation of an example client device.

In FIG. 13L, the derivative NFT 6224 has been temporarily loaned to another user who plays the game. At the end of the loan (e.g. when the expiration restrictions are met) the loaned game is automatically deleted, destroyed, disabled or otherwise "burned" and game data 6226 indicating the end of the escrow, stats and experience or other game performance metrics earned by the other user via the game are retrieved and can be stored by the user on the blockchain or other decentralized computer network with the original NFT 6220 to generate updated NFT 6220', as shown in FIG. 13M.

FIG. 13N presents a flowchart representation of an example method. In particular, a method 6200-4 is presented for use in conjunction with any of the functions and features described herein. Step 6202-4 includes facilitating, via the processor, creation of a derivative NFT corresponding to an original NFT associated with a game the derivative NFT having expiration restrictions limiting game play of the game. Step 6204-4 includes facilitating, via the processor, a micro-loan transaction of the derivative NFT to another user to facilitate the game play of the game by the other user, wherein the derivative NFT expires when the expiration restrictions are met.

FIG. 13O presents a flowchart representation of an example method. In particular, a method 6200-5 is presented for use in conjunction with any of the functions and features described herein. Step 6202-5 includes facilitating, via the processor, creation of a derivative NFT corresponding to an original NFT associated with a game the derivative NFT having expiration restrictions limiting game play of the game. Step 6204-5 includes facilitating, via the processor, a micro-loan transaction of the derivative NFT to another user to facilitate the game play of the game by the another user, wherein the derivative NFT expires when the expiration restrictions are met. Step 6206-5 includes receiving, via the processor, game data associated with the game play of the game piece by the another user. Step 6208-5 includes updating the original NFT associated with the game piece, based on the game data associated with the game play of the game piece by the other user.

Figure 13P:
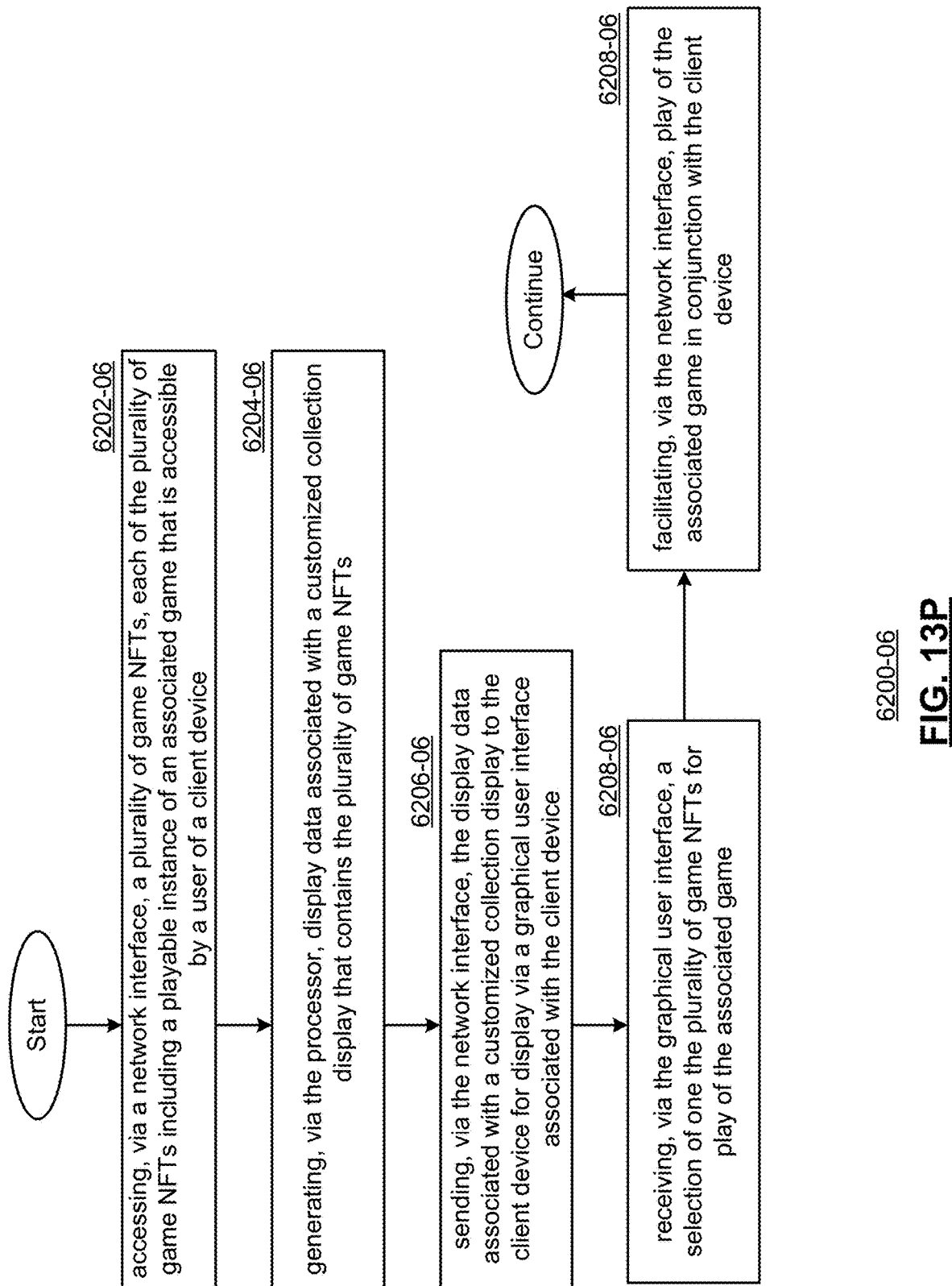
FIG. 13P presents a flowchart representation of an example method.

FIG. 13P presents a flowchart representation of an example method. In particular, a method 6200-6 is presented for use in conjunction with any of the functions and features described herein. Step 6202-6 includes accessing, via a network interface, a plurality of game NFTs, each of the plurality of game NFTs including a playable instance of an associated game that is accessible by a user of a client device. Step 6204-06 includes generating, via the processor, display data associated with a customized collection display that contains the plurality of game NFTs. Step 6206-06 includes sending, via the network interface, the display data associated with a customized collection display to the client device for display via a graphical user interface associated with the client device.

Step 6208-06 includes receiving, via the graphical user interface, a selection of one the plurality of game NFTs for play of the associated game. Step 62010-06 includes facilitating, via the network interface, play of the associated game in conjunction with the client device.

In various examples, facilitating the play of the associated game includes streaming, via the network interface, game video associated with the one of the plurality of game NFTs to the client device and receiving from the client device, via the network interface, game data associated with the game play of the game by the user. The customized collection display that presents the plurality of game NFTs can be configured in response to user interactions with the graphical user interface, configured based on metadata associated with the plurality of game NFTs and/or example, be configured based on genres associated with the plurality of game NFTs or other categories or customized arrangements, either automatically or by selection from the user.

In various examples, the method can further include updating the game NFT based on the game play of the associated game by the user, for example, by minting an updated game NFT that may be minted on via parachain that can be different from the blockchain that minted the game NFT. The method can further include: facilitating creation of a derivative NFT corresponding to a game NFT of the plurality of game NFTs, the derivative NFT having expiration restrictions limiting game play of the associated game; and facilitating a micro-loan transaction of the derivative NFT to another user to facilitate the game play of the associated game by the another user, wherein the derivative NFT expires when the expiration restrictions are met. These facilitating steps can be accomplished via NFT marketplace tools 804 and NFT generation tools 808 in conjunction with, for example, one or more NFT wallet systems 820, one or more NFT marketplaces 822 and one or more NFT creation systems 824.

Figure 13Q:
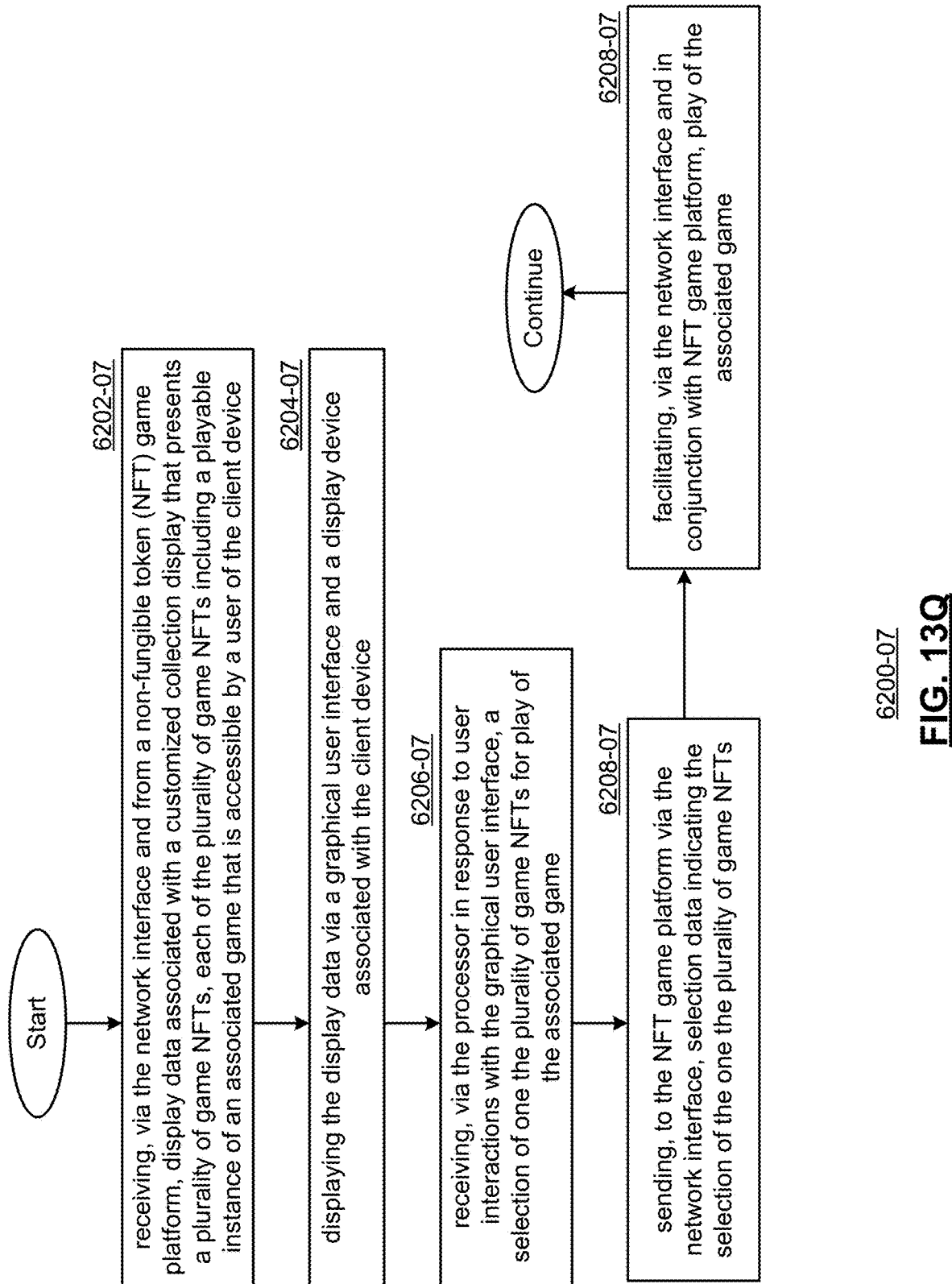
FIG. 13Q presents a flowchart representation of an example method.

FIG. 13Q presents a flowchart representation of an example method. In particular, a method 6200-7 is presented for use in conjunction with any of the functions and features described herein. Step 6202-7 includes receiving, via the network interface and from a non-fungible token (NFT) game platform, display data associated with a customized collection display that presents a plurality of game NFTs, each of the plurality of game NFTs including a playable instance of an associated game that is accessible by a user of the client device. Step 6204-07 includes displaying the display data via a graphical user interface and a display device associated with the client device.

Step 6206-07 includes receiving, via the processor in response to user interactions with the graphical user interface, a selection of one the plurality of game NFTs for play of the associated game. Step 6208-7 includes sending, to the NFT game platform via the network interface, selection data indicating the selection of the one the plurality of game NFTs. Step 6210-07 includes facilitating, via the network interface and in conjunction with NFT game platform, play of the associated game.

The NFT game platform can be implemented via NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

In various examples, facilitating the play of the associated game includes receiving, via the network interface, game video associated with the one of the plurality of game NFTs that is streamed from the NFT game platform and/or sending to the NFT game platform, via the network interface, game data associated with the game play of the game by the user that is generated by the client device.

Figure 14A:
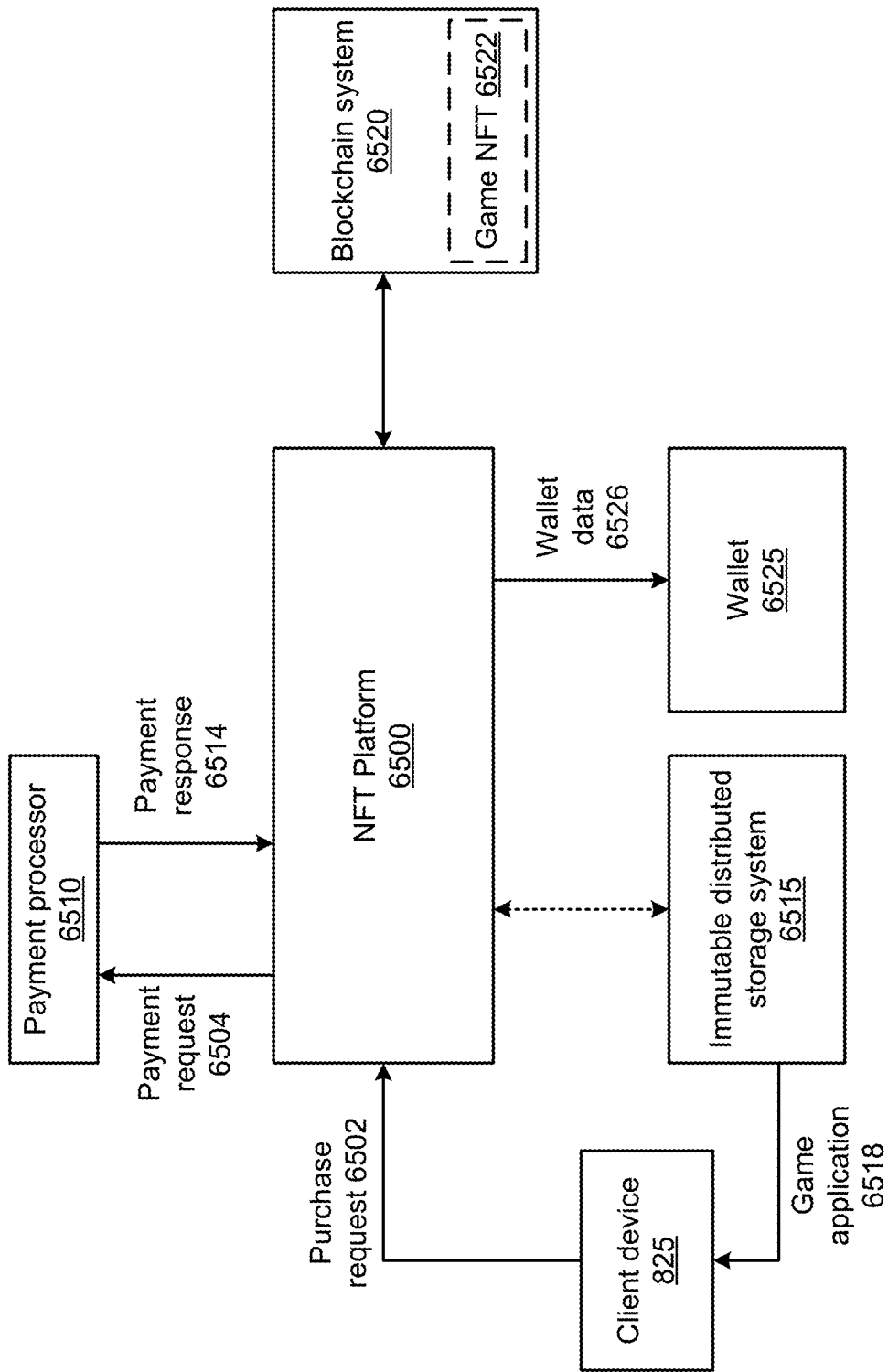
FIG. 14A presents a block diagram representation of an example system.

FIG. 14A presents a block diagram representation of an example system. The system includes a NFT platform 6500, such as NFT collection platform 800, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes an immutable distributed storage system 6515, a client device 825, a payment processor 6510 or other marketplace or marketplace tool, a blockchain system 6520, such as NFT creation system 824 or other decentralized computer system and a wallet 6526, such as NFT wallet system 820 or other wallet.

In operation, the immutable distributed storage system 6515, such as an interplanetary file system (IPFS) or other decentralized computer system/network stores a game application 6518 (e.g. playable game data) such as application binary and data corresponding to an electronic game, such as a game 812 or other electronic game. This form of storage promotes an incorruptibility and perpetual storage of the game. When a client device generates a purchase request 6502 for a game application associated with an electronic game that is received by the NFT platform 6500. The NFT platform 6500 responds by generating a payment request 6504 and receives a payment response 6514 indicating whether or not the payment request is verified. In various examples, in response to the payment response verifying the payment request, the platform system 6500 facilitates the minting of a game NFT 6522 associated with the electronic game. In addition, or in alternative, one or more game NFTs can be minted prior to sale. In this fashion, for example, a limited and/or numbered series of game NFTs can be minted and offered for sale to collectors. Furthermore, pre-minting a number of NFTs for sale can help expedite the sales because the minting of the game NFTs does not need to occur in real-time.

In various examples, minting of the game NFT 6522 includes generation of a private key associated with the game NFT that is stored with NFT metadata and/or other wallet data 6526 in the wallet 6526. In other examples, an existing private key can be retrieved and used for the same purpose. The game NFT 6522 serves to authenticate the purchase of the game application 6518 by the user of the client device 825 and can be used to enable play of the electronic game via the client device 825, for example, by verification of the NFT authorization via the application binary of the game application 6518, before the game is fully launched for game play via the client device 825. This improves the technology of game systems by providing a secure and incorruptible methodology for authenticating ownership of a game and/or authenticating the user to the game as the actual game owner.

While the immutable distributed storage system 6515 and the blockchain system 6520 are shown as separate elements, these two systems can be combined, for example, when the game NFT 6522 and the game application 6518 are stored via the same blockchain. Furthermore, while the game application 6518 is shown as being sent to client device 825, in other examples, the immutable distributed storage system 6515 and the NFT platform 6500 can be in direct or network communication and the game application 6518 can be executed by the NFT platform 6500 for game play via the client device 825. Other configurations, combinations and connections are likewise possible.

Figure 14B:
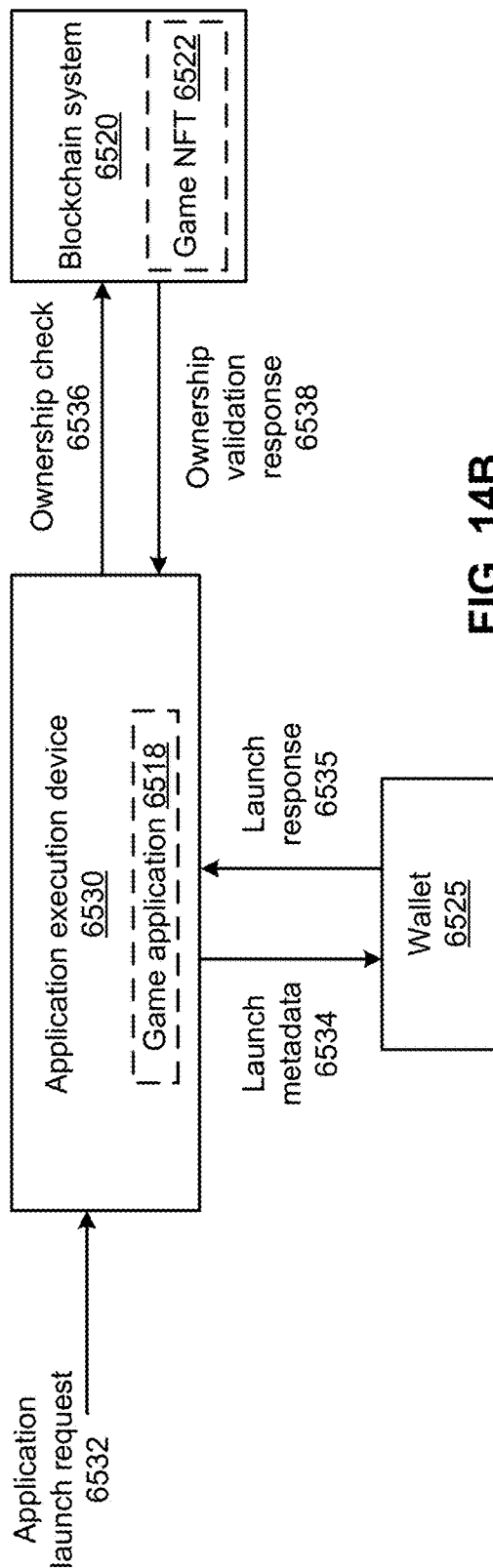
FIG. 14B presents a block diagram representation of an example system.

FIG. 14B presents a block diagram representation of an example system. In the example shown, an application execution device 6530 stores the game application 6518 for execution having a game NFT 6522 associated therewith. Similar devices shown in FIG. 14A are represented by similar reference numerals. The application execution device can be a client device 825, an NFT platform 800 or other NFT platform or other device for executing the game application 6518 to facilitate play of the game.

In operation, the application execution device 6530 operates in response to application launch request 6532 for the game application 6518. This application launch request 6532 can be received (internally) from a user interface associated with the application execution device 6530 (e.g. a client device or NFT platform) and/or received from an external device such as a client device, when for example, the application execution device 6530 corresponds to an NFT platform in communication with a client device. Once execution of the gaming application is initiated in response to the application launch request 6532, launch metadata 6534 is generated, for example, to determine if the launch request can be validated. The launch metadata 6534 is sent to the wallet 6525 containing a private key associated with the game NFT 6522 associated with a user, such as a user of the application execution device and/or the application execution device 6530. The application execution device 6530 receives from the wallet 6526, a launch response 6535 that is generated based on the private key. The game application generates, based on the launch response 6536, an ownership check 6536 that is sent to the blockchain system 6520 that stores the game NFT 6522. An ownership validation response 6538 is received from the blockchain system 6520 that enables play of the game via the game application 6518 when the ownership validation response 6538 indicates ownership of the game NFT is verified and prevents play of the game via the game application 6518 when the ownership validation response 6538 indicates ownership of the game NFT is not verified. When not verified, the game application 6518 can, for example, shut itself down. In this fashion, the game application 6518 can self-validate on launch to verify ownership using game NFT data in a user's wallet which holds the private key to the game NFT 6522.

In various examples, the launch metadata 6534 can include a current date and time, expiration information (if any) and a version number of the game application 6518, a counter that indicates a number of times the application has been executed, and/or other data corresponding to the game NFT 6522, the game application 6518 and/or the launch. The launch response 6535 can include a public key associated with the game NFT 6522, a signed hash that is based on the private key, the launch metadata 6534, and/or other data/metadata to be used to validate the NFT data from the wallet 6525 to the game NFT 6522. In this fashion, the private key is not shared directly with the application binary—and instead is merely used by the wallet 6525 in a secure fashion.

The ownership check 6536 can include information from the launch response 6535, additional owner/user information, such as user authentication data, associated with the user and/or owner of the game NFT 6522 and or other and/or other data/metadata to be used to validate the NFT data from the wallet 6525 to the game NFT 6522. In various examples, the blockchain system 6520 can include an NFT transaction authenticator 6022, a secure real-time NFT metadata repository 6024 and an NFT source 6026 that actually stores the game NFT 6522 on a blockchain or other decentralized computer system/network and user authentication/NFT validation can take place, for example as described in conjunction with FIGS. 12A-12D.

Figure 14C:
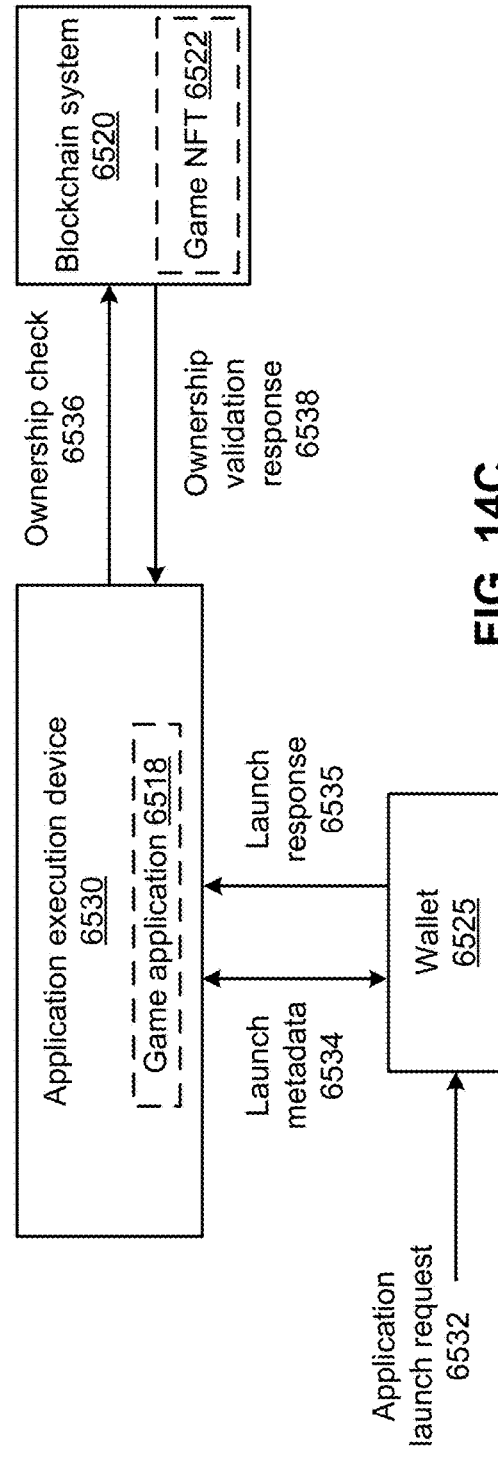
FIG. 14C presents a block diagram representation of an example system.

FIG. 14C presents a block diagram representation of an example system. This system operates similarly to the system of FIG. 14B, however, the application launch request 6532 is received directly from the wallet 6525.

Figure 14D:
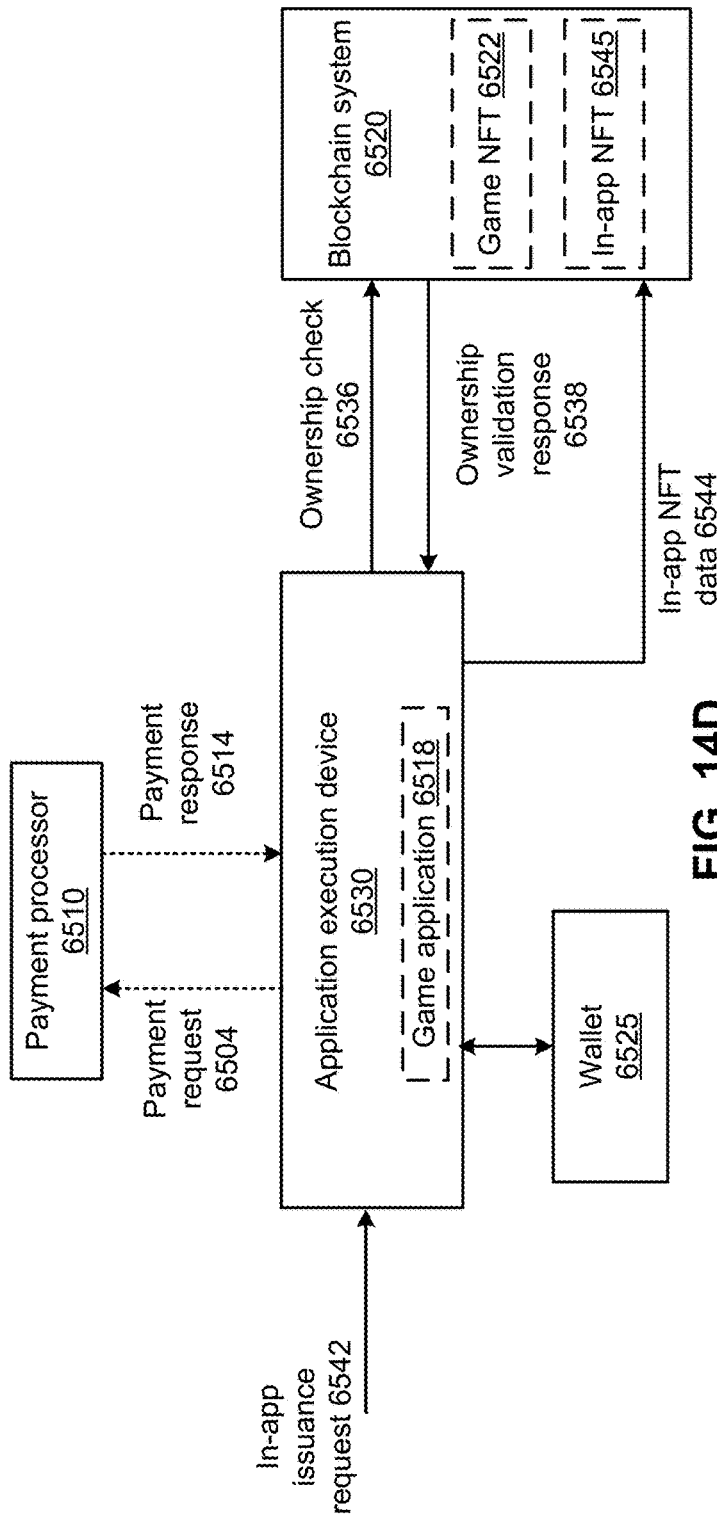
FIG. 14D presents a block diagram representation of an example system.

FIG. 14D presents a block diagram representation of an example system. These examples address a scenario where NFT's can be issued in-application (in-app NFTs). These in-app NFTs can correspond to collected or collectable items, achievements, purchased items, and or other NFTs that can be purchased or collected in-app. For example, first launch for a new user can issue an unsealing/open box NFT that is the digital equivalent of opening the box of a physical good and collecting a prize. These in-app NFT's can be tied to the user/owner of the game NFT 6522 and/or tied to a particular instance of the game application 6518. This allows some NFTs to be transferred when ownership of the game application is transferred via sale or micro-loan of the game NFT 6518. In other examples, the in-app NFTs can be independently sold and disassociated with the game NFT 6522.

In various examples, the application execution device 6530 receives an in-app issuance request 6542 from a gaming application 6518 that was generated either automatically or in response to user interaction with the game. The application execution device 6530 responds by facilitating, based on in-app NFT data 6544, the minting of an in-game NFT 6545 associated with the electronic game based on an authentication of the ownership of the game application 6518 via ownership of the associated game NFT 6522 by the user/owner that is playing the game.

In various examples, the system operates by: generating, via the application execution device 6530, an ownership check 6536; sending the ownership check 6536 to a blockchain system 6520 that stores a game NFT 6522 associated with the electronic game and the user; receiving, from the blockchain system 6520, an ownership validation response 6538; and facilitating, via the game application 6518, a minting of the in-app NFT 6545 when the ownership validation response 6538 indicates ownership of the game NFT 6518 is verified.

In this example shown, an ownership check 6536 is initiated not only on launch of the game application 6518, but also when an in-app issuance request 6542 is initiated to generate an in-app NFT. The in-app NFT 6546 is only minted when a favorable ownership validation response 6538 is received indicating validated ownership and/or user authentication. Furthermore, a favorable payment response 6514 may be required when the in-app issuance request 6542 has an associated cost. Otherwise, if payment is denied or ownership validation fails, the requested in-app NFT 6542 is not minted.

Figure 14E:
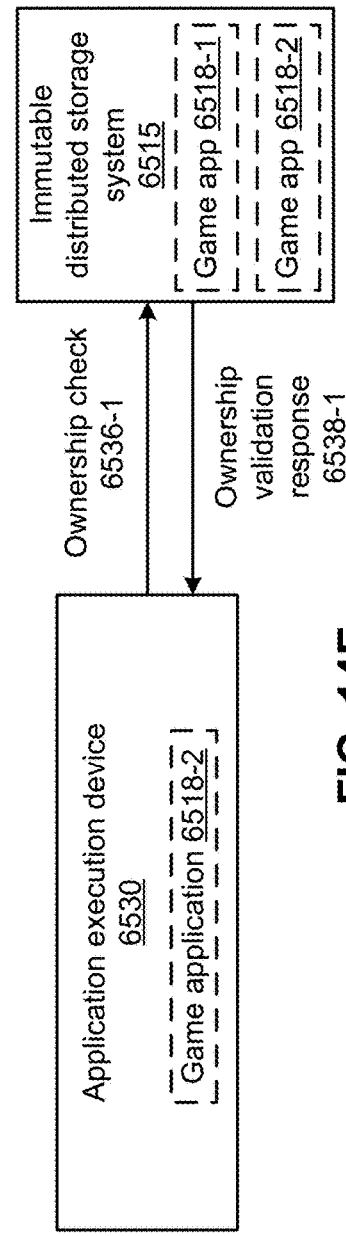
FIG. 14E presents a block diagram representation of an example system.

FIG. 14E presents a block diagram representation of an example system. In various examples, game application 6518 starts with a root version that can be designed as 6518-1. As bugs are fixed and new updates are released, new versions of the game application (6518-2, 8518-3 . . . ) can be created. Consider the following example, where the immutable storage system 6515 includes an IPFS file system.

The game application 6518-1 can be uploaded and an IPFS hash of the content (a "CID," or content address) is generated that is used to make an IPFS URL (ipfs://<cid>). This IPFS URL can be included in the NFT data of the game NFT to refer to off-chain data (e.g., the metadata field in game NFT, the field in your metadata corresponding to the content—in this case the game application) as a pointer to the content itself. When there is a request to retrieve the game application 6518-1, the NFT data can be accessed from the decentralized IPFS network from any peer that has the content. CIDs reference immutable content stored via a blockchain so that the game application that is accessed is the content referenced in the game NFT. The game application 6518-1 can be fetched directly, via a public IPFS gateway, or by using an IPFS Desktop application or via an IPFS command line.

When a new version of the game application, designated as 6518-2 is released, a new blockchain can be created with each block in the chain superseding the corresponding blocks from the previous chain. A game NFT for the prior version of the game application 6518-1 can be used to check the blockchain to validate the newer version of the game application 6518-2. For example, when a blockchain for a new version of the game application is created, its metadata can include links/references to one (or all) prior versions that are stored in the immutable storage system 6515. In this fashion, an ownership check associated with a newer version can determine that a prior version has been superseded when the newer version includes references to that prior version. While a direct ownership check based on older NFT may initially fail because the corresponding older version has been superseded, the immutable storage system 6515 can then attempt ownership checks associated with one or more prior versions until either ownership is validated for one of the prior versions or there are no remaining prior versions to check.

Considering the example shown, the immutable storage system 6515 stores versions 6518-1 and 6518-2 of the game application via a blockchain or other decentralized computer network. When the game application 6518-2 is launched by an application execution device 6530, an ownership check 6536-1 is generated in accordance with a game NFT generated based on a prior game version of the game application 6518-1. The immutable distributed storage system 6515 operates by determining when the ownership check 6536-1 is validated to the prior game version 6518-1 and furthermore determining when the prior game version 6518-1 has been superseded by the current game version 6518-2. The ownership validation response 6538-1 is generated to indicate ownership validation only when both the ownership check 6536-1 is validated to the prior game version 6518-1 and when the prior game version 6518-2 has been superseded by the current game version. These two steps can be performed via the one process described above or via separate processes.

Figure 14F:
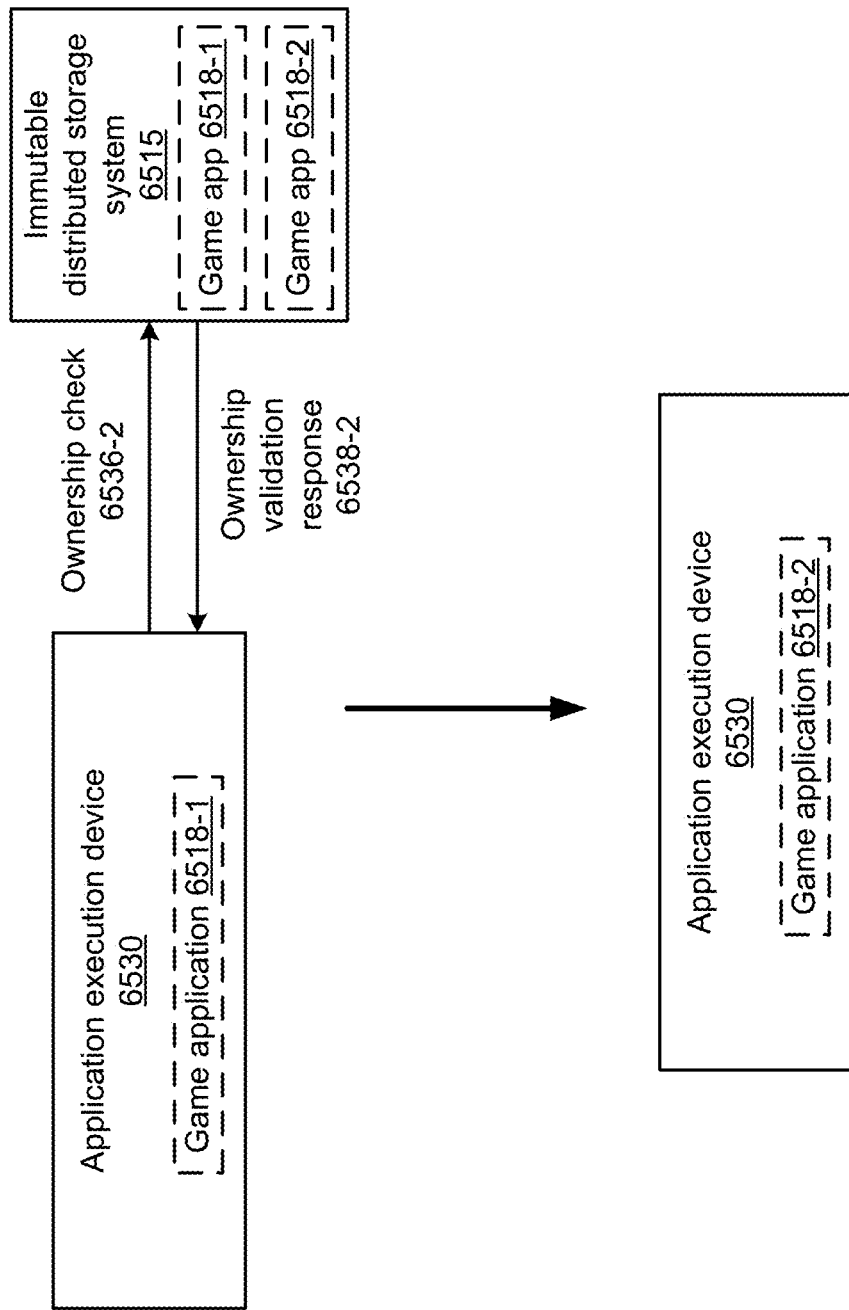
FIG. 14F presents a block/flow diagram representation of an example system.

FIG. 14F presents a block/flow diagram representation of an example system. In various examples the immutable distributed storage system 6515 can also determine when updates of a game application are available and facilitate the download of such updates.

Consider the following example. When the game application 6518-1 is launched by an application execution device 6530, an ownership check 6536-2 is generated in accordance with a game NFT generated based on the (original) game version of the game application 6518-1. The immutable distributed storage system 6515 operates by determining when the ownership check 6536-2 is validated to the game version 6518-1 and furthermore determining when the game version 6518-1 has been superseded by the current game version 6518-2. In this case, the ownership check can be validated on the first instance since the launch metadata/response data corresponds to the version of the game application that is being launched. The immutable distributed storage system 6515 can, for example, also search the metadata, a version list associated with the game application or other data structure, to determine and identify another version of the game that supersedes the version being launched. If both conditions are met, the ownership validation response 6538-2 is generated to indicate that the updated game application 6518-2 is available. Furthermore, the immutable distributed storage system 6515 can facilitate access, by the application execution device 6530, to the updated gaming application 6518-2. This facilitation can be performed by coordinating with the application execution device 6530 to download the game application 6518-2 as shown. The updated gaming application 6518-2 can then be launched and validated as previously described in conjunction with FIG. 14E.

FIG. 14G presents a flowchart representation of an example method. In particular, a method 6550-1 is presented for use in conjunction with any of the functions and features described herein. Step 6552-1 includes receiving, at the NFT platform and from a client device, a purchase request for a game application associated with an electronic game. Step 6554-1 includes generating a payment request in response to the purchase request. Step 6556-1 includes receiving a payment response verifying the payment request. Step 6558-1 includes facilitating, in response to the payment response verifying the payment request, via the processor, a minting of a game NFT associated with the electronic game authenticating the purchase of the game application.

In various examples, the application data associated with the game application is stored via an immutable distributed storage system. The game NFT can operate to enable play of the electronic game via the client device. Minting of the game NFT can include generation or retrieval of a private key to be associated with the game NFT and the method can further include facilitating storage, via a wallet associated with a user of the client device, of the private key associated with the game NFT.

FIG. 14H presents a flowchart representation of an example method. In particular, a method 6550-2 is presented for use in conjunction with any of the functions and features described herein. Step 6552-2 includes receiving, from a client device, an application launch request for a game application having a game NFT associated therewith. Step 6554-2 includes generating, via the game application and in response to the application launch request, launch metadata. Step 6556-2 includes sending the launch metadata to a wallet associated with a user of the client device, the wallet containing a private key associated with the game NFT.

Step 6558-2 includes receiving, from the wallet, a launch response that is generated based on the private key. Step 6560-2 includes generating, via the game application and based on the launch response, an ownership check. Step 6562-2 includes sending the ownership check to a blockchain system that stores the game NFT. Step 6564-2 includes receiving, from the blockchain system, an ownership validation response. Step 6566-2 includes enabling, via the game application, play of the game when the ownership validation response indicates ownership of the game NFT is verified. Step 6568-2 includes preventing, via the game application, play of the game when the ownership validation response indicates the ownership of the game NFT is not verified.

In various examples, the application data associated with the game application is stored via an immutable distributed storage system. The game NFT can enable play of the electronic game via the client device. The game NFT can include generation of a private key associated with the game NFT and the method can further include facilitating storage, via a wallet associated with a user of the client device, of the private key associated with the game NFT.

Figure 14I:
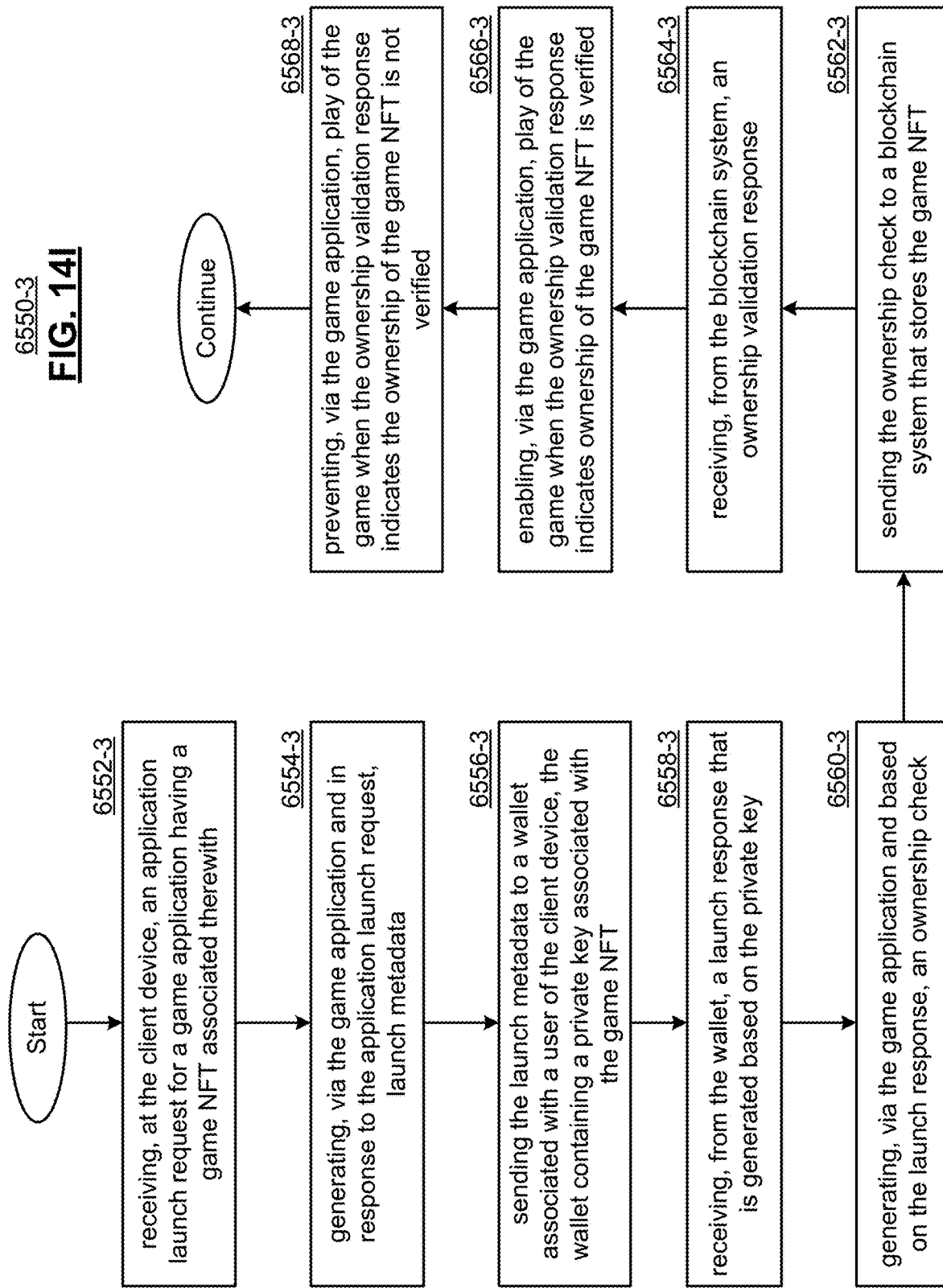
FIG. 14I presents a flowchart representation of an example method.

FIG. 14I presents a flowchart representation of an example method. In particular, a method 6550-3 is presented for use in conjunction with any of the functions and features described herein. Step 6552-3 includes receiving, at the client device, an application launch request for a game application having a game NFT associated therewith. Step 6554-3 includes generating, via the game application and in response to the application launch request, launch metadata. Step 6556-3 includes sending the launch metadata to a wallet associated with a user of the client device, the wallet containing a private key associated with the game NFT. Step 6558-3 includes receiving, from the wallet, a launch response that is generated based on the private key.

Step 6560-3 includes generating, via the game application and based on the launch response, an ownership check. Step 6562-3 includes sending the ownership check to a blockchain system that stores the game NFT. Step 6564-3 includes receiving, from the blockchain system, an ownership validation response. Step 6566-3 includes enabling, via the game application, play of the game when the ownership validation response indicates ownership of the game NFT is verified. Step 6568-3 includes preventing, via the game application, play of the game when the ownership validation response indicates the ownership of the game NFT is not verified.

Figure 14J:
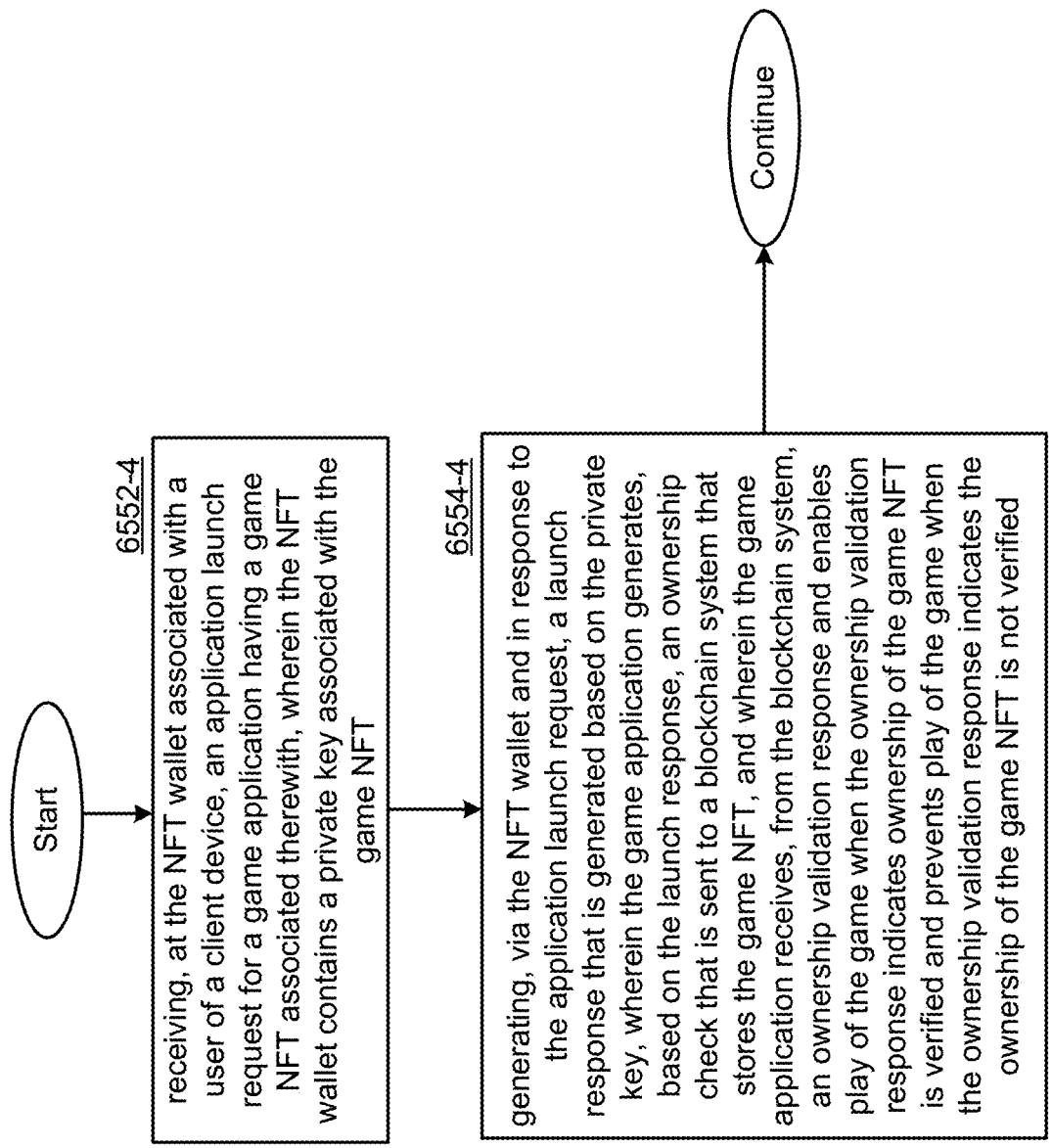
FIG. 14J presents a flowchart representation of an example method.

FIG. 14J presents a flowchart representation of an example method. In particular, a method 6550-4 is presented for use in conjunction with any of the functions and features described herein. Step 6552-4 includes receiving, at the NFT wallet associated with a user of a client device, an application launch request for a game application having a game NFT associated therewith, wherein the NFT wallet contains a private key associated with the game NFT. Step 6554-4 includes generating, via the NFT wallet and in response to the application launch request, a launch response that is generated based on the private key, wherein the game application generates, based on the launch response, an ownership check that is sent to a blockchain system that stores the game NFT, and wherein the game application receives, from the blockchain system, an ownership validation response and enables play of the game when the ownership validation response indicates ownership of the game NFT is verified and prevents play of the game when the ownership validation response indicates the ownership of the game NFT is not verified.

FIG. 14K presents a flowchart representation of an example method. In particular, a method 6550-5 is presented for use in conjunction with any of the functions and features described herein. Step 6552-5 includes receiving, at the NFT platform and from a game application associated with an electronic game played by a user, an in-app issuance request for an in-app NFT. Step 6554-5 includes generating, via the NFT platform, an ownership check. Step 6556-5 includes sending the ownership check to a blockchain system that stores a game NFT associated with the electronic game and the user. Step 6558-5 includes receiving, from the blockchain system, an ownership validation response. Step 6560-5 includes facilitating, via the game application, a minting of the in-app NFT when the ownership validation response indicates ownership of the game NFT is verified.

In various examples, the method further includes: generating a payment request in response to the purchase request; and receiving a payment response verifying the payment request; wherein the ownership check is generated in response to the payment response. The in-app NFT can have in-app NFT metadata associated therewith, wherein the in-app NFT metadata includes one or more of: an achievement data associated with the electronic game and the user, an application identifier associated with the electronic game, a user identifier associated with the user or an instance identifier indicating an instance of the electronic game associated with the user.

FIG. 14L presents a flowchart representation of an example method. In particular, a method 6550-6 is presented for use in conjunction with any of the functions and features described herein. Step 6552-6 includes receiving, at the blockchain system and from a game application associated with an electronic game, an ownership check generated in accordance with a game non-fungible token (NFT), wherein the game application is associated with a current game version of the game application and the game NFT was generated based on a prior game version of the game application. Step 6554-6 includes determining, via the blockchain system, when the ownership check is validated to the prior game version. Step 6556-6 includes determining, via the blockchain system, when the prior game version has been superseded by the current game version. Step 6558-6 includes generating an ownership validation response indicating ownership validation when the ownership check is validated to the prior game version and when the prior game version has been superseded by the current game version.

FIG. 14M presents a flowchart representation of an example method. In particular, a method 6550-7 is presented for use in conjunction with any of the functions and features described herein. Step 6552-7 includes receiving, from a client device, an application launch request for a game application having a game NFT associated therewith. Step 6554-7 includes generating, via the game application and in response to the application launch request, launch metadata. Step 6556-7 includes sending the launch metadata to a wallet associated with a user of the client device, the wallet containing a private key associated with the game NFT. Step 6558-7 includes receiving, from the wallet, a launch response that is generated based on the private key. Step 6560-7 includes generating, via the game application and based on the launch response, an ownership check.

Step 6562-7 includes sending the ownership check to a blockchain system that stores the game NFT. Step 6564-7 includes receiving, from the blockchain system, an ownership validation response that indicates an updated game application is available. Step 6566-7 includes facilitating access, by the client device, to the updated gaming application.

FIG. 14N presents a flowchart representation of an example method. In particular, a method 6550-8 is presented for use in conjunction with any of the functions and features described herein. Step 6552-8 includes receiving an application launch request for a game application having a game non-fungible token (NFT) associated therewith. Step 6554-8 includes generating, via the game application and in response to the application launch request, launch metadata. Step 6556-8 includes sending the launch metadata to an NFT wallet, the NFT wallet containing a private key associated with the game NFT. Step 6568-8 includes receiving, from the NFT wallet, a launch response that is generated based on the private key.

Step 6560-8 includes generating, via the game application and based on the launch response, an ownership check. Step 6562-8 includes sending the ownership check to a blockchain system that stores the game NFT. Step 6564-8 includes receiving, from the blockchain system, an ownership validation response. Step 6566-8 includes enabling, via the game application, play of the game when the ownership validation response indicates ownership of the game NFT is verified.

In various examples, the method includes preventing, via the game application, play of the game when the ownership validation response indicates the ownership of the game NFT is not verified. The application data associated with the game application can be stored via an immutable distributed storage system and be downloaded to a client device or NFT platform for execution of the game application. The application launch request can be generated by a client device, and wherein the game application is executed via the client device or via an NFT platform in communication with the client device.

In various examples, the ownership validation response indicates when an updated game application is available and the method further includes: facilitating access to the updated gaming application when the updated game application is available. The application launch request can be generated by a client device, wherein the gaming application is executed by the client device, and wherein facilitating access to the updated gaming application includes downloading the updated gaming application to the client device for execution via the client device. The application launch request can be generated by a client device, wherein the gaming application is executed by an NFT platform in communication with the client device, and wherein facilitating access to the updated gaming application includes downloading the updated gaming application to the NFT platform for execution via the NFT platform.

While the forgoing systems and methods of FIGS. 14A-14N have focused on game NFTs, these systems and methods could likewise be applied to NFTs associated with other applications, other media and/or other types of NFTs. Furthermore, the applications and techniques associated with NFTs previously described in this application, and in copending U.S. application Ser. No. 17/656,084 entitled, FACILITATING PLAY OF GAME NFTS VIA A CLIENT DEVICE, can likewise be applied to game NFTs as well.

Figure 15A:
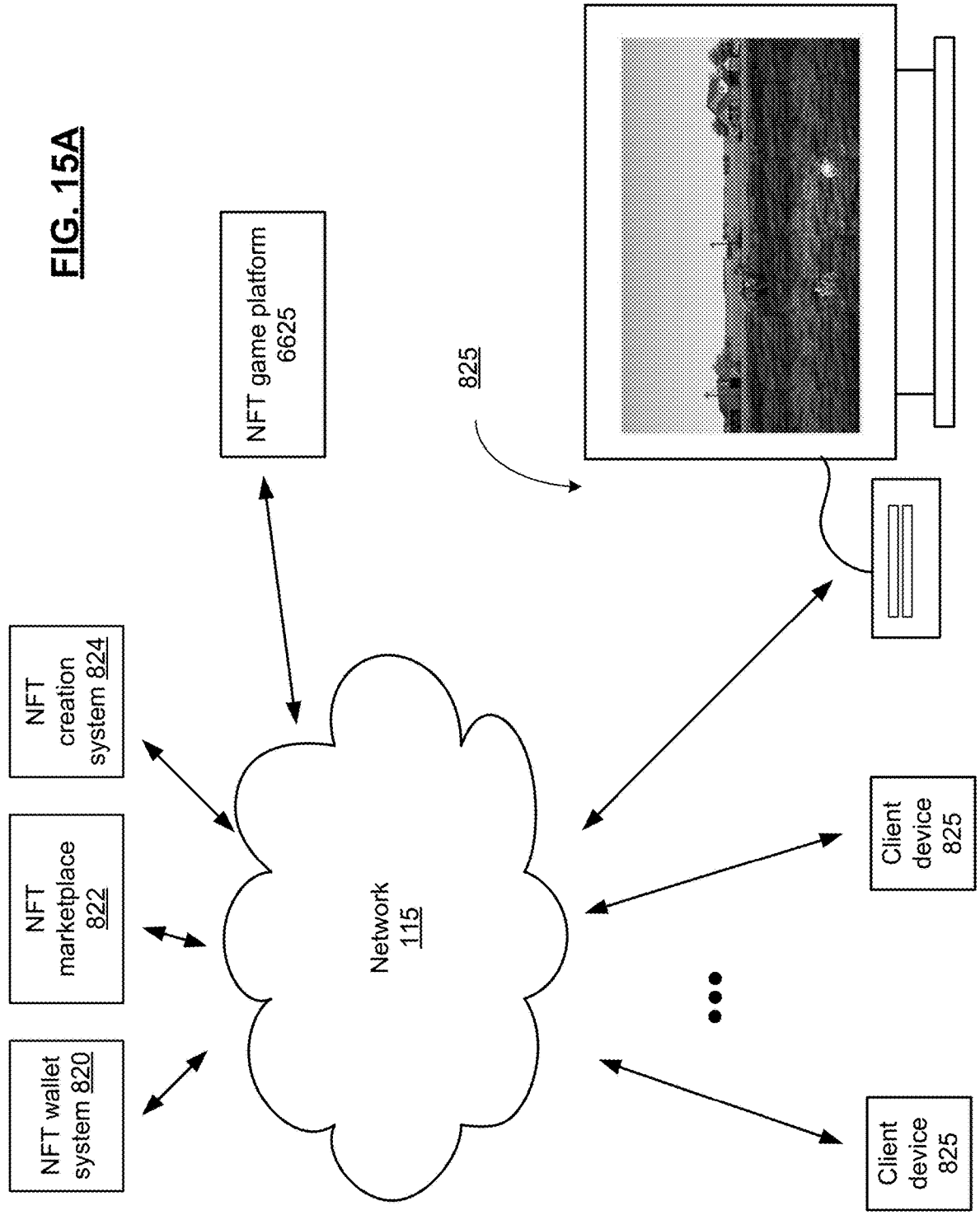
FIG. 15A presents a block diagram representation of an example system.

FIG. 15A presents a block diagram representation of an example system. In the example shown, a user of an NFT game platform 6625 has accessed, via a client device associated with the user such as client device 825, a multiplayer game playable by the user in conjunction with users of other client devices 825. The NFT game platform can be implemented via NFT game platform 6500, NFT collection platform 800, NFT distribution platform 2800, and/or other NFT platform that can include or operate in conjunction with NFT transaction authenticator 6022, NFT source 6026, secure real-time NFT metadata repository 6024, NFT wallet system 820, NFT marketplace 822, NFT creation system 824, and/or other tools, devices and systems described herein.

The NFT game platform 6625 and/or associated client device 825 improves the technology of NFT systems and existing gaming platforms by allowing the user to generate, store, collect, display and use NFTs that enable game play of the associated multiplayer games. These NFTs may be game NFTs as previously discussed that allow a user to access game applications that are stored via blockchain or other immutable storage via the game NFT. These NFTs may also be "game token" NFTs that, while not associated with storage and/or authentication of the game application itself, nevertheless are associated with a user's ownership of and/or access to a particular game and can be used by a game application, client device 825 and/or game platform 6625 to provide authenticated access by the user to a game that, for example can be executed and/or streamed to a user's client device. Like the game NFT's previously discussed, the game token NFTs can be collected, traded, sold or loaned for play of the game by others.

Figure 15B:
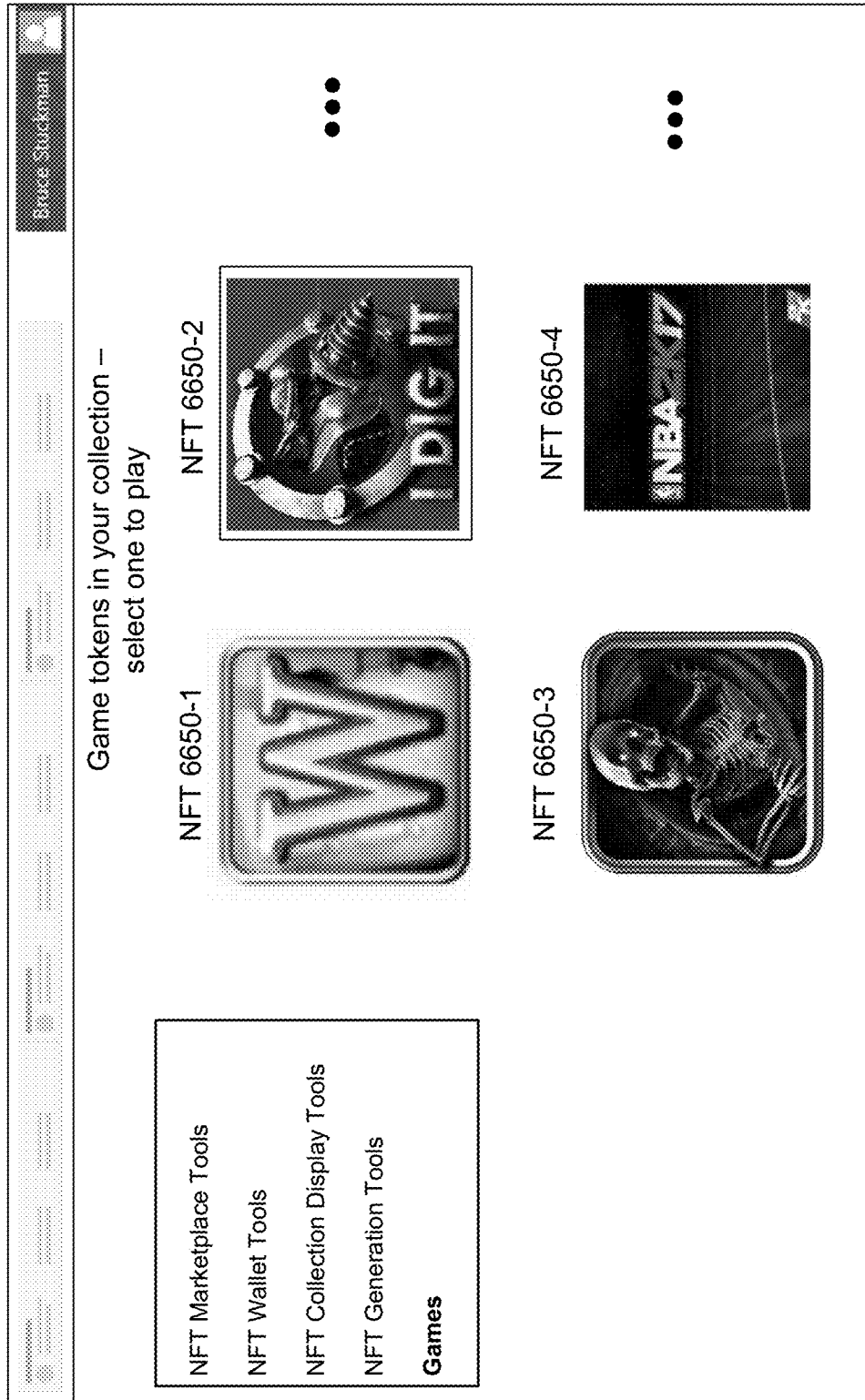
FIGS. 15B-15J present pictorial representations of example screen displays.

FIGS. 15B-15J present pictorial representations of example screen displays. In FIG. 15B, the user's collection of game token NFTs includes NFTs 6650-1, 6650-2, 6650-3, and 6650-4, etc. In various embodiments the collection display can be arranged by the user or automatically sorted into categories such as genre's or other groupings based on metadata associated with each of the NFTs.

Figure 15C:
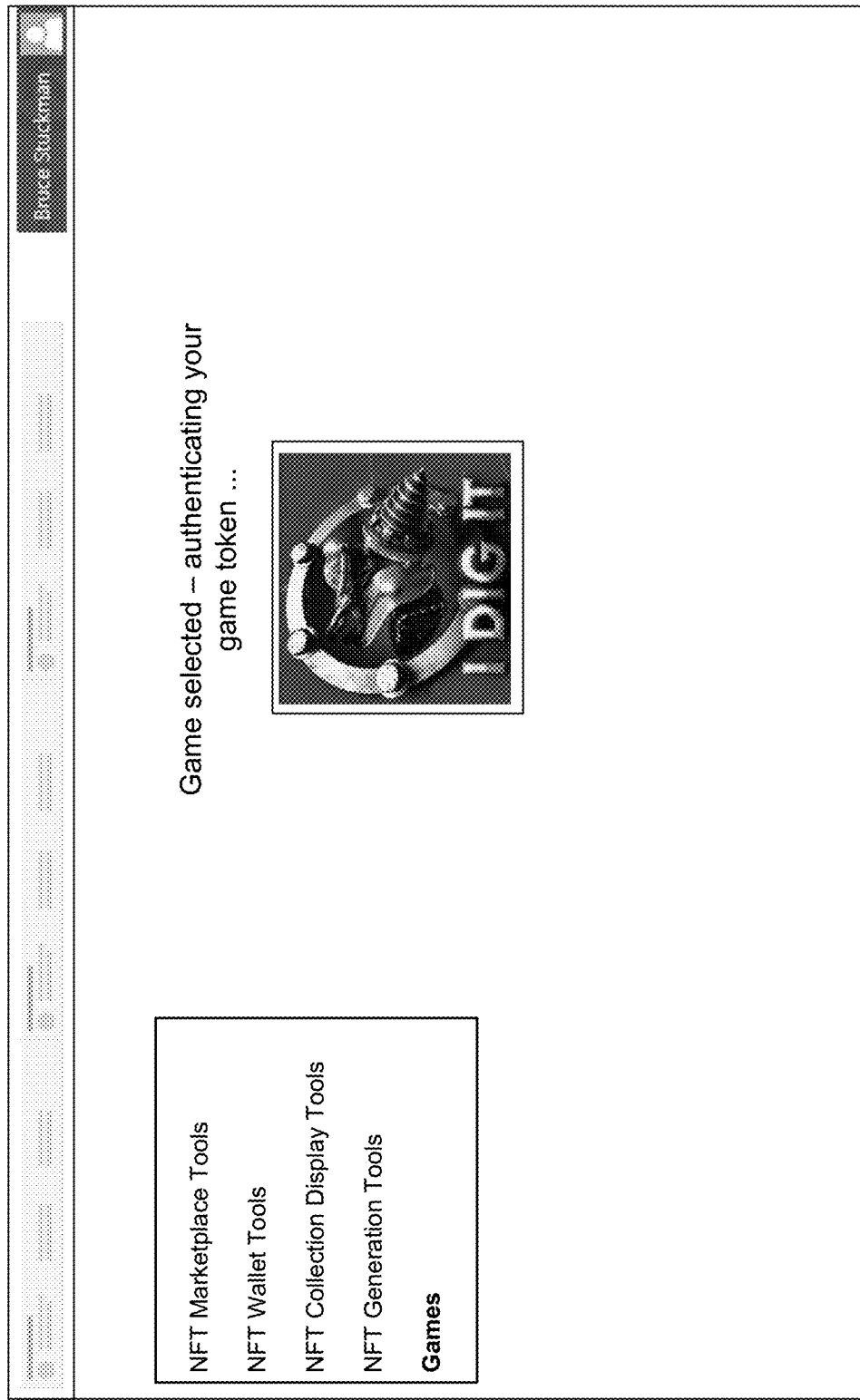
Figure 15D:
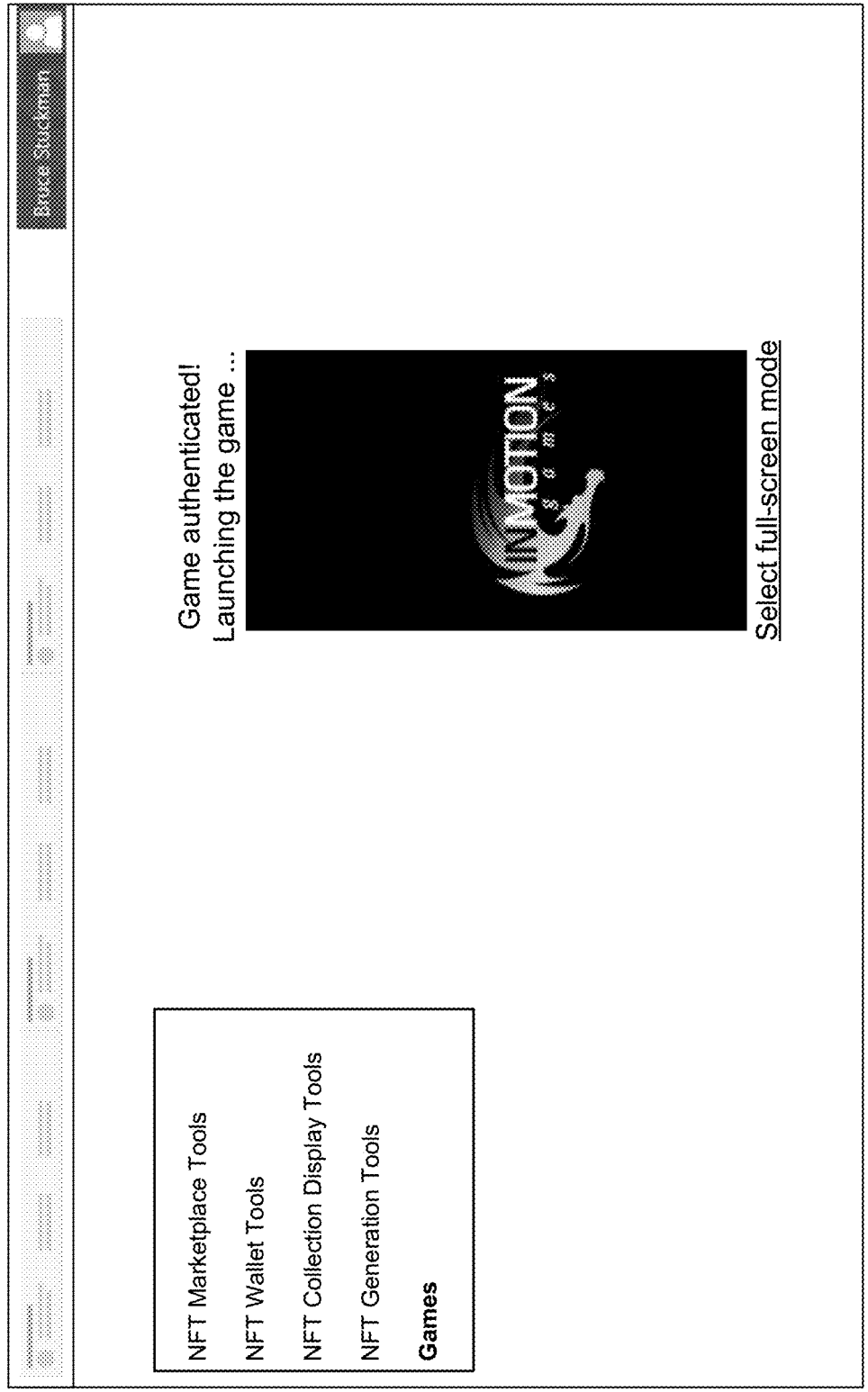

In the example shown, the platform has generated display data associated with a customized collection display that contains the plurality of game token NFTs for display via a graphical user interface associated with the client device. Furthermore, the user has interacted with the graphical user interface and indicated a selection of one the plurality of game token NFTs for play—in this case, the game "I Dig It". The selection is received by the platform which responds by interacting, via the network 115, with a client device 825 to authenticate the user's access to the game via validation of the game token NFT as shown in FIG. 15C. In this fashion, the play of the selected game can be enabled for the user and/or other user's also having their own valid game token NFTs corresponding to the game as shown in FIG. 15D. Conversely, a user attempting to play without an associated game token NFT can be prevented access to the game.

NFT game platform 6625 can support other use of NFTs in conjunction with games, such as multiplayer games. Consider a multiplayer game that allows players to mine for or otherwise collect NFTs that are dropped in the game at various times, included in game levels, dropped in the game for tournaments and/or otherwise placed in a game to be issued to the first player that is able to find or otherwise earn the NFT. In various examples, the types of NFTs that are collected can fall within three different categories that are described below.

Non-Utilitarian Game NFT

This is a game-related NFT (that is specific to the game) that is collected or earned via game play of a game and that provides no benefit (direct or indirect) to the player in the game—but rather may derive value as a as a symbol of the player's prowess and/or as collector's item that may be bartered or sold apart from the game. An example is a winner's trophy or badge NFT that represents an accomplishment but that does not provide any tangible benefit in terms of player abilities, to the player (or the player's character) within the game itself—other than, optionally, as a symbol of the player's status. A further example is a NFT associated with a sponsor that may or may not provide subsidiary benefits with respect to a sponsor's products and/or services—but no benefits to the user's play of the game.

Direct-Beneficial Game NFT

This is a game-related NFT (that is specific to the game) that is purchased, collected or earned via game play of a game and that provides a direct benefit to the player in the game by enabling and/or automatically providing player access to player abilities, advantages, enhanced skills, unlocking additional features, and/or automatically providing player access to other enhancements to the player's character that are nonfungible, unique or of a limited nature, and associated with the NFT. Examples include an NFT associated with a unique or one of a limited set of weapons, armor or other game artifacts, a unique plot of metaverse game real estate, access to a new and/or hidden level of the game, a player token associated with the player's character or new character to be used by the player or other direct benefit to the player or player's character within the game.

Indirect-Beneficial Game NFT

This is a game-related NFT that is purchased, collected or earned via game play of a game and that provides an indirect benefit to the player in the game, by providing one or more tokens, points or game currency that are fungible and not unique to the NFT (i.e could be gathered or earned in different ways), but which a player may choose to convert to direct benefits such as advantages, enhanced skills, unlocking additional features, and/or access to other enhancements to the player's character. Examples include a game token that allows a player to play again, an NFT which entitles a player to certain benefits only after other NFTs have been collected (i.e. having a contingent benefit), a level-up benefit which could be achieved in other ways, and/or points or game currency that can be achieved in other ways and that can be converted, at the player's discretion, into a direct benefit to the player or player's character within the game.

Figure 15G:
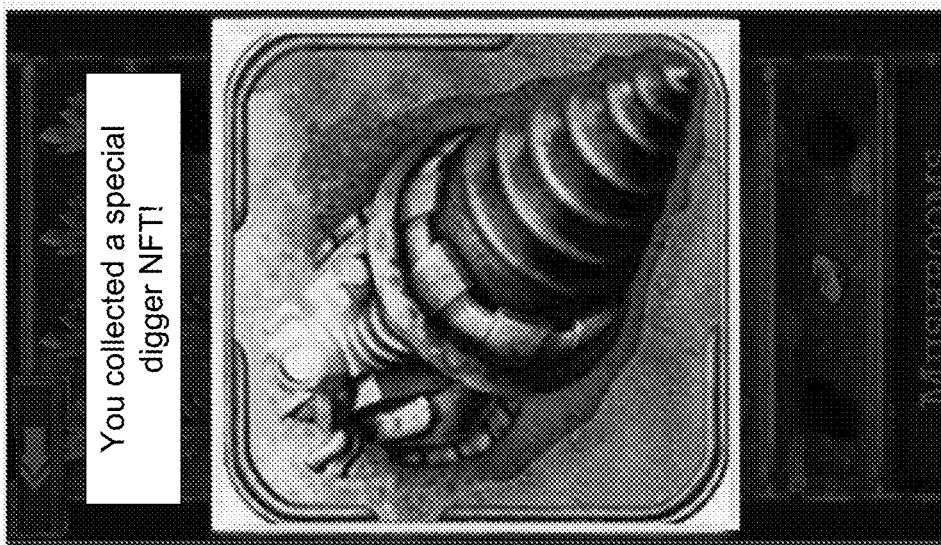
Figure 15F:
Figure 15E:
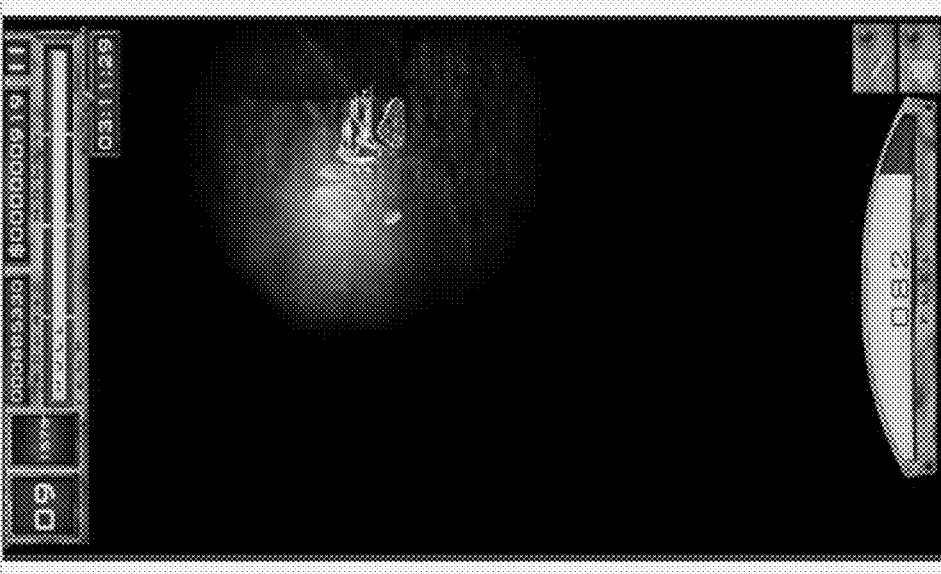

Consider the screen shown in FIG. 15E of a multiplayer I Dig It game. The player's character is a digger that is digging/mining to collect dig up stuff ("diggins") that can be collected by the player that first finds them and sold in the game in exchange for game currency that can be used to fuel and/or upgrade the player's digger. One or more of these diggins can be NFTs including one or more Non-Utilitarian Game NFTs, one or more Direct-Beneficial Game NFTs and/or one or more Indirect-Beneficial Game NFTs.

In various examples, either during regular game play or during a limited time tournaments, multiplayer games are populated with players in groups of N (say 6, 10, 25, 100, etc.), so that the number of competitors are limited and the processing resources required for each game can be capped to a maximum level. In this fashion, multiple games/tournaments can be formed serially and/or contemporaneously as each new game/tournament is filled until a maximum number of games/tournaments is reached. This improves the technology of multiplayer gaming by allowing processing resources to be predicted and allocated more efficiently to support multiple games.

For each game/tournament, a fixed number of NFTs are created and virtually buried in the I Dig It world for each tournament (X NFTs per tournament). These NFTs could be, for example, one or more Non-Utilitarian Game NFTs, one or more Direct-Beneficial Game NFTs and/or one or more Indirect-Beneficial Game NFTs that are each either original NFTs or derivative NFTs in a limited series. The players can play normally and look for resources and regular prizes but also could find an NFT. The first to find an NFT can collect the NFT (a game-collected NFT) which is then issued to the player. The game display can include a score board of player scores that also indicates NFTs found—how many are left etc. Players not finding NFTs can access information indicating others who won NFTs and where they were found in the virtual world.

In various examples, the game platform 6625 further operates via individual instances of the game application being executed for each player that operate independently in most circumstances with only a limit the number of server interactions that are each triggered by special circumstances within the game. This allows the game platform 6625 to support more players in each game/tournament and/or more contemporaneous games/tournaments with fewer processing resources. In various examples, each game application includes a player dashboard that includes game clock that presents a display of time left in the particular game/tournament that is synchronized when a player starts the game/tournament. To collect NFTs and/or to add to their score, players must enter and drop off their loot/diggins at a particular check-in location in the game (i.e., a verification site). This triggers a server interaction which updates the player's score. During this exchange, the player can view a tournament scoreboard that includes scores for other players that have only been updated from the last time each player visited the check-in location.

In various examples, NFTs that were collected by a player can only be officially earned (and issued to the player) if the player is the first to show up with the NFT at the check-in location in the game. Consider the following example process:

A player collects an NFT and the game checks to see if it has already been cashed in/earned by another player;

If not yet collected—the player can pick it up and game provides a warning that the player must successful exit and cash it in at the check-in location in order to earn it.

Once the player arrives at the check-in location with the NFT, the game checks again to see if it previously was cashed in by a previous player. If not, it is awarded (issued) to the player. If so, the player is not awarded the NFT.

In FIG. 15F, a player has collected an example of an Indirect-Beneficial NFT that by itself does not provide additional player abilities, but can be collected at the check-in location (if the player was the first to check-in with this particular NFT). If the NFT was successfully collected (or in other examples, whether the NFT was earned or not), the player also receives a certain amount of game currency that itself can be used as a basis of game score for the player, and/or further can be exchanged to enhance the player's abilities.

Figure 15J:
Figure 15I:
Figure 15H:
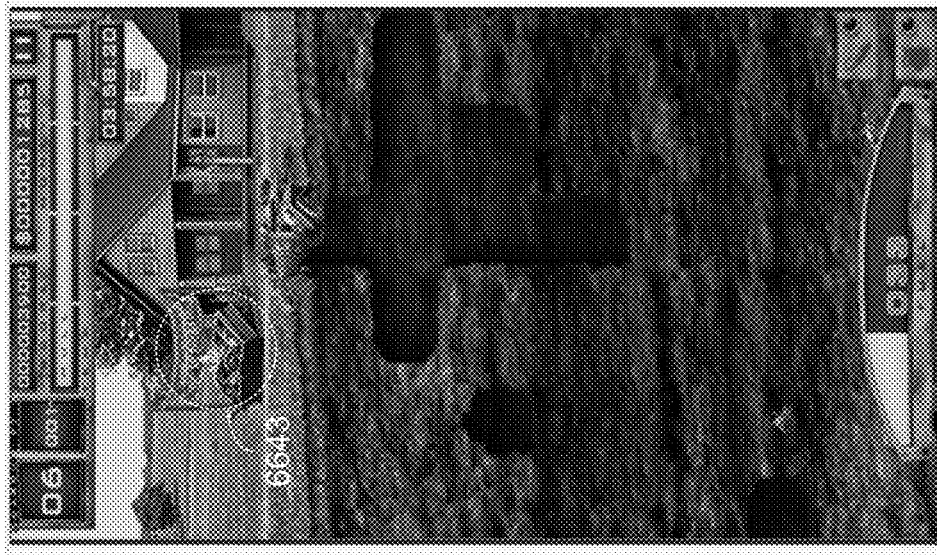

In FIG. 15G, a player has collected an example of a Direct-Beneficial NFT that if successfully collected, not only includes the NFT, but also provides a special enhanced digger to the player. In FIG. 15H, the player's character is approaching a check-in location 6643 in the game. In FIG. 15I, a player has earned an example of a Non-Utilitarian NFT, for winning a particular tournament. This particular Non-Utilitarian NFT can automatically be earned by winning the associated game/tournament without the collection process through the check-in location. In other examples however, other Non-Utilitarian NFTs could be earned through the collection process previously described.

While the prior examples have been focused on the collection of NFTs, similar procedures can be used to earn crypto-currency that has been dropped in a game for possible player collection. In FIG. 15J. a player has collected an Amp Coin.

In various examples, the game platform 6625 can support three different currencies:

A game currency that can only be used in-game, e.g. a game-dependent currency (e.g. game dollars, coins, etc.) that only exists in (or is only relevant to) the game and can be used to purchase resources used in the game. Game currency is earned based on achievements associated with game play either in tournaments and/or regular game play.

A non-game standard (non-crypto) currency—a game-independent currency that exists outside of the game, can also be used to purchase resources used in the game (including the game currency via in-app purchases), but can also be bought/sold by others without relation to the game (e.g. the US dollar).

A non-game crypto-currency, a crypto currency, e.g. a game-independent crypto-currency (e.g. Amp coins, Bit coins, Doge coins, etc.) that exists outside of the game, may or may not be used to purchase resources used in the game, but can be bought/sold by others without relation to the game.

A game crypto-currency, a crypto currency, e.g. a game-based crypto-currency that is unique to the game, and may be used to purchase resources used in the game, but also can be bought/sold by others without relation to the game as collectables or use by other players in the game.

In various examples, non-game crypto-currency can be earned in different ways:

Non-game crypto-currency can be earned based on locating crypto-currency coins during games/tournaments. The first player to successfully collect a coin, earns the coins.

Non-game crypto-currency can also be earned based on game/tournament results. In various examples, amounts of crypto-currency can be awarded to first place, second place, third place, etc. In addition or in the alternative, at the end of the tournament, the first place player takes a percentage of any undiscovered crypto-currency coins (in addition to whatever they found themselves). The second place player takes a lower percentage of undiscovered crypto-currency coins (in addition to whatever they found themselves), etc.

It should be noted that game crypto-currency can be earned in any of the ways described above with respect to non-game crypto-currency.

FIG. 15K presents a block/flow diagram representation of an example system of an example of NFT generation. In the example shown, NFT generation tools 808 operate to convert image data 6620-1 and other data 6622-1 into one or more non-utilitarian NFTs 6624-1. The image data 6620-1 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 6620-1, prior to creating the non-utilitarian NFT 6624-1. In this fashion, one or more non-utilitarian NFT 6624-1 can only be created (e.g. on a derivative basis) when the source NFT or NFTs are verified—preventing the creation of unauthorized or counterfeit NFTs.

The other data 6622-1, can be image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the image data 6620-1.

This other data 6622-1 can be used to generate an NFT and/or combined with the image data 6620-1 to create a dataset that includes both the image data 6620-1 and the other data 6622-1. This other data 6622-1 or combined dataset can be protected via the blockchain decentralized computer network and/or other crypto-based NFT creation technology that is employed by the NFT generation tools 808 and via the NFT creation system 824 to create and protect the new non-utilitarian NFT 6624-1 itself. It should be noted that the non-utilitarian NFT 6624-1 can include a single derivative or a number of derivatives, including a limited series of derivatives. It should be noted further that some or all of the other data 6622-1, including restriction data and/or attribution data, can be derived from one or more original NFTs whose images are associated with the image data 6620-1.

FIG. 15L presents a flowchart representation 6600-1 of an example method. In particular, a method is presented for use in conjunction with one or more functions or features described herein. Step 6602-1 includes receiving, via the processor, an image to be associated with a series of non-utilitarian NFTs corresponding to a multiplayer game. Step 6604-1 includes receiving, via the processor, other data, wherein the other data is also associated with the series of non-utilitarian NFTs. Step 6604-1 includes facilitating creation of the series of non-utilitarian NFTs.

FIG. 15M presents a block/flow diagram representation of an example system of an example of NFT generation. In the example shown, NFT generation tools 808 operate to convert image data 6620-2 and other data 6622-2 into a series of derivative NFTs 6624-2. The image data 6620-2 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 6620-2, prior to creating the non-utilitarian NFT 6624-2. In this fashion, one or more non-utilitarian NFT 6624-2 can only be created (e.g. on a derivative basis) when the source NFT or NFTs are verified—preventing the creation of unauthorized or counterfeit NFTs.

The other data 6622-2 can be any of the other data 6622-1. This other data 6622-2 an image data 6620-2 can be protected via the blockchain and/or other crypto-based NFT creation technology that is employed by the NFT generation tools 808 and via the NFT creation system 824 to create and protect the series of derivative NFTs 6624-2. It should be noted that the series of derivative NFTs 6624-2 can include a number of derivatives, including a limited series of derivatives. It should be noted further that some or all of the other data 6622-2, including restriction data and/or attribution data, can be derived from one or more original NFTs whose images are associated with the image data 6620-2.

FIG. 15N presents a flowchart representation 6600-2 of an example method. In particular, a method is presented for use in conjunction with one or more functions or features described herein. Step 6602-2 includes receiving, via the processor, an image to be associated with a series of derivative NFTs corresponding to a multiplayer tournament. Step 6604-2 includes receiving, via the processor, other data, wherein the other data is also associated with the series of derivative NFTs. Step 6602-2 include facilitating creation of the series of derivative NFTs.

FIG. 15O presents a flowchart representation 6600-3 of an example method. In particular, a method is presented for use in conjunction with one or more functions or features described herein. Step 6602-3 includes accessing, via a network interface, a plurality of game token NFTs, each of the plurality of game token NFTs associated with a multiplayer game accessible by a user of a client device. Step 6604-3 includes generating, via the processor, display data associated that the plurality of game token NFTs for display via a graphical user interface of the client device. Step 6606-3 includes receiving, via the graphical user interface, a selection of one the plurality of game token NFTs for play of the associated multiplayer game. Step 6608-3 includes facilitating, via the network interface and in conjunction with the client device, play of the multiplayer game associated with the one of the plurality of game NFTs, when the one of the plurality of game token NFTs is selected.

FIG. 15P presents a flowchart representation 6600-4 of an example method. In particular, a method is presented for use in conjunction with one or more functions or features described herein. Step 6602-4 includes facilitating, via a network interface and in conjunction with a client device, play of a multiplayer game by a player of a plurality of players, wherein the player is associated with the client device. Step 6604-4 includes updating, via the processor, the multiplayer game to reflect that the player has collected an NFT from the multiplayer game when the player is determined to be a first player of a plurality of players to deposit the NFT at a collection verification site in the multiplayer game. Step 6606-4 includes issuing the NFT from the multiplayer game to the player when the player is determined to be the first player of a plurality of players to deposit the NFT at a collection verification site in the multiplayer game.

FIG. 15Q presents a flowchart representation 6600-5 of an example method. In particular, a method is presented for use in conjunction with one or more functions or features described herein. Step 6602-5 includes facilitating, via a network interface and in conjunction with a client device, play of a multiplayer game by a player of a plurality of players, wherein the player is associated with the client device. Step 6604-5 includes updating, via the processor, the multiplayer game to reflect that the player has collected crypto-currency from the multiplayer game when the player is determined to be a first player of a plurality of players to deposit the crypto-currency at a collection verification site in the multiplayer game. Step 6606-5 includes issuing the crypto-currency from the multiplayer game to the player when the player is determined to be the first player of a plurality of players to deposit the crypto-currency at a collection verification site in the multiplayer game.

Figure 15R:
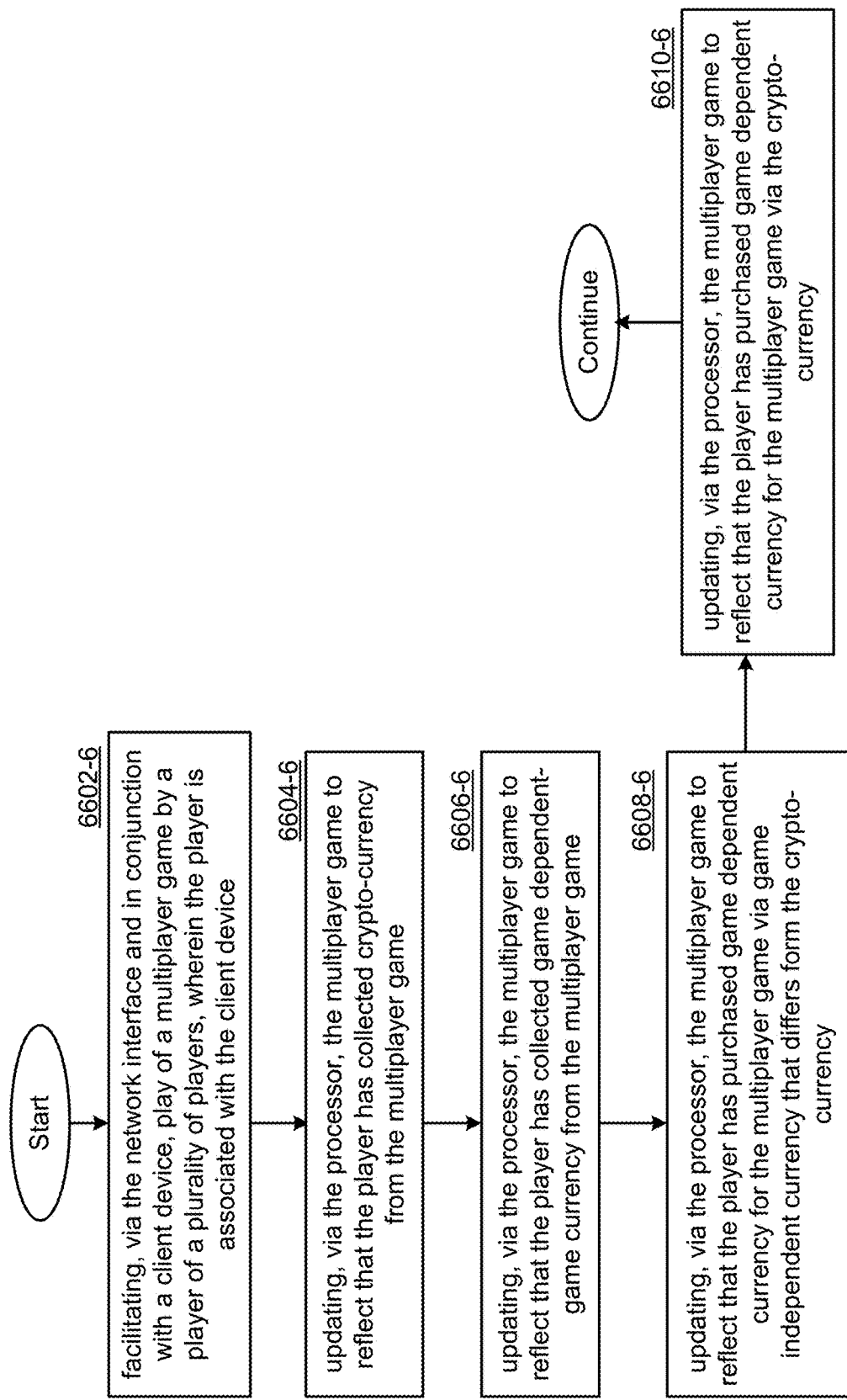
FIG. 15R presents a flowchart representation of an example method.

FIG. 15R presents a flowchart representation 6600-6 of an example method. In particular, a method is presented for use in conjunction with one or more functions or features described herein. Step 6602-6 includes facilitating, via a network interface and in conjunction with a client device, play of a multiplayer game by a player of a plurality of players, wherein the player is associated with the client device. Step 6604-6 includes updating, via the processor, the multiplayer game to reflect that the player has collected crypto-currency from the multiplayer game. Step 6606-6 includes updating, via the processor, the multiplayer game to reflect that the player has collected game dependent-game currency from the multiplayer game. Step 6608-6 includes updating, via the processor, the multiplayer game to reflect that the player has purchased game dependent currency for the multiplayer game via game independent currency that differs from the crypto-currency. Step 6610-6 includes updating, via the processor, the multiplayer game to reflect that the player has purchased game dependent currency for the multiplayer game via the crypto-currency.

Figure 16A:
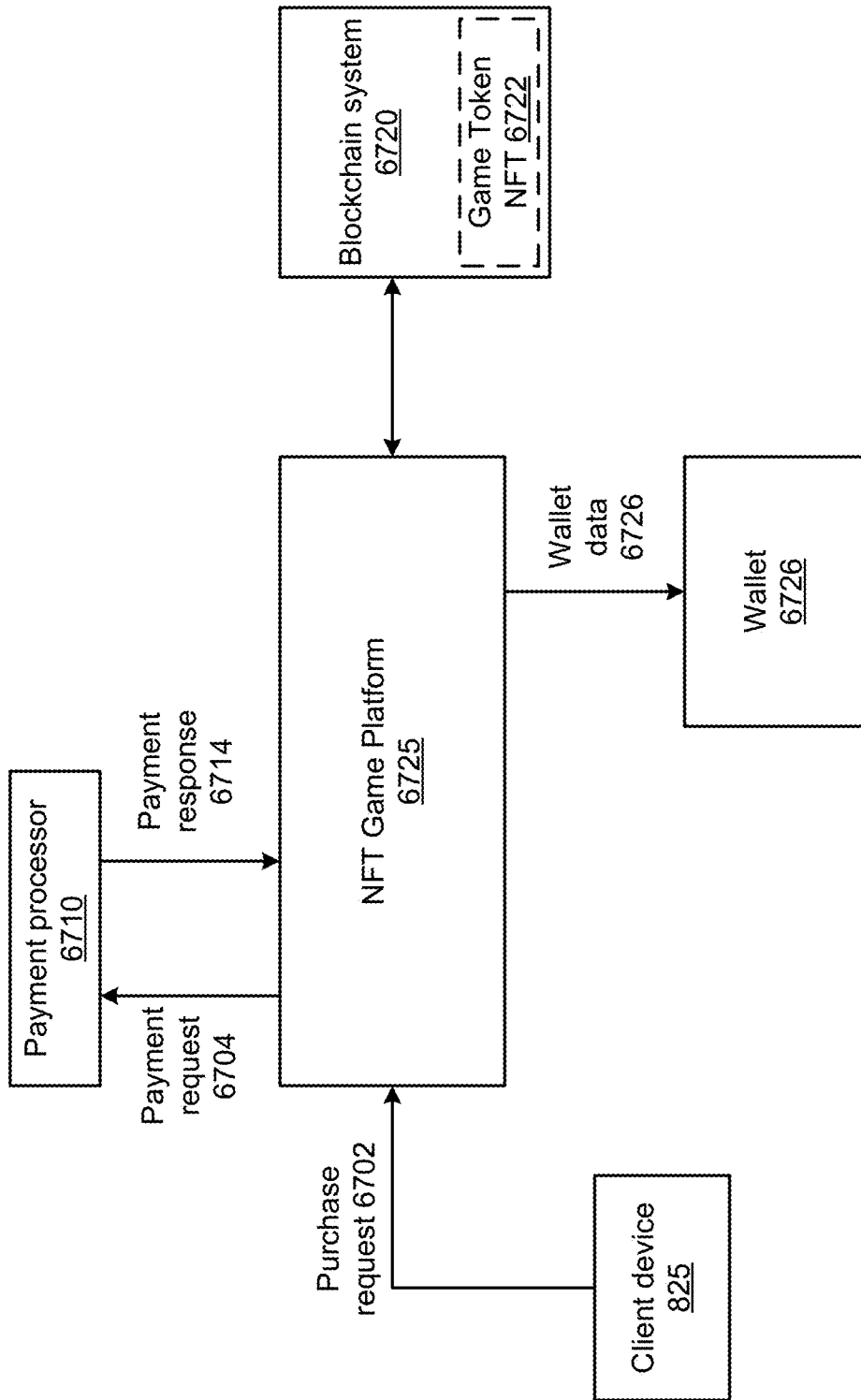
FIG. 16A presents a block diagram representation of an example system.

FIG. 16A presents a block diagram representation of an example system. In the system shown, a game token NFT 6722 is purchased and issued to a particular user of a client device 825. The game token NFT 6722, as previously discussed, while not associated with storage of the game application, nevertheless are associated with a user's ownership of and/or access to a particular game and can be used by a game application, client device 825 and/or game platform 6625 to provide authenticated access by the user to a game that, for example can be executed and/or streamed to a user's client device in order for the user to play the game.

The system includes a NFT platform 6725, such as NFT collection platform 800, NFT game platform 6500, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes a client device 825, a payment processor 6710 or other marketplace or marketplace tool, a blockchain system 6720, such as NFT creation system 824 or other decentralized computer network and a wallet 6726, such as NFT wallet system 820 or other wallet.

A client device generates a purchase request 6702 for a game token NFT 6722 associated with an electronic game that is received by the NFT game platform 6725. The NFT game platform 6725 responds by generating a payment request 6704 and receives a payment response 6714 indicating whether or not the payment request is verified. In various examples, in response to the payment response verifying the payment request, the NFT game platform system 6725 facilitates the minting of a game token NFT 6722 associated with the electronic game. In addition, or in the alternative, one or more game token NFTs can be minted prior to sale. In this fashion, for example, a limited and/or numbered series of game token NFTs can be minted and offered for sale to collectors. Furthermore, pre-minting a number of NFTs for sale can help expedite the sales because the minting of the game token NFTs does not need to occur in real-time.

In various examples, minting of the game token NFT 6722 includes generation of a private key associated with the game token NFT that is stored with NFT metadata and/or other wallet data 6726 in the wallet 6726. In other examples, an existing private key can be retrieved and used for the same purpose. The game token NFT 6722 serves to authenticate the purchase of the game or access to a game/tournament or game application by the user of the client device 825 and can be used to enable play of the electronic game via the client device 825, for example, by verification of the NFT authorization before the game is fully launched for game play via the client device 825. This improves the technology of game systems by providing a secure and incorruptible methodology for authenticating game/tournament access and/or authenticating the user to the game as the actual game owner or other authorized user/player. While a particular architecture is shown, other configurations, combinations and connections are likewise possible. Furthermore, other authentication systems & methodologies described herein, including any of the techniques described in conjunction with FIGS. 12A-12D, could likewise be employed.

FIG. 16B presents a flowchart representation 6700-1 of an example method. In particular, a method is presented for use in conjunction with one or more functions or features described herein. Step 6702-1 includes receiving, at the NFT platform and from a client device, a purchase request for a game token NFT associated with an electronic game. Step 6704-1 includes generating a payment request in response to the purchase request. Step 6706-1 includes receiving a payment response verifying the payment request. Step 6708-1 includes facilitating, in response to the payment response verifying the payment request, via the processor, issuance of a game token NFT associated with the electronic game for enabling play of the electronic game.

Figures 16C, 16D, 16E:
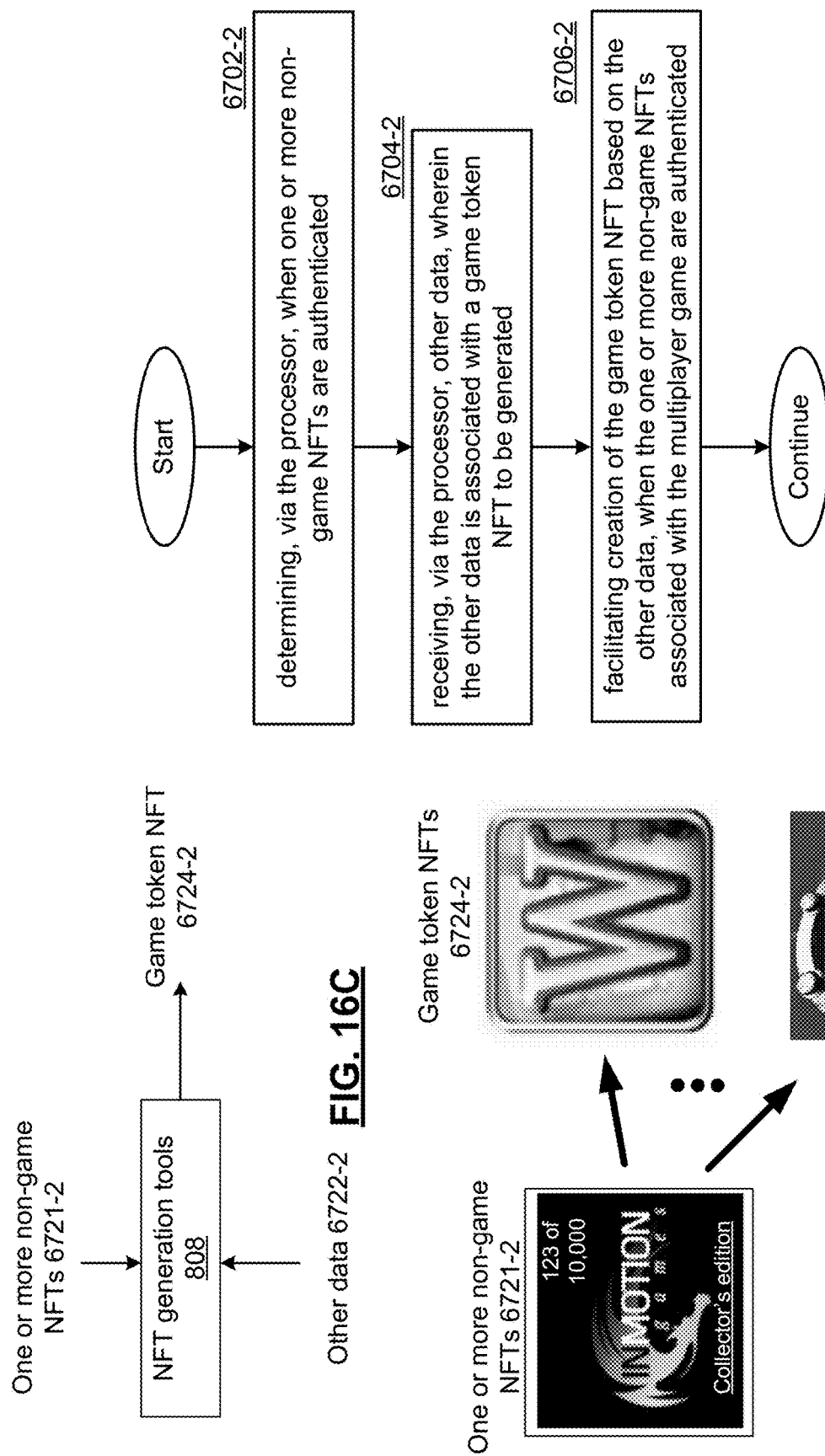
FIG. 16C presents a block/flow diagram representation of an example system.
FIG. 16D presents a pictorial/flow diagram representation of an example process.
FIG. 16E presents a flowchart representation of an example method.

FIG. 16C presents a block/flow diagram representation of an example system. In this example, ownership (e.g. authenticated ownership) by a user of one or more non-game NFTs 6721-2 is used to automatically trigger the generation of a game token NFT 6724-2 based on other data 6722-2. As used herein, a non-game NFT is an NFT that, even though it may provide benefits to a particular game and have value to collectors independent of a particular, it is not specific to a particular game. In this fashion, a game studio may issue NFTs that provide subsidiary benefits to a number of different games as opposed to one specific game. For example, one or more non-game NFTs 6721-2 associated with InMotion Games, may provide benefits to a number of different games produced by InMotion, as opposed to any one specific game.

In the example shown in FIG. 16D, after a non-game NFTs 6721-2 associated with InMotion Games is authenticated to the user, game token NFTs 6724-2 are generated as a result. While ownership/collection of a single NFT triggers generation of multiple game token NFTs, in other examples, ownership collection of multiple non-game NFTs may be required to generate either a single game token NFT or a series of game token NFTs associated with a single game or different games.

In this fashion, a non-game NFT associated with a film or series of films, may provide benefits to a particular game that is based on characters from the film(s), even though it is primarily associated with the film(s) themselves. For example, a non-game NFT associated with Harry Potter series of films may provide subsidiary benefits to a particular game that is based on characters from the Harry Potter film(s), even though the NFT is primarily associated with the film(s) themselves. In this fashion, a non-game NFT associated with an unrelated product, may provide subsidiary benefits to a particular game that is sponsored by the producer of this product. For example, a Fritos NFT may provide benefits to a particular game that is sponsored by Frito-Lay.

In this context, the other data 6722-2 can include the particular image to be associated with the game token NFT 6724-2 along with other data used in NFT generation as previously described herein.

FIG. 16E presents a flowchart representation 6700-2 of an example method. In particular, a method is presented for use in conjunction with one or more functions or features described herein. Step 6702-2 includes determining, via the processor, when one or more non-game NFTs are authenticated. Step 6704-2 includes receiving, via the processor, other data, wherein the other data is associated with a game token NFT to be generated. Step 6706-2 includes facilitating creation of the game token NFT based on the other data, when the one or more non-game NFTs associated with the multiplayer game are authenticated.

FIG. 16F presents a block/flow diagram representation of an example system. In this example, ownership (e.g. authenticated ownership) by a user of one or more game-collected NFTs 6721-3 is used to automatically trigger the generation of a game token NFT 6724-3 based on other data 6722-3. As used herein, a game collected NFT is an NFT that was collected via play/use of a game to be associated with the game token. In the example shown in FIG. 16G, after a user/player has collected NFTs 6721-3 via play of I Dig It, and these NFTs are authenticated to the user, game token NFT 6724-2 is generated as a result. In this fashion, a user can collect new game tokens to a game that can be used in future play if older game tokens to that game expire after a time or due to the loss of the game by a player. These new game tokens can also be bartered or sold.

FIG. 16H presents a flowchart representation 6700-3 of an example method. In particular, a method is presented for use in conjunction with one or more functions or features described herein. Step 6702-3 includes determining, via the processor, when one or more game-collected NFTs associated with a multiplayer game are authenticated. Step 6704-3 includes receiving, via the processor, other data, wherein the other data is associated with a game token NFT to be generated. Step 6706-3 includes facilitating creation (e.g., issuance) of the game token NFT based on the other data, when the one or more game-collected NFTs associated with the multiplayer game are authenticated.

FIGS. 16I-16J present a block/flow diagram representations of example systems. In the example shown in FIG. 16I, an application execution device 6730 stores the game application 6718 for execution having a game token NFT 6722 associated therewith. Similar devices shown in FIG. 16A are represented by similar reference numerals. The application execution device can be a client device 825, an NFT platform 800, NFT game platform 6625, NFT game platform 6500 or other NFT platform or other device for executing the game application 6718 to facilitate play of the game.

In operation, the application execution device 6730 operates in response to an application launch request 6732 for the game application 6718. This application launch request 6732 can be received (internally) from a user interface associated with the application execution device 6730 (e.g. a client device or NFT platform) and/or received from an external device such as a client device, when for example, the application execution device 6730 corresponds to an NFT platform in communication with a client device. Once execution of the gaming application is initiated in response to the application launch request 6732, launch metadata 6734 is generated, for example, to determine if the launch request can be validated. The launch metadata 6734 is sent to the wallet 6725 containing a private key associated with the game token NFT 6722 associated with a user, such as a user of the application execution device and/or the application execution device 6730. The application execution device 6730 receives from the wallet 6726, a launch response 6735 that is generated based on the private key. The game application generates, based on the launch response 6736, an ownership check 6736 that is sent to the blockchain system 6720 that stores the game token NFT 6722. An ownership validation response 6738 is received from the blockchain system 6720 that enables play of the game via the game application 6718 when the ownership validation response 6738 indicates ownership of the game token NFT 6722 is verified and prevents play of the game via the game application 6718 when the ownership validation response 6738 indicates ownership of the game token NFT 6722 is not verified. When not verified, the game application 6718 can, for example, shut itself down. In this fashion, the game application 6718 can self-validate on launch to verify ownership/authorized use by the user using game token NFT data in a user's wallet which holds the private key to the game token NFT 6722.

In various examples, the launch metadata 6734 can include a current date and time, expiration information (if any) and a version number of the game application 6718, a counter that indicates a number of times the application has been executed, and/or other data corresponding to the game token NFT 6722, the game application 6718 and/or the launch. The launch response 6735 can include a public key associated with the game token NFT 6722, a signed hash that is based on the private key, the launch metadata 6734, and/or other data/metadata to be used to validate the NFT data from the wallet 6725 to the game token NFT 6722. In this fashion, the private key is not shared directly with the application binary—and instead is merely used by the wallet 6725 in a secure fashion.

The ownership check 6736 can include information from the launch response 6735, additional owner/user information, such as user authentication data, associated with the user and/or owner of the game token NFT 6722 and or other and/or other data/metadata to be used to validate the NFT data from the wallet 6725 to the game token NFT 6722. In various examples, the blockchain system 6720 can include an NFT transaction authenticator 6022, a secure real-time NFT metadata repository 6024 and an NFT source 6026 that actually stores the game token NFT 6722 on a blockchain or other decentralized computer system/network and user authentication/NFT validation can take place, for example as described in conjunction with FIGS. 12A-12D.

FIG. 16J presents a block diagram representation of an example system. This system operates similarly to the system of FIG. 16I, however, the application launch request 6732 is received directly from the wallet 6725.

FIG. 16K presents a flowchart representation 6700-4 of an example method. In particular, a method is presented for use in conjunction with one or more functions or features described herein. Step 6702-4 includes receiving an application launch request for a game application having a game token NFT associated therewith. Step 6704-4 includes generating, in response to the application launch request, launch metadata Step 6706-4 includes sending the launch metadata to a wallet associated with a user of the client device, the wallet containing a private key associated with the game token NFT. Step 6708-4 includes receiving, from the wallet, a launch response that is generated based on the private key. Step 6710-4 includes generating, based on the launch response, an ownership check. Step 6712-4 includes sending the ownership check to a blockchain system that stores the game token NFT. Step 6714-4 includes receiving, from the blockchain system, an ownership validation response. Step 6716-4 includes enabling, via the game application, play of the game when the ownership validation response indicates ownership of the game token NFT is verified. Step 6718-4 includes preventing, via the game application, play of the game when the ownership validation response indicates the ownership of the game token NFT is not verified.

Figure 16L:
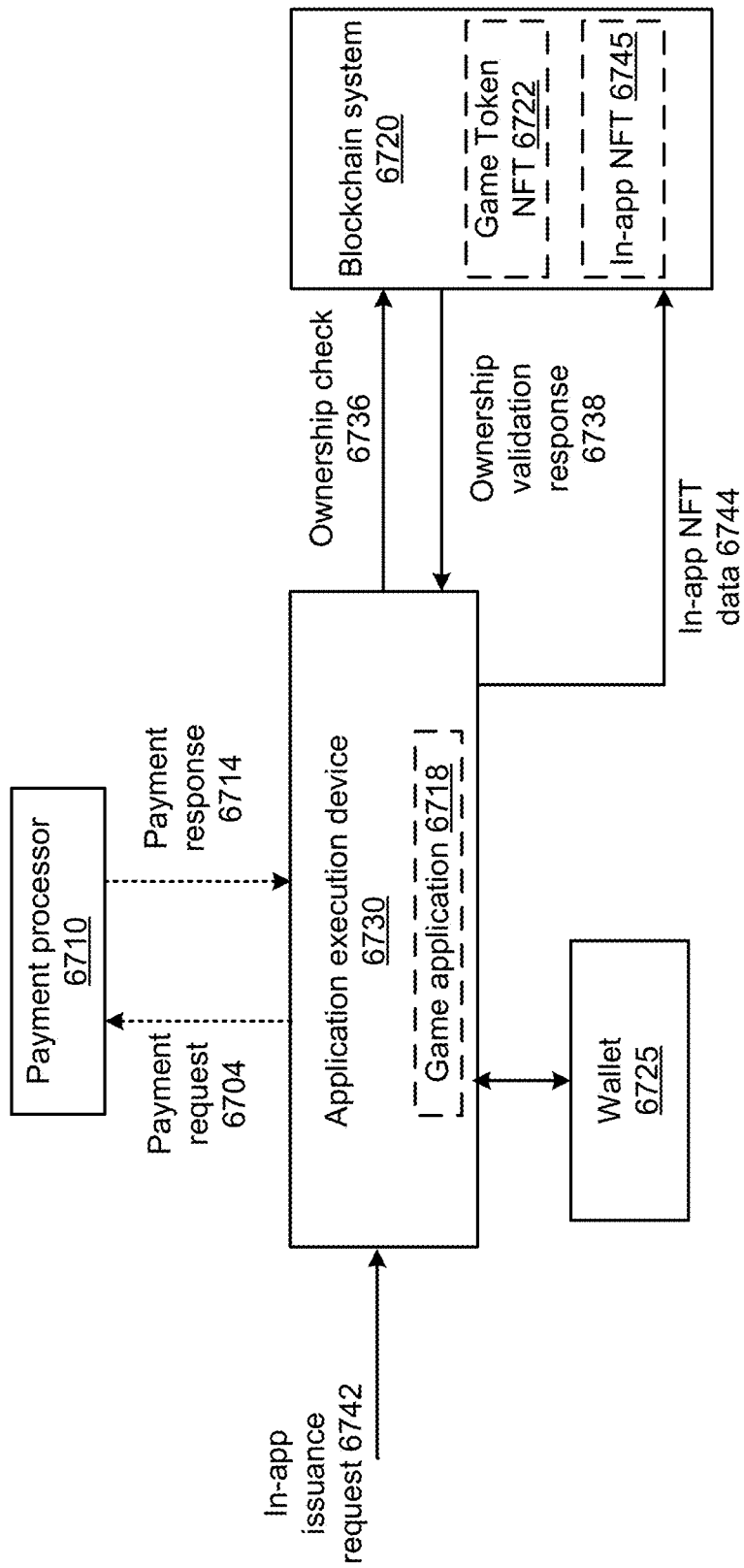
FIG. 16L presents a block/flow diagram representation of an example system.

FIG. 16L presents a block/flow diagram representation of an example system. This example addresses a scenario where NFT's can be issued in-application (in-app NFTs). These in-app NFTs can correspond to any of the game-collected NFTs and/or other collected or collectable items, achievements, purchased items, and or other NFTs that can be purchased, earned and/or collected in-app. For example, first launch for a new user can issue an unsealing/open box NFT that is the digital equivalent of opening the box of a physical good and collecting a prize. These in-app NFT's can be tied to the user/owner of the game token NFT 6722 and/or tied to a particular instance of the game application 6718. This allows some NFTs to be transferred when ownership of the game application is transferred via sale or micro-loan of the game token NFT 6718. In other examples, the in-app NFTs can be independently sold and disassociated with the game token NFT 6722.

In various examples, the application execution device 6730 receives an in-app issuance request 6742 from a gaming application 6718 that was generated either automatically or in response to user interaction with the game. The application execution device 6730 responds by facilitating, based on in-app NFT data 6744, the minting of an in-game NFT 6745 associated with the electronic game based on an authentication of the ownership of the game application 6718 via ownership of the associated game token NFT 6722 by the user/owner that is playing the game.

In various examples, the system operates by: generating, via the application execution device 6730, an ownership check 6736; sending the ownership check 6736 to a blockchain system 6720 that stores a game token NFT 6722 associated with the electronic game and the user; receiving, from the blockchain system 6720, an ownership validation response 6738; and facilitating, via the game application 6718, a minting/issuance of the in-app NFT 6745 when the ownership validation response 6738 indicates ownership of the game token NFT 6722 is verified.

In this example shown, an ownership check 6736 is initiated not only on launch of the game application 6718, but also when an in-app issuance request 6742 is initiated to generate an in-app NFT. The in-app NFT 6745 is only minted when a favorable ownership validation response 6738 is received indicating validated ownership and/or user authentication of the game token NFT 6722. Furthermore, a favorable payment response 6714 may be required when the in-app issuance request 6742 has an associated a cost. Otherwise, if payment is denied or ownership validation fails, the requested in-app NFT 6745 is not minted.

FIG. 16M presents a flowchart representation 6700-5 of an example method. In particular, a method is presented for use in conjunction with one or more functions or features described herein. Step 6702-5 includes receiving, at the NFT platform and from a game application associated with an electronic game played by a user, an in-app issuance request for an in-app NFT. Step 6704-5 includes generating, via the NFT platform, an ownership check. Step 6706-5 includes sending the ownership check to a blockchain system that stores a game token NFT associated with the electronic game and the user. Step 6708-5 includes receiving, from the blockchain system, an ownership validation response. Step 6710-5 includes facilitating, via the game application, issuance of the in-app NFT when the ownership validation response indicates ownership of the game token NFT is verified.

Figure 17A:
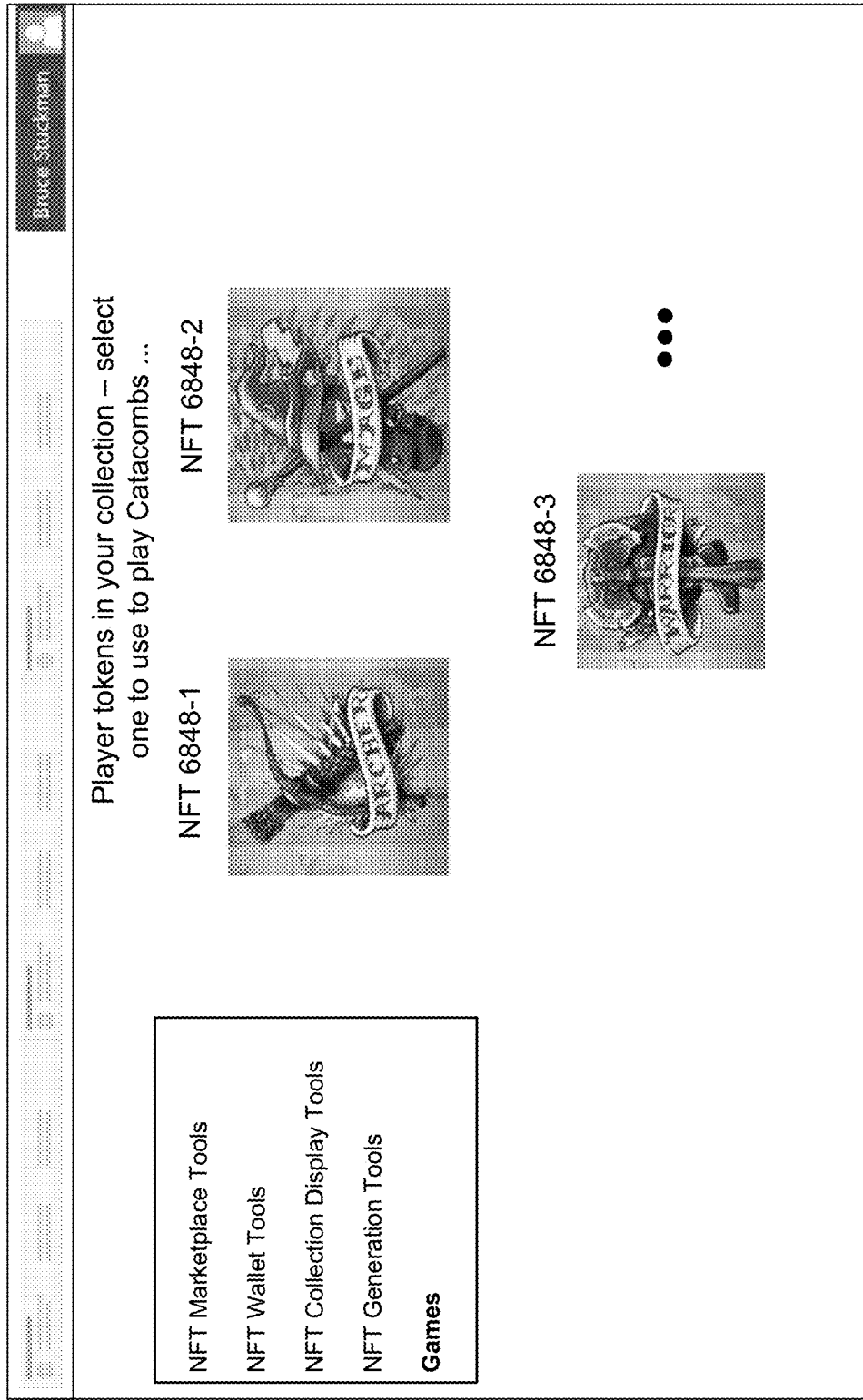
FIG. 17A presents a pictorial representation of an example screen display.

FIG. 17A presents a pictorial representation of an example screen display. In various examples, one or more player token NFTs 6848 can be purchased, collected or otherwise issued to a particular user of a client device 825. The player token NFTs 6848, are specific examples of game token NFTs and can be used to provide authenticated access by the user to a game that, for example can be executed and/or streamed to a user's client device in order for the user to play a particular game. In addition, player token NFTs are associated with a particular player and/or the associated player/character used in the game. In this fashion, a player token NFT 6848, while not associated with storage of the game application, nevertheless are associated with a user's ownership and/or control of and/or access to a particular player/character of game and can be used by a game application, client device 825 and/or game platform 6625 to provide authenticated access by the user to play the game—with the associated player/character.

In the example shown, the player token NFTs 6848-1, 6848-2, 6848-3 . . . are each associated with a different players associated with the game Catacombs.

Figure 17B:
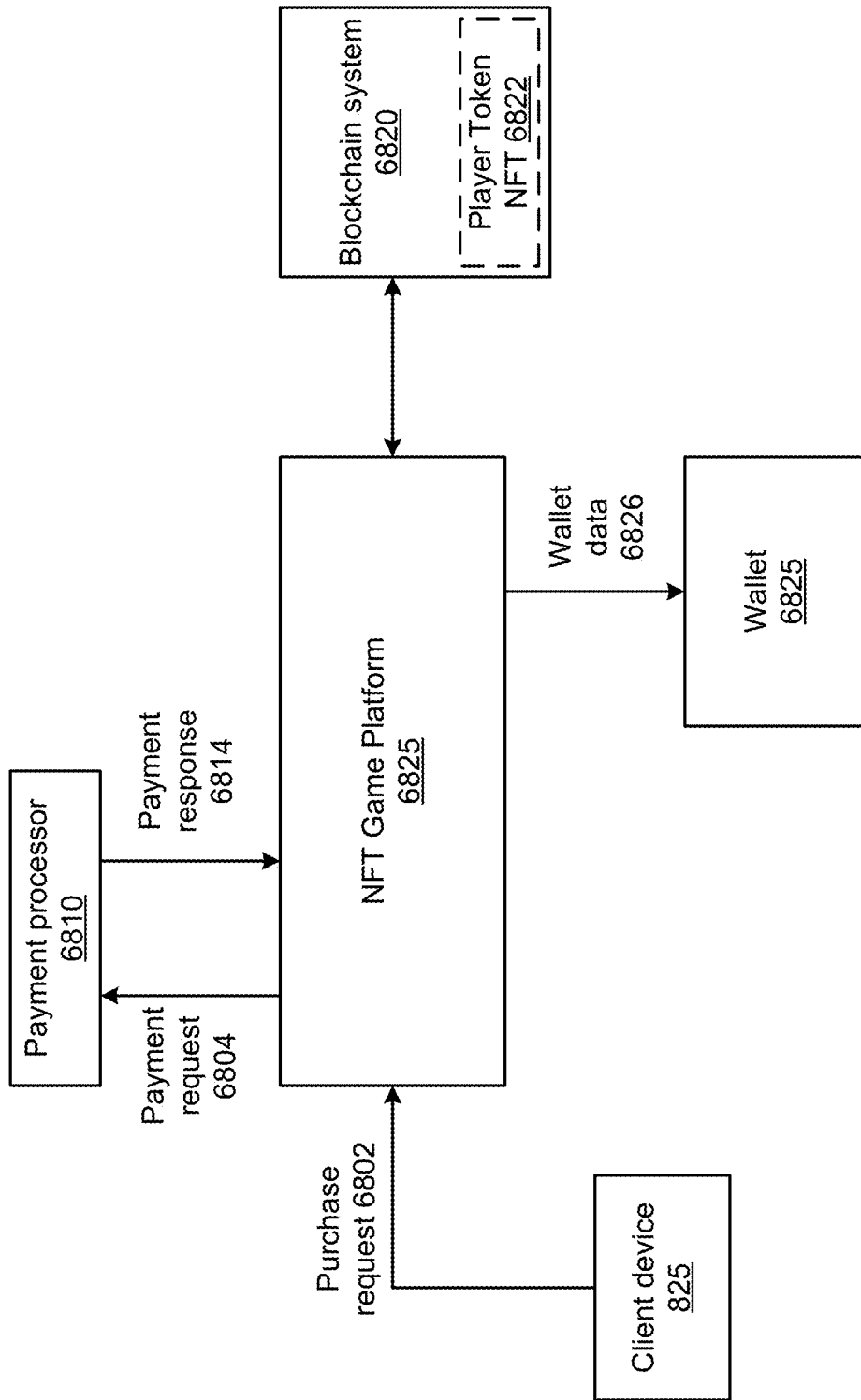
FIG. 17B presents a block diagram representation of an example system.

FIG. 17B presents a block diagram representation of an example system. The system includes a NFT platform 6825, such as NFT collection platform 800, NFT game platform 6500, NFT distribution platform 2800 or other NFT platform that operates to facilitate the creation of new NFTs such as game NFTs or other NFTs associated with games or other media and/or the play of games associated with one or more game NFTs that have been purchased or acquired by a player, collector or other user. The system further includes a client device 825, a payment processor 6810 or other marketplace or marketplace tool, a blockchain system 6820, such as NFT creation system 824 or other decentralized computer system and a wallet 6826, such as NFT wallet system 820 or other wallet.

A client device generates a purchase request 6802 for a player token NFT 6822 associated with an electronic game that is received by the NFT game platform 6825. The NFT game platform 6825 responds by generating a payment request 6804 and receives a payment response 6814 indicating whether or not the payment request is verified. In various examples, in response to the payment response verifying the payment request, the NFT game platform system 6825 facilitates the minting of a player token NFT 6822 associated with the electronic game. In addition, or in the alternative, one or more player token NFTs can be minted prior to sale. In this fashion, for example, a limited and/or numbered series of player token NFTs can be minted and offered for sale to collectors. Furthermore, pre-minting a number of NFTs for sale can help expedite the sales because the minting of the player token NFTs does not need to occur in real-time.

In various examples, minting of the player token NFT 6822 includes generation of a private key associated with the player token NFT that is stored with NFT metadata and/or other wallet data 6826 in the wallet 6826. In other examples, an existing private key can be retrieved and used for the same purpose. The player token NFT 6822 serves to authenticate the purchase of the game or access to a game/tournament or game application by the user of the client device 825 and can be used to enable play of the electronic game via the client device 825, for example, by verification of the NFT authorization before the game is fully launched for game play via the client device 825. This improves the technology of game systems by providing a secure and incorruptible methodology for authenticating game/tournament access and/or authenticating the user to the game as the actual game owner or other authorized user/player and/or associated character. While a particular architecture is shown, other configurations, combinations and connections are likewise possible. Furthermore, other authentication systems & methodologies described herein, including any of the techniques described in conjunction with FIGS. 12A-12D, could likewise be employed.

FIG. 17C presents a flowchart representation 6800-1 of an example method. In particular, a method is presented for use in conjunction with one or more functions or features described herein. Step 6802-1 includes receiving, at the NFT platform and from a client device, a purchase request for a player token NFT associated with an electronic game. Step 6804-1 includes generating a payment request in response to the purchase request. Step 6806-1 includes receiving a payment response verifying the payment request. Step 6808-1 includes facilitating, in response to the payment response verifying the payment request, via the processor, issuance of a player token NFT associated with the electronic game for enabling play of the electronic game.

FIG. 17D presents a block/flow diagram representation of an example system. In this example, ownership (e.g. authenticated ownership) by a user of one or more non-game NFTs 6821-2 is used to automatically trigger the generation of a player token NFT 6824-2 based on other data 6822-2. As used herein, a non-game NFT is an NFT that, even though it may provide benefits to a particular game and have value to collectors independent of a particular, it is not specific to a particular game. In this fashion, a game studio may issue NFTs that provide subsidiary benefits to a number of different games as opposed to one specific game. For example, one or more non-game NFTs 6821-2 associated with InMotion Games, may provide benefits to a number of different games produced by InMotion, as opposed to any one specific game.

In the example shown in FIG. 17E, after a non-game NFTs 6821-2 associated with InMotion Games is authenticated to the user, player token NFTs 6824-2 are generated as a result. While ownership/collection of a single NFT triggers generation of multiple player token NFTs, in other examples, ownership collection of multiple non-game NFTs may be required to generate either a single player token NFT or a series of player token NFTs associated with a single game or different games.

In this fashion, a non-game NFT associated with a film or series of films, may provide benefits to a particular game that is based on characters from the film(s), even though it is primarily associated with the film(s) themselves. For example, a non-game NFT associated with Harry Potter series of films may provide benefits to a particular game that is based on characters from the Harry Potter film(s), even though the NFT is primarily associated with the film(s) themselves. In this fashion, a non-game NFT associated with an unrelated product, may provide benefits to a particular game that is sponsored by the producer of this product. For example, a Fritos NFT may provide benefits to a particular game that is sponsored by Frito-Lay.

In this context, the other data 6822-2 can include the particular image to be associated with the player token NFT 6824-2 along with other data used in NFT generation as previously described herein.

FIG. 17F presents a flowchart representation 6800-2 of an example method. In particular, a method is presented for use in conjunction with one or more functions or features described herein. Step 6802-2 includes determining, via the processor, when one or more non-game NFTs are authenticated. Step 6804-2 includes receiving, via the processor, other data, wherein the other data is associated with a player token NFT to be generated. Step 6806-2 includes facilitating creation of the player token NFT based on the other data, when the one or more non-game NFTs associated with the multiplayer game are authenticated.

FIG. 17G presents a block/flow diagram representation of an example system. In this example, ownership (e.g. authenticated ownership) by a user of one or more game-collected NFTs 6821-3 is used to automatically trigger the generation of a player token NFT 6824-3 based on other data 6822-3. As used herein, a game collected NFT is an NFT that was collected via play/use of a game to be associated with the player token. In the example shown in FIG. 17H, after a user/player has collected NFTs 6821-3 via play of Catacombs, and these NFTs are authenticated to the user, player token NFT 6824-2 is generated as a result. In this fashion, a user can collect new player tokens to a game that can be used in future play if older player tokens to that game expire after a time or due to the loss of the game by a player.

FIG. 17I presents a flowchart representation 6800-3 of an example method. In particular, a method is presented for use in conjunction with one or more functions or features described herein. Step 6802-3 includes determining, via the processor, when one or more game-collected NFTs associated with a multiplayer game are authenticated. Step 6804-3 includes receiving, via the processor, other data, wherein the other data is associated with a player token NFT to be generated. Step 6806-3 includes facilitating creation (e.g., issuance) of the player token NFT based on the other data, when the one or more game-collected NFTs associated with the multiplayer game are authenticated.

Figure 17J:
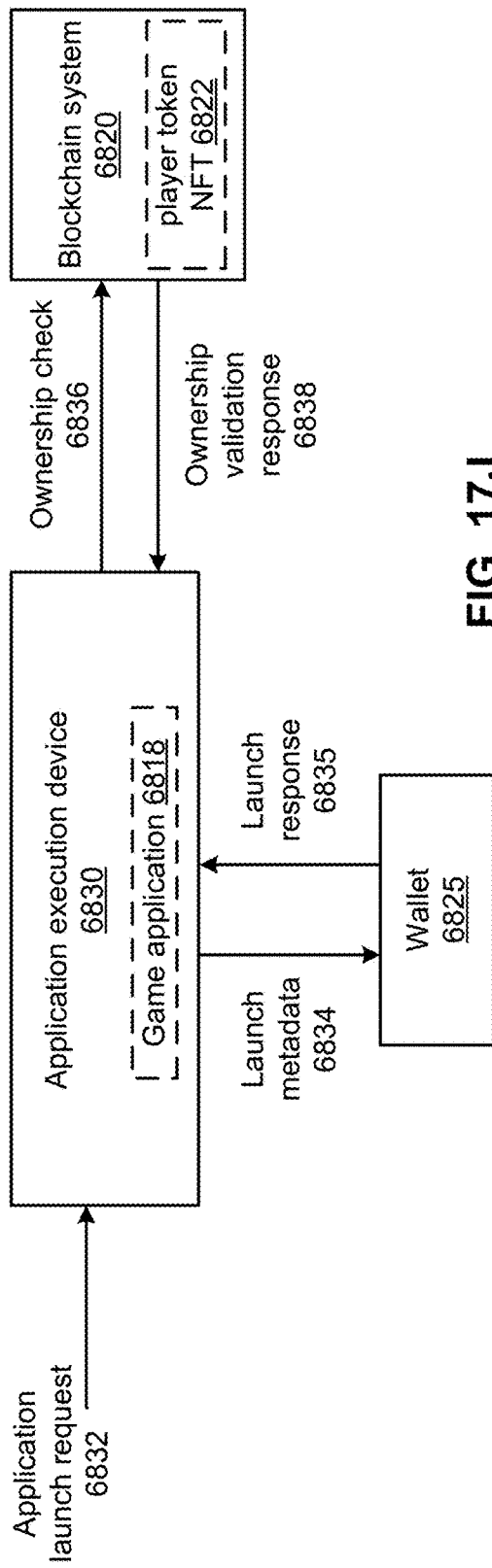
FIGS. 17J-17K present a block/flow diagram representations of example systems.
Figure 17K:
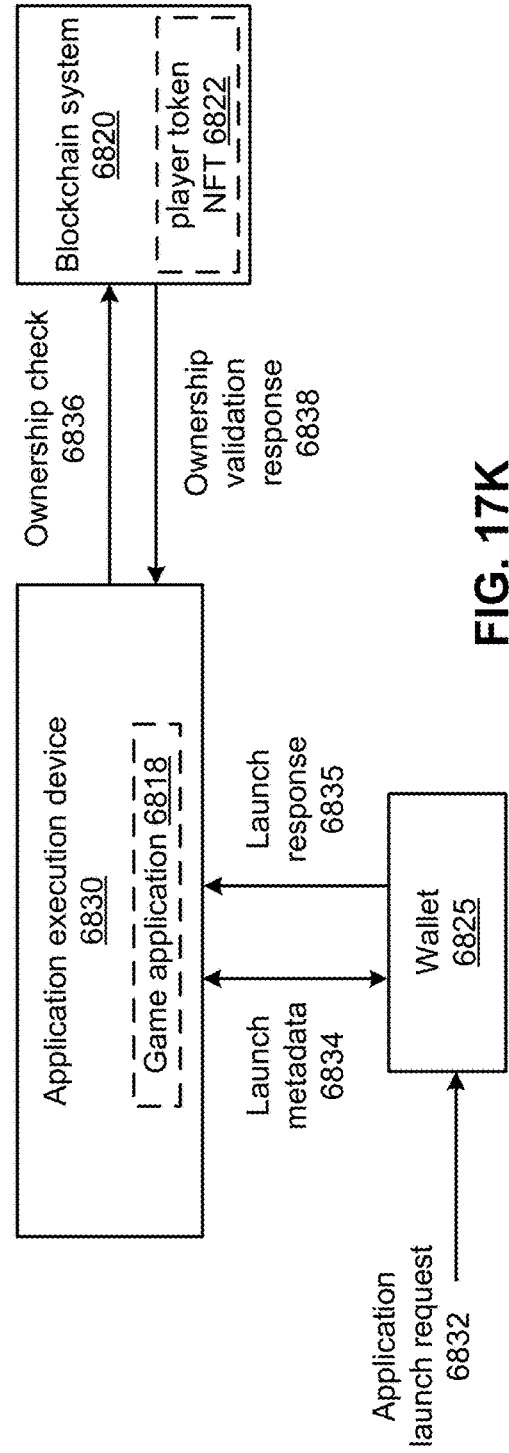

FIGS. 17J-17K present a block/flow diagram representations of example systems. In the example shown in FIG. 17J, an application execution device 6830 stores the game application 6818 for execution having a player token NFT 6822 associated therewith. Similar devices shown in FIG. 17B are represented by similar reference numerals. The application execution device can be a client device 825, an NFT platform 800, NFT game platform 6625 or other NFT platform or other device for executing the game application 6818 to facilitate play of the game.

In operation, the application execution device 6830 operates in response to application launch request 6832 for the game application 6818. This application launch request 6832 can be received (internally) from a user interface associated with the application execution device 6830 (e.g. a client device or NFT platform) and/or received from an external device such as a client device, when for example, the application execution device 6830 corresponds to an NFT platform in communication with a client device. Once execution of the gaming application is initiated in response to the application launch request 6832, launch metadata 6834 is generated, for example, to determine if the launch request can be validated. The launch metadata 6834 is sent to the wallet 6825 containing a private key associated with the player token NFT 6822 associated with a user, such as a user of the application execution device and/or the application execution device 6830. The application execution device 6830 receives from the wallet 6826, a launch response 6835 that is generated based on the private key. The game application generates, based on the launch response 6836, an ownership check 6836 that is sent to the blockchain system 6820 that stores the player token NFT 6822. An ownership validation response 6838 is received from the blockchain system 6820 that enables play of the game via the game application 6818 when the ownership validation response 6838 indicates ownership of the player token NFT is verified and prevents play of the game via the game application 6818 when the ownership validation response 6838 indicates ownership of the player token NFT is not verified. When not verified, the game application 6818 can, for example, shut itself down. In this fashion, the game application 6818 can self-validate on launch to verify ownership/authorized use by the user using player token NFT data in a user's wallet which holds the private key to the player token NFT 6822.

In various examples, the launch metadata 6834 can include a current date and time, expiration information (if any) and a version number of the game application 6818, a counter that indicates a number of times the application has been executed, and/or other data corresponding to the player token NFT 6822, the game application 6818 and/or the launch. The launch response 6835 can include a public key associated with the player token NFT 6822, a signed hash that is based on the private key, the launch metadata 6834, and/or other data/metadata to be used to validate the NFT data from the wallet 6825 to the player token NFT 6822. In this fashion, the private key is not shared directly with the application binary—and instead is merely used by the wallet 6825 in a secure fashion.

The ownership check 6836 can include information from the launch response 6835, additional owner/user information, such as user authentication data, associated with the user and/or owner of the player token NFT 6822 and or other and/or other data/metadata to be used to validate the NFT data from the wallet 6825 to the player token NFT 6822. In various examples, the blockchain system 6820 can include an NFT transaction authenticator 6022, a secure real-time NFT metadata repository 6024 and an NFT source 6026 that actually stores the player token NFT 6822 on a blockchain or other decentralized computer system/network and user authentication/NFT validation can take place, for example as described in conjunction with FIGS. 12A-12D.

FIG. 17K presents a block diagram representation of an example system. This system operates similarly to the system of FIG. 17I, however, the application launch request 6832 is received directly from the wallet 6825.

FIG. 17L presents a flowchart representation 6800-4 of an example method. In particular, a method is presented for use in conjunction with one or more functions or features described herein. Step 6802-4 includes receiving an application launch request for a game application having a player token NFT associated therewith. Step 6804-4 includes generating, in response to the application launch request, launch metadata Step 6806-4 includes sending the launch metadata to a wallet associated with a user of the client device, the wallet containing a private key associated with the player token NFT. Step 6808-4 includes receiving, from the wallet, a launch response that is generated based on the private key. Step 6810-4 includes generating, based on the launch response, an ownership check. Step 6812-4 includes sending the ownership check to a blockchain system that stores the player token NFT. Step 6814-4 includes receiving, from the blockchain system, an ownership validation response. Step 6816-4 includes enabling, via the game application, play of the game when the ownership validation response indicates ownership of the player token NFT is verified. Step 6818-4 includes preventing, via the game application, play of the game when the ownership validation response indicates the ownership of the player token NFT is not verified.

Figure 17M:
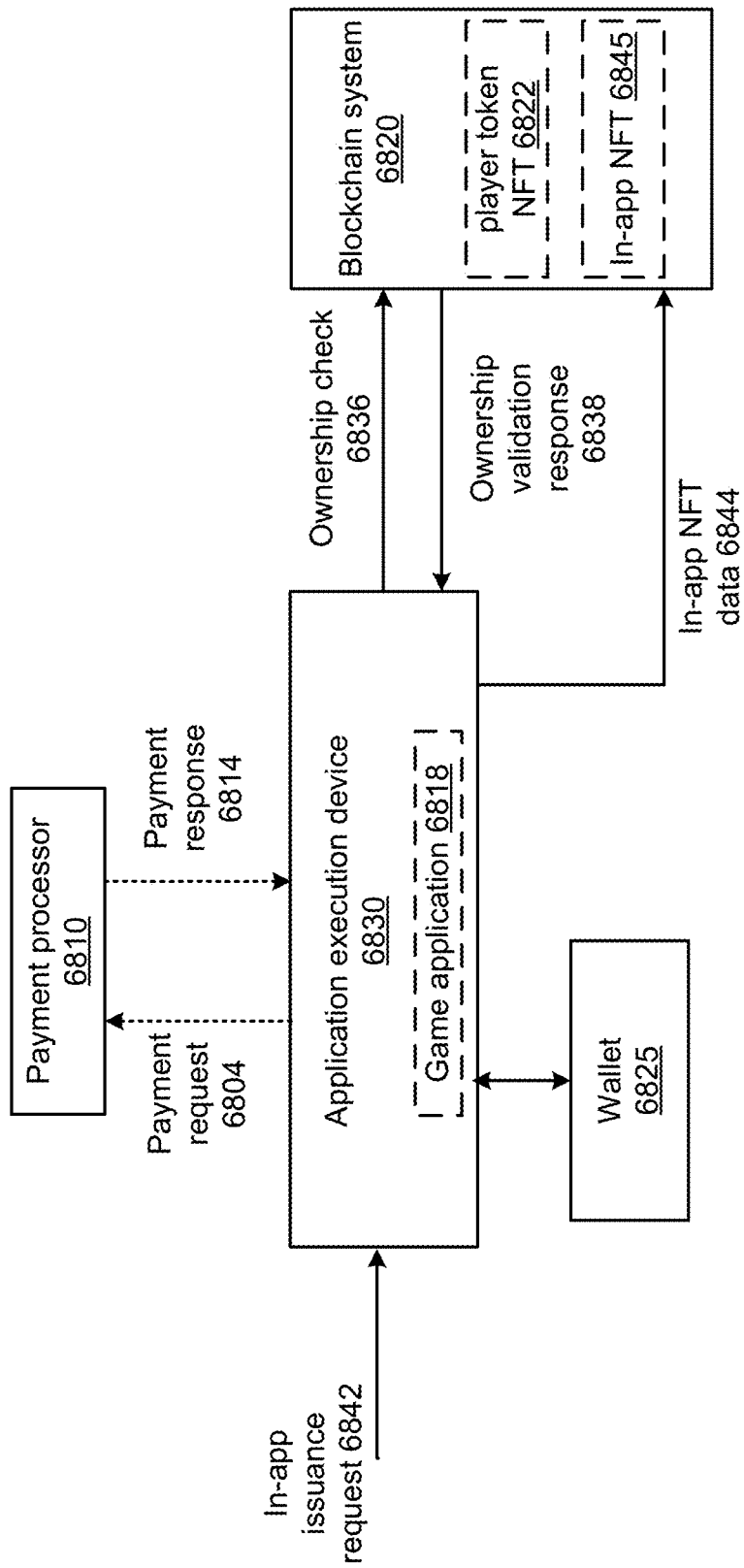
FIG. 17M presents a block/flow diagram representation of an example system.

FIG. 17M presents a block/flow diagram representation of an example system. This example addresses a scenario where NFT's can be issued in-application (in-app NFTs). These in-app NFTs can correspond to game-collected NFTs and/or other collected or collectable items, achievements, purchased items, and or other NFTs that can be purchased or collected in-app. For example, first launch for a new user can issue an unsealing/open box NFT that is the digital equivalent of opening the box of a physical good and collecting a prize. These in-app NFT's can be tied to the user/owner of the player token NFT 6822 and/or tied to a particular instance of the game application 6818. This allows some NFTs to be transferred when ownership of the game application is transferred via sale or micro-loan of the player token NFT 6818. In other examples, the in-app NFTs can be independently sold and disassociated with the player token NFT 6822.

In various examples, the application execution device 6830 receives an in-app issuance request 6842 from a gaming application 6818 that was generated either automatically or in response to user interaction with the game. The application execution device 6830 responds by facilitating, based on in-app NFT data 6844, the minting of an in-game NFT 6845 associated with the electronic game based on an authentication of the ownership of the game application 6818 via ownership of the associated player token NFT 6822 by the user/owner that is playing the game.

In various examples, the system operates by: generating, via the application execution device 6830, an ownership check 6836; sending the ownership check 6836 to a blockchain system 6820 that stores a player token NFT 6822 associated with the electronic game and the user; receiving, from the blockchain system 6820, an ownership validation response 6838; and facilitating, via the game application 6818, a minting/issuance of the in-app NFT 6845 when the ownership validation response 6838 indicates ownership of the player token NFT 6822 is verified.

In this example shown, an ownership check 6836 is initiated not only on launch of the game application 6818, but also when an in-app issuance request 6842 is initiated to generate an in-app NFT. The in-app NFT 6845 is only minted when a favorable ownership validation response 6838 is received indicating validated ownership and/or user authentication of the player token NFT 6822. Furthermore, a favorable payment response 6814 may be required when the in-app issuance request 6842 has an associated a cost. Otherwise, if payment is denied or ownership validation fails, the requested in-app NFT 6845 is not minted.

FIG. 17N presents a flowchart representation 6800-5 of an example method. In particular, a method is presented for use in conjunction with one or more functions or features described herein. Step 6802-5 includes receiving, at the NFT platform and from a game application associated with an electronic game played by a user, an in-app issuance request for an in-app NFT. Step 6804-5 includes generating, via the NFT platform, an ownership check. Step 6806-5 includes sending the ownership check to a blockchain system that stores a player token NFT associated with the electronic game and the user. Step 6808-5 includes receiving, from the blockchain system, an ownership validation response. Step 6810-5 includes facilitating, via the game application, issuance of the in-app NFT when the ownership validation response indicates ownership of the player token NFT is verified.

FIG. 18A presents a block/flow diagram representation of an example system of an example of NFT generation. In the example shown, NFT generation tools 808 operate to convert image data 6920-1 and other data 6922-1 (including persona data) into one or more player token NFTs 6924-1. The image data 6920-1 can correspond to an original NFT, borrowed (e.g. temporary micro-loaned) NFT, a derivative NFT, an original image, and/or other derivatives or microloans thereof or other display or image data. In various examples, the NFT generation tools 808 can operate to verify the credentials of any NFTs whose images are contained in the image data 6920-1, prior to creating the player token NFT 6924-1. In this fashion, one or more player token NFTs 6924-1 can only be created (e.g. on a derivative basis) when the source NFT or NFTs are verified—preventing the creation of unauthorized or counterfeit NFTs.

The other data 6922-1, can include a set of persona data corresponding to a set of players having differing personas with, for example, differing attributes, abilities, strengths, weaknesses and/or other properties in a game. These properties can include personas with differ goals including some personas having a goal to win, some personas having a goal to sabotage and/or spoil the victory for other players, other personas having a goal to extend the game as long as possible, etc. The other data 6922-1 can further include image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the image data 6920-1.

This other data 6922-1 can be used to generate an NFT and/or combined with the image data 6920-1 to create a dataset that includes both the image data 6920-1 and the other data 6922-1. This other data 6922-1 or combined dataset can be protected via the blockchain and/or other crypto-based NFT creation technology that is employed by the NFT generation tools 808 and via the NFT creation system 824 to create and protect each new player token NFT 6924-1 itself. It should be noted that the player token NFTs 6924-1 can include a single derivative or a number of derivatives, including a limited series of derivatives. It should be noted further that some or all of the other data 6922-1, including restriction data and/or attribution data, can be derived from one or more original NFTs whose images are associated with the image data 6920-1.

In various embodiments, the player token NFTs can be selected by a user, or assigned randomly, at time of purchase or at the time the player token NFT is first used. Player token NFTs can be collected by a user via prior game play, earned via collection of one or more required non-game or game-collected NFTs, or other wise bought, sold traded, collected, etc.

FIG. 18B presents a flowchart representation 6900-1 of an example method. In particular, a method is presented for use in conjunction with one or more functions or features described herein. Step 6902-1 includes receiving, via the processor, an image to be associated with a series of player token NFTs corresponding to a multiplayer game. Step 6904-1 includes receiving, via the processor, other data, wherein the other data including persona data is also associated with the series of player token NFTs. Step 6906-1 includes facilitating creation of the series of player token NFTs.

Figure 18C:
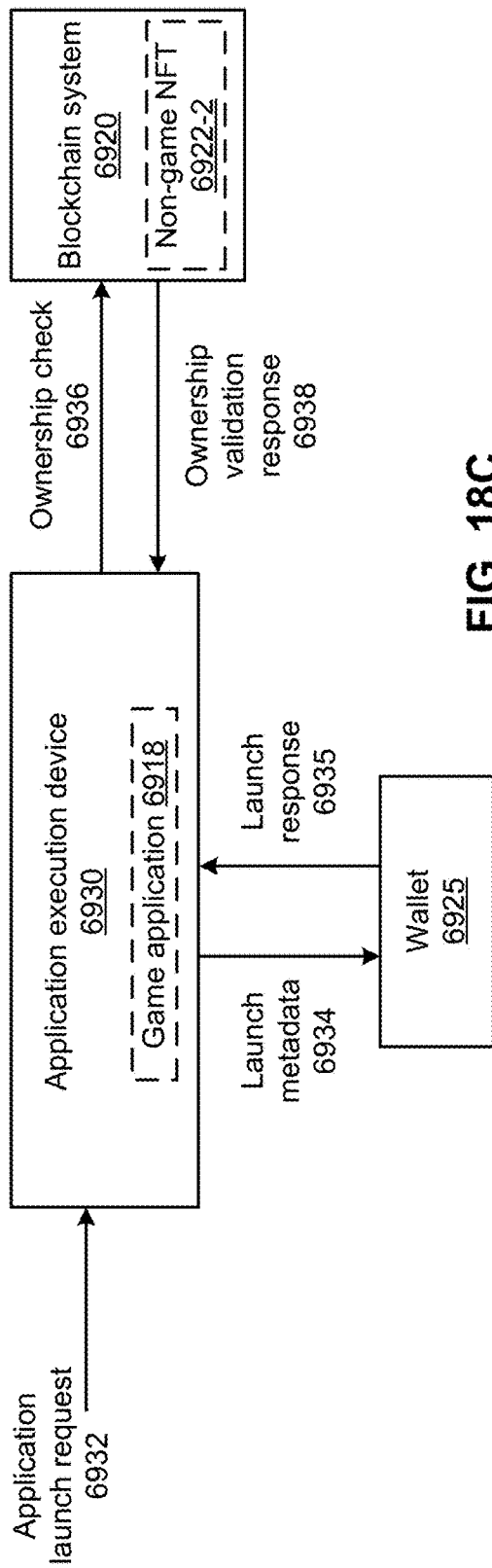
FIGS. 18C-18D present a block/flow diagram representations of example systems.
Figure 18D:
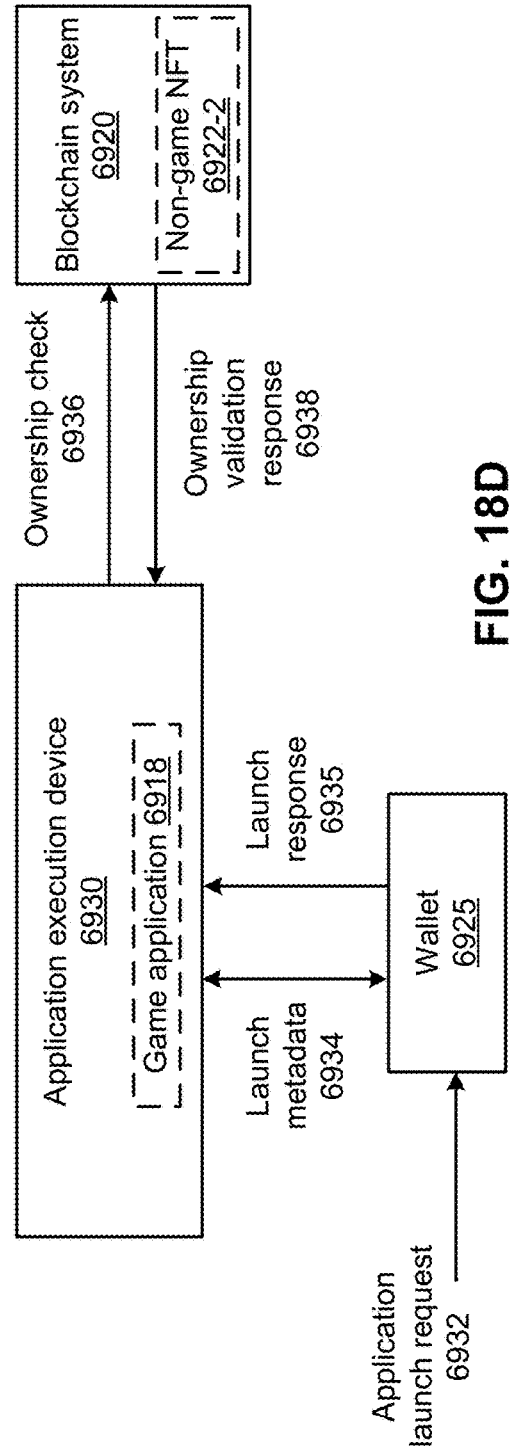

FIGS. 18C-18D present a block/flow diagram representations of example systems. As previously discussed, ownership and/or authentication non-game NFTs can be used to trigger the generation of game token NFTs, player token NFTs and/or with other NFTs that are related to a game/tournament and/or game application. In addition, ownership and/or authentication can be non-game NFTs can, in addition or in the alternative, be used to trigger the augmentation of a particular player/character in a game with special attributes, abilities, strengths, weaknesses and/or other properties in a game.

In the example shown in FIG. 18C, an application execution device 6930 stores the game application 6918 for execution having a player token NFT 6922 associated therewith. The application execution device can be a client device 825, an NFT platform 800, NFT game platform 6625 or other NFT platform or other device for executing the game application 6918 to facilitate play of the game.

In operation, the application execution device 6930 operates in response to an application launch request 6932 for the game application 6918. This application launch request 6932 can be received (internally) from a user interface associated with the application execution device 6930 (e.g. a client device or NFT platform) and/or received from an external device such as a client device, when for example, the application execution device 6930 corresponds to an NFT platform in communication with a client device. Once execution of the gaming application is initiated in response to the application launch request 6932, launch metadata 6934 is generated, for example, to determine if the launch request is associated with a valid non-game NFT. The launch metadata 6934 is sent to the wallet 6925 containing a private key associated with the non-game NFT 6922-1 associated with a user, such as a user of the application execution device and/or the application execution device 6930. The application execution device 6930 receives from the wallet 6926, a launch response 6935 that is generated based on the private key. The game application generates, based on the launch response 6936, an ownership check 6936 that is sent to the blockchain system 6920 that stores the non-game NFT 6922-1. An ownership validation response 6938 is received from the blockchain system 6920 that augments a player/character via the game application 6918 when the ownership validation response 6938 indicates ownership of the non-game NFT 6922-1 is verified and does not augment the player/character via the game application 6918 when the ownership validation response 6938 indicates ownership of the player token NFT is not verified.

In various examples, the launch metadata 6934 can include a current date and time, expiration information (if any) and a version number of the game application 6918, a counter that indicates a number of times the application has been executed, and/or other data corresponding to the non-game NFT 6922-1, the game application 6918 and/or the launch. The launch response 6935 can include a public key associated with the non-game NFT 6922-1, a signed hash that is based on the private key, the launch metadata 6934, and/or other data/metadata to be used to validate the NFT data from the wallet 6925 to the non-game NFT 6922-1. In this fashion, the private key is not shared directly with the application binary—and instead is merely used by the wallet 6925 in a secure fashion.

The ownership check 6936 can include information from the launch response 6935, additional owner/user information, such as user authentication data, associated with the user and/or owner of the non-game NFT 6922-1 and or other and/or other data/metadata to be used to validate the NFT data from the wallet 6925 to the non-game NFT 6922-1. In various examples, the blockchain system 6920 can include an NFT transaction authenticator 6022, a secure real-time NFT metadata repository 6024 and an NFT source 6026 that actually stores the player token NFT 6922 on a blockchain or other decentralized computer system/network and user authentication/NFT validation can take place, for example as described in conjunction with FIGS. 12A-12D. Furthermore, while not expressly shown, the process described above can also include validation of a game token NFT and/or player token NFT as a requirement to successfully launch the game application.

FIG. 18D presents a block diagram representation of an example system. This system operates similarly to the system of FIG. 18C, however, the application launch request 6932 is received directly from the wallet 6925.

Figure 18E:
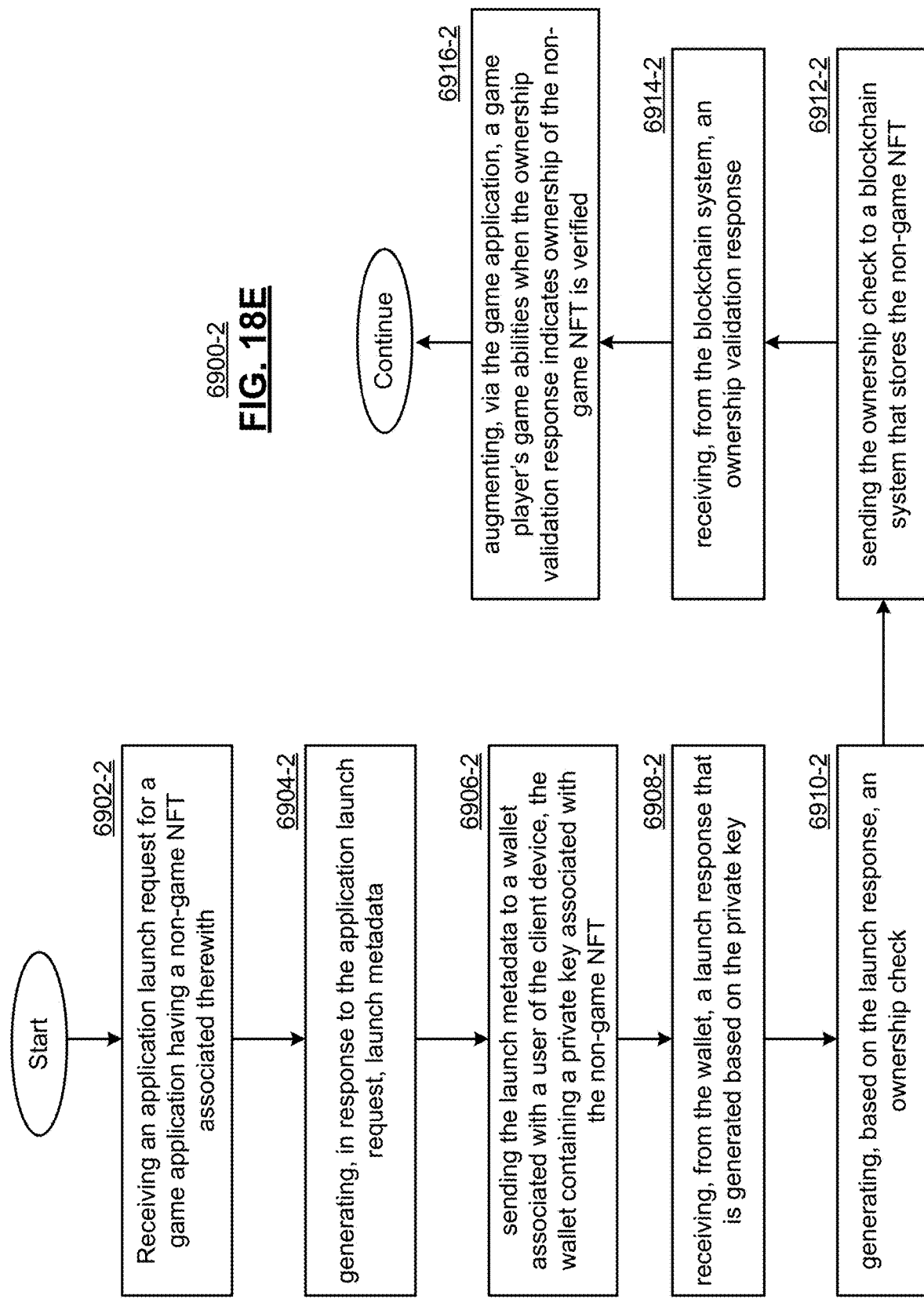
FIG. 18E presents a flowchart representation of an example method.

FIG. 18E presents a flowchart representation 6900-2 of an example method. In particular, a method is presented for use in conjunction with one or more functions or features described herein. Step 6902-2 includes receiving an application launch request for a game application having a non-game NFT associated therewith. Step 6904-2 includes generating, in response to the application launch request, launch metadata Step 6906-2 includes sending the launch metadata to a wallet associated with a user of the client device, the wallet containing a private key associated with the non-game NFT. Step 6908-2 includes receiving, from the wallet, a launch response that is generated based on the private key. Step 6910-2 includes generating, based on the launch response, an ownership check. Step 6912-2 includes sending the ownership check to a blockchain system that stores the non-game NFT. Step 6914-2 includes receiving, from the blockchain system, an ownership validation response. Step 6916-2 includes augmenting, via the game application, a game player's game abilities when the ownership validation response indicates ownership of the non-game NFT is verified.

Figures 18F, 18G:
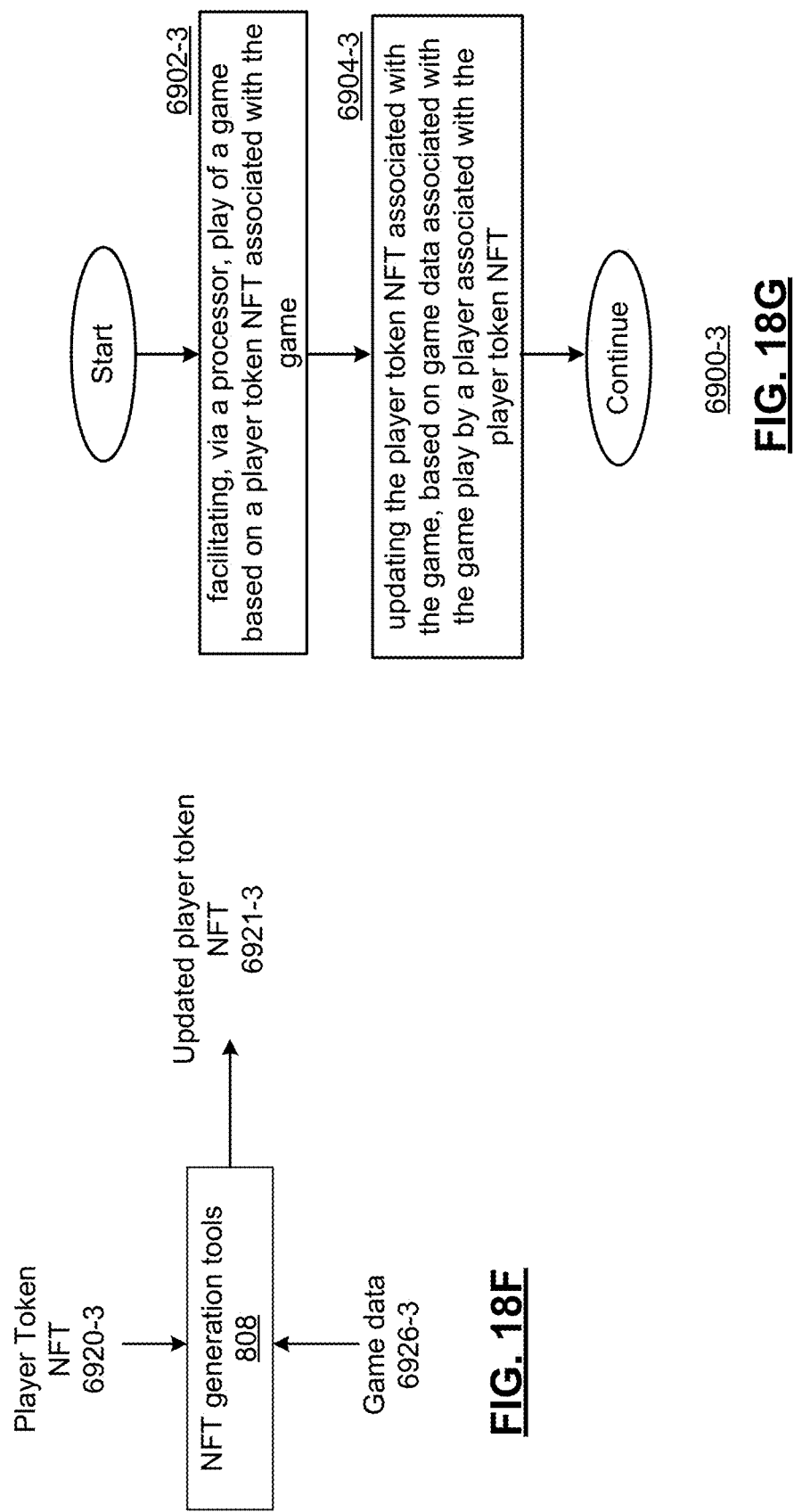
FIG. 18F presents a block/flow diagram representation of an example system.
FIG. 18G presents a flowchart representation of an example method.

FIG. 18F presents a block/flow diagram representation of an example system. In the example shown, NFT generation tools can be used to generate an updated player token NFT 6921-3 that is based on a player token NFT 6920-3 and game data 6926-3 generated via play of the game via the player/character associated with the player token NFT 6920-3. In this fashion, game data 6926 indicating new abilities, enhancements, achievements, stats, experience, level-ups, level-downs, scores, status or other game performance metrics earned and/or otherwise occurring via the game can be stored on the blockchain or other decentralized computer network with the original player token NFT 6920-3 to generate an updated player token NFT 6221-3 as a derivative NFT or entirely new NFT that supersedes the prior NFT.

FIG. 18G presents a flowchart representation 6900-3 of an example method. In particular, a method is presented for use in conjunction with one or more functions or features described herein. Step 6902-3 includes facilitating, via a processor, play of a game based on a player token NFT associated with the game. Step 6904-3 includes updating the player token NFT associated with the game, based on game data associated with the game play by a player associated with the player token NFT.

FIG. 18H presents a block/flow diagram representation of an example system. In the example shown, NFT generation tools can be used to generate an updated game token NFT 6921-4 that is based on a game token NFT 6920-4 and game data 6926-4 generated via play of the game via the player/character associated with the game token NFT 6920-4. In this fashion, game data 6926 indicating new abilities, enhancements, achievements, stats, experience, level-ups, level-downs, scores, status or other game performance metrics earned and/or otherwise occurring via the game can be stored on the blockchain or other decentralized computer network with the original game token NFT 6920-4 to generate an updated game token NFT 6221-4 as a derivative NFT or entirely new NFT that supersedes the prior NFT.

FIG. 18I presents a flowchart representation 6900-4 of an example method. In particular, a method is presented for use in conjunction with one or more functions or features described herein. Step 6902-4 includes facilitating, via a processor, play of a game based on a game token NFT associated with the game. Step 6904-4 includes updating the game token NFT associated with the game, based on game data associated with the game play by a player associated with the game token NFT.

Figure 18K:
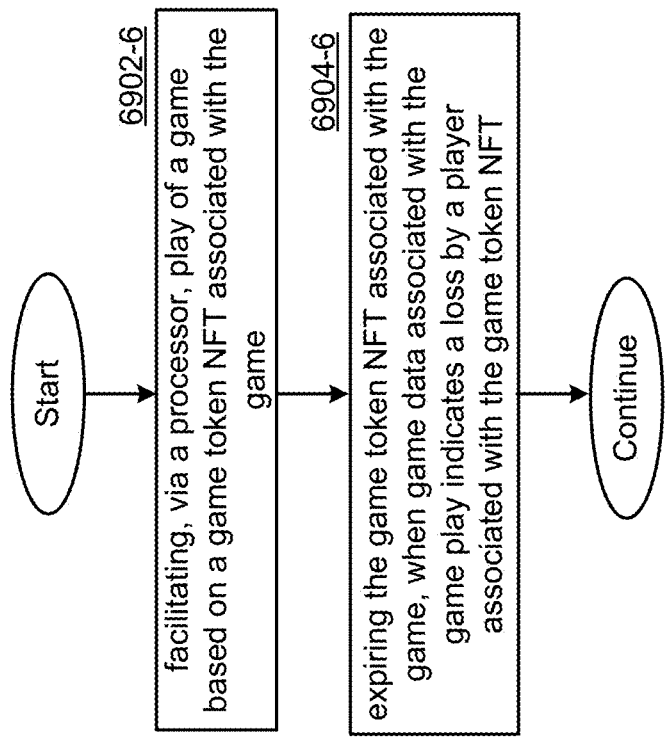
FIG. 18K presents a flowchart representation of an example method.
Figure 18J:
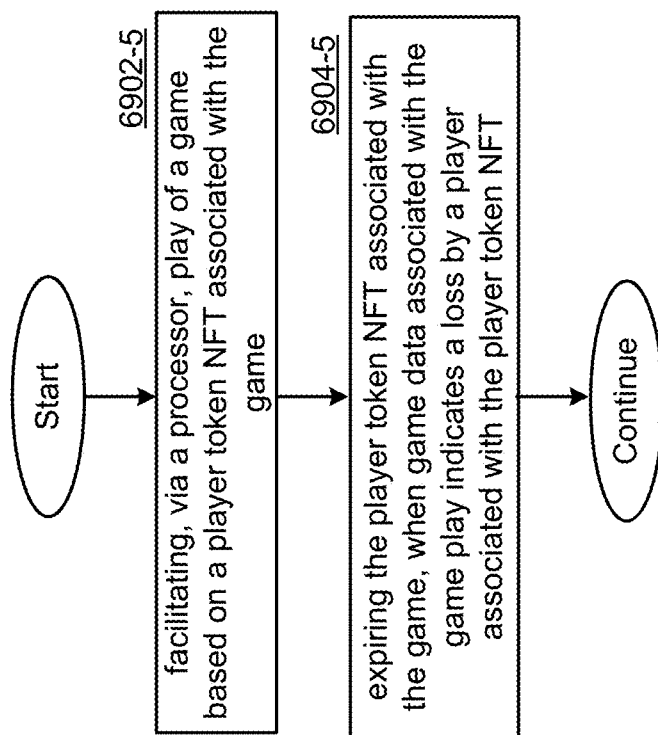
FIG. 18J presents a flowchart representation of an example method.

FIG. 18J presents a flowchart representation 6900-5 of an example method. In particular, a method is presented for use in conjunction with one or more functions or features described herein. As a supplemental case of the system of FIG. 18F, game data 6926-3 may indicate that a player has lost a game/tournament or "died" in the game. In the response to this condition, instead of issuing an updated player token NFT, the player token NFT 6920-3 may, based for example on the restrictions associated with the NFT, be terminated, expired or otherwise burned—optionally maintaining, for example, the NFT for collection purposes, while preventing the future use of the player token NFT 6920-3 for enabling game play.

Step 6902-5 includes facilitating, via a processor, play of a game based on a player token NFT associated with the game. Step 6904-5 includes expiring the player token NFT associated with the game, when game data associated with the game play indicates a loss by a player associated with the player token NFT.

FIG. 18K presents a flowchart representation 6900-6 of an example method. In particular, a method is presented for use in conjunction with one or more functions or features described herein. As a supplemental case of the system of FIG. 18H, game data 6926-4 may indicate that a player has lost a game/tournament or "died" in the game. In the response to this condition, instead of issuing an updated game token NFT, the game token NFT 6920-3 may, based for example on the restrictions associated with the NFT, be terminated, expired or otherwise burned—optionally maintaining, for example, the NFT for collection purposes, while preventing the future use of the game token NFT 6920-3 for enabling game play.

Step 6902-6 includes facilitating, via a processor, play of a game based on a game token NFT associated with the game. Step 6904-6 includes expiring the game token NFT associated with the game, when game data associated with the game play indicates a loss by a player associated with the game token NFT.

Figure 18L:
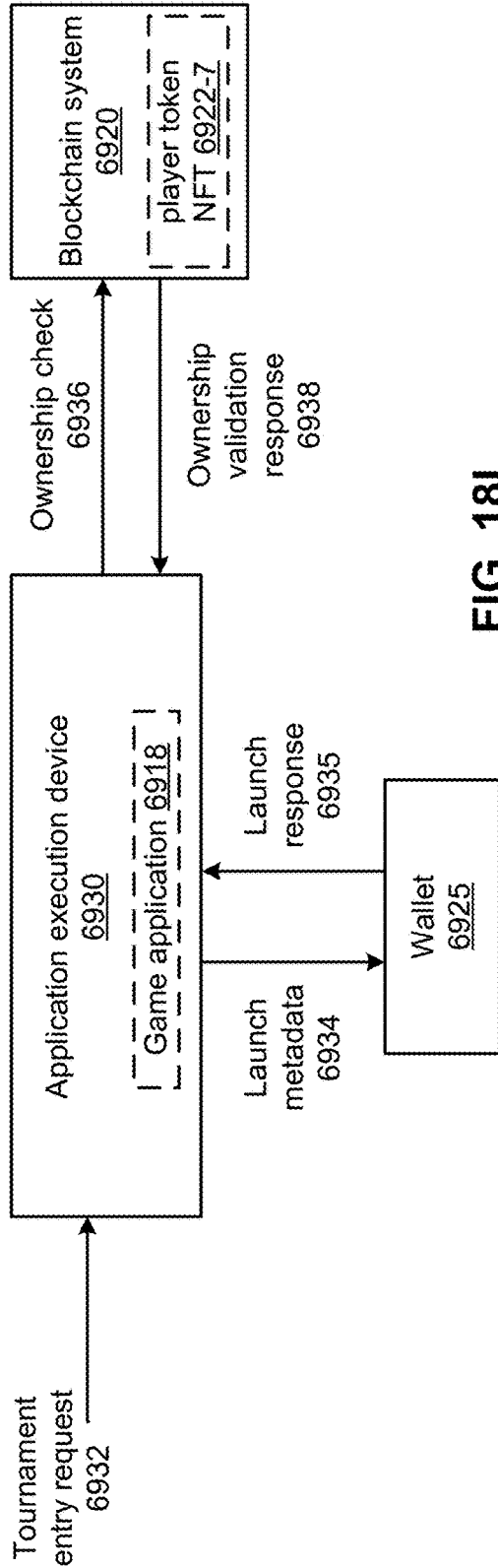
FIGS. 18L-18M present a block/flow diagram representations of example systems.
Figure 18M:
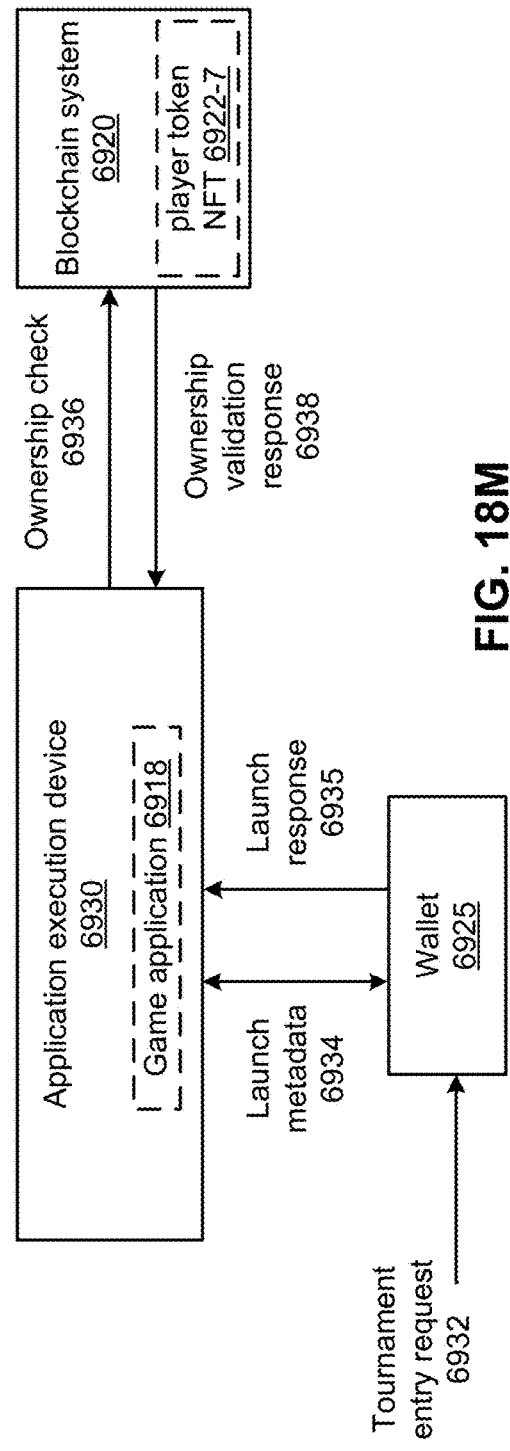

FIGS. 18L-18M present a block/flow diagram representations of example systems. In particular, these systems operate similarly to the systems of FIGS. 17J and 17K to enable tournament play, rather than normal game play via a player token 6922-7.

Figure 18N:
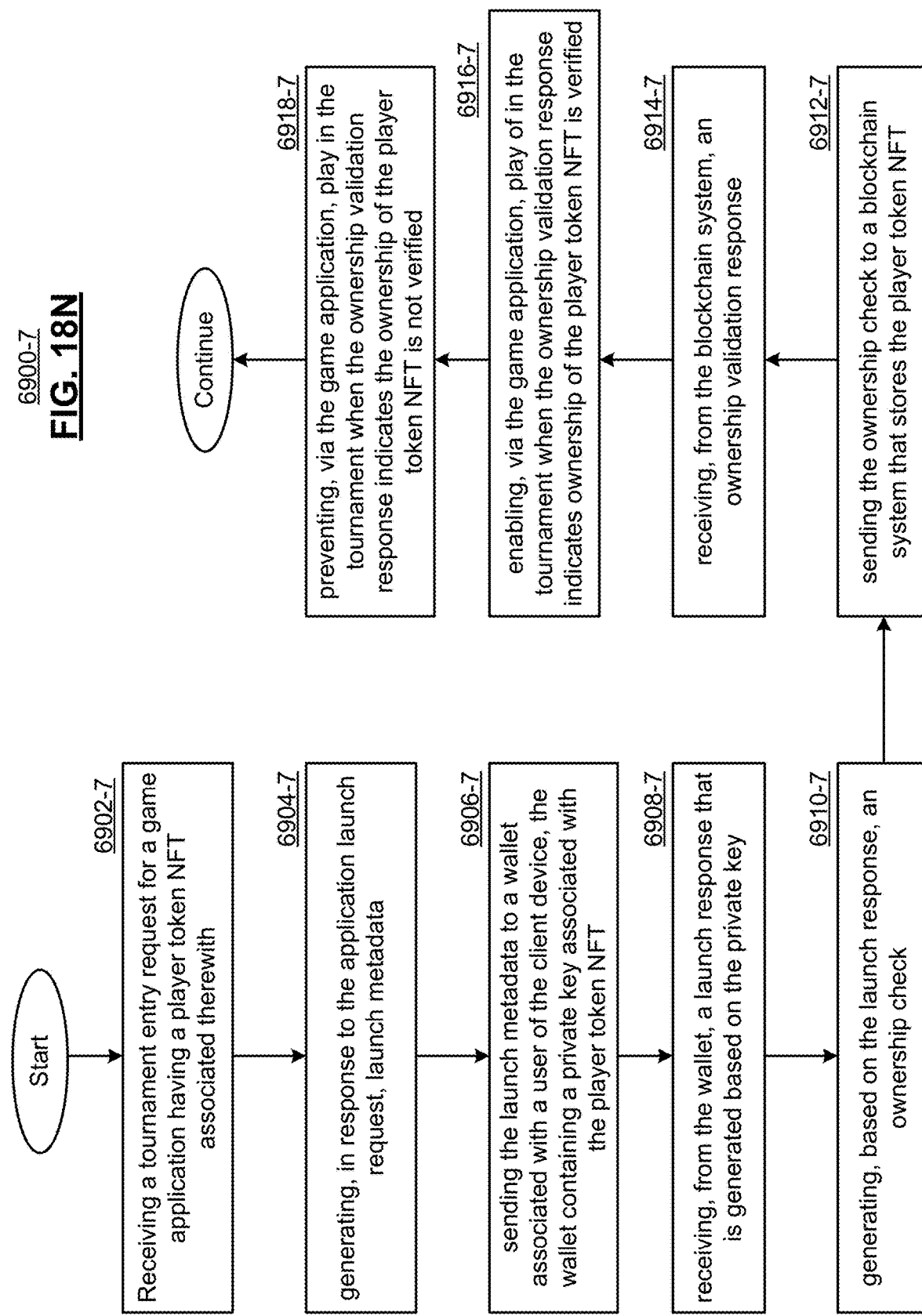
FIG. 18N presents a flowchart representation of an example method.

FIG. 18N presents a flowchart representation 6900-7 of an example method. In particular, a method is presented for use in conjunction with one or more functions or features described herein. Step 6902-7 includes receiving a tournament entry request for a game application having a player token NFT associated therewith. Step 6904-7 includes generating, in response to the application launch request, launch metadata Step 6906-7 includes sending the launch metadata to a wallet associated with a user of the client device, the wallet containing a private key associated with the player token NFT. Step 6908-7 includes receiving, from the wallet, a launch response that is generated based on the private key. Step 6910-7 includes generating, based on the launch response, an ownership check. Step 6912-7 includes sending the ownership check to a blockchain system that stores the player token NFT. Step 6914-7 includes receiving, from the blockchain system, an ownership validation response. Step 6916-7 includes enabling, via the game application, play of in the tournament when the ownership validation response indicates ownership of the player token NFT is verified. Step 6918-7 includes preventing, via the game application, play in the tournament when the ownership validation response indicates the ownership of the player token NFT is not verified.

Figure 18O:
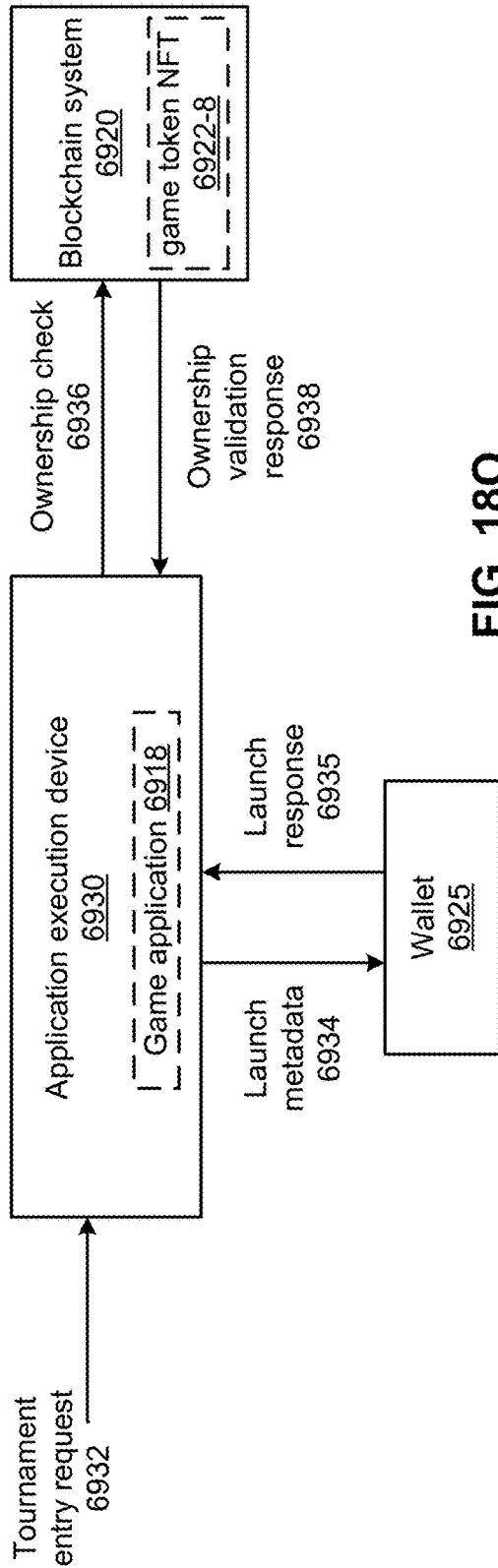
FIGS. 18O-18P present a block/flow diagram representations of example systems.
Figure 18P:
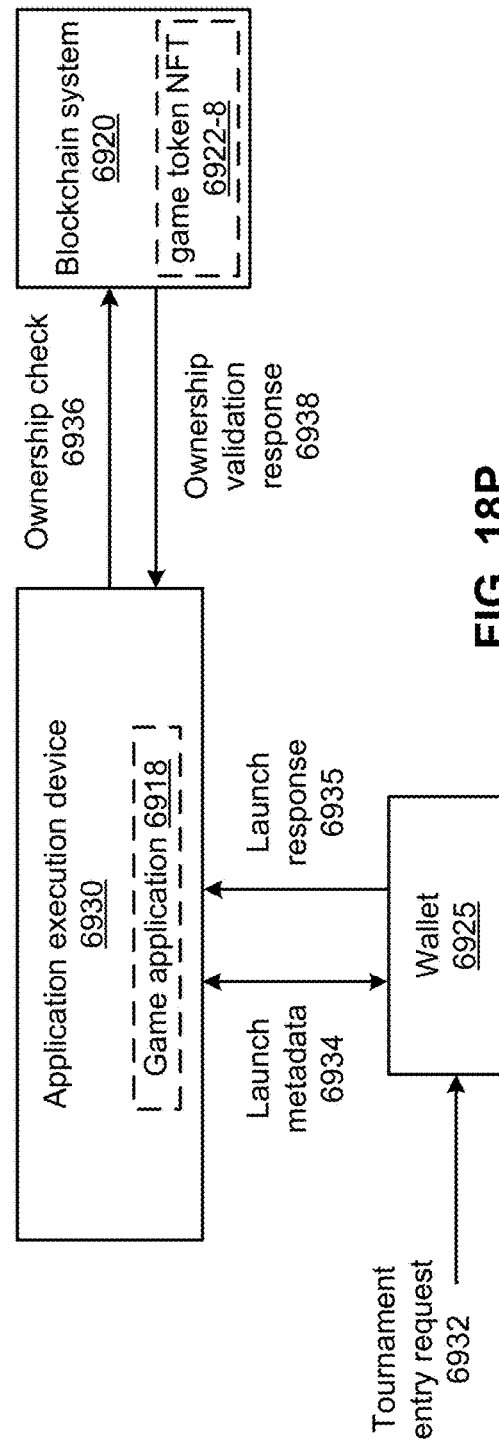

FIGS. 18O-18P present a block/flow diagram representations of example systems. In particular, these systems operate similarly to the systems of FIGS. 16I and 16J to enable tournament play, rather than normal game play via a game token 6922-8.

Figure 18Q:
FIG. 18Q presents a flowchart representation of an example method.

FIG. 18Q presents a flowchart representation 6900-8 of an example method. In particular, a method is presented for use in conjunction with one or more functions or features described herein. Step 6902-8 includes receiving a tournament entry request for a game application having a game token NFT associated therewith. Step 6904-8 includes generating, in response to the application launch request, launch metadata Step 6906-8 includes sending the launch metadata to a wallet associated with a user of the client device, the wallet containing a private key associated with the game token NFT. Step 6908-8 includes receiving, from the wallet, a launch response that is generated based on the private key. Step 6910-8 includes generating, based on the launch response, an ownership check. Step 6912-8 includes sending the ownership check to a blockchain system that stores the game token NFT. Step 6914-8 includes receiving, from the blockchain system, an ownership validation response. Step 6916-8 includes enabling, via the game application, play of in the tournament when the ownership validation response indicates ownership of the game token NFT is verified. Step 6918-8 includes preventing, via the game application, play in the tournament when the ownership validation response indicates the ownership of the game token NFT is not verified.

Figure 18R:
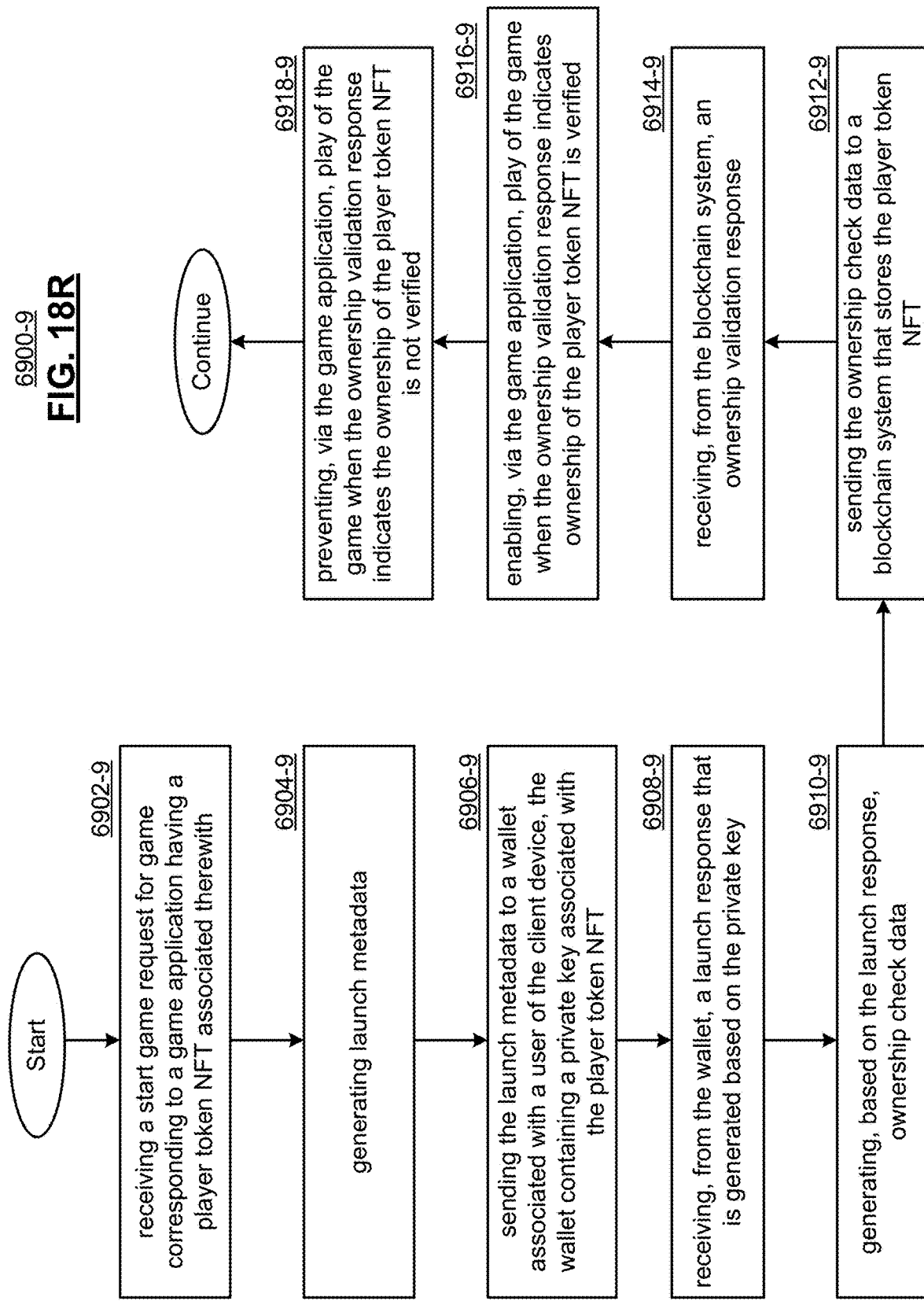
FIG. 18R presents a flowchart representation of an example method.

FIG. 18R presents a flowchart representation 6900-9 of an example method. In particular, a method is presented for use in conjunction with one or more functions or features described herein. Step 6902-9 includes receiving a start game request for game corresponding to a game application having a player token NFT associated therewith. Step 6904-9 includes generating launch metadata. Step 6906-9 includes sending the launch metadata to a wallet associated with a user of a client device, the wallet containing a private key associated with the player token NFT. Step 6908-9 includes receiving, from the wallet, a launch response that is generated based on the private key. Step 6910-9 includes generating, based on the launch response, ownership check data.

Step 6912-9 includes sending the ownership check data to a blockchain system that stores the player token NFT. Step 6914-9 includes receiving, from the blockchain system, an ownership validation response. Step 6916-9 includes enabling, via the game application, play of a game associated with the game application when the ownership validation response indicates ownership of the player token NFT is verified. Step 6918-9 includes preventing, via the game application, the play of the game when the ownership validation response indicates the ownership of the player token NFT is not verified.

In various examples, the ownership check data includes at least one of: NFT identification data associated with the player token NFT or NFT authentication data generated based on the private key. The ownership check data can further include user identification data associated with the user of the client device. The ownership validation response can indicate ownership of the player token NFT is verified when the player token NFT is authenticated based on the NFT authentication data and when the user of the client device is identified based on the user identification data. The user identification data associated with the user of the client device can include at least one of: a user device identifier associated with the client device or user biometric data generated via the client device.

In various examples, the player token NFT has an associated player persona of a plurality of player personas associated with the game. The ownership validation response can indicate whether or not ownership of the player token NFT is verified. The ownership validation response can include credentials data to enable the play of the game via a player token associated with the player token NFT when the ownership of the player token NFT is verified.

The start game request can include an application launch request or a request to start or enter a game associated with a game application that has already been launched. The player token NFT can be expended (e.g. terminated, burned and/or deactivated) based on game play data associated with player token that indicates loss of the game.

FIG. 19A presents a block/flow diagram representation of an example system of an example of NFT generation. In the example shown, NFT generation tools 808 operate to convert image data 7020-1 and other data 7022-1 (including player attribute data) into one or more player token NFTs 7024-1. The image data 7020-1 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 7020-1, prior to creating the player token NFT 7024-1. In this fashion, one or more player token NFTs 7024-1 can only be created (e.g. on a derivative basis) when the source NFT or NFTs are verified—preventing the creation of unauthorized or counterfeit NFTs.

The other data 7022-1, can include a set of attribute data corresponding to a particular player and/or player persona. The set of attribute data can, for example, correspond to player strength, intelligence, willpower, agility, speed, endurance, constitution, personality, luck, magical ability, fighting ability, education, social standing, dexterity, charisma and/or other player properties, abilities, strengths and/or weaknesses pertaining to the game. These properties can further include personas with differ goals including some personas having a goal to win, some personas having a goal to sabotage and/or spoil the victory for other players, other personas having a goal to extend the game as long as possible, etc. The other data 7022-1 can further include image data including signatures and other endorsement images, visual indications of derivative series, originality classification, attributions, or other image data, metadata of all kinds including metadata indicating one or more originality classifications, attributions, endorsement data, other derivative data indicating the series number and total number in a derivative series, restrictions on micro-loans or other derivatives, restrictions on derivatives with artistic effects, restrictions that derivatives must include attributions to the original source, restrictions on numbers of derivatives or micro-loans or the sizes of derivative series, restrictions on the creation of collection NFTs, the number of collection NFTs, the creation of collection NFTs including NFTs from other sources, from prohibited sources or with prohibited content, geographical restrictions, time restrictions (e.g., can be used to create derivatives or collection NFTs or can be temporarily micro-loaned for 1 month, one year, etc., other restrictions and/or other data associated with, or to be associated with, the image data 7020-1.

This other data 7022-1 can be used to generate an NFT and/or combined with the image data 7020-1 to create a dataset that includes both the image data 7020-1 and the other data 7022-1. This other data 7022-1 or combined dataset can be protected via the blockchain and/or other crypto-based NFT creation technology that is employed by the NFT generation tools 808 and via the NFT creation system 824 to create and protect each new player token NFT 7024-1 itself. It should be noted that the player token NFTs 7024-1 can include a single derivative or a number of derivatives, including a limited series of derivatives. It should be noted further that some or all of the other data 7022-1, including restriction data and/or attribution data, can be derived from one or more original NFTs whose images are associated with the image data 7020-1.

In various embodiments, the player token NFTs can be selected by a user, or assigned randomly, at time of purchase or at the time the player token NFT is first used. Player token NFTs can be collected by a user via prior game play, earned via collection of one or more required non-game or game-collected NFTs, or otherwise bought, sold traded, collected, etc.

FIG. 19B presents a flowchart representation 7000-1 of an example method. In particular, a method is presented for use in conjunction with one or more functions or features described herein. For example, the method can be used with an NFT platform, game platform and/or other system that includes a processor and a memory to perform various steps of the method. Step 7002-1 includes receiving, via the processor, image data to be associated with a player token NFT corresponding to a multiplayer game. Step 7004-1 includes receiving, via the processor, other data, wherein the other data includes player attribute data to be associated with the player token NFT; and step 7006-1 includes facilitating creation of the player token NFT, based on the image data and the player attribute data.

FIG. 19C presents a block/flow diagram representation of an example system of an example of NFT generation. In the example shown, NFT generation tools 808 operate to convert image data 7020-2 and other data 7022-2 (including player attribute data) into one or more player token NFTs 7024-2. The image data 7020-2 can correspond to an original NFT, borrowed (e.g. temporary micro-loaned) NFT, a derivative NFT, an original image, and/or other derivatives or micro-loans thereof or other display or image data. In various examples, the NFT generation tools 808 can operate to verify the credentials of any NFTs whose images are contained in the image data 7020-2, prior to creating the player token NFT 7024-2. In this fashion, one or more player token NFTs 7024-2 can only be created (e.g. on a derivative basis) when the source NFT or NFTs are verified—preventing the creation of unauthorized or counterfeit NFTs.

The other data 7022-2, can include a set of attribute data corresponding to a particular player and/or player persona. The other data 7022-2 can further include player health data corresponding to the player. This health data can include a numerical score or index pertaining to an amount of general health, the presence of one or more health conditions, other health information relating to the number of healthy eyes, ears, arms legs, feet, hands, and/or a lack thereof, and/or other health scores, data or other health-related information pertaining to the game.

FIG. 19D presents a flowchart representation 7000-2 of an example method. In particular, a method is presented for use in conjunction with one or more functions or features described herein. For example, the method can be used with an NFT platform, game platform and/or other system that includes a processor and a memory to perform various steps of the method. Step 7002-2 includes receiving, via the processor, image data to be associated with a player token NFT corresponding to a multiplayer game. Step 7004-2 includes receiving, via the processor, other data, wherein the other data includes player health data to be associated with the player token NFT. Step 7006-2 includes facilitating creation of the player token NFT, based on the image data and the player health data.

FIG. 19E presents a block/flow diagram representation of an example system. In the example shown, NFT generation tools can be used to generate an updated player token NFT 7021-3 that is based on a player token NFT 7020-3 and game data 7026-3 generated via play of the game via the player/character associated with the player token NFT 7020-3. In this fashion, game data 7026 can include player health data that indicates updates to player health. The player health data updates can include changes/updates to a numerical score or index pertaining to an amount of general health, the presence/absence of one or more health conditions, updates to other health information relating to the number of healthy eyes, ears, arms legs, feet, hands, and/or a lack thereof, and/or other health scores, data or other changes in health-related information pertaining to the game.

The game data 7026-3, as previously discussed, can further include new abilities, enhancements, achievements, stats, experience, level-ups, level-downs, scores, status or other game performance metrics earned and/or otherwise occurring via the game can be stored on the blockchain or other decentralized computer network with the original player token NFT 7020-3 to generate an updated player token NFT 6221-3 as a derivative NFT or entirely new NFT that supersedes the prior NFT.

FIG. 19F presents a flowchart representation 7000-3 of an example method. In particular, a method is presented for use in conjunction with one or more functions or features described herein. For example, the method can be used with an NFT platform, game platform and/or other system that includes a processor and a memory to perform various steps of the method. Step 7002-3 includes facilitating, via a processor, game play based on a player token NFT associated with the game. Step 7004-3 includes receiving a player health data update responsive to the game play. Step 7006-3 includes updating the player token NFT associated with the game, based on the player health data update.

FIG. 19G presents a block/flow diagram representation of an example system. In the example shown, NFT generation tools can be used to generate an updated player token NFT 7021-4 that is based on a player token NFT 7020-4 and game data 7026-4 generated via play of the game via the player/character associated with the player token NFT 7020-4. In this fashion, game data 7026 can include player health data that indicates updates to player health including, for example, indications of one or more disabling wounds, an indication that a player/character has been maimed, including but not limited to the loss of hearing or eyesight, the loss of one or more eyes, ears, arms, legs, feet, hands and/or other disabling wounds to the player pertaining to the game.

The game data 7026-4, as previously discussed, can further include new abilities, enhancements, achievements, stats, experience, level-ups, level-downs, scores, status or other game performance metrics earned and/or otherwise occurring via the game can be stored on the blockchain or other decentralized computer network with the original player token NFT 7020-4 to generate an updated player token NFT 6221-4 as a derivative NFT or entirely new NFT that supersedes the prior NFT.

FIG. 19H presents a flowchart representation 7000-4 of an example method. In particular, a method is presented for use in conjunction with one or more functions or features described herein. For example, the method can be used with an NFT platform, game platform and/or other system that includes a processor and a memory to perform various steps of the method. Step 7002-4 includes facilitating, via a processor, game play based on a player token NFT associated with the game. Step 7004-4 includes receiving a player health data update responsive to the game play indicating a disabling wound. Step 7006-4 includes updating the player token NFT associated with the game, based on the player health data update to indicate the disabling wound.

FIG. 19I presents a block/flow diagram representation of an example system. In the example shown, NFT generation tools can be used to generate an updated player token NFT 7021-5 that is based on a player token NFT 7020-5 and game data 7026-5 generated via play of the game via the player/character associated with the player token NFT 7020-5. In this fashion, game data 7026 including player health data can be used to update imagery for the player token NFT 7020-5 associated with the player health data update. This imagery can include a numerical score, a bar graph, a number of "hearts", a change in character/player general appearance, the loss of a limb or other disabling wound, or other imagery that visually indicates the health conditions of the character/player.

FIG. 19J presents a flowchart representation 7000-5 of an example method. In particular, a method is presented for use in conjunction with one or more functions or features described herein. For example, the method can be used with an NFT platform, game platform and/or other system that includes a processor and a memory to perform various steps of the method. Step 7002-5 includes facilitating, via a processor, game play based on a player token NFT associated with the game. Step 7004-5 includes receiving a player health data update responsive to the game play indicating a disabling wound. Step 7006-5 includes updating the player token NFT associated with the game, based on the player health data update, with imagery associated with the player health data update.

FIG. 19K presents a pictorial representation of an example NFT. In the example shown, the updated player token NFT 7021-5' includes a bar graph of the remaining health of the character. In FIG. 19L, the imagery of the character presented in updated player token NFT 7021-5" visually indicates the character has been maimed. In particular, the character's image has been updated to show the loss of its left leg.

FIG. 19M presents a flowchart representation 7000-6 of an example method. In particular, a method is presented for use in conjunction with one or more functions or features described herein. For example, the method can be used with an NFT platform, game platform and/or other system that includes a processor and a memory to perform various steps of the method. In this example, a player token NFT can be terminated/expired, when the player health data indicates that the expiration of the players health. This expiration can be indicated, for example, by the player health data indicating a health score of zero, the loss of the characters head, the player succumbing to a terminal disease or receiving a crushing blow, terminal wound, the death of the character in the game, etc.

Step 7002-6 includes facilitating, via a processor, play of a game based on a player token NFT associated with the game. Step 7004-6 includes receiving player health data responsive to the game play. Step 7006-6 includes expiring the player token NFT associated with the game, when the player health data indicates an expiration of player health.

Other implementations of multiplayer games associated with an NFT platform are likewise possible and are presented in conjunction with FIGS. 20A-20N, 21A-21O and 22A-22P that follow.

Consider examples where a multiplayer game involves game "syndicates". As used herein, a syndicate is a collection of players (with associated characters) and possibly one or more non-player characters (NPCs) that are formally associated with one another, share an allegiance, cooperate and/or work together toward common goals, in common quests, pursuits and/or tasks and/or that operate as a team.

In various examples, a character may earn (e.g., via successful performance of an initiation ritual) and/or via invitation, membership in a syndicate which is memorialized with a game item associated to the character/player that will be referred to as a "Ticket" and also by a formalized token such as a ticket NFT which publicly recognizes a players allegiance to that particular syndicate. The ticket NFT can be written to the public ledger, containing its mint number, family tree, syndicate identification, player association and/or other player information. It should be noted that certain syndicates may have different classes/statuses of membership such as apprentice, journeyman, master, grandmaster, counselor, elder, adjudicator, warlord, etc. that can be earned via game play. Likewise, a player's ticket and ticket NFT can be updated based on game play to represent a player's class/status in the syndicate at any given time. In other examples, upon receiving a Ticket, a player's character's appearance can be visually imprinted with a demarcation (e.g. a tattoo or brand) or other imagery that is associated with the syndicate.

In various examples, a ticket may be redeemed in exchange for services from the syndicate (e.g., the ticket is surrendered or "torn") at which point the player is cast out, the syndicate's further allegiance to the player is forfeited and the ticket NFT can be made to expire. The Ticket NFT may also be made to expire upon expiration of the player and/or the player token NFT.

In various examples, a non-fungible token (NFT) platform operates by: receiving, via the processor, player data to be associated with a player ticket NFT corresponding to a multiplayer game; receiving, via the processor, other data, wherein the other data includes player syndicate data to be associated with the player ticket NFT; and facilitating creation of the player ticket NFT, based on the player data the player syndicate data.

In various examples, a non-fungible token (NFT) platform operates by: facilitating, via a processor, game play based on a player token NFT associated with the game; receiving player syndicate data responsive to the game play; and updating the player token NFT associated with the game, based on the player syndicate data.

In various examples, a non-fungible token (NFT) platform operates by: facilitating, via a processor, game play based on a player token NFT associated with the game; and receiving a player syndicate update responsive to the game play indicating a player's disassociation with a player syndicate; and updating the player token NFT associated with the game, based on the player syndicate update responsive to the game play indicating the player's disassociation with the player syndicate.

In various examples, a non-fungible token (NFT) platform operates by: facilitating, via a processor, game play based on a player ticket NFT associated with the game; receiving a player syndicate update responsive to the game play indicating a player's disassociation with a player syndicate associated with the player ticket NFT; and updating the player ticket NFT associated with the game, based on the player syndicate update responsive to the game play indicating the player's disassociation with the player syndicate.

In various examples, a non-fungible token (NFT) platform operates by: facilitating, via a processor, game play based on a player token NFT associated with the game; receiving a player syndicate data responsive to the game play; and updating the player token NFT associated with the game, based on the player syndicate data, with imagery associated with the player syndicate data.

In various examples, a non-fungible token (NFT) platform operates by: facilitating, via a processor, play of a game based on a player ticket NFT associated with the game; receiving player ticket redemption data responsive to the game play; and expiring the player ticket NFT associated with the game, when the player ticket redemption data indicates a player's ticket has been torn.

FIG. 20A presents a block/flow diagram representation of an example system. In the example shown, NFT generation tools 808 operate to convert image data 7120-1 and other data 7122-1 into a player ticket NFT 7124-1. The image data 7120-1 can correspond to a generic blank ticket and/or a blank ticket associated with a particular syndicate. In various examples, the NFT generation tools 808 can operate to verify the credentials of a player's player token NFT prior to creating the player ticket NFT 7124-1. In this fashion, a player ticket NFTs 7124-1 can only be created when the player's NFT is verified—preventing the creation of unauthorized or counterfeit player ticket NFTs.

The other data 7122-1 can include syndicate data including the name of the syndicate, distinctive markings, and/or other attributes of the syndicate. The other data 7122-1 can include a set of attribute data corresponding to a particular player (and associated character) and/or player/character's persona. The set of attribute data can, for example, correspond to a character's imagery, character name, player name, syndicate status, strength, intelligence, willpower, agility, speed, endurance, constitution, personality, luck, magical ability, fighting ability, education, social standing, dexterity, charisma and/or other player/character properties, abilities, strengths and/or weaknesses pertaining to the game. These properties can further include personas with differ goals including some personas having a goal to win, some personas having a goal to sabotage and/or spoil the victory for other players, other personas having a goal to extend the game as long as possible, etc. The other data 7122-1 can further include use conditions/restrictions to be associated with the player ticket NFT 7124-1 such as restrictions on loans and/or sales (if any), expiration conditions (if any), update conditions, and/or other conditions.

This other data 7122-1 can be used and/or combined with the image data 7120-1 to create a dataset that includes both the image data 7120-1 and the other data 7122-1. This combined dataset can be protected via the blockchain and/or other crypto-based NFT creation technology that is employed by the NFT generation tools 808 and via the NFT creation system 824 to create and protect each new player ticket NFT 7124-1 itself. It should be noted that the player token NFTs 7124-1 can include a single derivative or a number of derivatives, including a limited series of derivatives. It should be noted further that some or all of the other data 7122-1, including restriction data and/or attribution data, can be derived from one or more original NFTs whose images are associated with the image data 7120-1.

FIG. 20B presents a pictorial representation of an example NFT. In the example show, a player having a character named "Maalek Zorb" has been issued a player ticket NFT 7124-1 indicating the player/character's association with the "Bruconian Syndicate" in an online multiplayer fantasy game.

FIG. 20C presents a block/flow diagram representation of an example system. In the example shown, NFT generation tools can be used to generate an updated player token NFT 7110-2 that is based on a player token NFT 7110-1 (e.g., based on the data contained therein and/or as a derivative of the earlier NFT) and other data 7112-1, such as game play data generated via play of the game via the player/character associated with the player token NFT 7110-1. In various examples, the NFT generation tools 808 can operate to verify the credentials of the player token NFT 7110-1 prior to creating the updated player token NFT 7110-2. In this fashion, an updated player token NFT 7110-2 can only be created when the player's earlier token NFT is verified—preventing the creation of unauthorized or counterfeit player token NFTs.

In the example shown, the other data 7112-1 includes game play data with player syndicate data that indicates that the player has become associated with the Bruconian Syndicate and imagery associated with that syndicate that is included in imagery of the updated player token NFT 7110-2.

In the example shown in FIG. 20D, a mark of the syndicate is tattooed (in black) on the left arm of the player's character going forward and the imagery of the player token NFT is updated to reflect this. In this fashion, other players seeing this player in the game can visually recognize the character's syndicate affiliation. In other examples however, other image updates and/or other non-image updates are likewise possible to indicate the syndication affiliation of the character.

FIG. 20E presents a block/flow diagram representation of an example system. In the example shown, NFT generation tools can be used to generate an updated player ticket NFT 7124-2 that is based on a player ticket NFT 7124-1 (e.g., based on the data contained therein and/or as a derivative of the earlier NFT) and other data 7122-2, such as game play data generated via play of the game via the player/character associated with the player ticket NFT 7124-1. In various examples, the NFT generation tools 808 can operate to verify the credentials of the player ticket NFT 7124-1 prior to creating the updated player ticket NFT 7124-2. In this fashion, an updated player ticket NFT 7124-2 can only be created when the player's earlier ticket NFT is verified—preventing the creation of unauthorized or counterfeit player ticket NFTs.

The other data 7122-2 can include updates to the syndicate, updates to the player/character in the syndicate including promotions and demotions, and/or other changes that come about based on game play by the player and/or by others. In the example shown, the other data 7122-2 includes game play data that indicates the character's disassociation with the syndicate (e.g., based on game play data that includes player ticket redemption data indicating that the character's ticket has been redeemed) as indicated in the updated player ticket 7124-2 shown in FIG. 20F.

In various examples, other data indicating player syndicate updates generated based on game play can likewise be used to generate an updated player token NFT 7110-3 as shown in FIG. 20G. In the example of 20H, the character's imagery has been updated and, in this example, the syndicate tattoo has been negated with an overlaid "not" symbol tattoo (in red)—indicating the character's ticket redemption and/or other syndicate disassociation.

FIG. 20I presents a flowchart representation 7100-1 of an example method. In particular, a method is presented for use in conjunction with one or more functions or features described herein. For example, the method can be used with an NFT platform, game platform and/or other system that includes a processor, network interface and a memory to perform various steps of the method.

Step 7102-1 includes receiving, via the processor, player data to be associated with a player ticket NFT corresponding to a multiplayer game. Step 7104-1 includes receiving, via the processor, other data, wherein the other data includes player syndicate data to be associated with the player ticket NFT. Step 7106-1 includes facilitating creation of the player ticket NFT, based on the player data the player syndicate data.

FIG. 20J presents a flowchart representation 7100-2 of an example method. In particular, a method is presented for use in conjunction with one or more functions or features described herein. For example, the method can be used with an NFT platform, game platform and/or other system that includes a processor, network interface and a memory to perform various steps of the method.

Step 7102-2 includes facilitating, via a processor, game play based on a player token NFT associated with the game. Step 7104-2 includes receiving player syndicate data responsive to the game play. Step 7106-2 includes updating the player token NFT associated with the game, based on the player syndicate data.

Figure 20L:
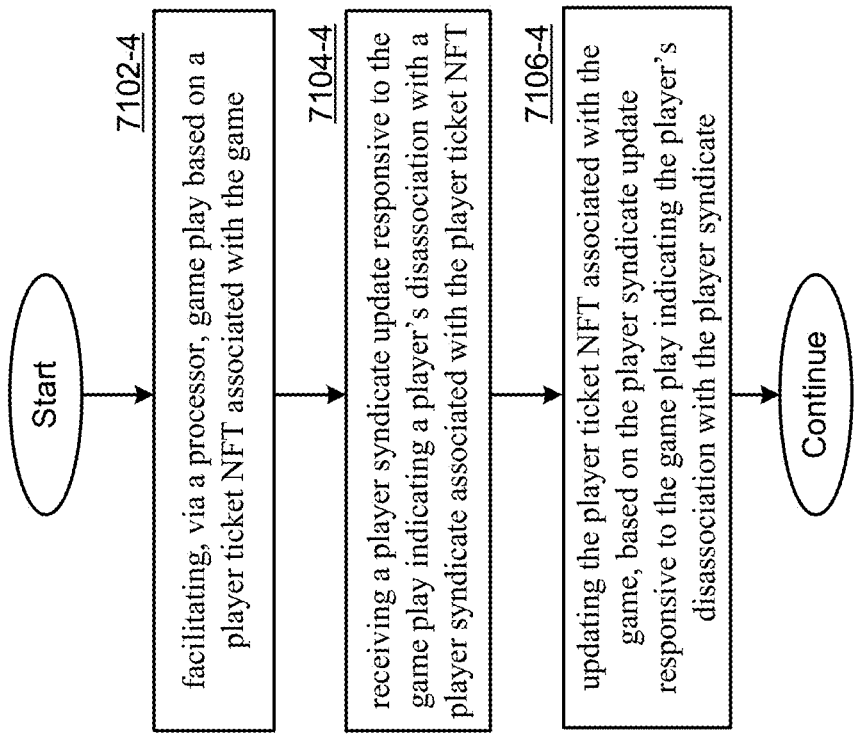
Figure 20K:
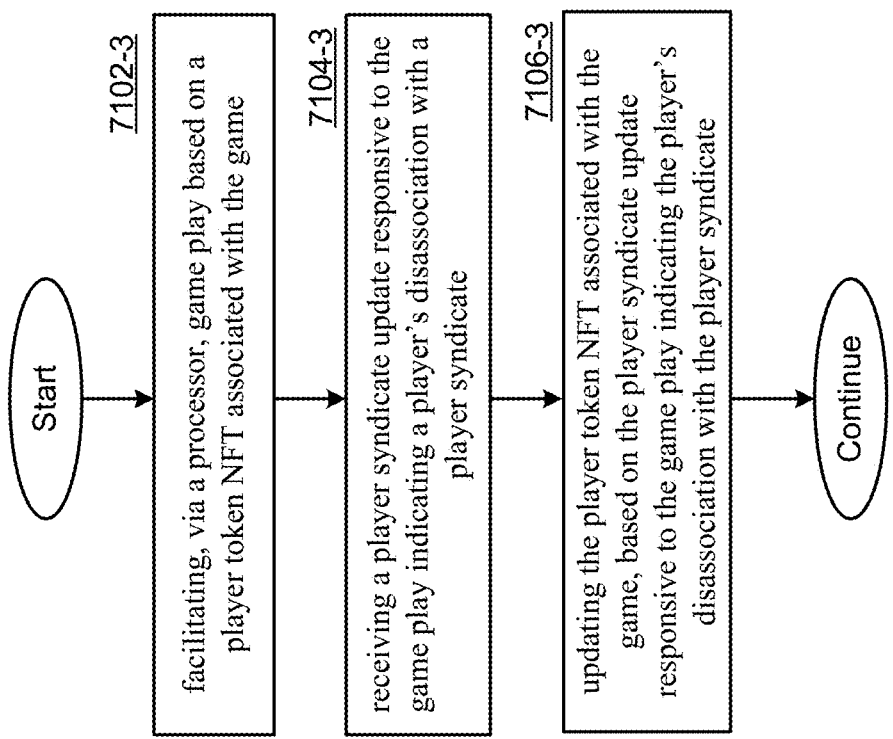

FIG. 20K presents a flowchart representation 7100-3 of an example method. In particular, a method is presented for use in conjunction with one or more functions or features described herein. For example, the method can be used with an NFT platform, game platform and/or other system that includes a processor, network interface and a memory to perform various steps of the method.

Step 7102-3 includes facilitating, via a processor, game play based on a player token NFT associated with the game. Step 7104-3 includes receiving a player syndicate update responsive to the game play indicating a player's disassociation with a player syndicate. Step 7106-3 includes updating the player token NFT associated with the game, based on the player syndicate update responsive to the game play indicating the player's disassociation with the player syndicate.

FIG. 20L presents a flowchart representation 7100-4 of an example method. In particular, a method is presented for use in conjunction with one or more functions or features described herein. For example, the method can be used with an NFT platform, game platform and/or other system that includes a processor, network interface and a memory to perform various steps of the method.

Step 7102-4 includes facilitating, via a processor, game play based on a player ticket NFT associated with the game. Step 7104-4 includes receiving a player syndicate update responsive to the game play indicating a player's disassociation with a player syndicate associated with the player ticket NFT. Step 7106-4 includes updating the player ticket NFT associated with the game, based on the player syndicate update responsive to the game play indicating the player's disassociation with the player syndicate.

Figures 20M, 20N:
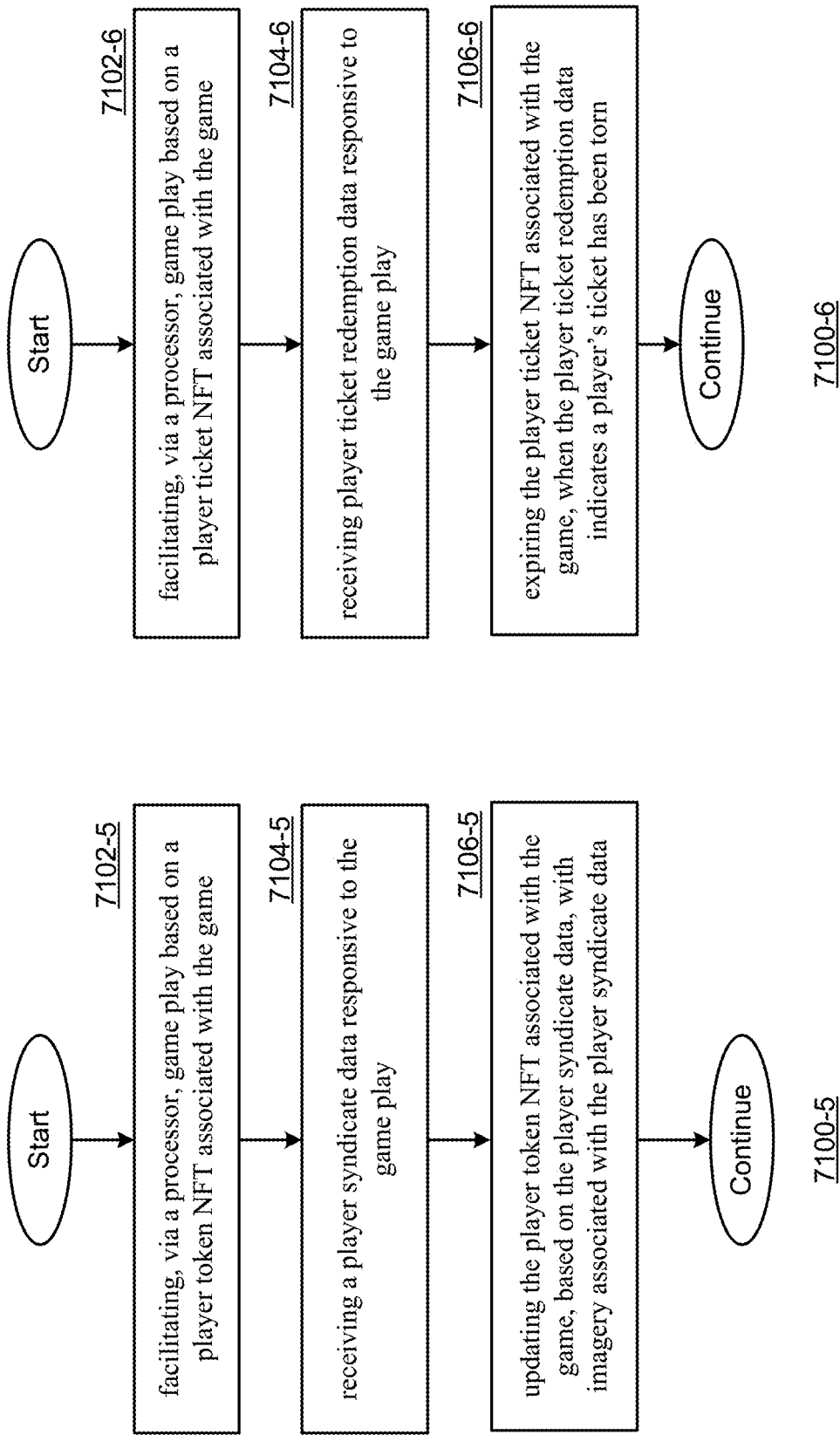

FIG. 20M presents a flowchart representation 7100-5 of an example method. In particular, a method is presented for use in conjunction with one or more functions or features described herein. For example, the method can be used with an NFT platform, game platform and/or other system that includes a processor, network interface and a memory to perform various steps of the method.

Step 7102-5 includes facilitating, via a processor, game play based on a player token NFT associated with the game. Step 7104-5 includes receiving a player syndicate data responsive to the game play. Step 7106-5 includes updating the player token NFT associated with the game, based on the player syndicate data, with imagery associated with the player syndicate data.

FIG. 20N presents a flowchart representation 7100-6 of an example method. In particular, a method is presented for use in conjunction with one or more functions or features described herein. For example, the method can be used with an NFT platform, game platform and/or other system that includes a processor, network interface and a memory to perform various steps of the method.

Step 7102-6 includes facilitating, via a processor, play of a game based on a player ticket NFT associated with the game. Step 7104-6 includes receiving player ticket redemption data responsive to the game play. Step 7106-6 includes expiring the player ticket NFT associated with the game, when the player ticket redemption data indicates a player's ticket has been torn.

Consider further examples where non-player character (NPC) NFTs are generated by an NFT platform that associated with NPCs used in game play such as pets, other non-human NPCs including bots, aliens, animals and/or other non-player characters that are owned, associated with, guided (e.g., with some autonomous action) or otherwise controlled by the player and/or associated with the player's character. The NPC NFTS can be owned by the player and/or associated with the player token NFT. These NPC NFTs can be earned based on game play, purchased, customized, updated based on game play and/or loaned just as in a player token NFT or other game token NFT. They can also be sold and may continue after a player token NFT is expired and then may be associated with another player. Also, NPC NFTs may be associated (or also associated) with two or more players and/or a syndicate and guided and/or controlled in a hierarchal fashion—first player, then associated players and other syndicate players and/or based on syndicate status/class.

FIG. 21A presents a block/flow diagram representation of an example system. In the example shown, NFT generation tools 808 operate to utilize player data 7220-1 and other data 7222-1 to generate NPC NFT 7224-1. The player data 7220-1 can include a character's name, character, syndicate and/or other character attributes and/or other data associated with a player's player token NFT. In various examples, the NFT generation tools 808 can operate to verify the credentials of a player's player token NFT prior to creating the NPC NFT 7224-1. In this fashion, NPC NFTs 7224-1 can only be created when the player's NFT is verified—preventing the creation of unauthorized or counterfeit NPC NFTs.

The other data 7222-1 can include a set of attribute data corresponding to a particular NPC and/or character persona. The set of attribute data can, for example, correspond to a character's imagery, character name, player name, syndicate status, strength, intelligence, willpower, agility, speed, endurance, constitution, personality, luck, magical ability, fighting ability, education, social standing, dexterity, charisma and/or other player/character properties, abilities, strengths and/or weaknesses pertaining to the game. The other data 7222-1 can further include use conditions/restrictions to be associated with the NPC NFT 7224-1 such as restrictions on loans and/or sales (if any), expiration conditions (if any), update conditions, and/or other conditions.

This other data 7222-1 can be used and/or combined with the player data 7220-1 to create a dataset. This combined dataset can be protected via the blockchain and/or other crypto-based NFT creation technology that is employed by the NFT generation tools 808 and via the NFT creation system 824 to create and protect each new NPC NFT 7224-1 itself.

FIG. 21B presents a pictorial representation of an example NFT. In the example shown, an NPC earned by and associated with a player's character has been issued a NPC NFT 7224-1 in an online multiplayer fantasy game. In this example, the NPC is "Fiji the War Parrot" that is guided by commands issued by the player/character, to "hunt", "protect", "shred", "chomp", "stand down", "scout", "find", etc. After being issued a command, the parrot can operate autonomously in the game (based, for example on the operation of an AI game bot that controls its actions) until a command is fulfilled or a new command is issued.

FIG. 21C presents a block/flow diagram representation of an example system. In the example shown, NFT generation tools can be used to generate an updated NPC NFT 7224-2 that is based on a NPC NFT 7224-1 (e.g., based on the data contained therein and/or as a derivative of the earlier NFT) and other data 7212-1, such as game play data generated via play of the game via the player/character associated with the NPC NFT 7224-1 and/or based on the performance of the NPC itself. In various examples, the NFT generation tools 808 can operate to verify the credentials of a player's player token NFT and/or the NPC NFT 7224-1 prior to creating the updated NPC NFT 7224-2. In this fashion, an updated NPC NFT 7124-2 can only be created when the player's earlier token NFT and/or the player's NPC NFT is/are verified—preventing the creation of unauthorized or counterfeit NPC NFTs. In the example shown, the other data 7212-1 includes game play data with player syndicate data that indicates that the player associated with the NPC and/or other NPC itself has become associated with the Bruconian Syndicate and imagery associated with that syndicate that is included in imagery of the updated NPC NFT 7224-2.

In the example shown in FIG. 21D, a mark of the syndicate is tattooed (in black) on the parrot feathers and the imagery of the NPC NFT 7224-2 is updated to reflect this. In this fashion, other players seeing this NPC in the game can visually recognize the NPC's syndicate affiliation. In other examples however, other image updates and/or other non-image updates are likewise possible to indicate the syndication affiliation of the NPC. In other examples, the NPC NFT 7224-2 can be updated to reflect the performance of the NPC, the player's character and/or other results of the game play including the health of the NPC, injuries to the NPC, armor or other items acquired by the NPC, skills (such as upright walking, talking, languages, or other skills acquired by the NPC) and/or other changes in the NPCs attributes.

Likewise, a player/character's association or disassociation and/or other game play results/performance involving the NPC can be reflected in updates to the player's player token of the player token NFT 7110-05 shown in the system of FIG. 21E. In more specific examples, the updated player token NFT 7110-5 shown in FIG. 21F reflects game play data indicating the association of a player's character with an NPC (such as an NPC wombat having associated NPC NFT 7224-1') and the updated player token NFT 7110-6 of FIG. 21G reflects game play data indicating the subsequent disassociation of the player's character with the NPC wombat.

In further examples, a player/character's disassociation with the NPC can be reflected in updates to the player's NPC NFT that may be based on the specific conditions of the NFT. In specific examples, the updated NPC NFT 7224-2' shown in FIG. 21H reflects game play data indicating the disassociation of a player's character with the NPC wombat or the termination of the player's character resulting in free agency that can, for example, cause the player to lose all control of the NPC but to enable the player to freely sell the NPC NFT. In the example of FIG. 21I, the NPC NFT 7224-2' is expired based on game play data indicating the termination of the corresponding NPC, and/or based on the termination of the player's character itself.

Figures 21J, 21K:
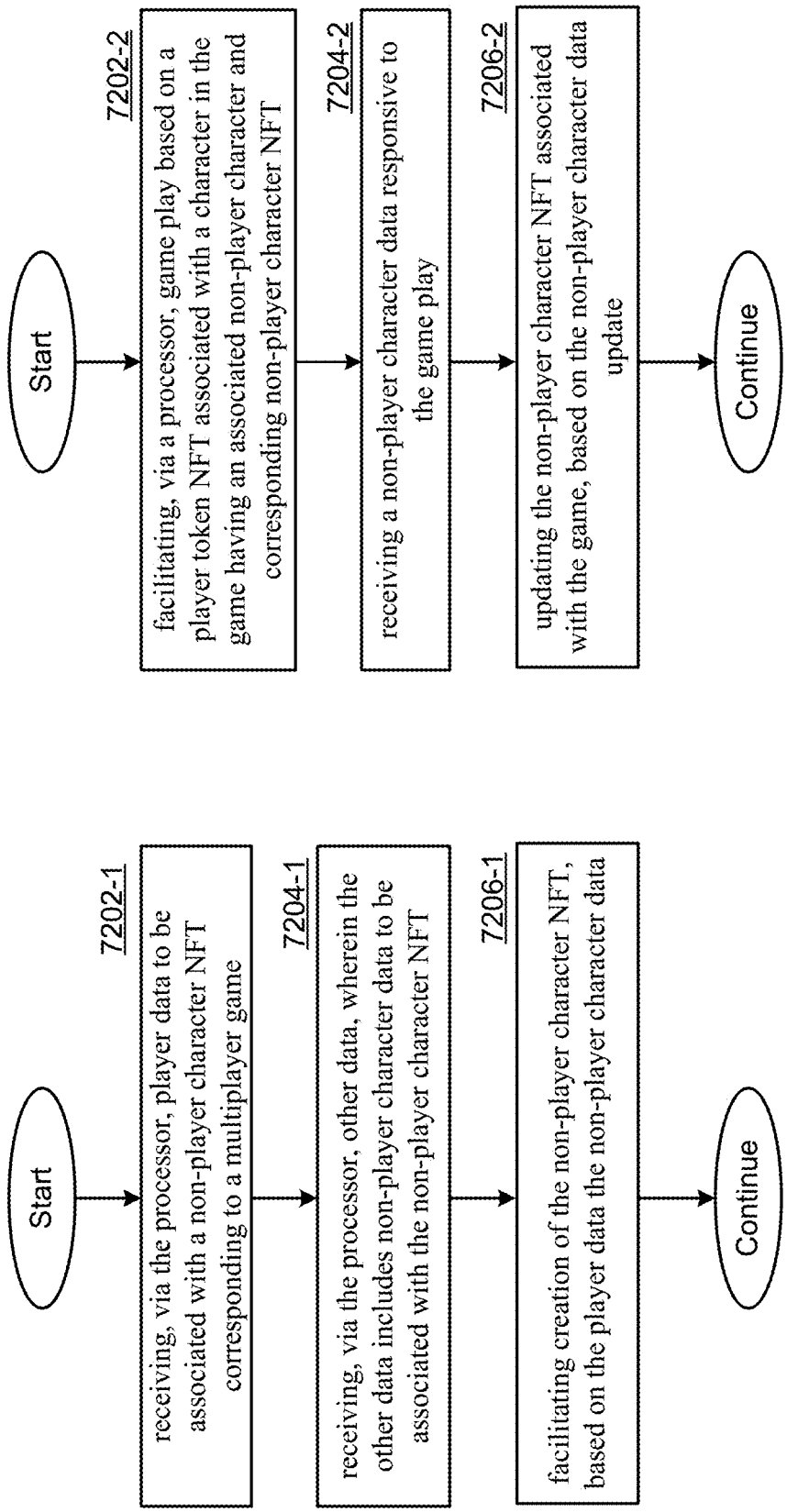

FIG. 21J presents a flowchart representation 7200-1 of an example method. In particular, a method is presented for use in conjunction with one or more functions or features described herein. For example, the method can be used with an NFT platform, game platform and/or other system that includes a processor, network interface and a memory to perform various steps of the method. Step 7202-1 includes receiving, via the processor, player data to be associated with a non-player character NFT corresponding to a multiplayer game. Step 7204-1 includes receiving, via the processor, other data, wherein the other data includes non-player character data to be associated with the non-player character NFT. Step 7206-1 includes facilitating creation of the non-player character NFT, based on the player data the non-player character data.

FIG. 21K presents a flowchart representation 7200-2 of an example method. In particular, a method is presented for use in conjunction with one or more functions or features described herein. For example, the method can be used with an NFT platform, game platform and/or other system that includes a processor, network interface and a memory to perform various steps of the method.

Step 7202-2 includes facilitating, via a processor, game play based on a player token NFT associated with a character in the game having an associated non-player character and corresponding non-player character NFT. Step 7204-2 includes receiving a non-player character data responsive to the game play. Step 7405-2 includes updating the non-player character NFT associated with the game, based on the non-player character data update.

Figure 21M:
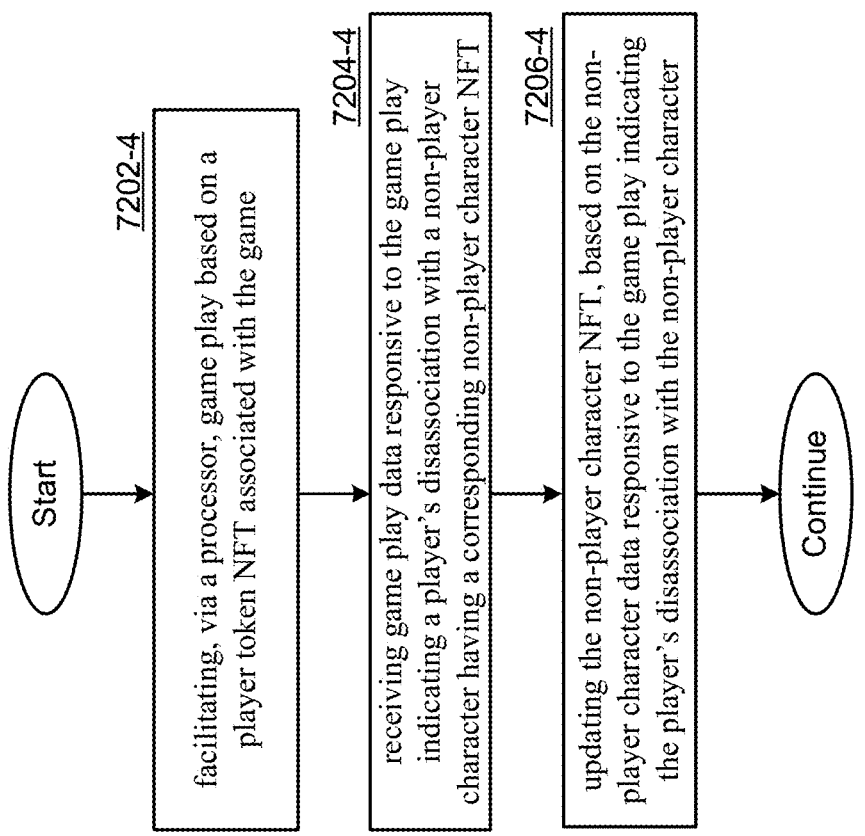
Figure 21L:
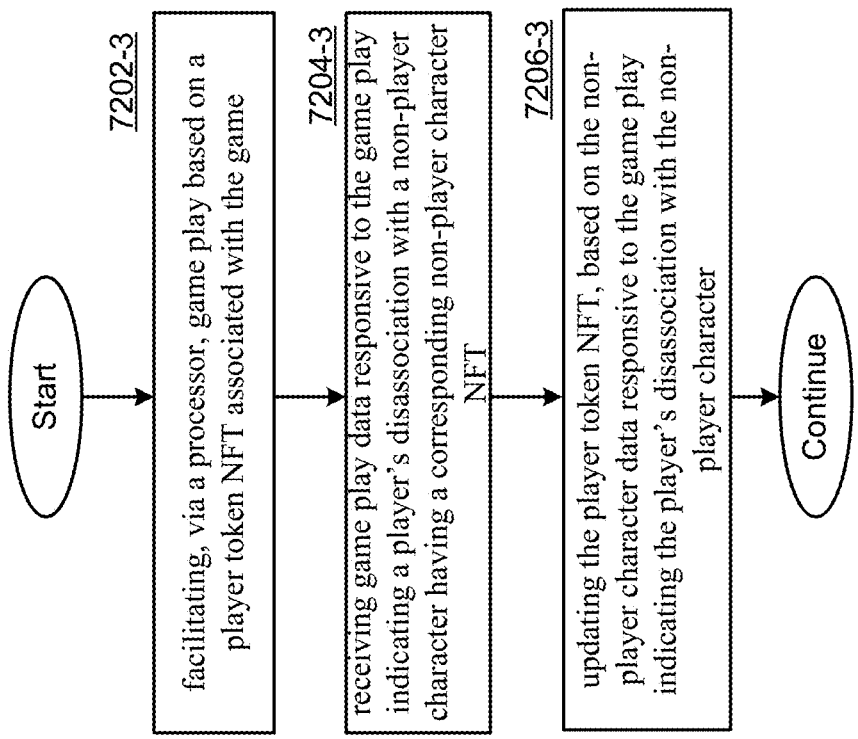

FIG. 21L presents a flowchart representation 7200-3 of an example method. In particular, a method is presented for use in conjunction with one or more functions or features described herein. For example, the method can be used with an NFT platform, game platform and/or other system that includes a processor, network interface and a memory to perform various steps of the method.

Step 7202-3 includes facilitating, via a processor, game play based on a player token NFT associated with the game. Step 7204-3 includes receiving game play data responsive to the game play indicating a player's disassociation with a non-player character having a corresponding non-player character NFT. Step 7406-3 includes updating the player token NFT, based on the non-player character data responsive to the game play indicating the player's disassociation with the non-player character.

FIG. 21M presents a flowchart representation 7200-4 of an example method. In particular, a method is presented for use in conjunction with one or more functions or features described herein. For example, the method can be used with an NFT platform, game platform and/or other system that includes a processor, network interface and a memory to perform various steps of the method.

Step 7202-4 includes facilitating, via a processor, game play based on a player token NFT associated with the game. Step 7404-4 includes receiving game play data responsive to the game play indicating a player's disassociation with a non-player character having a corresponding non-player character NFT. Step 7406-4 includes updating the non-player character NFT, based on the non-player character data responsive to the game play indicating the player's disassociation with the non-player character.

Figure 21O:
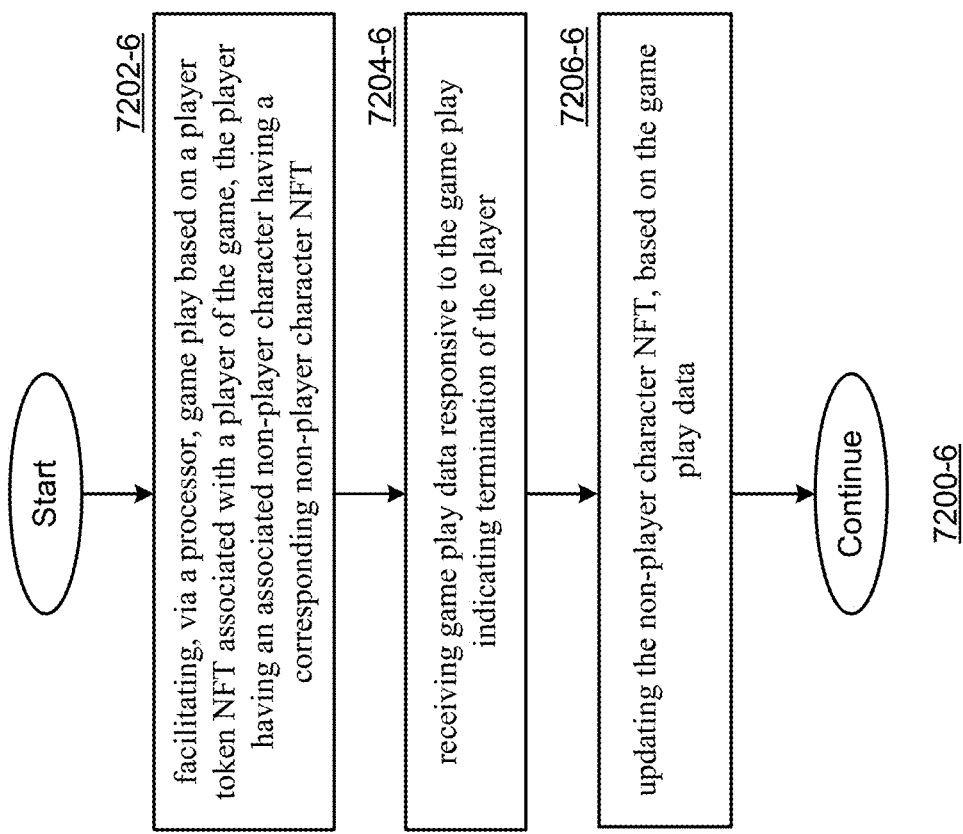
Figure 21N:
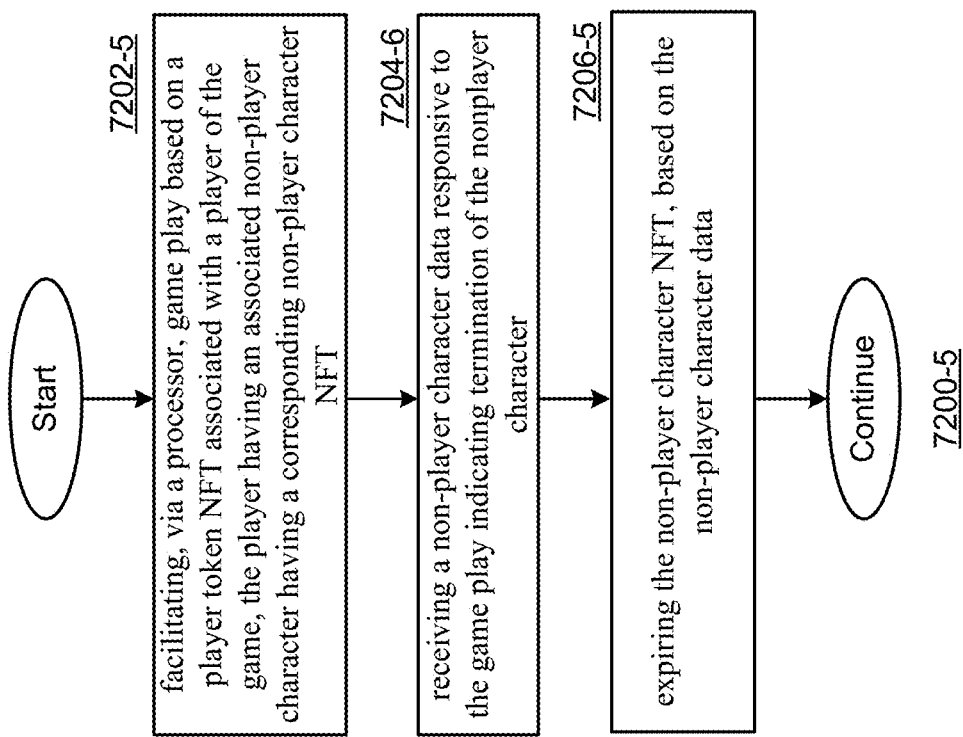

FIG. 21N presents a flowchart representation 7200-5 of an example method. In particular, a method is presented for use in conjunction with one or more functions or features described herein. For example, the method can be used with an NFT platform, game platform and/or other system that includes a processor, network interface and a memory to perform various steps of the method.

Step 7202-5 includes facilitating, via a processor, game play based on a player token NFT associated with a player of the game, the player having an associated non-player character having a corresponding non-player character NFT. Step 7204-5 includes receiving a non-player character data responsive to the game play indicating termination of the nonplayer character. Step 7206-5 includes expiring the non-player character NFT, based on the non-player character data.

FIG. 21O presents a flowchart representation 7200-6 of an example method. In particular, a method is presented for use in conjunction with one or more functions or features described herein. For example, the method can be used with an NFT platform, game platform and/or other system that includes a processor, network interface and a memory to perform various steps of the method.

Step 7202-6 includes facilitating, via a processor, game play based on a player token NFT associated with a player of the game, the player having an associated non-player character having a corresponding non-player character NFT. Step 7204-6 includes receiving game play data responsive to the game play indicating termination of the player. Step 7206-6 includes updating the non-player character NFT, based on the game play data.

In various examples, Oath NFTs (associated with corresponding Oaths in a game), have associated obligations granted to an Oath holder in exchange for player/character services and/or other game benefits given to the oath granter. For example, one player may grant an Oath to another player (who becomes the Oath holder) in exchange for assistance by the other player's corresponding character with a quest, loan of a game item or NPC, cash, or other benefit in the game. When an Oath is redeemed via an oath redemption request by the Oath holder, the Oath granter must satisfy the Oath by performing (e.g., the character performing in the game) as requested in the redemption request. For example, this can include performing a requested activity such as a hit or other contract by the oath giver, participation in a quest, performing a task or other requested activity, etc.

In various examples, the player's player token NFT can be updated to indicate that redemption request. Conditions associated with the Oath and the corresponding Oath NFT can include that an oath redemption cannot require player suicide, but can require participation in a seemingly suicidal activity in the game. After redemption and fulfillment of the Oath, the Oath NFT is updated to "satisfied". In various examples, the Oath NFTs are personal to the player and associated to the player token NFT, and cannot be loaned or sold, but they can expire if the player is killed, i.e., the player token NFT is expired and/or when the other player (the receiver of the oath) is killed (terminated). In other examples the Oath receiver can sell the Oath (and corresponding NFT) to other players and an Oath giver can redeem an Oath to assign a redemption request to another player.

If an Oath giver refuses an oath redemption request, this can trigger creation of a player termination contract, either automatically or by right of the Oath holder— e.g., to put out a hit on the player that refused the redemption request. Contract NFTs can be generated for game play by player resulting in a successful contract, e.g. a "hit". These contract NFTs can be earned when contract an existing contract is satisfied (e.g., satisfied first) by the player (or by a combination of players). Player token NFTs can be updated to reflect the successful contract satisfaction. The contract NFT may be prohibited to be loaned but may be sold, but they may or not expire if the player is killed, i.e., the player token NFT is expired.

FIG. 22A presents a block/flow diagram representation of an example system. In the example shown, NFT generation tools 808 operate to based on player data 7320-1 (the oath grantee) and other data 7322-1 corresponding another player (the oath grantor) to generate an oath NFT 7324-1. In various examples, the NFT generation tools 808 can operate to verify the credentials of a player's (and/or the other player's) player token NFT prior to creating the oath NFT 7324-1. In this fashion, oath NFTs 7324-1 can only be created when the player(s)' NFT is/are verified—preventing the creation of unauthorized or counterfeit oath NFTs.

The other data 7322-1 can further include image data corresponding to an oath token as well as use conditions/restrictions that correspond to the oath, syndicate data corresponding to the oath grantor and grantee and/or other data corresponding to the two characters/players and their obligations and conditions.

This other data 7322-1 can be used and/or combined with the player data 7320-1 to create a dataset that includes both the player data 7320-1 and the other data 71322-1. This combined dataset can be protected via the blockchain and/or other crypto-based NFT creation technology that is employed by the NFT generation tools 808 and via the NFT creation system 824 to create and protect each oath NFT 7324-1.

An example of the oath NFT 7324-1 is presented in FIG. 22B which represents an Oath given by a player's character (the oath grantor) to another character "Remo the Giant" (the grantee). An oath NFTs 7324-1 can be updated based on other data 7322-2 (including game play data) to generate an updated oath NFT 7324-2 as shown in FIG. 22C. In the example shown in FIG. 22D, an updated oath NFT has been generated to reflect that the oath grantee (Remo the Giant in this case) has requested redemption of the oath that requests the oath grantor (Maalek Zorb in this case) to terminate another game character Porky McPorkface. When the oath grantee has satisfied the oath, he can retain an updated oath NFT 7324-3 that is shown in FIG. 22E that reflects its success. Furthermore, the oath grantee's successful hit can be reflected in updates to the corresponding player token NFT shown in FIG. 22G and earning the player termination contract NFT 7310 on Porky McPorkface shown in FIG. 22H. If any of the oath redemption conditions are not met—for example, (a) the oath grantor is terminated before satisfying the oath, or (b) the oath grantee is terminated before satisfying the oath, or (c) the subject of the request is terminated before satisfying the oath, or (d) a time limit associated with the oath redemption expires, etc., then the oath NFT can be updated as expired as shown in FIG. 22F.

Figure 22J:
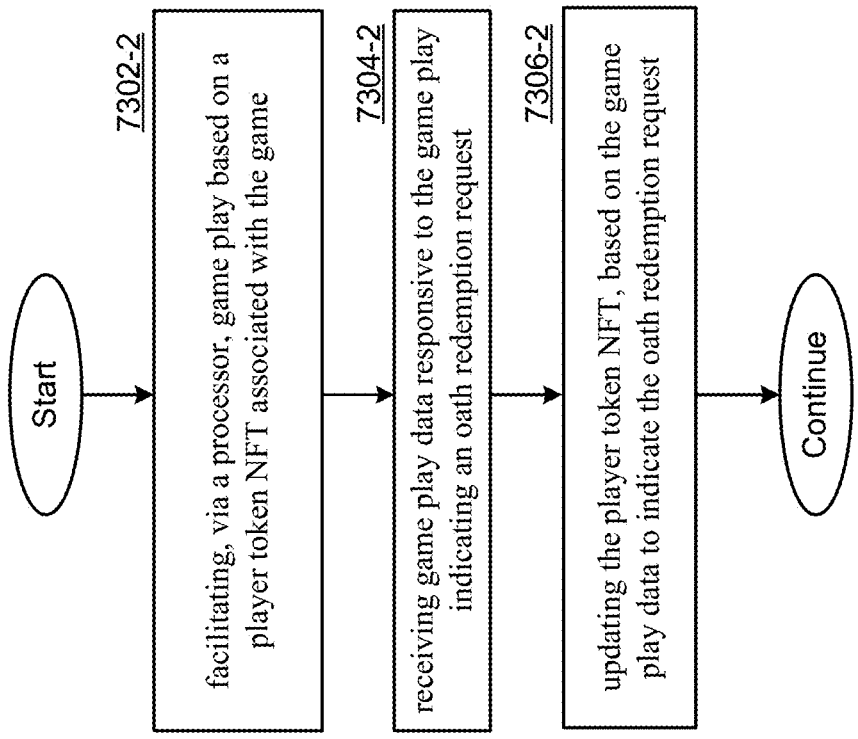
Figure 22I:
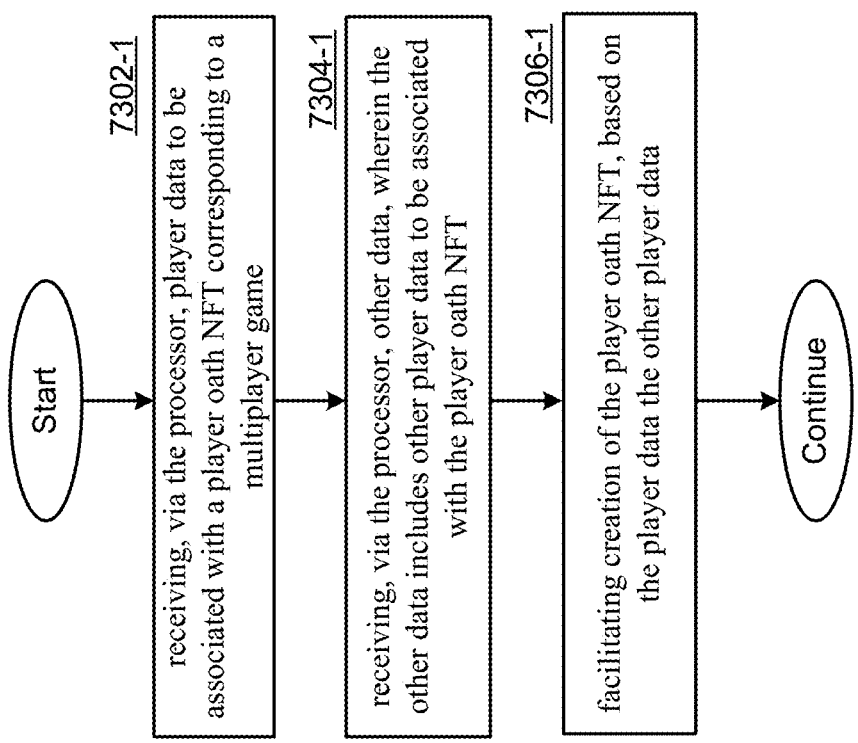

FIG. 22I presents a flowchart representation 7300-1 of an example method. In particular, a method is presented for use in conjunction with one or more functions or features described herein. For example, the method can be used with an NFT platform, game platform and/or other system that includes a processor, network interface and a memory to perform various steps of the method.

Step 7302-1 includes receiving, via the processor, player data to be associated with a player oath NFT corresponding to a multiplayer game, Step 7304-1 incudes receiving, via the processor, other data, wherein the other data includes other player data to be associated with the player oath NFT. Step 7306-1 includes facilitating creation of the player oath NFT, based on the player data the other player data.

FIG. 22J presents a flowchart representation 7300-2 of an example method. In particular, a method is presented for use in conjunction with one or more functions or features described herein. For example, the method can be used with an NFT platform, game platform and/or other system that includes a processor, network interface and a memory to perform various steps of the method.

Step 7302-2 includes facilitating, via a processor, game play based on a player token NFT associated with the game. Step 7304-2 includes receiving game play data responsive to the game play indicating an oath redemption request. Step 7306-2 includes updating the player token NFT, based on the game play data to indicate the oath redemption request.

FIG. 22K presents a flowchart representation 7300-3 of an example method. In particular, a method is presented for use in conjunction with one or more functions or features described herein. For example, the method can be used with an NFT platform, game platform and/or other system that includes a processor, network interface and a memory to perform various steps of the method.

Step 7302-3 includes facilitating, via a processor, game play based on a player token NFT associated with the game. Step 7304-3 includes receiving game play data responsive to the game play indicating an oath redemption request. Step 7306-3 includes determining, based on the game play when the oath redemption request has been satisfied. Step 7308-3 includes updating the player oath NFT to indicate when the oath redemption request has been satisfied.

FIG. 22L presents a flowchart representation 7300-4 of an example method. In particular, a method is presented for use in conjunction with one or more functions or features described herein. For example, the method can be used with an NFT platform, game platform and/or other system that includes a processor, network interface and a memory to perform various steps of the method.

Step 7302-4 includes facilitating, via a processor, game play based on a player token NFT associated with a player of the game, the player having an player oath NFT associated with an oath to the player by a second player. Step 7304-4 includes receiving second player data responsive to the game play indicating termination of the second player. Step 7306-4 includes expiring the player oath NFT, based on the termination of the second player.

Figure 22M:
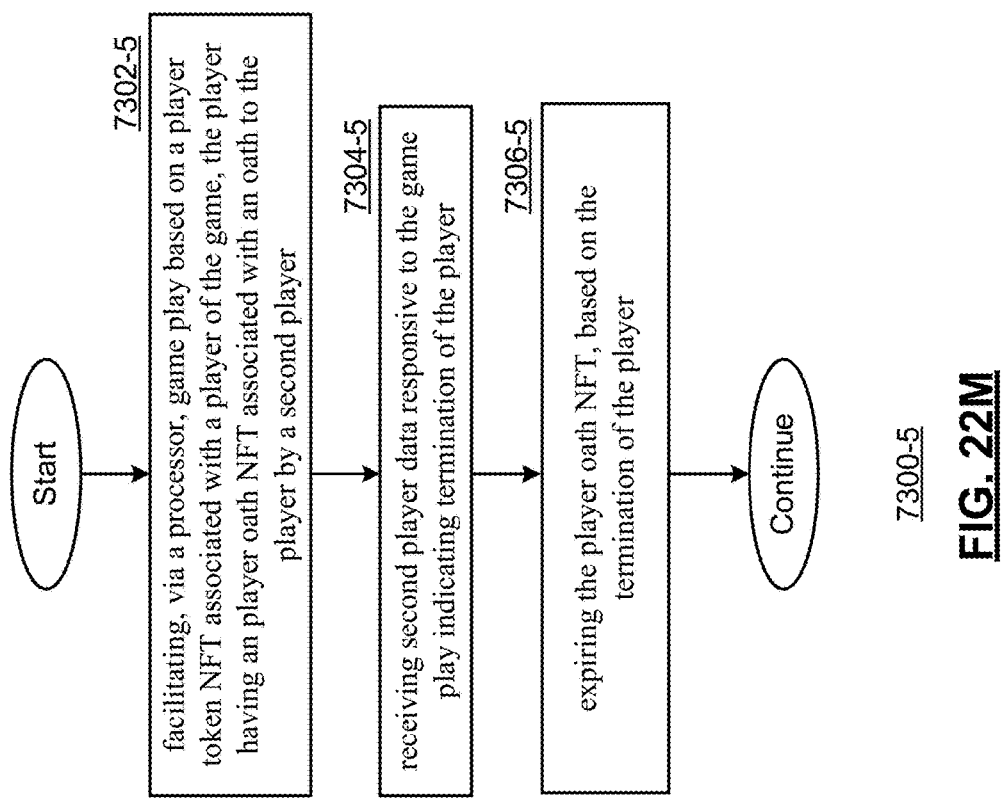

FIG. 22M presents a flowchart representation 7300-5 of an example method. In particular, a method is presented for use in conjunction with one or more functions or features described herein. For example, the method can be used with an NFT platform, game platform and/or other system that includes a processor, network interface and a memory to perform various steps of the method.

Step 7302-5 includes facilitating, via a processor, game play based on a player token NFT associated with a player of the game, the player having a player oath NFT associated with an oath to the player by a second player. Step 7304-5 includes receiving game play data responsive to the game play indicating termination of the player. Step 7206-5 includes expiring the player oath NFT, based on the termination of the player.

Figure 22N:
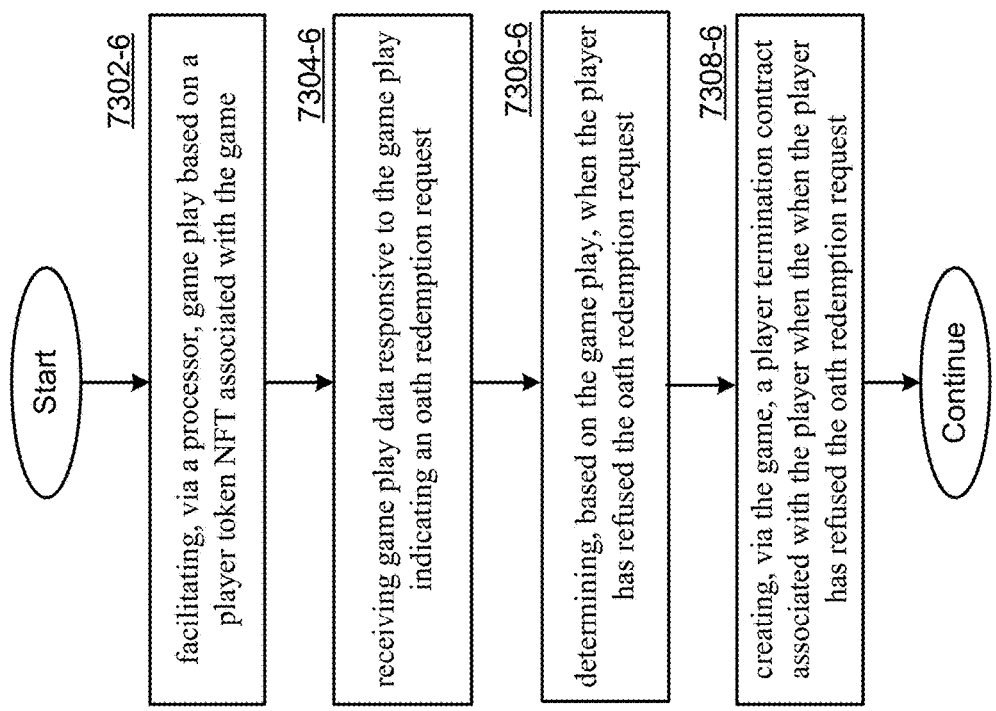

FIG. 22N presents a flowchart representation 7300-6 of an example method. In particular, a method is presented for use in conjunction with one or more functions or features described herein. For example, the method can be used with an NFT platform, game platform and/or other system that includes a processor, network interface and a memory to perform various steps of the method.

Step 7302-6 includes facilitating, via a processor, game play based on a player token NFT associated with the game. Step 7304-6 includes receiving game data responsive to the game play indicating an oath redemption request. Step 7306-6 includes determining, based on the game play, when the player has refused the oath redemption request. Step 7308-6 includes creating, via the game, a player termination contract associated with the player when the when the player has refused the oath redemption request.

FIG. 22O presents a flowchart representation 7300-7 of an example method. In particular, a method is presented for use in conjunction with one or more functions or features described herein. For example, the method can be used with an NFT platform, game platform and/or other system that includes a processor, network interface and a memory to perform various steps of the method.

Step 7302-7 includes facilitating, via a processor, game play based on a player token NFT associated with the game. Step 7304-7 includes receiving player termination contract data responsive to the game play indicating a player termination contract associated with a second player. Step 7306-7 includes determining based on game play responsive to game play when the player has satisfied the player termination contract. Step 7308-7 includes updating the player token NFT when the player has satisfied the player termination contract.

FIG. 22P presents a flowchart representation 7300-8 of an example method. In particular, a method is presented for use in conjunction with one or more functions or features described herein. For example, the method can be used with an NFT platform, game platform and/or other system that includes a processor, network interface and a memory to perform various steps of the method.

Step 7302-8 includes facilitating, via a processor, game play based on a player token NFT associated with the game. Step 7304-8 includes receiving player termination contract data responsive to the game play indicating a player termination contract associated with a second player. Step 7306-8 includes determining based on game play responsive to game play when the player has satisfied the player termination contract. Step 7308-8 includes facilitating generation of a contract NFT associated with the player when the player has satisfied the player termination contract.

Consider a further example, in addition or alternative to any of the forgoing, where a massive multiplayer online game is themed based on the John Wick franchise of films. This metaverse-based game, presents a blockchain-based interactive experience that can be built on the core principle of becoming an Assassin in the franchise-inspired Underworld. The Underworld is built on web3 mechanics that leverage hierarchical relationships, that manage rules and reverence, and that delivers a one-of-a-kind game experience and economy, supporting true ownership through a unique blend of adventure and survival.

Journey to the High Table

The High Table serves as the ultimate authority for every criminal in the Underworld. Each seat is occupied by the leader of a unique criminal syndicate, ranging from the Cosa Nostra to the Yakuza. Syndicates with a seat at the High Table represent the most elite of the criminal organizations, with that designation potentially being measured in overall mission success, membership volume, or cumulative ranking of members. As such, only a certain number of syndicates would sit at the table, with the rest maintaining a lower status and reputation.

At the outset of gameplay, syndicates would be predetermined. But after a significant duration of time, player-created syndicates would emerge, potentially via a voting mechanism. Players will need to use every skill at their disposal to try and rise through the ranks. But as they reach the upper echelons of a syndicate, they'll risk being targeted by someone wanting their place.

Discovering the Underworld

One of the core pillars of John Wick is the depth of the stories told in the world. Discovering new stories, mythology, environments, and characters is key both in the Underworld and to the player's experience. The Underworld leverages blockchain and web3 technologies to manage critical components for the game economy, syndicate relationships, and assassin personalization in a trustless manner.

It also creates a community through story and social interaction that can lead to scalable revenue opportunities and lifelong value to and from players. As a player, you are writing your legend to the history book of your assassin which cannot be rewritten. Player-influenced narratives provide a story-based backbone for the Underworld and the souls in it. These stories evolve as players unlock achievements, and they are further steered by an AI engine that has been trained with John Wick lore.

As players navigate the world, their interactions, decisions and results become a part of your assassin's lore that is immortalized on chain. This solidifies the social impact each assassin has on the Wick universe.

Web3—Changing the Experience

Web3 philosophies and techniques open up new opportunities to increase engagement and create unique monetization opportunities for members of the ecosystem in decentralized trustless transactions. When Assassins are offered a Hit, they enter into a smart contract that immediately executes payment through a trustless transaction upon completion. Additionally, all the gear Assassins use is fully owned and securely and transparently written to the public ledger. This also includes developments in the narrative itself, serving as a recorded history of the conflicts and resolutions between players and syndicates, resulting in an ongoing epic legend for each player.

Consider the following additional examples how web3 technology can be used in the Underworld to drive the player experience.

The High Table Structure

The syndicate application process navigates a relationship system immortalized on the blockchain and reflected in the decentralized hierarchical map/ledger stored in each player's Assassin file.

Assassin Creator

Assassins' unique visual traits (from weapons to tattoos) are all managed on a decentralized ledger through acquisition of digital collectibles such as player token NFTs, oaths, tickets, and coins. No two assassins can be created to be the same—so the unique characteristics of each assassin are permanently removed from the future selection pool after each new character is created.

Contracts

Hits and Oaths are ordered and bound by smart contracts that live on-chain, and they can be both created and collected by Assassins and syndicates alike.

Currency

The currency of the world can be used to create a contract, gain access, and purchase gear.

Joining the Underworld

After a new character is created the player's journey begins with an invitation, or "Ticket," which is also a formalized token and publicly recognized declaration of one's allegiance to a particular syndicate. This Ticket is a debt or bond of allegiance between two individuals or one individual with an organization called a syndicate. Upon receiving a Ticket, a player's character's appearance will be visually imprinted with a demarcation (e.g. a tattoo or brand). After receiving a Ticket from a syndicate, a player's Assassin file is written to the public ledger, containing its mint number, family tree, and syndicate identification. The higher a player mints on the family tree, the more initially powerful their Assassin becomes. After becoming a member, players can start inviting their own friends to create a community below them. The larger the community of Assassins, the more powerful its leader. Each syndicate reveal is a must-see, must-attend event. The Elder will be gifting syndicate Ticket invitations at certain times and real-life locations. Once a syndicate Ticket is dropped, participants can watch the network grow across the world, connecting everyone together.

A ticket may be redeemed in exchange for services from the syndicate (e.g., the ticket is surrendered), at which point the syndicate's further allegiance to the player is forfeited and the ticket NFT can be made to expire. The Ticket NFT may also be made to expire when upon expiration of the player and/or the player token NFT.

Becoming an Assassin

A player's assassin file is their identity in the Underworld and a core progression piece as they fight to move up a syndicate towards the High Table. Each Assassin file offers a different menu of available characteristics for their members' selection, spanning appearance, fighting styles, and special skills. Visually, players can customize their assassin's look using a character creator tool. Customization options are driven by player's syndicate skin (e.g. tattoos or other distinguishing marks) and the NFTs in their Assassin file.

Preparing for War

After customizing their Assassin, players will enter the opulent Continental Hotel to further hone their abilities and collect items. The Continental is a global series of luxury hotels exclusively for criminal members of the Underworld. It serves as equal parts sanctuary, marketplace, haberdashery, and social hub. Some activities include:

Immersion—Buy/Sell/Trade
Tokenized items and digital collectibles, such as weapons, cars, and pets obtained through visits to the Sommelier, the Chop Shop, and the Kennels, can be traded or sold. The later section on NFTs expands on these items.

Rest
Resting in a rented room allows one's Assassin to passively grow in power/resources, but not to the degree that sending them on a mission would. This room will serve as a refuge for the Assassin and will also be a place to store, use, or simply admire items and gear they have acquired.

Earn Gold Coins

Gold coins are the currency of the Underworld and can be used to buy upgrades, enter special areas, and rent a room in the Continental Hotel.

Socializing

In the Continental Lobby and Bar, players can socialize with other Assassins and participate in training quests, which can level up characteristics (and unlock new ones) upon completion.

Fighting to the High Table

As a player's Assassin grows stronger and collects more gear, they will become increasingly ready to fight to the High Table. There will be a mix of daily and weekly missions assigned by another player, aka the Syndicate's leader. Based on the player's success, these missions will scale in difficulty and complexity. The variety in cadence of these missions ensures that the narrative will draw players in daily. Each Assassin's chosen characteristics and gear can result in bonuses/penalties on these missions. The rarest gear will facilitate the highest chance of success, while entry-level gear can increase the risk of failure. In rising up the ranks, the ultimate test of skills comes when trying to take down one's own Syndicate leader. Victory means being crowned the top dog of the Syndicate. Failure means being charged with treason, damaging one's standing Earning & Defending Ranks After attaining a certain level of stature within the syndicate hierarchy, players can begin maintaining a Crew of fellow Assassins. The size of this Crew expands as players continue to rise up the ranks, as does their ability to earn gold coins—along with their potential to become the target of an enemy's Hit. A player will be required to complete a certain number of missions per day/week/month in order to defend their rank. This will incentivize frequent check-ins and activity. However, a successful Hit on a player would knock down the recipient's rank significantly.

Missions can be delegated to Crew members and they can also task subordinates with recruiting members, whether by offering Tickets to new Assassins or by converting the members of enemy syndicates. Other actions could include putting Crew members on Bodyguard duty, which offers defensive bonuses in the event that they are targeted by a Hit.

Gold Coin Economy

The use of gold coins as a form of currency within the John Wick universe establishes the assassin underworld as a place where traditional forms of currency are not always accepted. Gold coins are very valuable and are highly sought after. They are often used as a way to pay for goods, such as weapons and drinks, and services, such as hiring hitmen, and are also used as a way to bribe or blackmail.

Within the game, players can use gold coins to purchase items and services, as well as place bounties on contracts. Here are the main ways that players are able to use gold coins—gold coins are granted, acquired and/or purchased by players, but cannot be transferred outside the game. These gold coins will be an in-game currency in the traditional sense.

1. FOR GOODS:
3. FOR INFORMATION:
2. FOR CONTRACTS:
4. FOR SERVICES:

Further examples of UNDERWORLD ECONOMIC DETAILS are shown in conjunction with the table presented in FIG. 23.

Assassin for Hire

Successful blockchain games offer the opportunity to lend out your NFTs to other players to collect passive income. We want to make this process simple, easy, and engaging. Players will get notifications requesting, through a contract, to loan out their assassin to enter a mission.

The loaning out of an assassin can be done from any smart mobile device and gives the player more flexibility with how they use their assassin in the Underworld. Based on the success or failure of the mission, the assassin will be awarded or penalized and their story legend will be changed.

Assassin

Every Assassin is a reflection of their accomplishments in the Underworld and each become more valuable as they grow in experience. Even the tattoos an assassin holds could become a valuable asset that another player desires.

Weapons

Weapons are both bought and earned. Each weapon class is managed by the blockchain and is an NFT. Players can collect, trade and upgrade weapons in the Continental.

Fashion and Gear

Fashion is both a way to express oneself and upgrade armor. As players earn gold coins they can continue to upgrade their assassins' outfits and gear. Both can be earned, bought or traded in the Continental.

Pets

Pets (or other NPCs) can become an iconic part of the Underworld and can be associated with a player a group of players and/or a syndicate and memorialized via NPC NFTs. As you upgrade a pet based on game play they can be gifted or loaned to others to help carry out a mission. There can be missions that will require pets to execute based on guided directions of command by the associated player.

Vehicles, Parts and Other Game Items

Game items help the player in his missions. For example, vehicles can be used to navigate the world quickly. Vehicles are also a place where many hold their gear for a mission. Players can bring much more to the battle with a vehicle versus walking there. Vehicles can be constantly upgraded, bought, sold and loaned.

Rooms and Locations

Acquire a room at The Continental or own a club. Rooms and locations become a vital part of the world and economy. Rooms can be upgraded, bought, sold or traded.

It should be noted that the terms "user" and "player" can be used interchangeably to refer to the player of a game. Furthermore, the player of a game may have an associated character in a multiplayer game that can be controlled by the player to play the game and which can also be referred to as an "avatar". As such a player and a character (the player's character) can be referred to interchangeably.

As used herein, the term "non-player character" can be used to indicate either (a) a game character that may interact with a player's character but that is controlled by the game and does operate directly under a player's control; and/or (b) a character that may be associated with a player's character, may take commands from the character. but otherwise operates not under direct control, but autonomously within the game in response to general commands from a player, if any.

As used herein, the terms "game piece" and "game item" and can be used interchangeably to refer to an ancillary article or other article or object that is used in a game. It should also be noted that a game piece can also correspond to a game character.

As used herein "blockchain" and "blockchain node" refer to traditional blockchain technology. However, other decentralized computer network technologies that, for example, maintain a secure and decentralized record of transactions and/or otherwise protect the security of digital information can likewise be employed. In various examples, a blockchain can operate to collect information together in groups, such as blocks, that hold sets of information. These blocks have certain storage capacities and, when filled, are closed and linked to the previously filled blocks, forming a chain of data. New information that follows that freshly added block is compiled into newly formed blocks that, once filled, can also be added to the chain.

As used herein the term "tool" corresponds to a utility, application and/or other software routine that performs one or more specific functions in conjunction with a computer.

FIG. 24A presents a block/flow diagram representation of an example system. In the example shown, NFT generation tools 808 operate to player token NFT data 7120-1 and other data 7412-1 into a player token NFT 7410-1. In addition to any or all of the types of other data that can be included in an NFT, the other data 7412-1, in this example, includes player hierarchy data 7400-1 that described a player hierarchy. As used herein, a player hierarchy pertains to a syndicate, cooperative unit, affiliation, or other group of players and/or NPCs of a multiplayer game that are organized in a hierarchical relationship having two or more levels. As used in this context the term "player" refers to a character/avatar that is used by a particular player in game play.

In various examples, like the syndicates previously discussed, player hierarchies are groups formed in a game to include a collection of players (with associated characters) and possibly one or more non-player characters (NPCs) that are formally associated with one another, share an allegiance, cooperate and/or work together to generally provide mutual protection, to toward pursue common goals, common quests, pursuits and/or tasks and/or that otherwise operate as a unit or team. These players can be referred to as "members" of the player hierarchy unless or until they are terminated, disavowed and/or otherwise disassociated with the player hierarchy.

In some examples, the collection of players can include mercenaries, contractors and/or other affiliates, that are part of the player hierarchy but their continuing membership is contingent upon one or more conditions, such as (a) the player receiving predetermined monetary payments or awards, (b) the player hierarchy achieving one or more predetermined goals or achievements, (c) a predetermined length of time, (d) only for a predetermined project, task or quest, or (e) other terms and conditions of the game. In some examples, one or more characters may outwardly share the common goals of the player hierarchy, but instead, operate traitorously to selectively block or confound the goals of the player hierarchy and/or the individual players and/or to harm its members directly or indirectly via game play.

In the example of player hierarchy data 7400-1 that is shown in FIG. 24B, the players and NPCs are arranged in four levels. These levels can correspond to, for example, Level 4=high table member
Level 3=warlord
Level 2=assassin
Level 1=apprentice In further examples, differing numbers of levels can be included with other assignments, such as (general, colonel, lt. colonel, major, captain, lieutenant, sergeant, corporal, private, etc.), and (chairman, CEO, COO, director, manager, supervisor, assistant, etc.), etc. and in other examples the level can be simply be referred to or designated numerically or alphanumerically. In addition to the various levels, the player hierarchy can, as shown in this example, define a reporting structure and/or other association of the various players and NPCs and, for example, can indicate player subgroups, units within the group, etc. While not expressly shown, the player hierarchy data 7400-1, other data 7412-1 and/or player token NFT data 7210-1 can include a name of the player hierarchy, distinctive markings, and/or other attributes of the syndicate hierarchy, a set of attribute data corresponding to a particular player (and associated character) and/or player/character's persona. The set of attribute data can, for example, correspond to a character's imagery, character name, player name, hierarchy status and level, strength, intelligence, willpower, agility, speed, endurance, constitution, personality, luck, magical ability, fighting ability, education, social standing, dexterity, charisma, role and/or other player/character properties, abilities, strengths and/or weaknesses pertaining to the game. These properties can further include personas with differ goals including some personas having a goal to win, some personas having a goal to sabotage and/or spoil the victory for other players, other personas having a goal to extend the game as long as possible, etc. The other data 7412-1 can further include use conditions/restrictions to be associated with the player token NFT 7410-1 such as restrictions on loans and/or sales (if any), expiration conditions (if any), update conditions, and/or other conditions.

This other data 7412-1 can be used and/or combined with the player token NFT data 7120-1 to create a combined dataset. This combined dataset can be protected via the blockchain and/or other crypto-based NFT creation technology that is employed by the NFT generation tools 808 and via the NFT creation system 824 to create and protect each new player token NFT 7400-1 itself.

FIG. 24C presents a pictorial representation of an example NFT. In the example show, a player number 100024 having a character named "Debbie DeArmond" has been issued a player token NFT 7410-1 indicating the player/character's new association with the player hierarchy of a group called the "Bruconian Syndicate" in an online multiplayer fantasy game and represented by player hierarchy data 7400-1 that is included in the NFT. The imagery of the player token NFT 7410-1 includes a symbol of the syndicate on the character's armor. This syndicate is characterized by the player hierarchy data 7400-1 and this player's character has entered as a level 1 apprentice of assassin (player no. 100034) that reports to warlord (player no. 100244) who in turn reports to high table member (player no. 100234).

FIG. 24D presents a block/flow diagram representation of an example system. In the example shown, NFT generation tools 808 can be used to generate an updated player token NFT 7410-2 that is based on player token NFT 7410-1 (e.g., based on the data contained therein and/or as a derivative of the earlier NFT) and other data 7412-2, such as game play data generated via play of the game via the player/character associated with the player token NFT 7410-1 and further any changes that are made to the player hierarchy data. In various examples, the NFT generation tools 808 can operate to verify the credentials of the player token NFT 7410-1 prior to creating the updated player token NFT 7410-2. In this fashion, an updated player token NFT 7410-2 can only be created when the player's earlier token NFT is verified—preventing the creation of unauthorized or counterfeit player token NFTs.

In the example shown in FIGS. 24E and 24F, the player hierarchy data has been updated so that the reporting of player no. 100024 has changed from player no. 100034 to Player number 100134. In various examples, this update the player hierarchy results in updated NFTs being generated for player no. 100024 as well as player nos. 100034 and 100134. In various example, the remaining players in the player hierarchy are also issued updated NFTs to reflect this change.

Figure 24H:
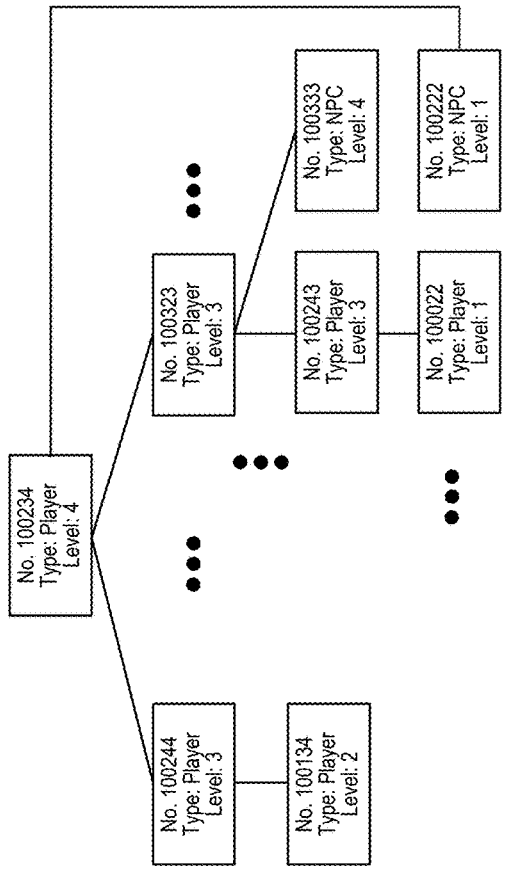

As previously noted, a player may leave a player hierarchy by tearing a syndicate ticket, choosing disassociation, being disavowed by the syndicate, by being terminated in the game, or other modes of disassociation. This can lead to updates in the player hierarchical data requiring further updates to corresponding player token NFTs of the affected players or to the all of the players of the hierarchy. In the example shown in FIG. 24G, player no. 100034 has been disassociated. In the example of FIG. 24H, this has resulted in the automatic disassociation of player nos. 100004 and 100024. This drastic action may be triggered based on the type of disassociation such as a disavowal of player 1000034.

Figure 24I:
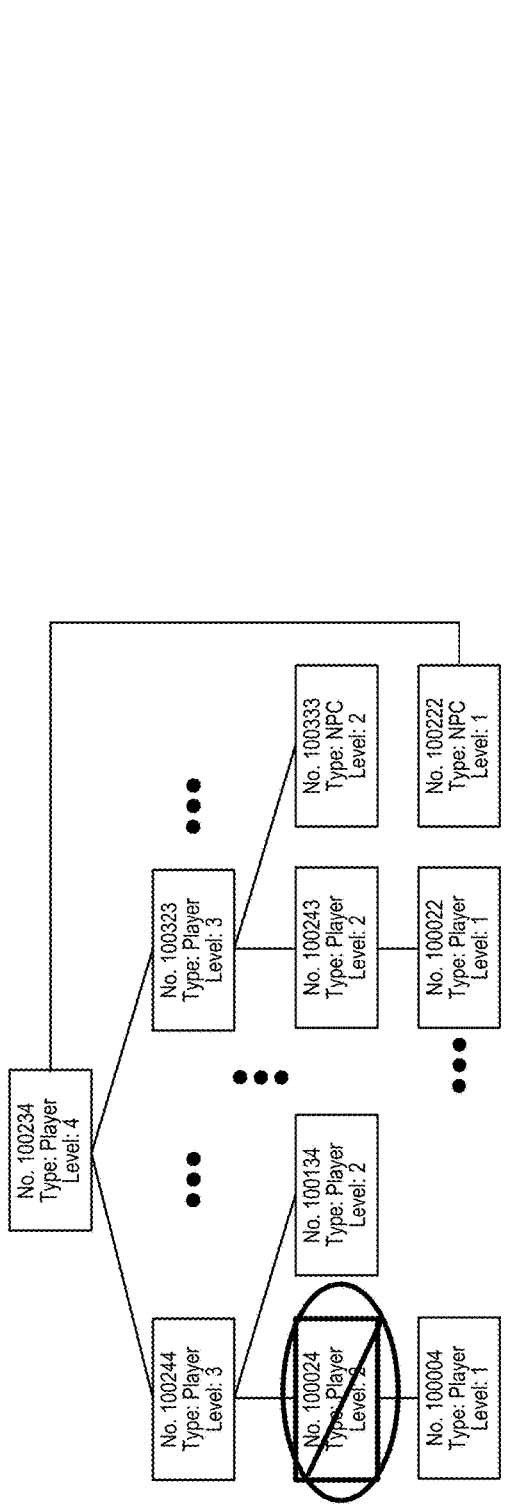
Figure 24J:
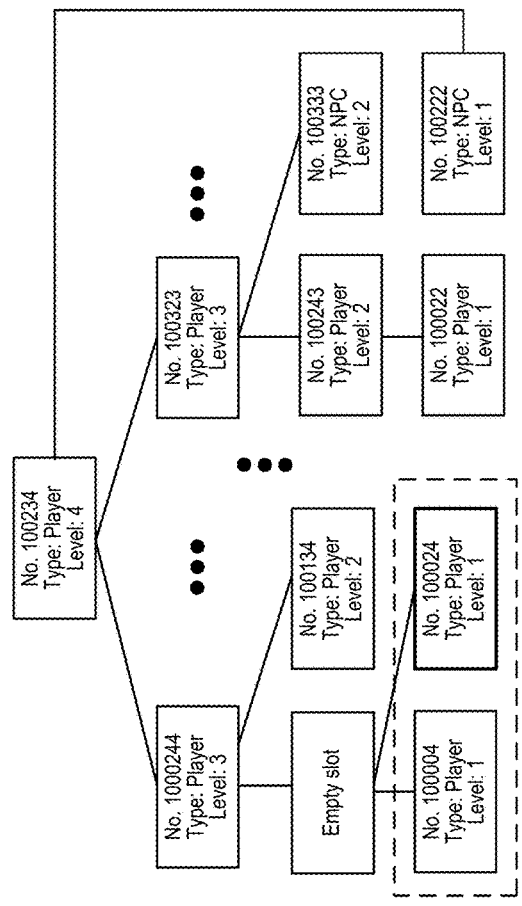

Other scenarios are likewise possible based on the rules of the game. In the example of FIG. 24I, one of the players beneath player no. 100034, in this case, player no. 100024, has been promoted to fill the slot. In FIG. 24J, player nos. 100004 and 100024 are automatically issued a challenge, such as a contest, duel or quest, with the winning player being promoted into the empty slot. While two players are indicated in this example, the challenge could likewise involve three or more players if the player hierarchy has three or more player immediately beneath the empty slot. In the event of a duel involving mortal combat between the characters in the game, the death of the losing player results in termination. In the event that one or more of the players refuses the challenge, the challenge can fall to the non-refusing player. If there is only one non-refusing player, the non-refusing player can be automatically promoted. Furthermore, in various examples, the player(s) refusing the challenge can be disavowed or demoted. The player hierarchy data and the player token NFTs for the player in the hierarchy can then be updated based on challenge results data indicating the results of the challenge.

Figure 24K:
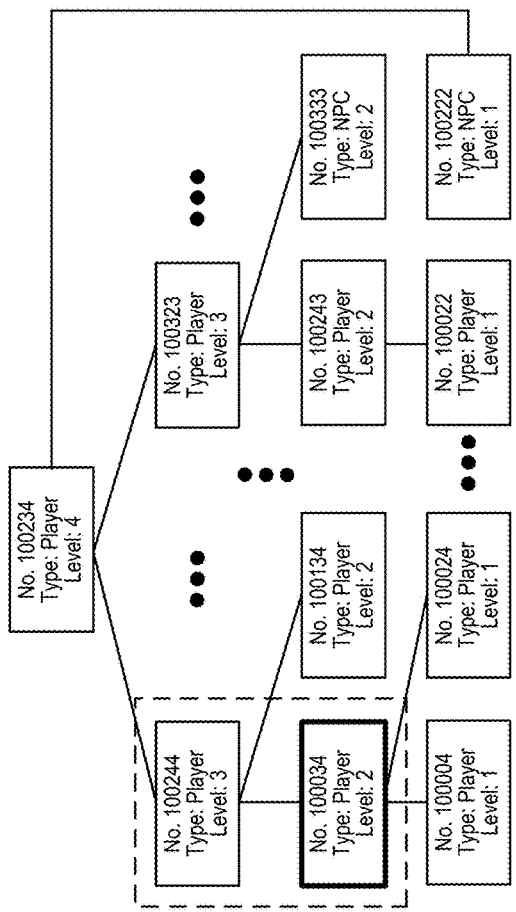
Figure 24L:
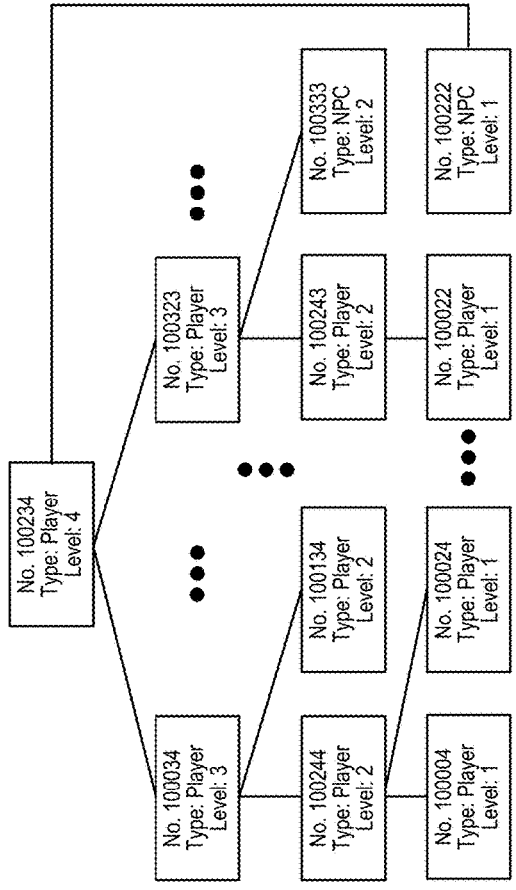

While the foregoing has discussed the automatic issuance of a challenge to fill an empty slot, in other scenarios, a player may issue a challenge to player above try to assume a higher spot in the player hierarchy. In the example of FIG. 24K, player no. 100034 has challenged player no. 100244 in the game. In the example of FIG. 24L, the player no. 100244 has either lost or refused the challenge resulting in the promotion of player no. 100034 the demotion of player no. 100244. The player hierarchy data has been updated and the corresponding player token NFTs can be updated for the affected players or for all of the players in the hierarchy.

Figure 24M:
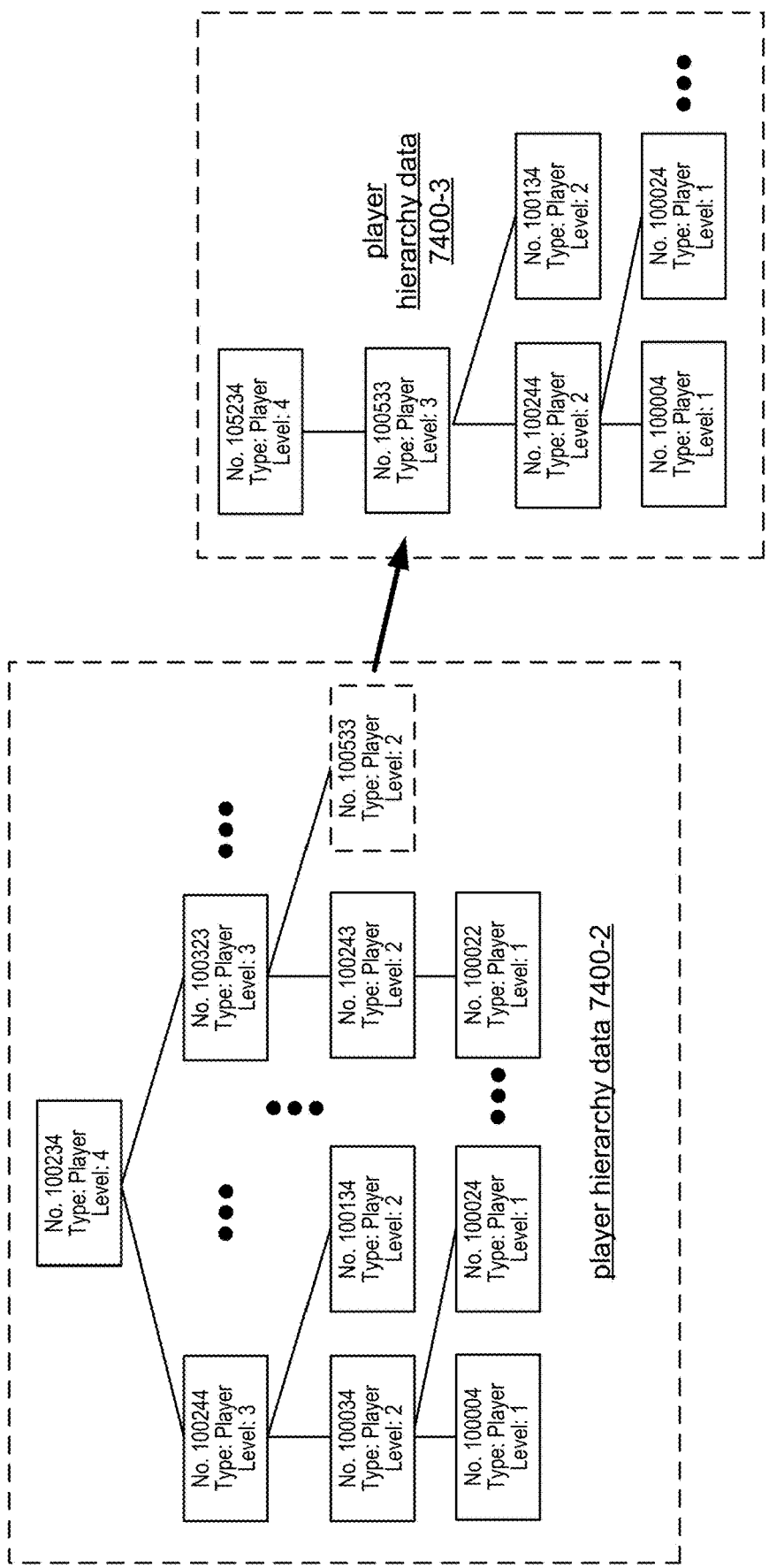

In the example of FIG. 24M, level 2 player No. 100533 has elected to disassociate with the player hierarchy corresponding to player hierarchy data 7400-2 and take a promotion to level 3 via reassociation with the player hierarchy of corresponding to player hierarchy data 7400-3. In this case player token NFTs corresponding to both player hierarchies are updated to reflect this reassociation.

Figure 24N:
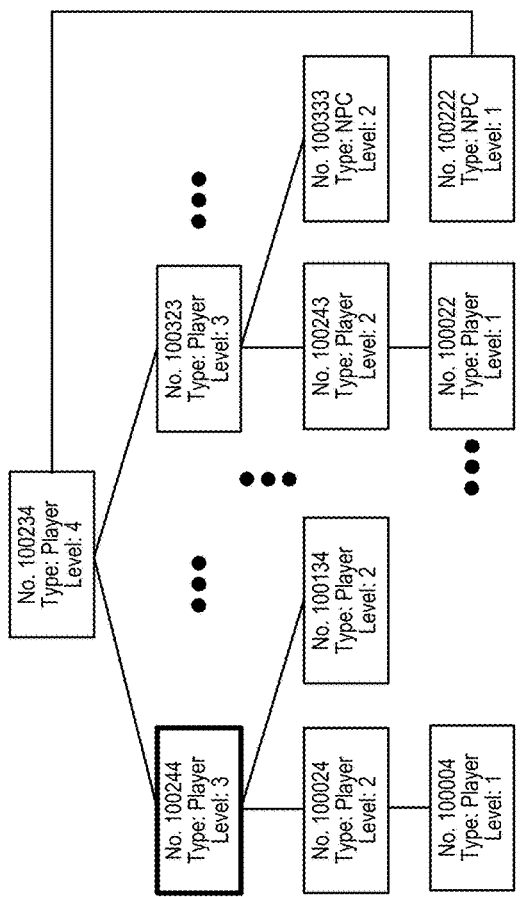
Figure 24O:
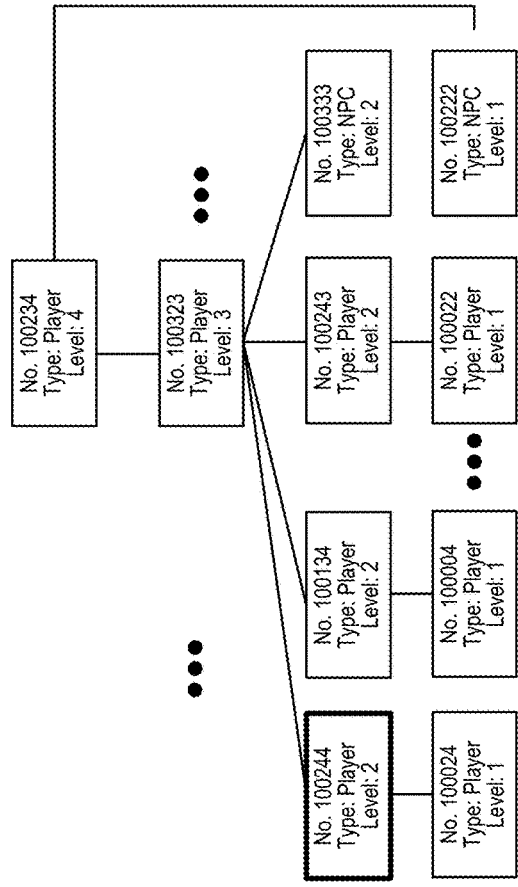

In the examples of FIGS. 24N and 24O, level 3 player no. 100244 has been demoted to level 2. This results in the automatic demotion of level 2 player 100024 beneath player no. 100244, and the automatic reassignment of player no. 100004 to player number 100134. This reassignment could be premised on the fact that there is no lower level to demote this player or happen for all players that are two levels below the demoted player, depending on the rules of the game.

Further examples including many optional functions and features are described in conjunction with FIGS. 25A-25F, 26A-26F, 27A-27F and 28A-28E. These further examples can be implemented in addition, or in the alternative, to any or all of the foregoing.

FIG. 25A presents a flowchart representation 7500-1 of an example method. In particular, a method is presented for use in conjunction with one or more functions or features described herein. For example, the method can be used with an NFT platform, game platform and/or other system that includes a processor, network interface and a memory to perform various steps of the method.

Step 7502-1 includes receiving, via the processor, player data to be associated with a player token NFT corresponding to a multiplayer game. Step 7504-1 includes receiving, via the processor, other data, wherein the other data includes player hierarchy data to be associated with the player token NFT. Step 7506-1 includes facilitating creation of the player token NFT via a blockchain-based distributed computer network, based on the player data and the player hierarchy data.

FIG. 25B presents a flowchart representation 7500-2 of an example method. In particular, a method is presented for use in conjunction with one or more functions or features described herein. For example, the method can be used with an NFT platform, game platform and/or other system that includes a processor, network interface and a memory to perform various steps of the method.

Step 7502-2 includes facilitating, via a processor, game play based on a player token NFT associated with the game. Step 7504-2 includes receiving player hierarchy data responsive to the game play. Step 7506-2 includes updating the player token NFT associated with the game, based on the player hierarchy data.

FIG. 25C presents a flowchart representation 7500-3 of an example method. In particular, a method is presented for use in conjunction with one or more functions or features described herein. For example, the method can be used with an NFT platform, game platform and/or other system that includes a processor, network interface and a memory to perform various steps of the method.

Step 7502-3 includes facilitating, via a processor, game play based on a player token NFT associated with the game. Step 7504-3 includes receiving a player hierarchy update responsive to the game play indicating a player's disassociation with a player hierarchy. Step 7506-3 includes updating the player token NFT associated with the game, based on the player hierarchy update responsive to the game play indicating the player's disassociation with the player hierarchy.

FIG. 25D presents a flowchart representation 7500-4 of an example method. In particular, a method is presented for use in conjunction with one or more functions or features described herein. For example, the method can be used with an NFT platform, game platform and/or other system that includes a processor, network interface and a memory to perform various steps of the method.

Step 7502-4 includes facilitating, via a processor, game play of a game having a plurality of players associated via a player hierarchy. Step 7504-4 includes receiving a player hierarchy update responsive to the game play. Step 7506-4 includes updating player token NFTs associated with the plurality of players based on the player hierarchy update.

FIG. 25E presents a flowchart representation 7500-5 of an example method. In particular, a method is presented for use in conjunction with one or more functions or features described herein. For example, the method can be used with an NFT platform, game platform and/or other system that includes a processor, network interface and a memory to perform various steps of the method.

Step 7502-5 includes facilitating, via a processor, game play based on a player token NFT associated with the game. Step 7504-5 includes receiving player hierarchical data responsive to the game play. Step 7506-5 includes updating the player token NFT associated with the game, based on the player hierarchical data, with imagery associated with the player hierarchical data.

FIG. 25F presents a flowchart representation 7500-6 of an example method. In particular, a method is presented for use in conjunction with one or more functions or features described herein. For example, the method can be used with an NFT platform, game platform and/or other system that includes a processor, network interface and a memory to perform various steps of the method.

Step 7502-6 includes facilitating, via a processor, game play based on a player token NFT associated with the game. Step 7504-6 includes receiving a player hierarchy update responsive to the game play indicating a player's disassociation with a first player hierarchy and association with a second player hierarchy. Step 7506-6 includes updating the player token NFT associated with the game, based on the player hierarchy update responsive to the game play indicating the player's disassociation with a first player hierarchy and association with a second player hierarchy.

Figures 26A, 26B:
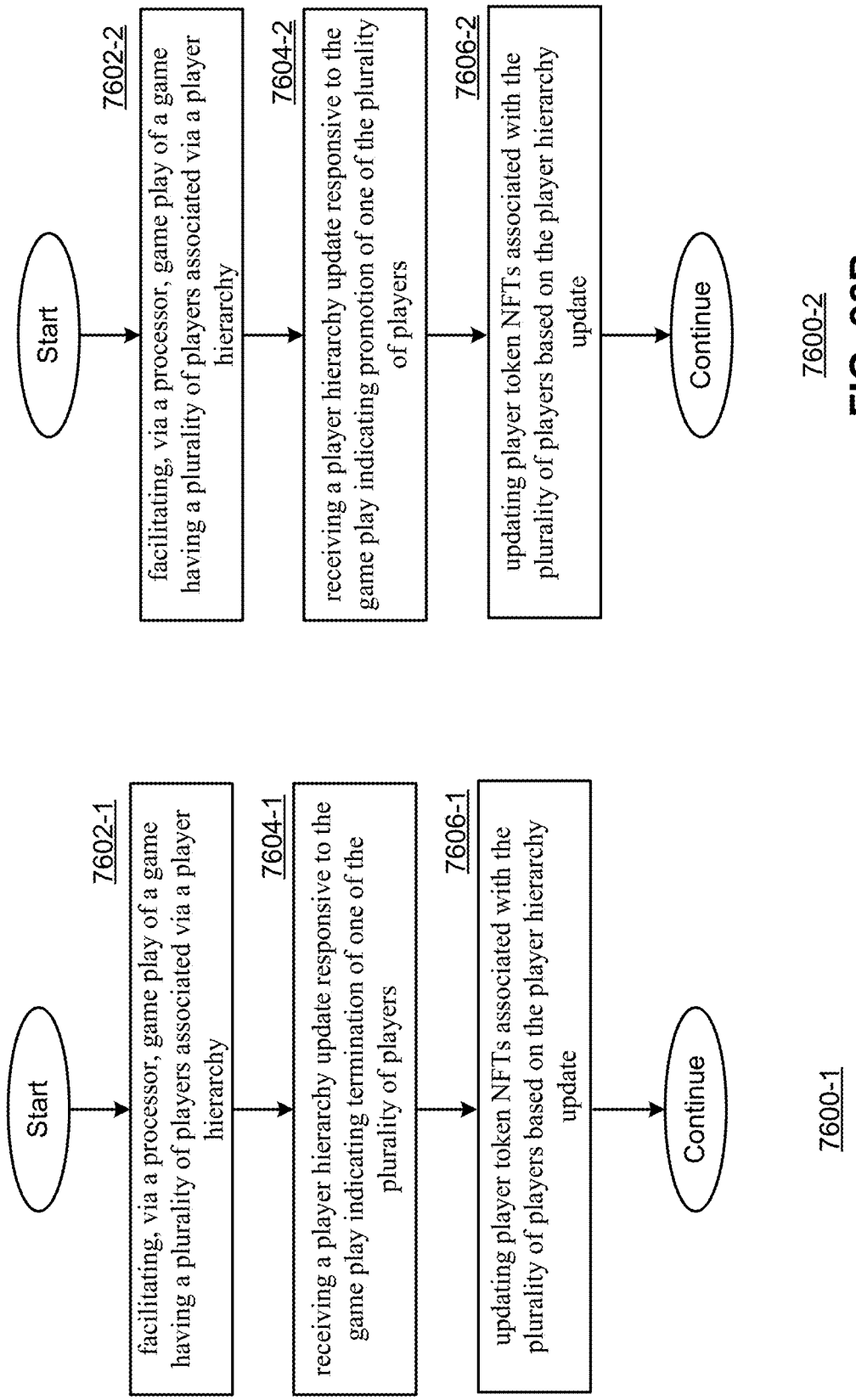

FIG. 26A presents a flowchart representation 7600-1 of an example method. In particular, a method is presented for use in conjunction with one or more functions or features described herein. For example, the method can be used with an NFT platform, game platform and/or other system that includes a processor, network interface and a memory to perform various steps of the method.

Step 7602-1 includes facilitating, via a processor, game play of a game having a plurality of players associated via a player hierarchy. Step 7604-1 includes receiving a player hierarchy update responsive to the game play indicating termination of one of the plurality of players. Step 7606-1 includes updating player token NFTs associated with the plurality of players based on the player hierarchy update.

FIG. 26B presents a flowchart representation 7600-2 of an example method. In particular, a method is presented for use in conjunction with one or more functions or features described herein. For example, the method can be used with an NFT platform, game platform and/or other system that includes a processor, network interface and a memory to perform various steps of the method.

Step 7602-2 includes facilitating, via a processor, game play of a game having a plurality of players associated via a player hierarchy. Step 7604-2 includes receiving a player hierarchy update responsive to the game play indicating promotion of one of the plurality of players. Step 7606-2 includes updating player token NFTs associated with the plurality of players based on the player hierarchy update.

FIG. 26C presents a flowchart representation 7600-3 of an example method. In particular, a method is presented for use in conjunction with one or more functions or features described herein. For example, the method can be used with an NFT platform, game platform and/or other system that includes a processor, network interface and a memory to perform various steps of the method.

Step 7602-3 includes facilitating, via a processor, game play of a game having a plurality of players associated via a player hierarchy. Step 7604-3 includes receiving a player hierarchy update responsive to the game play indicating demotion of one of the plurality of players. Step 7606-3 includes updating player token NFTs associated with the plurality of players based on the player hierarchy update.

FIG. 26D presents a flowchart representation 7600-4 of an example method. In particular, a method is presented for use in conjunction with one or more functions or features described herein. For example, the method can be used with an NFT platform, game platform and/or other system that includes a processor, network interface and a memory to perform various steps of the method.

Step 7602-4 includes facilitating, via a processor, game play of a game having a plurality of players associated via a player hierarchy. Step 7604-4 includes receiving game play data responsive to the game play indicating a termination of one of the plurality of players. Step 7606-4 includes generating a player hierarchy update indicating the termination of the one of the plurality of players and a disassociation of others of the plurality of players beneath the one of the plurality of players in the player hierarchy. Step 7608-4 includes updating player token NFTs associated with the plurality of players based on the player hierarchy update.

FIG. 26E presents a flowchart representation 7600-5 of an example method. In particular, a method is presented for use in conjunction with one or more functions or features described herein. For example, the method can be used with an NFT platform, game platform and/or other system that includes a processor, network interface and a memory to perform various steps of the method.

Step 7602-5 includes facilitating, via a processor, game play of a game having a plurality of players associated via a player hierarchy. Step 7604-5 includes receiving game play data responsive to the game play indicating a termination of one of the plurality of players. Step 7606-5 includes generating a player hierarchy update indicating the termination of the one of the plurality of players and a promotion of at least one other of the plurality of players beneath the one of the plurality of players in the player hierarchy. Step 7608-5 includes updating player token NFTs associated with the plurality of players based on the player hierarchy update.

FIG. 26F presents a flowchart representation 7600-6 of an example method. In particular, a method is presented for use in conjunction with one or more functions or features described herein. For example, the method can be used with an NFT platform, game platform and/or other system that includes a processor, network interface and a memory to perform various steps of the method.

Step 7602-6 includes facilitating, via a processor, game play associated with a game. Step 7604-6 includes receiving a player hierarchy update responsive to the game play indicating a player's disassociation with a first player hierarchy and association with a second player hierarchy. Step 7606-6 includes updating the player token NFTs associated with players in the first player hierarchy, based on the player hierarchy update indicating the player's disassociation with the first player hierarchy. Step 7608-6 includes updating the player token NFTs associated with players in the second player hierarchy, based on the player hierarchy update indicating the player's association with the second player hierarchy.

FIG. 27A presents a flowchart representation 7700-1 of an example method. In particular, a method is presented for use in conjunction with one or more functions or features described herein. For example, the method can be used with an NFT platform, game platform and/or other system that includes a processor, network interface and a memory to perform various steps of the method.

Step 7702-1 includes facilitating, via a processor, game play of a game having a plurality of players associated via a player hierarchy. Step 7704-1 includes receiving game play data responsive to the game play indicating a promotion of one of the plurality of players. Step 7706-1 includes generating a player hierarchy update indicating the promotion of the one of the plurality of players and a promotion of at least one of the plurality of players beneath the one of the plurality of players in the player hierarchy. Step 7708-1 includes updating player token NFTs associated with the plurality of players based on the player hierarchy update.

FIG. 27B presents a flowchart representation 7700-2 of an example method. In particular, a method is presented for use in conjunction with one or more functions or features described herein. For example, the method can be used with an NFT platform, game platform and/or other system that includes a processor, network interface and a memory to perform various steps of the method.

Step 7702-2 includes facilitating, via a processor, game play of a game having a plurality of players associated via a player hierarchy. Step 7704-2 includes receiving game play data responsive to the game play indicating a demotion of one of the plurality of players. Step 7706-2 includes generating a player hierarchy update indicating the demotion of the one of the plurality of players and a demotion of at least one of the plurality of players beneath the one of the plurality of players in the player hierarchy. Step 7708-2 includes updating player token NFTs associated with the plurality of players based on the player hierarchy update.

FIG. 27C presents a flowchart representation 7700-3 of an example method. In particular, a method is presented for use in conjunction with one or more functions or features described herein. For example, the method can be used with an NFT platform, game platform and/or other system that includes a processor, network interface and a memory to perform various steps of the method.

Step 7702-3 includes facilitating, via a processor, game play of a game having a plurality of players associated via a player hierarchy. Step 7704-3 includes receiving game play data responsive to the game play indicating a termination of one of the plurality of players. Step 7706-3 includes generating challenge data indicating a challenge to others of the plurality of players beneath the one of the plurality of players in the player hierarchy. Step 7708-3 includes receiving challenge resolution data indicating resolution of the challenge. Step 7710-3 includes generating a player hierarchy update based on the termination of the one of the plurality of players and the challenge resolution data. Step 7712-3 includes updating player token NFTs associated with the plurality of players based on the player hierarchy update.

FIG. 27D presents a flowchart representation 7700-4 of an example method. In particular, a method is presented for use in conjunction with one or more functions or features described herein. For example, the method can be used with an NFT platform, game platform and/or other system that includes a processor, network interface and a memory to perform various steps of the method.

Step 7702-4 includes facilitating, via a processor, game play of a game having a plurality of players associated via a player hierarchy. Step 7704-4 includes receiving game play data responsive to the game play indicating a challenge to ones of the plurality of players in the player hierarchy. Step 7706-4 includes receiving challenge resolution data indicating resolution of the challenge. Step 7708-4 includes generating a player hierarchy update based on the challenge resolution data. Step 7710-4 includes updating player token NFTs associated with the plurality of players based on the player hierarchy update.

FIG. 27E presents a flowchart representation 7700-5 of an example method. In particular, a method is presented for use in conjunction with one or more functions or features described herein. For example, the method can be used with an NFT platform, game platform and/or other system that includes a processor, network interface and a memory to perform various steps of the method.

Step 7702-5 includes facilitating, via a processor, game play of a game having a plurality of players associated via a player hierarchy. Step 7704-5 includes receiving game play data responsive to the game play indicating a challenge to a subset of the plurality of players in the player hierarchy. Step 7706-5 includes receiving challenge resolution data indicating resolution of the challenge indicating a refusal of the challenge by one of the subset of players in the player hierarchy. Step 7708-5 includes generating a player hierarchy update based on the challenge resolution data to disassociate the one of the subset of players. Step 7710-5 includes updating player token NFTs associated with the plurality of players based on the player hierarchy update.

FIG. 27F presents a flowchart representation 7700-6 of an example method. In particular, a method is presented for use in conjunction with one or more functions or features described herein. For example, the method can be used with an NFT platform, game platform and/or other system that includes a processor, network interface and a memory to perform various steps of the method.

Step 7702-6 includes facilitating, via a processor, game play of a game having a plurality of players associated via a player hierarchy. Step 7704-6 includes receiving game play data responsive to the game play indicating a challenge to a subset of the plurality of players in the player hierarchy. Step 7706-6 includes receiving challenge resolution data indicating resolution of the challenge indicating a refusal of the challenge by one of the subset of players in the player hierarchy. Step 7708-6 includes generating a player hierarchy update based on the challenge resolution data to demote the one of the subset of players. Step 7710-6 includes updating player token NFTs associated with the plurality of players based on the player hierarchy update.

Figure 28B:
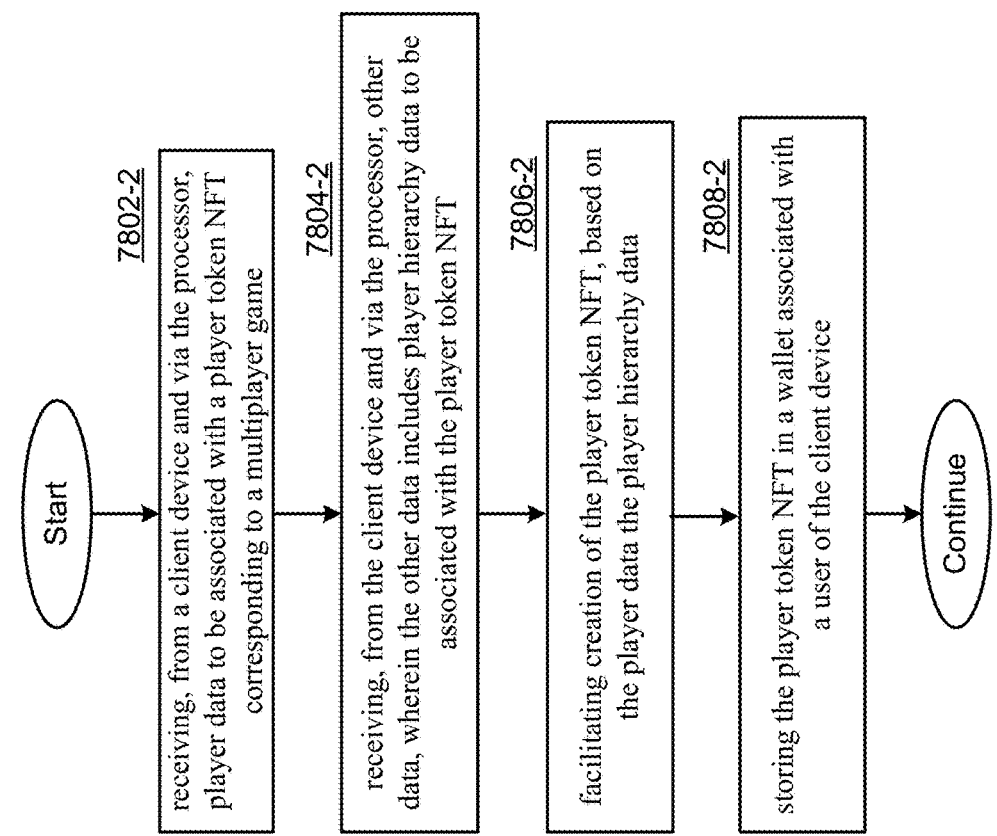
Figure 28A:
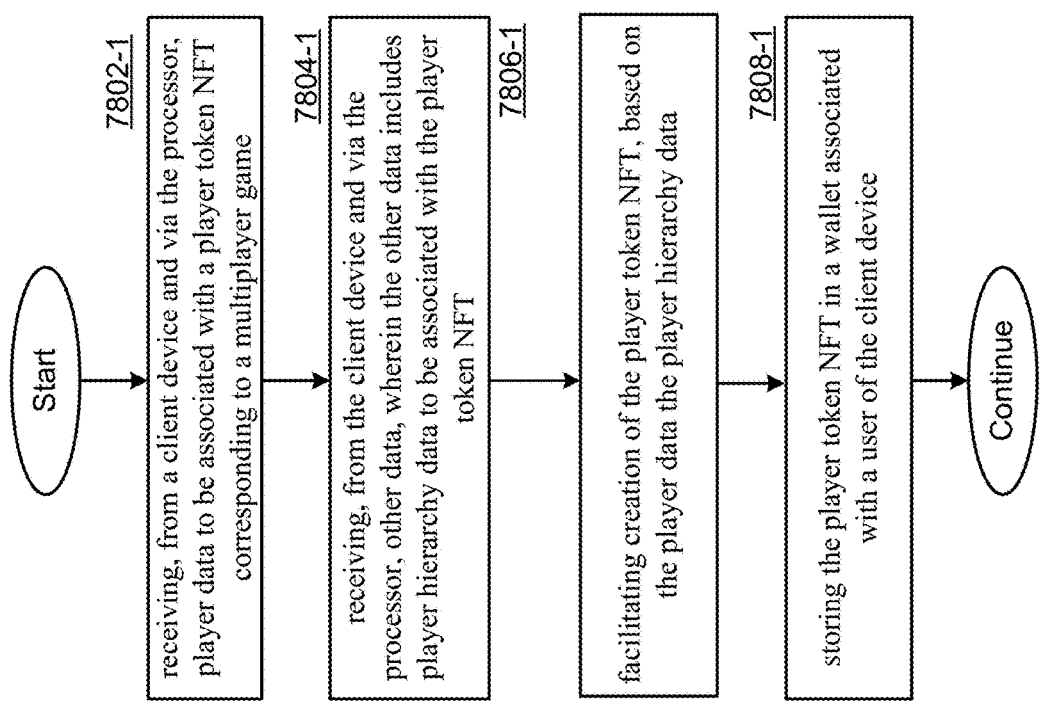

FIG. 28A presents a flowchart representation 7800-1 of an example method. In particular, a method is presented for use in conjunction with one or more functions or features described herein. For example, the method can be used with an NFT platform, game platform and/or other system that includes a processor, network interface and a memory to perform various steps of the method.

Step 7802-1 includes receiving, from a client device and via the processor, player data to be associated with a player token NFT corresponding to a multiplayer game. Step 7804-1 includes receiving, from the client device and via the processor, other data, wherein the other data includes player hierarchy data to be associated with the player token NFT. Step 7806-1 includes facilitating creation of the player token NFT, based on the player data the player hierarchy data. Step 7808-1 includes storing the player token NFT in a wallet associated with a user of the client device.

FIG. 28B presents a flowchart representation 7800-2 of an example method. In particular, a method is presented for use in conjunction with one or more functions or features described herein. For example, the method can be used with an NFT platform, game platform and/or other system that includes a processor, network interface and a memory to perform various steps of the method.

Step 7802-2 includes facilitating, via a client device, game play based on a player token NFT associated with the game. Step 7804-2 includes receiving player hierarchy data responsive to the game play. Step 7806-2 includes updating the player token NFT associated with the game, based on the player hierarchy data. Step 78-6-2 includes storing the updated player token NFT in a wallet associated with a user of the client device.

FIG. 28C presents a flowchart representation 7800-3 of an example method. In particular, a method is presented for use in conjunction with one or more functions or features described herein. For example, the method can be used with an NFT platform, game platform and/or other system that includes a processor, network interface and a memory to perform various steps of the method.

Step 7802-3 includes facilitating, via a client device game play based on a player token NFT associated with the game. Step 7804-3 includes receiving a player hierarchy update responsive to the game play indicating a player's disassociation with a player hierarchy. Step 7806-3 includes updating the player token NFT associated with the game, based on the player hierarchy update responsive to the game play indicating the player's disassociation with the player hierarchy. Step 7808-3 includes storing the updated player token NFT in a wallet associated with a user of the client device.

FIG. 28D presents a flowchart representation 7800-4 of an example method. In particular, a method is presented for use in conjunction with one or more functions or features described herein. For example, the method can be used with an NFT platform, game platform and/or other system that includes a processor, network interface and a memory to perform various steps of the method.

Step 7802-4 includes facilitating, via a client device, game play based on a player token NFT associated with the game. Step 7804-4 includes receiving player hierarchical data responsive to the game play. Step 7806-4 includes updating the player token NFT associated with the game, based on the player hierarchical data, with imagery associated with the player hierarchical data. Step 7808-4 includes storing the updated player token NFT in a wallet associated with a user of the client device.

Figure 28E:
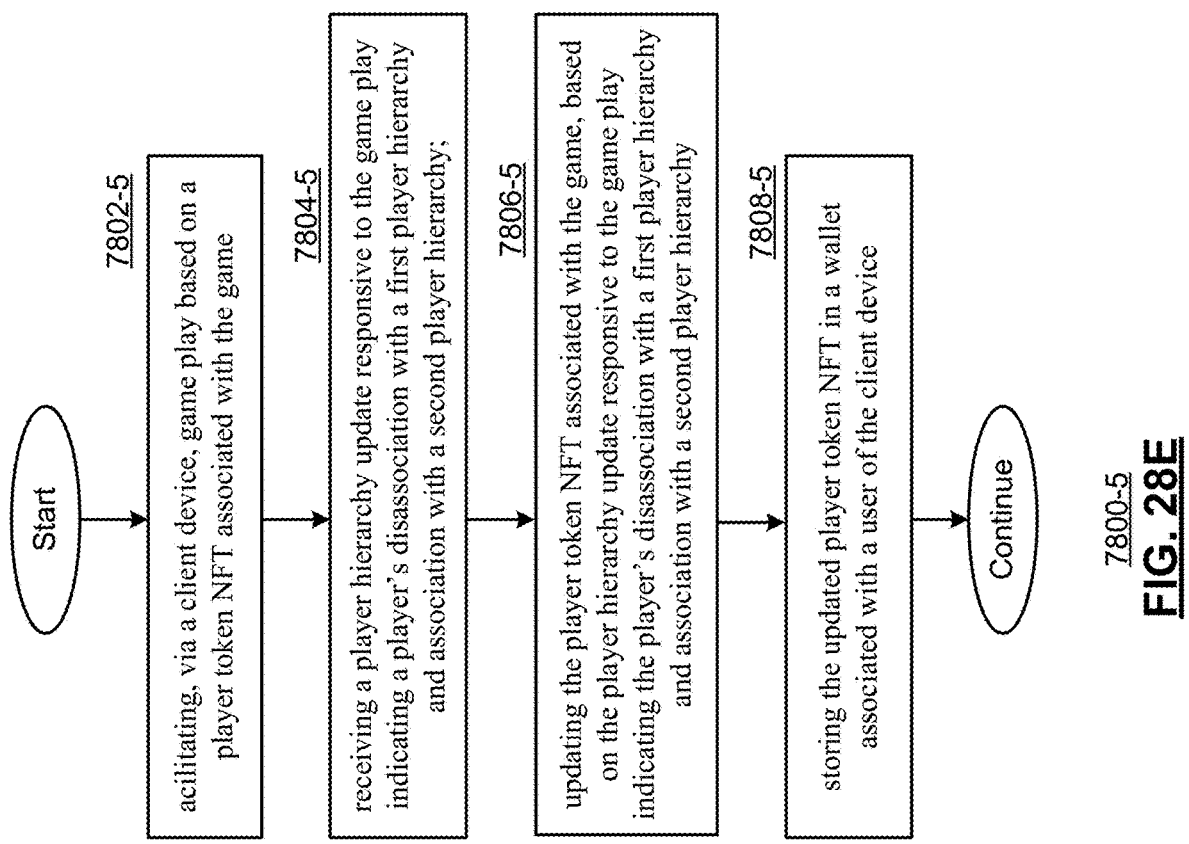

FIG. 28E presents a flowchart representation 7800-5 of an example method. In particular, a method is presented for use in conjunction with one or more functions or features described herein. For example, the method can be used with an NFT platform, game platform and/or other system that includes a processor, network interface and a memory to perform various steps of the method.

Step 7802-5 includes facilitating, via a client device, game play based on a player token NFT associated with the game. Step 7804-5 includes receiving a player hierarchy update responsive to the game play indicating a player's disassociation with a first player hierarchy and association with a second player hierarchy. Step 7806-5 includes updating the player token NFT associated with the game, based on the player hierarchy update responsive to the game play indicating the player's disassociation with a first player hierarchy and association with a second player hierarchy. Step 78-8-5 includes storing the updated player token NFT in a wallet associated with a user of the client device.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/ signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein involve NFTs that are generated ("minted") and secured via blockchain or other decentralized computer network technology. The distributed nature of these technologies over different nodes, the contemporaneous nature of geographically distinct calculations, coupled with the extreme computational complexity of the required calculations means that these decentralized computer network technologies cannot practically be performed by the human mind.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for use with a non-fungible token (NFT) platform that includes a processor and a memory, the method comprising:
   receiving, via the processor, player data to be associated with a player token NFT corresponding to a player character in a multiplayer game;
   receiving, via the processor, other data, wherein the other data includes player hierarchy data to be associated with the player token NFT, the player hierarchy data indicating a player hierarchy corresponding to a group of characters in the multiplayer game that includes the player character, the player hierarchy further indicating associations between the player character and other characters of the group of characters of the player hierarchy having differing levels compared to a level of the player character in the player hierarchy;
   facilitating creation of the player token NFT via a blockchain-based distributed computer network, based on the player data and the player hierarchy data; and
   facilitating multiplayer game play of the multiplayer game by the player character based on the player token NFT and by the other characters of the group of characters in accordance with the player hierarchy.

2. The method of claim 1, further comprising:
   receiving updated player hierarchy data responsive to the multiplayer game play; and
   updating the player token NFT associated with the multiplayer game, based on the updated player hierarchy data.

3. The method of claim 2, wherein the updated player hierarchy data indicates a player's disassociation with a player hierarchy, and wherein updating the player token NFT associated with the multiplayer game indicates the player's disassociation with the player hierarchy.

4. The method of claim 1, further comprising:
   receiving a player hierarchy update responsive to the multiplayer game play; and
   updating player token NFTs associated with the group of characters based on the player hierarchy update.

5. The method of claim 1, further comprising:
   receiving player hierarchical data responsive to the multiplayer game play; and
   updating the player token NFT associated with the multiplayer game, based on the player hierarchical data, with imagery associated with the player hierarchical data.

6. The method of claim 1, further comprising:
   receiving a player hierarchy update responsive to the multiplayer game play indicating a player's disassociation with a first player hierarchy and association with a second player hierarchy; and
   updating the player token NFT associated with the multiplayer game, based on the player hierarchy update responsive to the multiplayer game play indicating the player's disassociation with a first player hierarchy and association with a second player hierarchy.

7. The method of claim 1, further comprising:
   receiving a player hierarchy update responsive to the multiplayer game play indicating termination of one of the group of characters; and
   updating player token NFTs associated with the group of characters based on the player hierarchy update.

8. The method of claim 1, further comprising:
   receiving a player hierarchy update responsive to the multiplayer game play indicating promotion of one of the group of characters; and
   updating player token NFTs associated with the group of characters based on the player hierarchy update.

9. The method of claim 1, further comprising:
   receiving a player hierarchy update responsive to the multiplayer game play indicating demotion of one of the group of characters; and
   updating player token NFTs associated with the group of characters based on the player hierarchy update.

10. The method of claim 1, further comprising:
    receiving game play data responsive to the multiplayer game play indicating a termination of one of the group of characters;
    generating a player hierarchy update indicating the termination of the one of the group of characters and a disassociation of others of the group of characters beneath the one of the group of characters in the player hierarchy; and
    updating player token NFTs associated with the group of characters based on the player hierarchy update.

11. The method of claim 1, further comprising:
    receiving game play data responsive to the multiplayer game play indicating a termination of one of the group of characters;
    generating a player hierarchy update indicating the termination of the one of the group of characters and a promotion of at least one other of the group of characters beneath the one of the group of characters in the player hierarchy; and
    updating player token NFTs associated with the group of characters based on the player hierarchy update.

12. The method of claim 1, further comprising:
    receiving a player hierarchy update responsive to the multiplayer game play indicating a player character's disassociation with a first player hierarchy and association with a second player hierarchy;
    updating player token NFTs associated with player character's in the first player hierarchy, based on the player hierarchy update indicating the player character's's disassociation with the first player hierarchy; and updating player token NFTs associated with player character's in the second player hierarchy, based on the player hierarchy update indicating the player character's association with the second player hierarchy.

13. The method of claim 1, further comprising:
receiving game play data responsive to the multiplayer game play indicating a promotion of one of the group of characters;
generating a player hierarchy update indicating the promotion of the one of the group of characters and a promotion of at least one of the group of characters beneath the one of the group of characters in the player hierarchy; and
updating player token NFTs associated with the group of characters based on the player hierarchy update.

14. The method of claim 1, further comprising:
receiving game play data responsive to the multiplayer game play indicating a demotion of one of the group of characters;
generating a player hierarchy update indicating the demotion of the one of the group of characters and a demotion of at least one of the group of characters beneath the one of the group of characters in the player hierarchy; and
updating player token NFTs associated with the group of characters based on the player hierarchy update.

15. The method of claim 1, further comprising:
receiving game play data responsive to the multiplayer game play indicating a termination of one of the group of characters;
generating challenge data indicating a challenge to others of the group of characters beneath the one of the group of characters in the player hierarchy;
receiving challenge resolution data indicating resolution of the challenge;
generating a player hierarchy update based on the termination of the one of the group of characters and the challenge resolution data; and
updating player token NFTs associated with the group of characters based on the player hierarchy update.

16. The method of claim 1, further comprising:
receiving game play data responsive to the multiplayer game play indicating a challenge to ones of the group of characters in the player hierarchy;
receiving challenge resolution data indicating resolution of the challenge;
generating a player hierarchy update based on the challenge resolution data; and
updating player token NFTs associated with the group of characters based on the player hierarchy update.

17. The method of claim 1, further comprising:
receiving game play data responsive to the multiplayer game play indicating a challenge to a subset of the group of characters in the player hierarchy;
receiving challenge resolution data indicating resolution of the challenge indicating a refusal of the challenge by one of the subset of the group of characters in the player hierarchy;
generating a player hierarchy update based on the challenge resolution data to disassociate the one of the subset of the group of characters; and
updating player token NFTs associated with the group of characters based on the player hierarchy update.

18. The method of claim 1, further comprising:
receiving game play data responsive to the multiplayer game play indicating a challenge to a subset of the group of characters in the player hierarchy;
receiving challenge resolution data indicating resolution of the challenge indicating a refusal of the challenge by one of the subset of the group of characters in the player hierarchy;
generating a player hierarchy update based on the challenge resolution data to demote the one of the subset of the group of characters; and
updating player token NFTs associated with the group of characters based on the player hierarchy update.

19. The method of claim 1, further comprising:
storing the player token NFT in a wallet associated with a user of a client device.

20. A system comprises:
a network interface configured to communicate via a network;
a processor;
a non-transitory machine-readable storage medium that stores operational instructions that, when executed by the processor, cause the processor to perform operations that include:
receiving, via the processor, player data to be associated with a player token NFT corresponding to a player character in a multiplayer game;
receiving, via the processor, other data, wherein the other data includes player hierarchy data to be associated with the player token NFT, the player hierarchy data indicating a player hierarchy corresponding to a group of characters in the multiplayer game that includes the player character, the player hierarchy further indicating associations between the player character and other characters of the group of characters of the player hierarchy having differing levels compared to a level of the player character in the player hierarchy;
facilitating creation of the player token NFT via a blockchain-based distributed computer network, based on the player data and the player hierarchy data; and
facilitating multiplayer game play of the multiplayer game by the player character based on the player token NFT and by the other characters of the group of characters in accordance with the player hierarchy.

* * * * *